United States Patent
Iguchi et al.

(10) Patent No.: US 12,177,495 B2
(45) Date of Patent: Dec. 24, 2024

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Noritaka Iguchi, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 182 days.

(21) Appl. No.: 18/081,029

(22) Filed: Dec. 14, 2022

(65) Prior Publication Data

US 2023/0145001 A1   May 11, 2023

Related U.S. Application Data

(63) Continuation of application No. PCT/JP2021/023939, filed on Jun. 24, 2021.
(Continued)

(51) Int. Cl.
*H04N 19/96*   (2014.01)
*H04N 19/423*   (2014.01)
(Continued)

(52) U.S. Cl.
CPC ........... *H04N 19/96* (2014.11); *H04N 19/423* (2014.11); *H04N 19/597* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 2014/0375638 A1 | 12/2014 | Tomaru et al. | |
| 2019/0080483 A1* | 3/2019 | Mammou | G06T 3/4007 |
| 2021/0272323 A1* | 9/2021 | Ricard | G06T 7/50 |

FOREIGN PATENT DOCUMENTS

WO   2014/020663   2/2014

OTHER PUBLICATIONS

International Search Report issued Sep. 21, 2021 in International (PCT) Application No. PCT/JP2021/023939.

* cited by examiner

*Primary Examiner* — Rebecca A Volentine
(74) *Attorney, Agent, or Firm* — Wenderoth, Lind & Ponack, L.L.P.

(57) ABSTRACT

A three-dimensional data encoding method includes: obtaining data units each including three-dimensional points; encoding the three-dimensional points included in each of the data units; and generating a bitstream including encoded data obtained by encoding the three-dimensional points. In the encoding: geometry information of three-dimensional points included in a data unit to be encoded is converted into occupancy maps using an N-ary tree; each of the occupancy maps is converted into an index using a table indicating a correspondence relation between occupancy maps and indexes, and the encoded data is generated by encoding the index; the table is updated according to the index resulting from the conversion, and is stored into the memory; and when it is determined that the table stored in the memory is not to be initialized, encoding of a next data unit is started using the table stored in the memory.

10 Claims, 108 Drawing Sheets

Related U.S. Application Data

(60) Provisional application No. 63/043,937, filed on Jun. 25, 2020.

(51) Int. Cl.
*H04N 19/597* (2014.01)
*H04N 19/91* (2014.01)

| | GEOMETRY INFORMATION | ATTRIBUTE INFORMATION |
|---|---|---|
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

FIG. 27

EXAMPLES OF SEMANTICS OF pcc_nal_unit_type
(1) if pcc_codec_type == Codec 1
    0:Codec1 Goemetry
    1:Codec1 AttributeX
    2:Codec1 AttributeY
    3:Codec1 Geom. PS
    4:Codec1 AttrX. PS
    5:Codec1 AttrX. PS
    6:Codec1 Geometry Sequence PS
    7:Codec1 AttributeX Sequence PS
    8:Codec1 AttributeY Sequence PS
    9:Codec1 AU Header
   10:Codec1 GOF Header
 11 ~:Codec1 reserved for future use (2) if pcc_codec_type == Codec 2
    0:Codec2 DataA
    1:Codec2 MetaDataA
    2:Codec2 MetaDataB
  3 ~:Codec2 reserved for future use

PREDICTION TREE

FIG. 48

```
geometry_header {
...
NumNeighborPoint
...
NumPredMode
...
Thfix
...
QP
...
unique_point_per_leaf
}
```

FIG. 49

```
geometry_data {
...
 for (i=0; i<NumOfPoint; i++) {
  child_count
  if (distdiff >= Thfix && NumPredMode > 1)
    pred_mode
  ...
  for (j=0; j<3; j++) {
   residual_value[j]
  }
  ...
 }
}
```

FIG. 50

```
geometry_data {
...
 for (i=0; i<NumOfPoint; i++) {
  child_count for (j=0; j<3; j++) {
   if (distdiff >= Thfix && NumPredMode > 1)
      pred_mode[j]
   ...
   residual_value[j]
   }
  ...
 }
}
```

FIG. 78

```
SPS () {
  ...
  entropy_continue_enable;
  ...
}
```

FIG. 79

```
DevidedGeometryHeader () {
  gps_id
  tile_id
  slice_id
  frame_id
  if(entropy_continue_enable)
    geom_du_entropy_continue_flag;
    if(geom_du_entropy_continue_flag)
      slice2_id
  }
  other_parameter();
}
```

FIG. 80

```
DevidedAttributeHeader () {
  aps_id
  attr_index
  geom_slice_id
  if(entropy_continue_enable)
    attr_du_entropy_continue_flag;
    if(attr_du_entropy_continue_flag)
      slice2_id
  }
  other_parameter();
}
```

FIG. 81

```
DevidedAttributeHeader () {
  aps_id
  attr_index
  geom_slice_id
  if(entropy_continue_enable && geom_du_entropy_continue_flag)
     attr_du_entropy_continue_flag;
  }
  other_parameter();
}
```

FIG. 82

```
DevidedGeometryHeader () {
  if(geom_entropy_continue_enable)
     du_entropy_continue_flag;
     if(!du_entropy_continue_flag){
       gps_id
       tile_id
     }else{
       slice2_id
     }
  }
  other_parameter();
}
```

FIG. 87

```
SPS () {
  entropy_continue_enable_flag
  if(entropy_continue_enable_flag)
    entropy_continue_attr_enable_flag
}
```

FIG. 88

```
APS () {
  aps_is
  if(sps.entropy_continue_enable_flag)
    entropy_continue_attr_enable_flag
}
```

FIG. 89

```
DevidedGeometryHeader () {
  gps_id
  tile_id
  slice_id
  frame_id
  if(sps.entropy_continue_enable_flag)
    geom_du_entropy_continue_flag;
    if(geom_du_entropy_continue_flag)
      slice2_id
  }
  other_parameter();
}
```

FIG. 90

```
DevidedAttributeHeader () {
  aps_id
  attr_index
  geom_slice_id
  other_parameter();
}
```

FIG. 108

```
Geometry_data {
...
if(treemode==pred tree){
 for (i=0; i<NumOfPoint; i++) {
  child_count
  pred_mode
  root_node_flag (pred_mode==0)
  if(root_node_flag) //
     tree_cabac_init_flag;
 }
}
```

FIG. 109

```
pc_header() {
...
 num_predtree_minus2
  for (i=0; i<=num_pred_tree_minus2+1; i++) {
    numpoint_minus1_of_predtree[i]
    tree_cabac_init_flag[i]
    if(tree_ cabac_init_flag[i])
      offset[i]
}
```

FIG. 110

```
pc_header() {
 ...
 num_predtree_minus1
 num_rap;
 for (i=0; i<=num_pred_tree_minus1+1; i++)
    numpoint_minus1_of_predtree[i]

for (i=0; i<=num_rap; i++)
   tree_id[i]
   offset[i]
 }
}
```

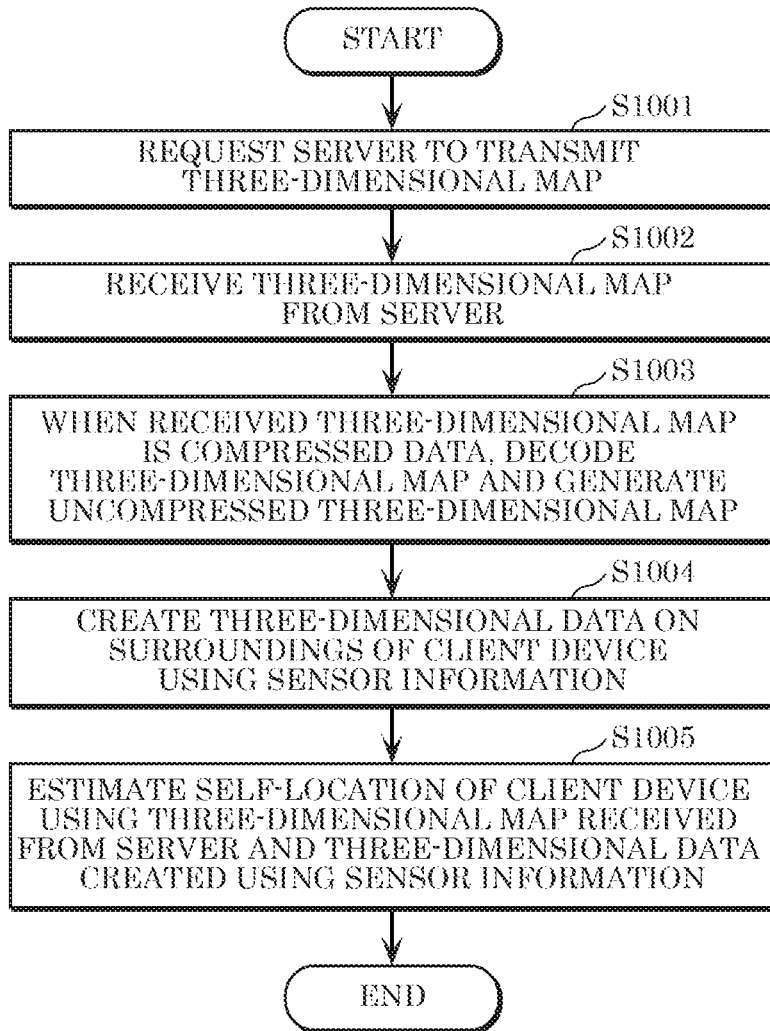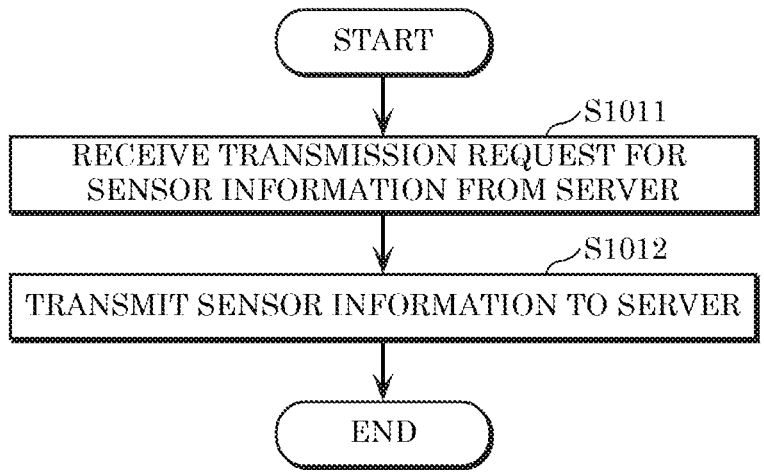

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2021/023939 filed on Jun. 24, 2021, claiming the benefit of priority of U.S. Provisional Patent Application No. 63/043,937 filed on Jun. 25, 2020, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (see, for example, Patent Literature (PTL) 1 (International Publication WO 2014/020663)).

SUMMARY

There has been a demand for causing a three-dimensional data decoding device to decode a bitstream appropriately.

The present disclosure has an object to provide a three-dimensional data encoding method, a three-dimensional data decoding method, a three-dimensional data encoding device, or a three-dimensional data decoding device that is capable of causing the three-dimensional data decoding device to decode a bitstream appropriately.

A three-dimensional data encoding method according to one aspect of the present disclosure includes: obtaining data units each including three-dimensional points; encoding the three-dimensional points included in each of the data units; and generating a bitstream including encoded data obtained by encoding the three-dimensional points, wherein in the encoding: geometry information of three-dimensional points included in a data unit to be encoded is converted into occupancy maps using an N-ary tree, N being an integer greater than or equal to 2; each of the occupancy maps is converted into an index using a table indicating a correspondence relation between occupancy maps and indexes, and the encoded data is generated by encoding the index; the table is updated according to the index resulting from the conversion, and is stored into memory; whether the table stored in the memory is to be initialized is determined when a lead three-dimensional point included in a next data unit following the data unit to be encoded is encoded; and when it is determined that the table stored in the memory is not to be initialized, encoding of the next data unit is started using the table stored in the memory, and the bitstream further includes first identification information indicating a result of the determination.

A three-dimensional data decoding method according to one aspect of the present disclosure includes: obtaining a bitstream including encoded data and first identification information, the encoded data being obtained by encoding a data unit including three-dimensional points, the first identification information indicating whether a table is to be initialized and used to encode the data unit, the table being used in encoding a preceding data unit preceding the data unit; and decoding the encoded data using the table according to the first identification information, wherein the table indicates a correspondence relation between occupancy maps and indexes, the occupancy map representing geometry information of the three-dimensional points using an N-ary tree, N being an integer greater than or equal to 2, the encoded data includes the index encoded, and in the decoding, the geometry information of the three-dimensional points is calculated by deriving an occupancy map corresponding to, in the table, the index obtained by decoding the encoded data.

The present disclosure provides a three-dimensional data encoding method, a three-dimensional data decoding method, a three-dimensional data encoding device, or a three-dimensional data decoding device that is capable of causing the three-dimensional data decoding device to decode a bitstream appropriately.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 27 is a diagram illustrating a semantics example of pcc_nal_unit_type according to Embodiment 2;

FIG. 48 is a diagram illustrating an example of a syntax of a header of geometry information according to Embodiment 4;

FIG. 49 is a diagram illustrating an example of a syntax of geometry information according to Embodiment 4;

FIG. 50 is a diagram illustrating another example of the syntax of geometry information according to Embodiment 4;

FIG. 78 is a diagram illustrating an exemplary syntax of an SPS according to Embodiment 7;

FIG. 79 is a diagram illustrating an exemplary syntax of the header (DevidedGeometryHeader) of divided geometry information according to Embodiment 7;

FIG. 80 is a diagram illustrating an exemplary syntax of the header (DevidedAttributeHeader) of divided attribute information according to Embodiment 7;

FIG. 81 is a diagram illustrating another exemplary syntax of the header (DevidedAttributeHeader) of the divided attribute information according to Embodiment 7;

FIG. 82 is a diagram illustrating another exemplary syntax of the header (DevidedGeometryHeader) of the divided geometry information according to Embodiment 7;

FIG. 87 is a diagram illustrating an example syntax of an SPS according to Embodiment 8;

FIG. 88 is a diagram illustrating an example syntax of an APS according to Embodiment 8;

FIG. 89 is a diagram illustrating an example syntax of a header of divided geometry information (DevidedGeometryHeader) according to Embodiment 8;

FIG. 90 is a diagram illustrating an example syntax of a header of divided attribute information (DevidedAttributeHeader) according to Embodiment 8;

FIG. 108 is a diagram illustrating an example of a syntax of a data unit of a geometry information item according to Embodiment 9 in a case where an initialization flag is stored in a data item of the geometry information item;

FIG. 109 is a diagram illustrating an example of a syntax of a header of a geometry information item according to Embodiment 9 in a case where an initialization flag and an offset information item are stored in the header;

FIG. 110 is a diagram illustrating an example of a syntax of a header of a geometry information item according to Embodiment 9 in a case where an initialization flag and an offset information item are stored in the header on a random access basis;

FIG. 116 is a flowchart of a three-dimensional data creation process performed by the client device according to Embodiment 10;

FIG. 117 is a flowchart of a sensor information transmission process performed by the client device according to Embodiment 10;

FIG. 119 is a flowchart of a three-dimensional map transmission process performed by the server according to Embodiment 10;

FIG. 120 is a diagram showing a structure of a variation of the system according to Embodiment 10;

FIG. 121 is a diagram showing a structure of the server and client devices according to Embodiment 10;

FIG. 122 is a diagram illustrating a configuration of a server and a client device according to Embodiment 10;

FIG. 123 is a flowchart of a process performed by the client device according to Embodiment 10;

FIG. 124 is a diagram illustrating a configuration of a sensor information collection system according to Embodiment 10;

FIG. 125 is a diagram illustrating an example of a system according to Embodiment 10;

FIG. 126 is a diagram illustrating a variation of the system according to Embodiment 10;

FIG. 127 is a flowchart illustrating an example of an application process according to Embodiment 10;

FIG. 128 is a diagram illustrating the sensor range of various sensors according to Embodiment 10;

FIG. 129 is a diagram illustrating a configuration example of an automated driving system according to Embodiment 10;

FIG. 130 is a diagram illustrating a configuration example of a bitstream according to Embodiment 10;

Figure 131:
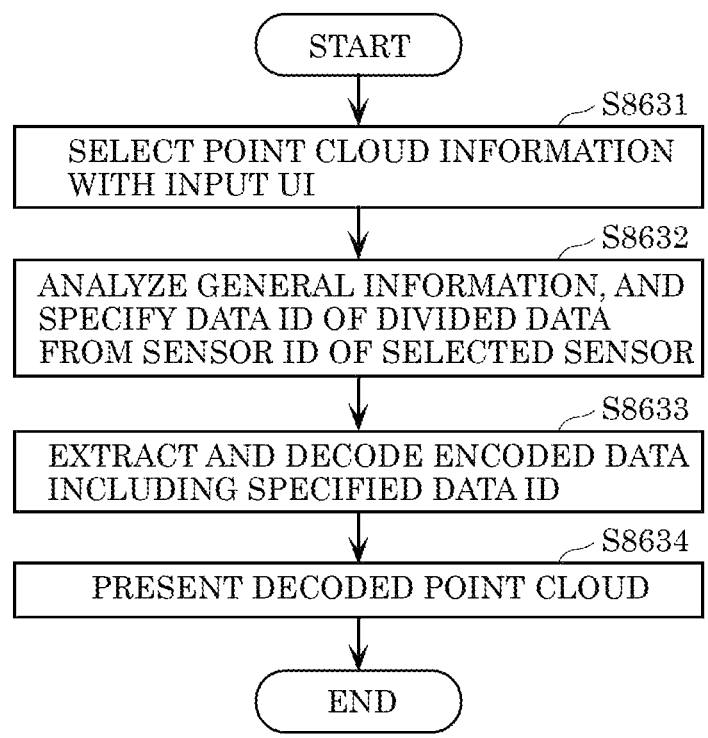
Figure 132:
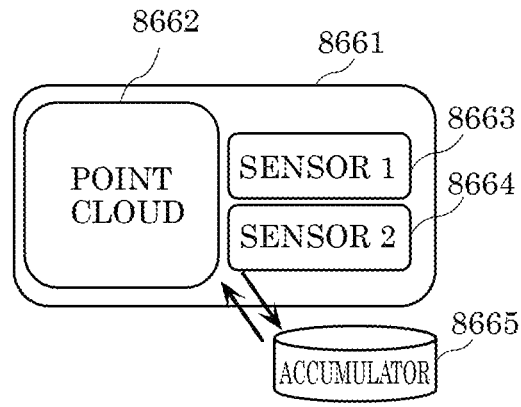
Figure 133:
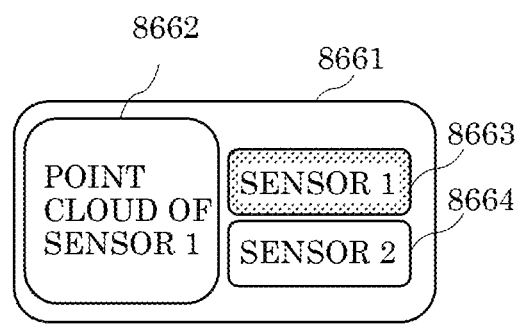
Figure 134:
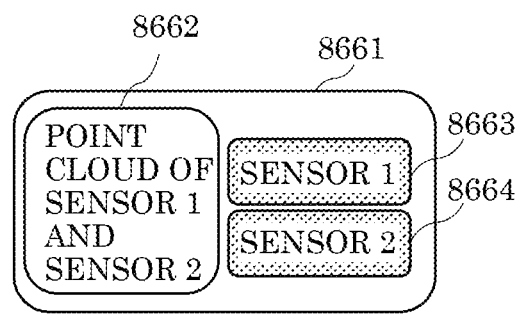

FIG. 131 is a flowchart of a point cloud selection process according to Embodiment 10;

FIG. 132 is a diagram illustrating a screen example for point cloud selection process according to Embodiment 10;

FIG. 133 is a diagram illustrating a screen example of the point cloud selection process according to Embodiment 10; and FIG. 134 is a diagram illustrating a screen example of the point cloud selection process according to Embodiment 10.

DETAILED DESCRIPTION OF THE EMBODIMENTS

A three-dimensional data encoding method according to one aspect of the present disclosure includes: obtaining data units each including three-dimensional points; encoding the three-dimensional points included in each of the data units; and generating a bitstream including encoded data obtained by encoding the three-dimensional points. In the encoding: geometry information of three-dimensional points included in a data unit to be encoded is converted into occupancy maps using an N-ary tree, N being an integer greater than or equal to 2; each of the occupancy maps is converted into an index using a table indicating a correspondence relation between occupancy maps and indexes, and the encoded data is generated by encoding the index; the table is updated according to the index resulting from the conversion, and is stored into memory; whether the table stored in the memory is to be initialized is determined when a lead three-dimensional point included in a next data unit following the data unit to be encoded is encoded; and when it is determined that the table stored in the memory is not to be initialized, encoding of the next data unit is started using the table stored in the memory. The bitstream further includes first identification information indicating a result of the determination.

Accordingly, since the index obtained using the table is encoded in the encoding of an occupancy map into which geometry information is converted, and a bitstream including the first identification information indicating whether the table used for the encoding is to be initialized is generated, the three-dimensional data decoding device is thus enabled to decode the bitstream appropriately.

Moreover, the index may indicate a total number of occurrences of an occupancy map or an occurrence frequency of an occupancy map.

Accordingly, coding efficiency can be improved by, for example, setting a smaller value to the index as the total number of occurrences or the occurrence frequency increases.

Furthermore, when indicating that the table is to be initialized, the first identification information may indicate that context of a preceding data unit is to be initialized, and attribute information of the three-dimensional points is to be encoded; and when indicating that the table is not to be initialized, the first identification information may indicate that the attribute information is to be encoded continuously using the context of the preceding data unit.

Moreover, the bitstream may further include second identification information indicating whether a function of continuing entropy between the data units is to be used, and when the second identification information indicates that the function of continuing the entropy between the data units is to be used, the first identification information may be shown.

A three-dimensional data decoding method according to one aspect of the present disclosure includes: obtaining a bitstream including encoded data and first identification information, the encoded data being obtained by encoding a data unit including three-dimensional points, the first identification information indicating whether a table is to be initialized and used to encode the data unit, the table being used in encoding a preceding data unit preceding the data unit; and decoding the encoded data using the table according to the first identification information. The table indicates a correspondence relation between occupancy maps and indexes, the occupancy map representing geometry information of the three-dimensional points using an N-ary tree, N being an integer greater than or equal to 2. The encoded data includes the index encoded. In the decoding, the geometry information of the three-dimensional points is calculated by deriving an occupancy map corresponding to, in the table, the index obtained by decoding the encoded data.

Accordingly, when determining that the bitstream is in conformance with specifications, the three-dimensional data decoding device can decode the bitstream appropriately by, for example, continuing the decoding. When determining that the bitstream is not in conformance with specifications, the three-dimensional data decoding device can prevent inappropriate decoding of the bitstream by, for example, stopping the decoding or performing an avoidance process.

Moreover, the index may indicate a total number of occurrences of an occupancy map or an occurrence frequency of an occupancy map.

Furthermore, when indicating that the table is to be initialized, the first identification information may indicate that context of the preceding data unit is to be initialized, and attribute information of the three-dimensional points is to be encoded; and when indicating that the table is not to be initialized, the first identification information may indicate that the attribute information is to be encoded continuously using the context of the preceding data unit.

Moreover, the bitstream may further include second identification information indicating whether a function of continuing entropy between the data units is to be used, and when the second identification information indicates that the function of continuing the entropy between the data units is to be used, the first identification information may be shown.

A three-dimensional data encoding device according to one aspect of the present disclosure includes a processor and memory. Using the memory, the processor obtains data units each including three-dimensional points; encodes the three-dimensional points included in each of the data units; and generates a bitstream including encoded data obtained by encoding the three-dimensional points. In the encoding: geometry information of three-dimensional points included in a data unit to be encoded is converted into occupancy maps using an N-ary tree, N being an integer greater than or equal to 2; each of the occupancy maps is converted into an index using a table indicating a correspondence relation between occupancy maps and indexes, and the encoded data is generated by encoding the index; the table is updated according to the index resulting from the conversion, and is stored into the memory; whether the table stored in the memory is to be initialized is determined when a lead three-dimensional point included in a next data unit following the data unit to be encoded is encoded; and when it is determined that the table stored in the memory is not to be initialized, encoding of the next data unit is started using the table stored in the memory. The bitstream further includes first identification information indicating a result of the determination.

Accordingly, since the index obtained using the table is encoded in the encoding of an occupancy map into which geometry information is converted, and a bitstream including the first identification information indicating whether the table used for the encoding is to be initialized is generated, the three-dimensional data decoding device is thus enabled to decode the bitstream appropriately.

A three-dimensional data decoding device according to one aspect of the present disclosure includes a processor and memory. Using the memory, the processor obtains a bitstream including encoded data and first identification information, the encoded data being obtained by encoding a data unit including three-dimensional points, the first identification information indicating whether a table is to be initialized and used to encode the data unit, the table being used in encoding a preceding data unit preceding the data unit; and decodes the encoded data using the table according to the first identification information. The table indicates a correspondence relation between occupancy maps and indexes, the occupancy map representing geometry information of the three-dimensional points using an N-ary tree, N being an integer greater than or equal to 2. The encoded data includes the index encoded. In the decoding, the geometry information of the three-dimensional points is calculated by deriving an occupancy map corresponding to, in the table, the index obtained by decoding the encoded data.

Accordingly, when determining that the bitstream is in conformance with specifications, the three-dimensional data decoding device can decode the bitstream appropriately by, for example, continuing the decoding. When determining that the bitstream is not in conformance with specifications, the three-dimensional data decoding device can prevent inappropriate decoding of the bitstream by, for example, stopping the decoding or performing an avoidance process.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims will be described as optional constituent elements.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

Figure 1:
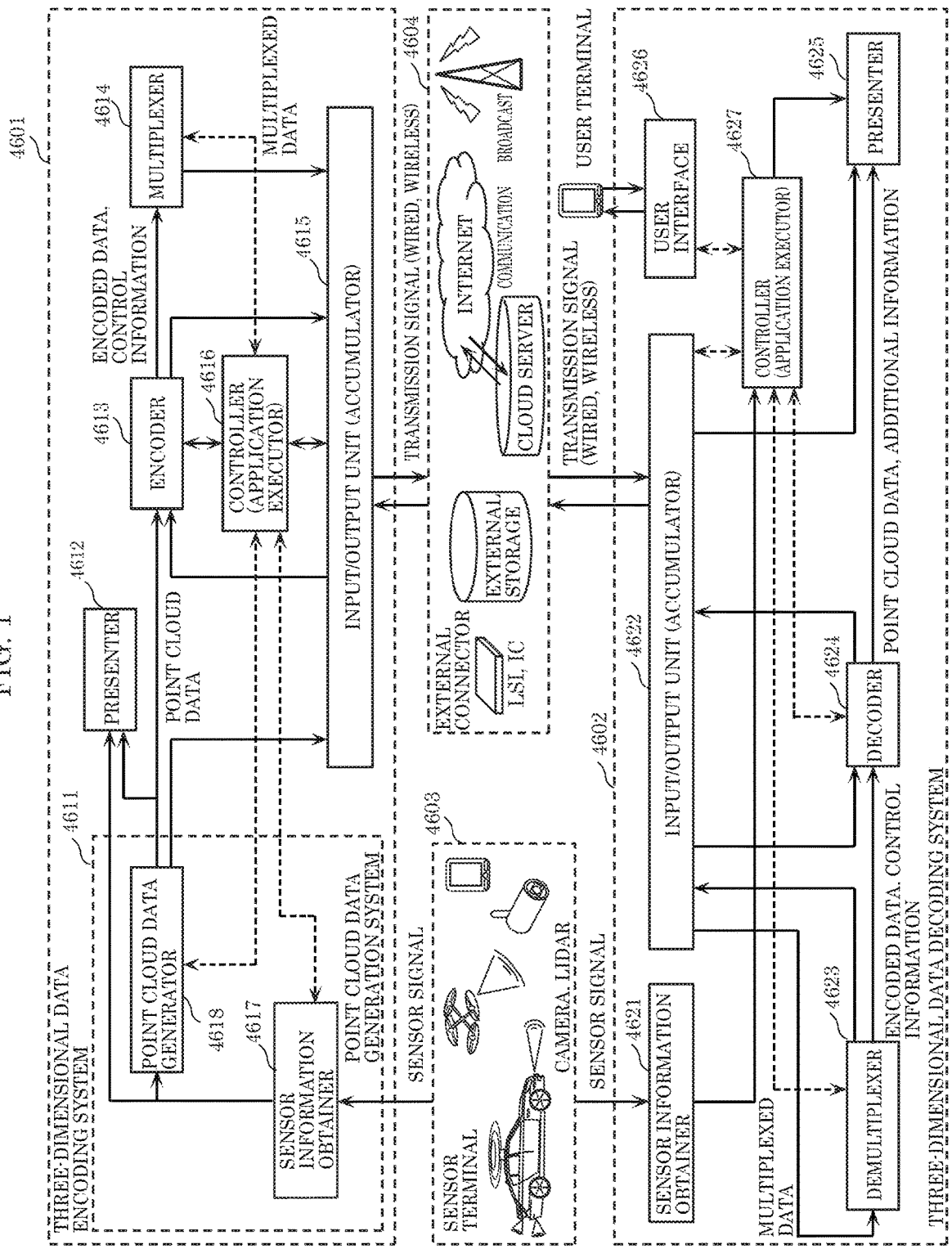
FIG. 1 is a diagram illustrating a configuration of a three-dimensional data encoding and decoding system according to Embodiment 1.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LiDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
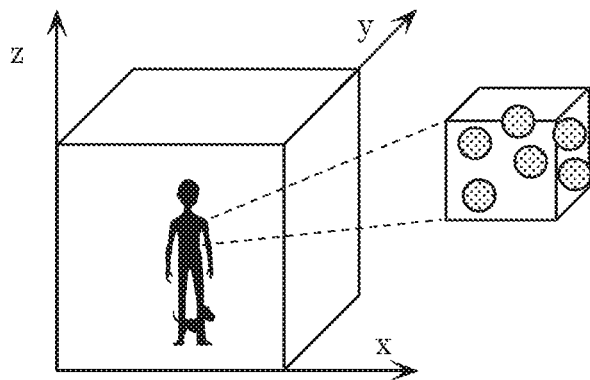
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One item of attribute information (in other words, a piece of attribute information or an attribute information item) may be associated with one item of geometry information (in other words, a piece of geometry information or a geometry information item), or attribute information on a plurality of different types of attributes may be associated with one item of geometry information. Alternatively, items of attribute information on the same type of attribute may be associated with one item of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
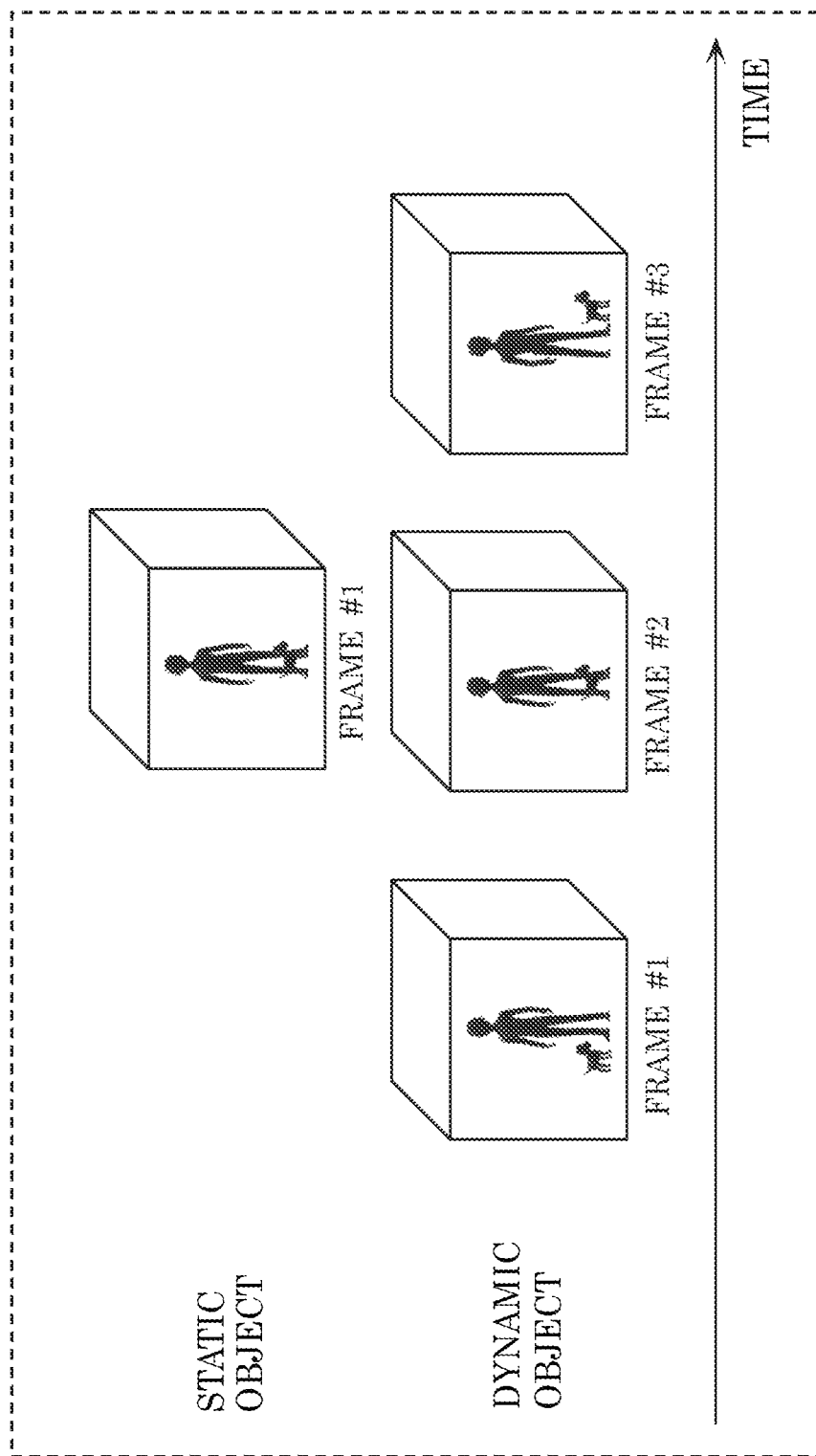
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LiDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
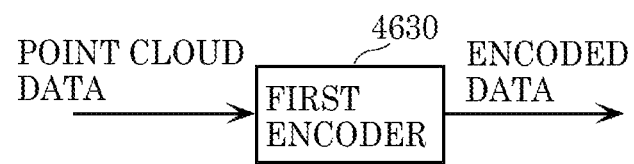
FIG. 5 is a diagram illustrating a structure of a first encoder according to Embodiment 1.
Figure 6:
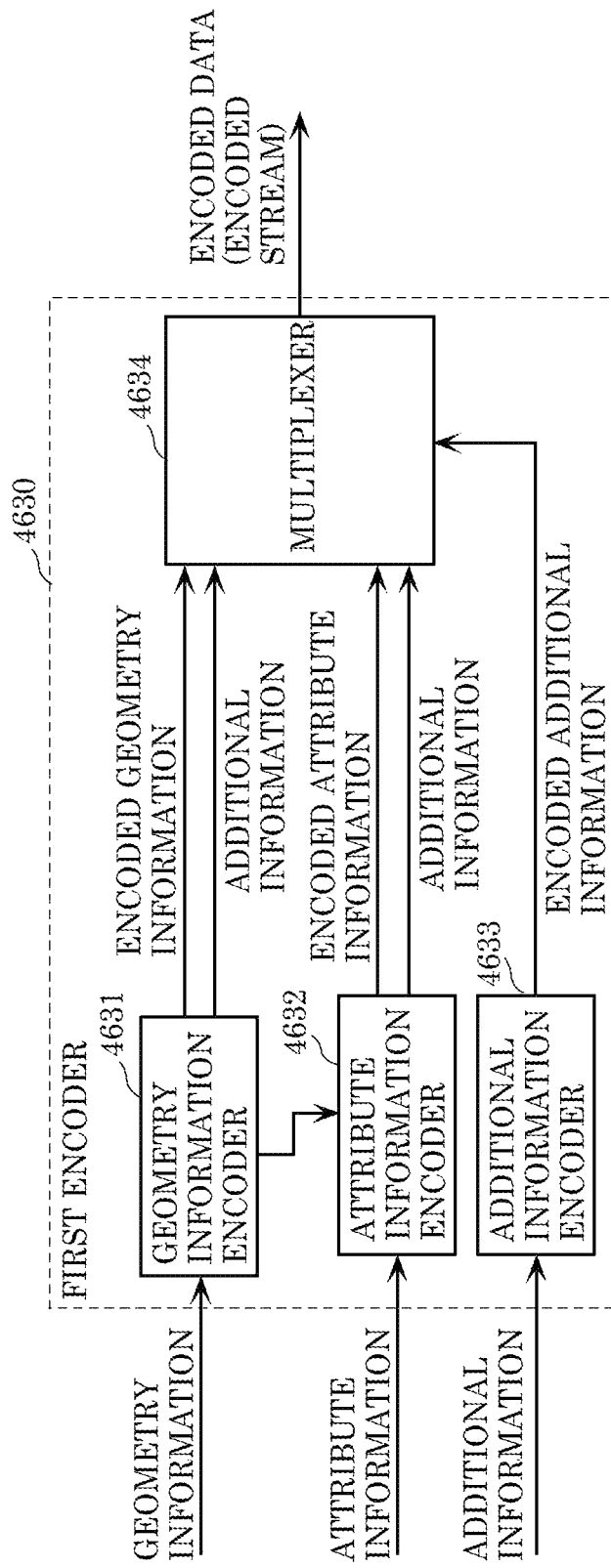
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space (target space) is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (in other words, a current node or a target node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
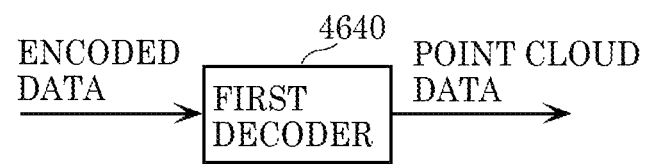
FIG. 7 is a diagram illustrating a structure of a first decoder according to Embodiment 1.
Figure 8:
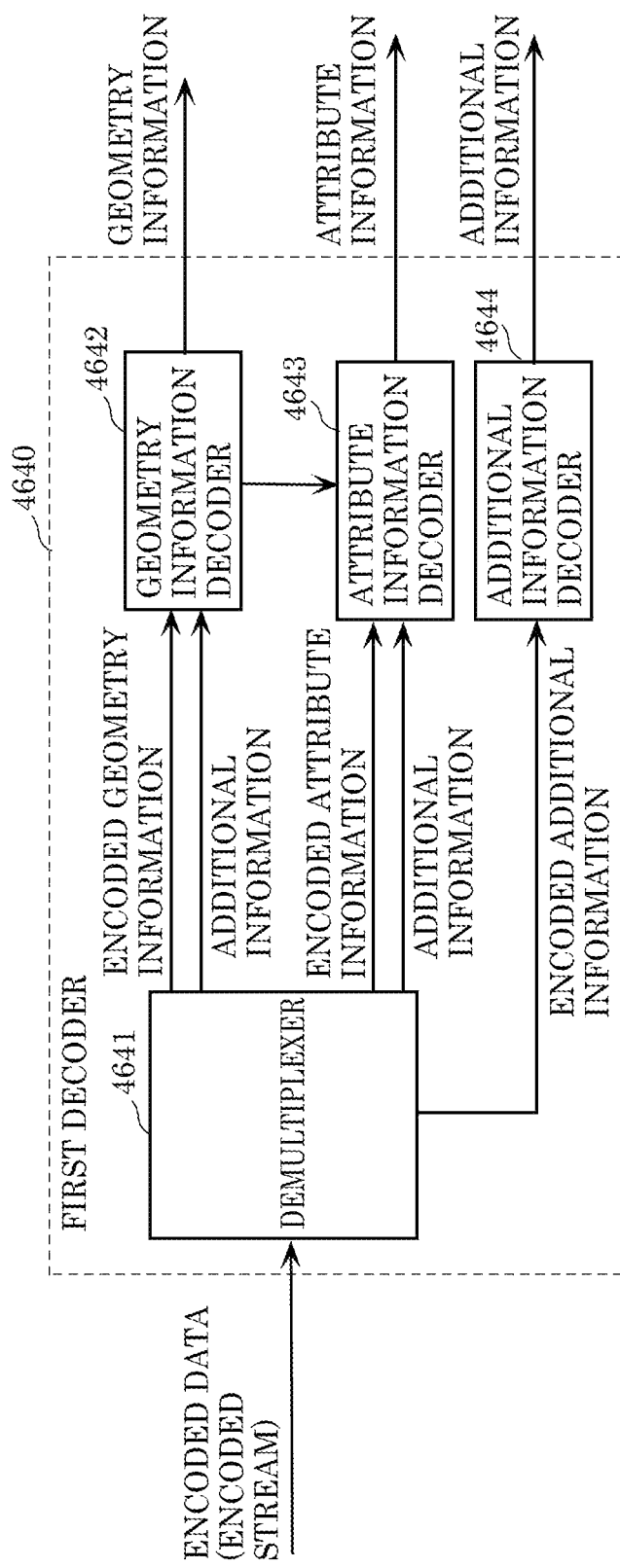
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
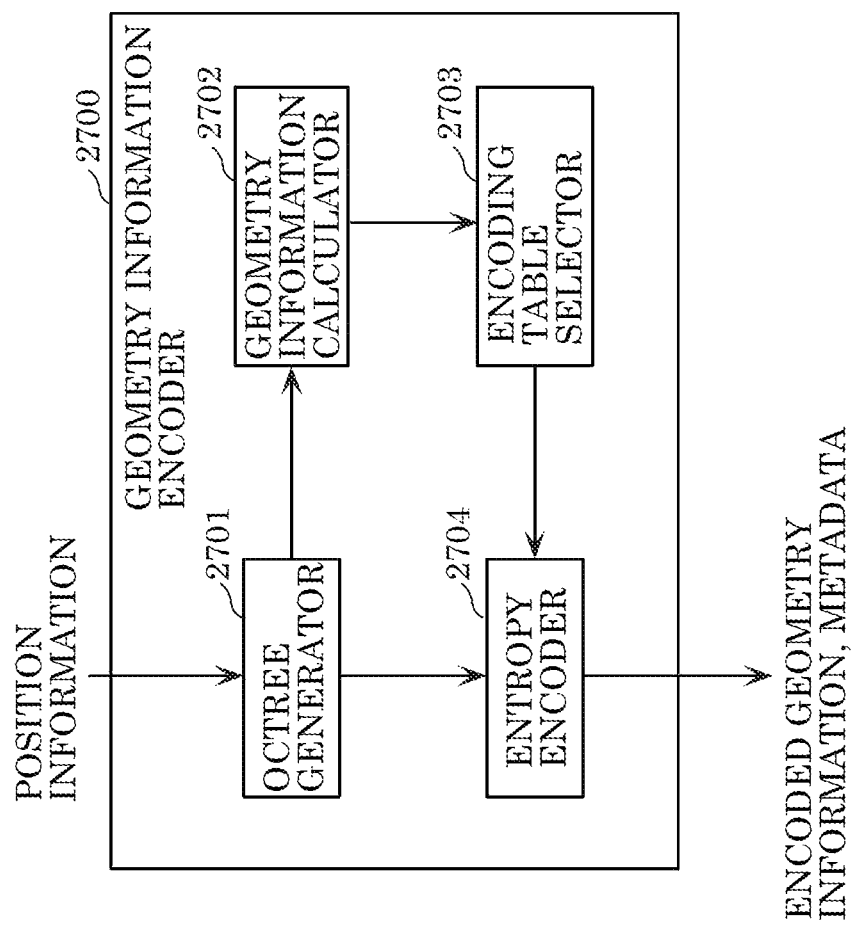
FIG. 9 is a block diagram of a three-dimensional data encoding device according to Embodiment 1.

Next, an example configuration of a geometry information encoder will be described. FIG. 9 is a block diagram of geometry information encoder 2700 according to this embodiment. Geometry information encoder 2700 includes octree generator 2701, geometry information calculator 2702, encoding table selector 2703, and entropy encoder 2704.

Octree generator 2701 generates an octree, for example, from input position information, and generates an occupancy code of each node of the octree. Geometry information calculator 2702 obtains information that indicates whether a neighboring node of a current node (target node) is an occupied node or not. For example, geometry information calculator 2702 calculates occupancy information on a neighboring node from an occupancy code of a parent node to which a current node belongs (information that indicates whether a neighboring node is an occupied node or not). Geometry information calculator 2702 may save an encoded node in a list and search the list for a neighboring node. Note that geometry information calculator 2702 may change neighboring nodes in accordance with the position of the current node in the parent node.

Encoding table selector 2703 selects an encoding table used for entropy encoding of the current node based on the occupancy information on the neighboring node calculated by geometry information calculator 2702. For example, encoding table selector 2703 may generate a bit sequence based on the occupancy information on the neighboring node and select an encoding table of an index number generated from the bit sequence.

Entropy encoder 2704 generates encoded geometry information and metadata by entropy-encoding the occupancy code of the current node using the encoding table of the selected index number. Entropy encoder may add, to the encoded geometry information, information that indicates the selected encoding table.

Figure 10:
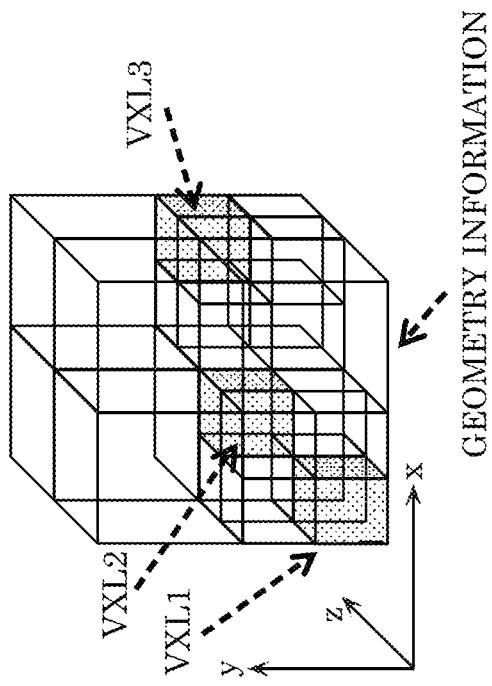
FIG. 10 is a diagram showing an example of geometry information according to Embodiment 1.
Figure 11:
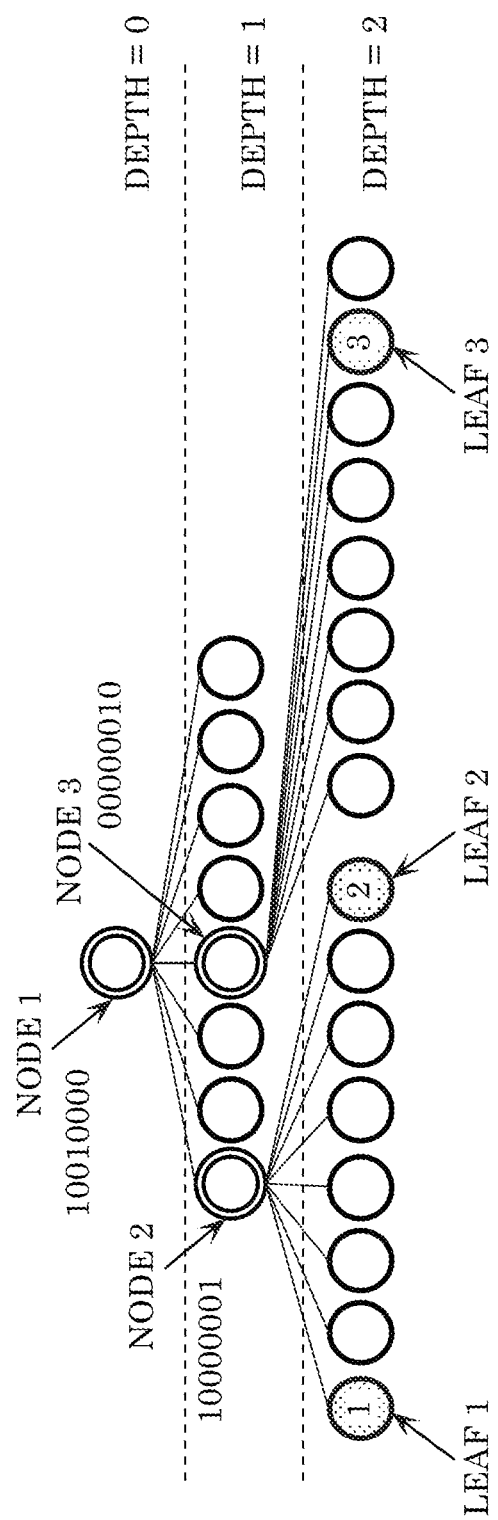
FIG. 11 is a diagram showing an example of an octree representation of geometry information according to Embodiment 1.

In the following, an octree representation and a scan order for geometry information will be described. Geometry information (geometry data) is transformed into an octree structure (octree transform) and then encoded. The octree structure includes nodes and leaves. Each node has eight nodes or leaves, and each leaf has voxel (VXL) information. FIG. 10 is a diagram showing an example structure of geometry information including a plurality of voxels. FIG. 11 is a diagram showing an example in which the geometry information shown in FIG. 10 is transformed into an octree structure. Here, of leaves shown in FIG. 11, leaves 1, 2, and 3 represent voxels VXL1, VXL2, and VXL3 shown in FIG. 10, respectively, and each represent VXL containing a point cloud (referred to as a valid VXL, hereinafter).

Specifically, node 1 corresponds to the entire space comprising the geometry information in FIG. 10. The entire space corresponding to node 1 is divided into eight nodes, and among the eight nodes, a node containing valid VXL is further divided into eight nodes or leaves. This process is repeated for every layer of the tree structure. Here, each node corresponds to a subspace, and has information (occupancy code) that indicates where the next node or leaf is located after division as node information. A block in the bottom layer is designated as a leaf and retains the number of the points contained in the leaf as leaf information.

Figure 12:
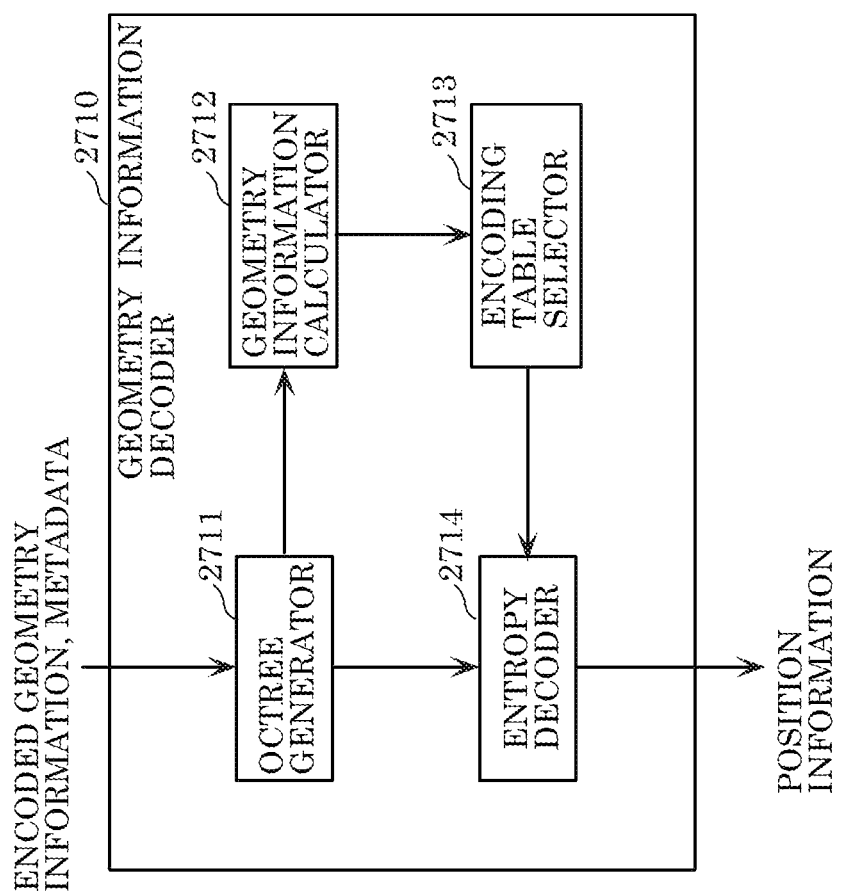
FIG. 12 is a block diagram of a three-dimensional data decoding device according to Embodiment 1.

Next, an example configuration of a geometry information decoder will be described. FIG. 12 is a block diagram of geometry information decoder 2710 according to this embodiment. Geometry information decoder 2710 includes octree generator 2711, geometry information calculator 2712, encoding table selector 2713, and entropy decoder 2714.

Octree generator 2711 generates an octree of a space (node) based on header information, metadata or the like of a bitstream. For example, octree generator 2711 generates an octree by generating a large space (root node) based on the sizes of a space in an x-axis direction, a y-axis direction, and a z-axis direction added to the header information and dividing the space into two parts in the x-axis direction, the y-axis direction, and the z-axis direction to generate eight small spaces A (nodes A0 to A7). Nodes A0 to A7 are sequentially designated as a current node.

Geometry information calculator 2712 obtains occupancy information that indicates whether a neighboring node of a current node is an occupied node or not. For example, geometry information calculator 2712 calculates occupancy information on a neighboring node from an occupancy code of a parent node to which a current node belongs. Geometry information calculator 2712 may save a decoded node in a list and search the list for a neighboring node. Note that geometry information calculator 2712 may change neighboring nodes in accordance with the position of the current node in the parent node.

Encoding table selector 2713 selects an encoding table (decoding table) used for entropy decoding of the current node based on the occupancy information on the neighboring node calculated by geometry information calculator 2712. For example, encoding table selector 2713 may generate a bit sequence based on the occupancy information on the neighboring node and select an encoding table of an index number generated from the bit sequence.

Entropy decoder 2714 generates position information by entropy-decoding the occupancy code of the current node using the selected encoding table. Note that entropy decoder 2714 may obtain information on the selected encoding table by decoding the bitstream, and entropy-decode the occupancy code of the current node using the encoding table indicated by the information.

Figure 13:
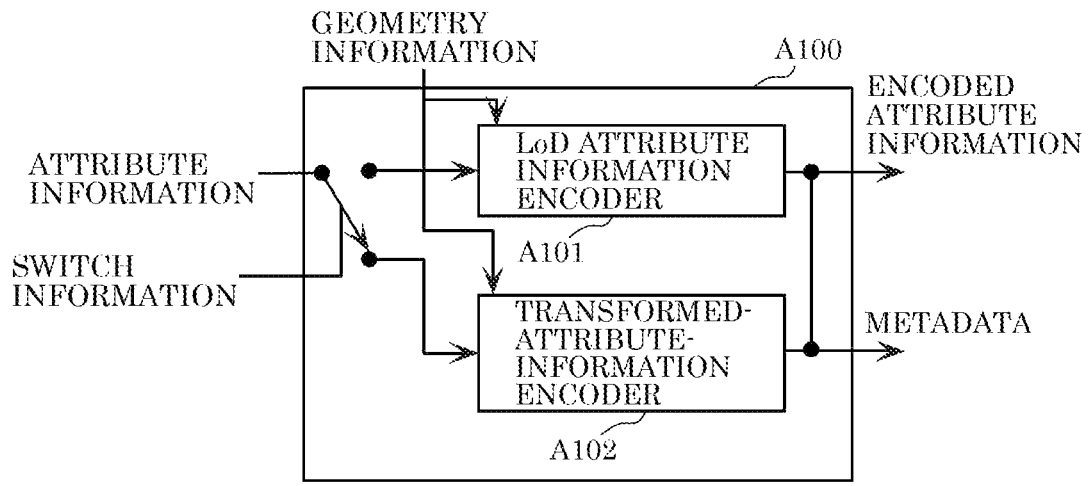
FIG. 13 is a block diagram of an attribute information encoder according to Embodiment 1.

In the following, configurations of an attribute information encoder and an attribute information decoder will be described. FIG. 13 is a block diagram showing an example configuration of attribute information encoder A100. The attribute information encoder may include a plurality of encoders that perform different encoding methods. For example, the attribute information encoder may selectively use any of the two methods described below in accordance with the use case.

Attribute information encoder A100 includes LoD attribute information encoder A101 and transformed-attribute-information encoder A102. LoD attribute information encoder A101 classifies three-dimensional points into a plurality of layers based on geometry information on the three-dimensional points, predicts attribute information on three-dimensional points belonging to each layer, and encodes a prediction residual therefor. Here, each layer into which a three-dimensional point is classified is referred to as a level of detail (LoD).

Transformed-attribute-information encoder A102 encodes attribute information using region adaptive hierarchical transform (RAHT). Specifically, transformed-attribute-information encoder A102 generates a high frequency component and a low frequency component for each layer by applying RAHT or Haar transform to each item of attribute information based on the geometry information on three-dimensional points, and encodes the values by quantization, entropy encoding or the like.

Figure 14:
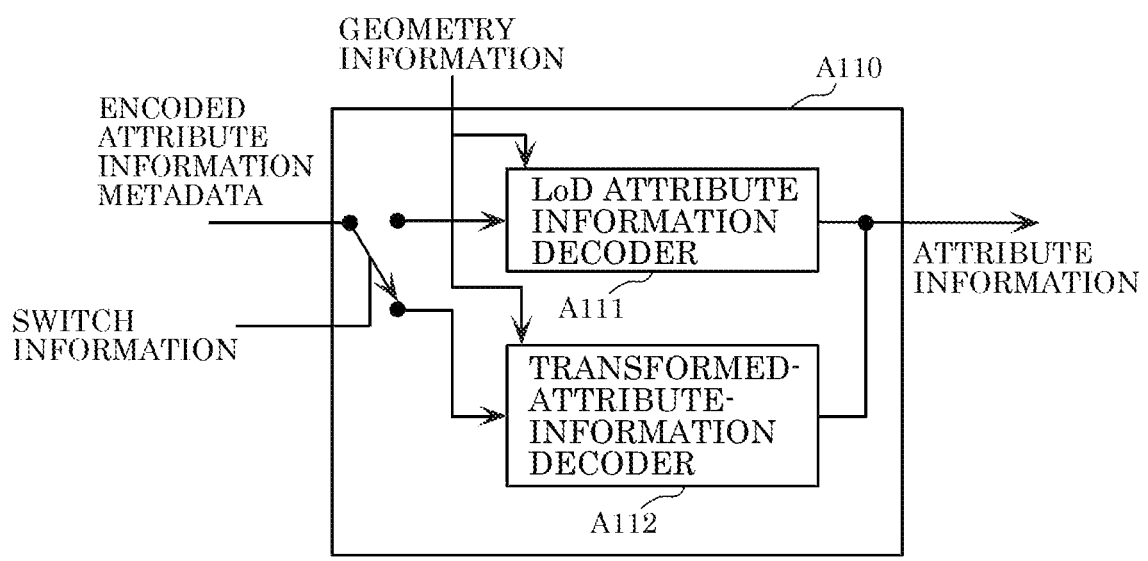
FIG. 14 is a block diagram of an attribute information decoder according to Embodiment 1.

FIG. 14 is a block diagram showing an example configuration of attribute information decoder A110. The attribute information decoder may include a plurality of decoders that perform different decoding methods. For example, the attribute information decoder may selectively use any of the two methods described below for decoding based on the information included in the header or metadata.

Attribute information decoder A110 includes LoD attribute information decoder A111 and transformed-attribute-information decoder A112. LoD attribute information decoder A111 classifies three-dimensional points into a plurality of layers based on the geometry information on the three-dimensional points, predicts attribute information on three-dimensional points belonging to each layer, and decodes attribute values thereof.

Transformed-attribute-information decoder A112 decodes attribute information using region adaptive hierarchical transform (RAHT). Specifically, transformed-attribute-information decoder A112 decodes each attribute value by applying inverse RAHT or inverse Haar transform to the high frequency component and the low frequency component of the attribute value based on the geometry information on the three-dimensional point.

Figure 15:
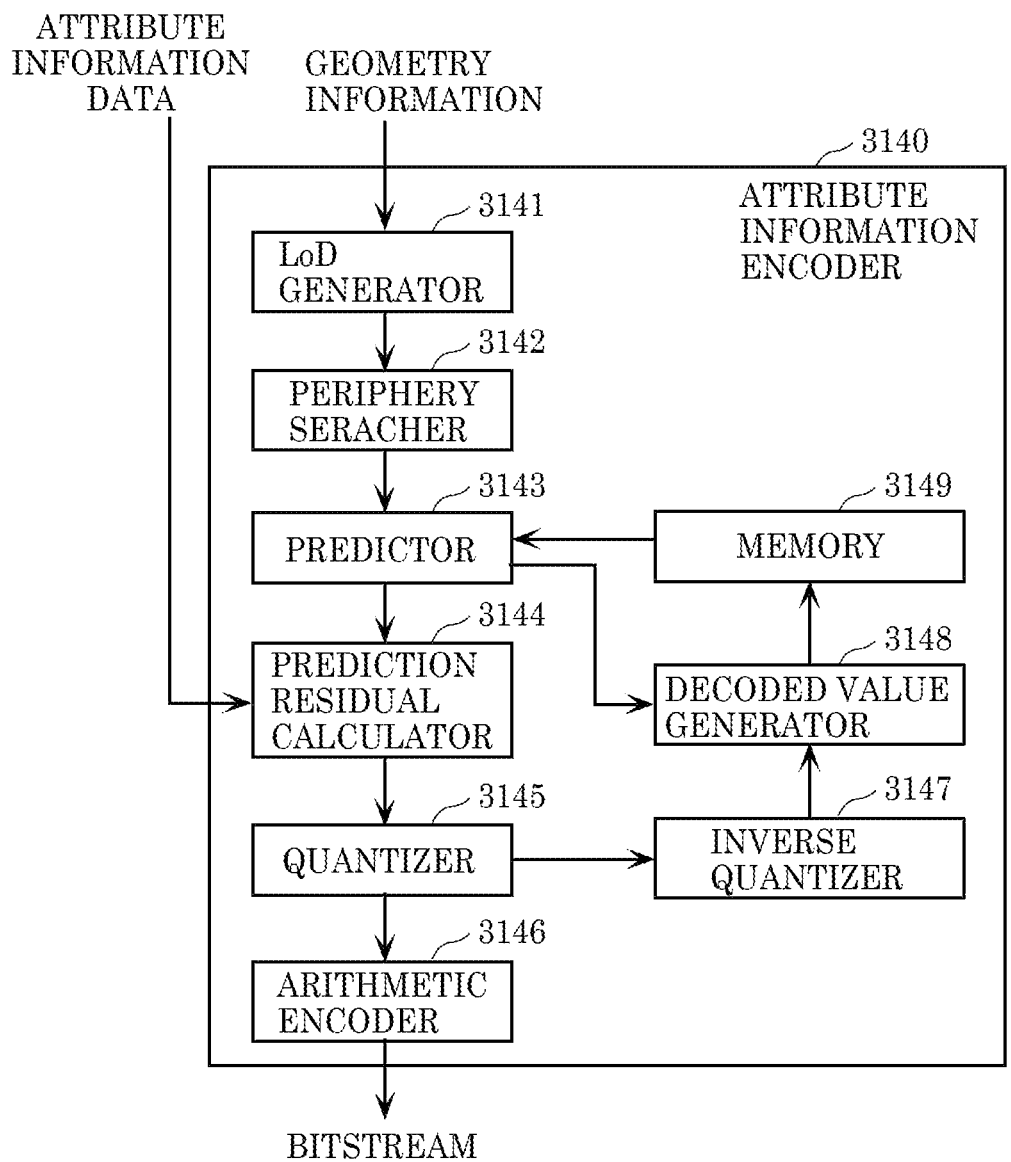
FIG. 15 is a block diagram showing a configuration of the attribute information encoder according to the variation of Embodiment 1.

FIG. 15 is a block diagram showing a configuration of attribute information encoder 3140 that is an example of LoD attribute information encoder A101.

Attribute information encoder 3140 includes LoD generator 3141, periphery searcher 3142, predictor 3143, prediction residual calculator 3144, quantizer 3145, arithmetic encoder 3146, inverse quantizer 3147, decoded value generator 3148, and memory 3149.

LoD generator 3141 generates an LoD using geometry information on a three-dimensional point.

Periphery searcher 3142 searches for a neighboring three-dimensional point neighboring each three-dimensional point using a result of LoD generation by LoD generator 3141 and distance information indicating distances between three-dimensional points.

Predictor 3143 generates a predicted value of an item of attribute information on a current (target) three-dimensional point to be encoded.

Prediction residual calculator 3144 calculates (generates) a prediction residual of the predicted value of the item of the attribute information generated by predictor 3143.

Quantizer 3145 quantizes the prediction residual of the item of attribute information calculated by prediction residual calculator 3144.

Arithmetic encoder 3146 arithmetically encodes the prediction residual quantized by quantizer 3145. Arithmetic encoder 3146 outputs a bitstream including the arithmetically encoded prediction residual to the three-dimensional data decoding device, for example.

The prediction residual may be binarized by quantizer 3145 before being arithmetically encoded by arithmetic encoder 3146.

Arithmetic encoder 3146 may initialize the encoding table used for the arithmetic encoding before performing the arithmetic encoding. Arithmetic encoder 3146 may initialize the encoding table used for the arithmetic encoding for each layer. Arithmetic encoder 3146 may output a bitstream including information that indicates the position of the layer at which the encoding table is initialized.

Inverse quantizer 3147 inverse-quantizes the prediction residual quantized by quantizer 3145.

Decoded value generator 3148 generates a decoded value by adding the predicted value of the item of attribute information generated by predictor 3143 and the prediction residual inverse-quantized by inverse quantizer 3147 together.

Memory 3149 is a memory that stores a decoded value of an item of attribute information on each three-dimensional point decoded by decoded value generator 3148. For example, when generating a predicted value of a three-dimensional point yet to be encoded, predictor 3143 may generate the predicted value using a decoded value of an item of attribute information on each three-dimensional point stored in memory 3149.

Figure 16:
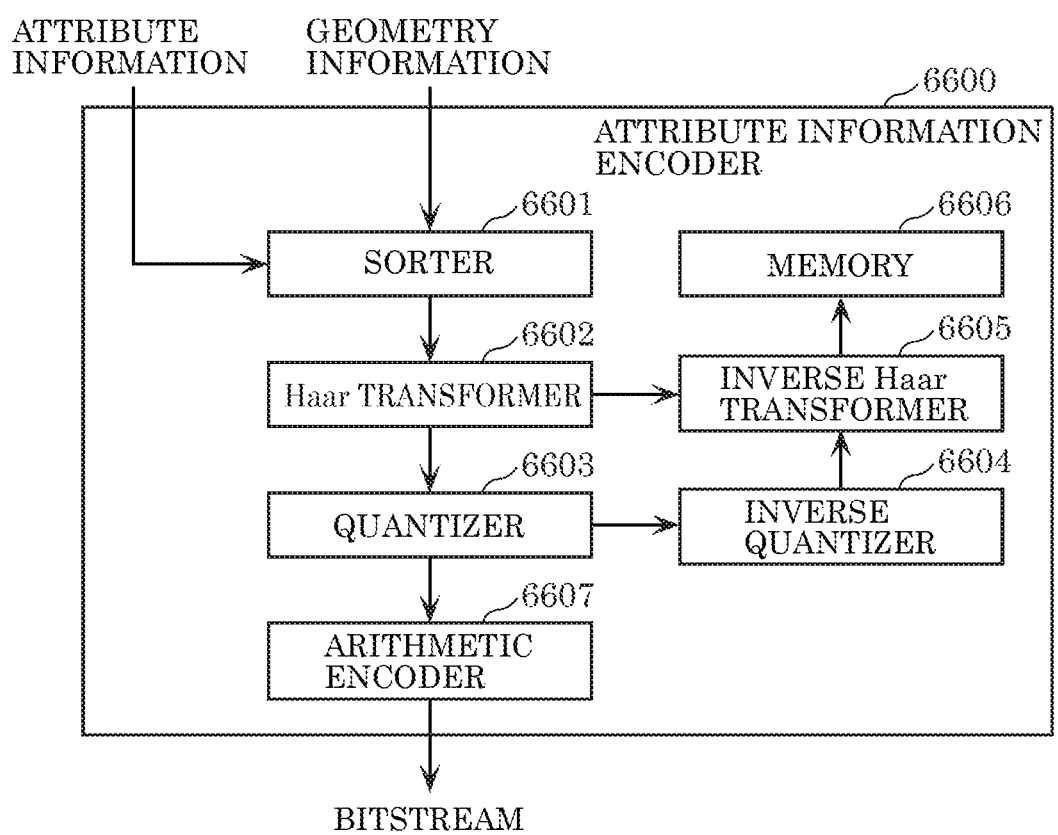
FIG. 16 is a block diagram of the attribute information encoder according to Embodiment 1.

FIG. 16 is a block diagram of attribute information encoder 6600 that is an example of transformation attribute information encoder A102. Attribute information encoder 6600 includes sorter 6601, Haar transformer 6602, quantizer 6603, inverse quantizer 6604, inverse Haar transformer 6605, memory 6606, and arithmetic encoder 6607.

Sorter 6601 generates the Morton codes by using the geometry information of three-dimensional points, and sorts the plurality of three-dimensional points in the order of the Morton codes. Haar transformer 6602 generates the coding coefficient by applying the Haar transform to the attribute information. Quantizer 6603 quantizes the coding coefficient of the attribute information.

Inverse quantizer 6604 inverse quantizes the coding coefficient after the quantization. Inverse Haar transformer 6605 applies the inverse Haar transform to the coding coefficient. Memory 6606 stores the values of items of attribute information of a plurality of decoded three-dimensional points. For example, the attribute information of the decoded three-dimensional points stored in memory 6606 may be utilized for prediction and the like of an unencoded three-dimensional point.

Arithmetic encoder 6607 calculates ZeroCnt from the coding coefficient after the quantization, and arithmetically encodes ZeroCnt. Additionally, arithmetic encoder 6607 arithmetically encodes the non-zero coding coefficient after the quantization. Arithmetic encoder 6607 may binarize the coding coefficient before the arithmetic encoding. In addition, arithmetic encoder 6607 may generate and encode various kinds of header information.

Figure 17:
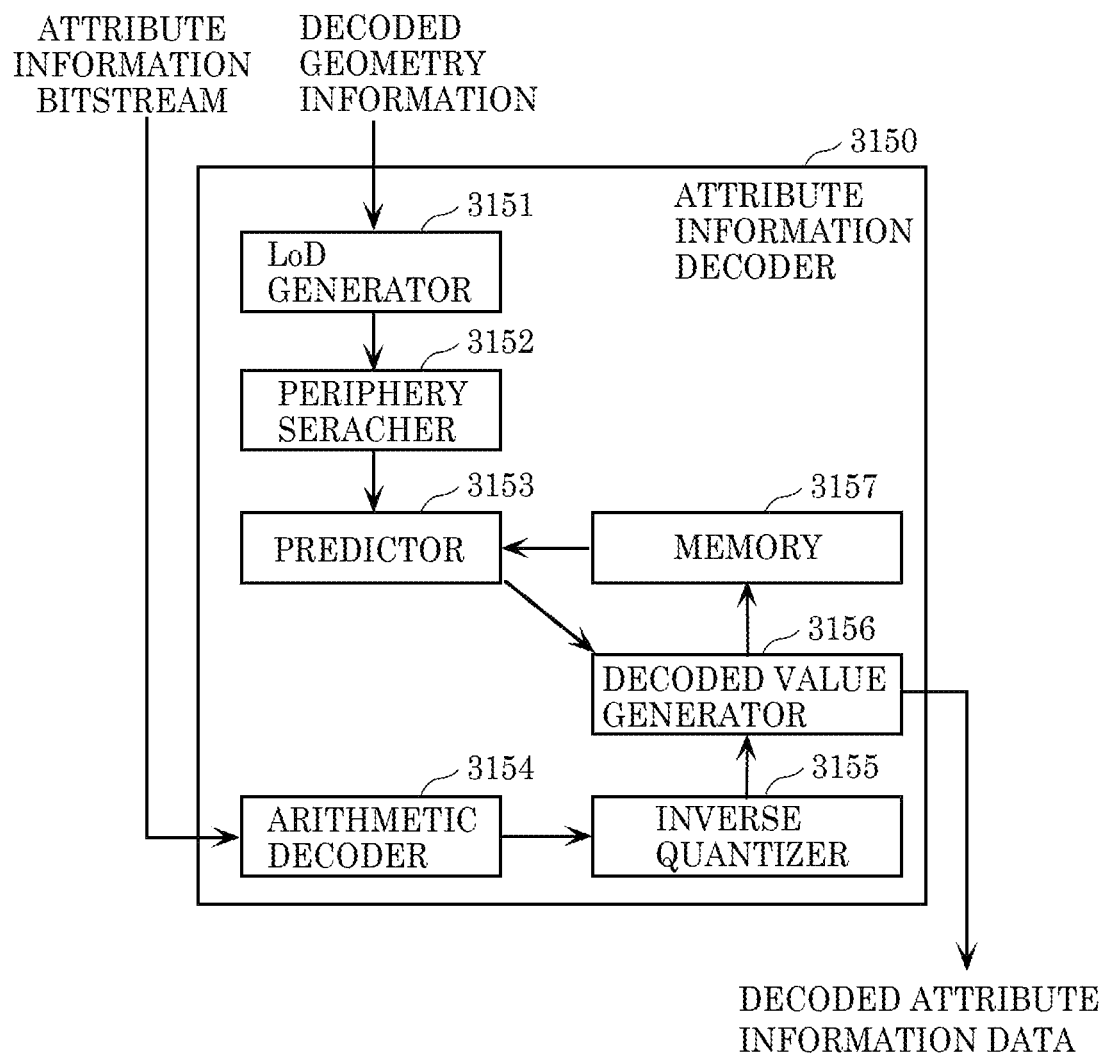
FIG. 17 is a block diagram showing a configuration of the attribute information decoder according to the variation of Embodiment 1.

FIG. 17 is a block diagram showing a configuration of attribute information decoder 3150 that is an example of LoD attribute information decoder A111.

Attribute information decoder 3150 includes LoD generator 3151, periphery searcher 3152, predictor 3153, arithmetic decoder 3154, inverse quantizer 3155, decoded value generator 3156, and memory 3157.

LoD generator 3151 generates an LoD using geometry information on a three-dimensional point decoded by the geometry information decoder (not shown in FIG. 17).

Periphery searcher 3152 searches for a neighboring three-dimensional point neighboring each three-dimensional point using a result of LoD generation by LoD generator 3151 and distance information indicating distances between three-dimensional points.

Predictor 3153 generates a predicted value of attribute information item on a current three-dimensional point to be decoded.

Arithmetic decoder 3154 arithmetically decodes the prediction residual in the bitstream obtained from attribute information encoder 3140 shown in FIG. 15. Note that arithmetic decoder 3154 may initialize the decoding table used for the arithmetic decoding. Arithmetic decoder 3154 initializes the decoding table used for the arithmetic decoding for the layer for which the encoding process has been performed by arithmetic encoder 3146 shown in FIG. 15. Arithmetic decoder 3154 may initialize the decoding table used for the arithmetic decoding for each layer. Arithmetic decoder 3154 may initialize the decoding table based on the information included in the bitstream that indicates the position of the layer for which the encoding table has been initialized.

Inverse quantizer 3155 inverse-quantizes the prediction residual arithmetically decoded by arithmetic decoder 3154.

Decoded value generator 3156 generates a decoded value by adding the predicted value generated by predictor 3153 and the prediction residual inverse-quantized by inverse quantizer 3155 together. Decoded value generator 3156 outputs the decoded attribute information data to another device.

Memory 3157 is a memory that stores a decoded value of an item of attribute information on each three-dimensional point decoded by decoded value generator 3156. For example, when generating a predicted value of a three-dimensional point yet to be decoded, predictor 3153 generates the predicted value using a decoded value of an item of attribute information on each three-dimensional point stored in memory 3157.

Figure 18:
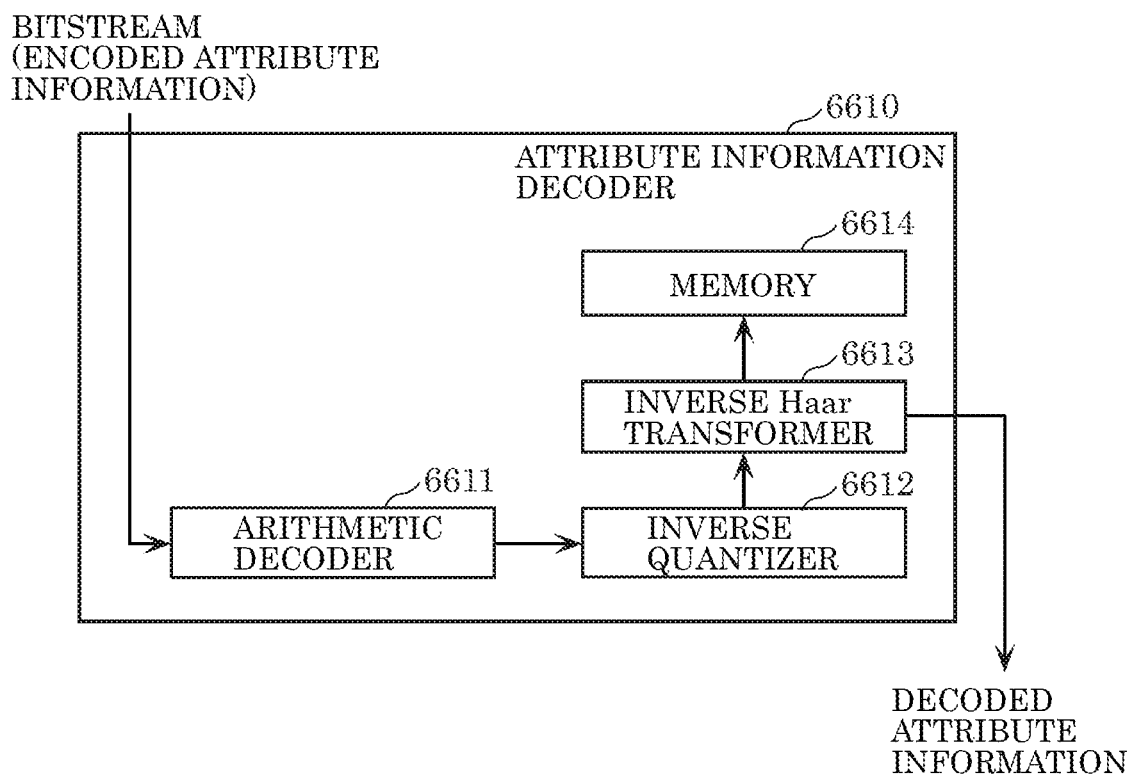
FIG. 18 is a block diagram of the attribute information decoder according to Embodiment 1.

FIG. 18 is a block diagram of attribute information decoder 6610 that is an example of transformation attribute information decoder A112. Attribute information decoder 6610 includes arithmetic decoder 6611, inverse quantizer 6612, inverse Haar transformer 6613, and memory 6614.

Arithmetic decoder 6611 arithmetically decodes ZeroCnt and the coding coefficient included in a bitstream. Note that arithmetic decoder 6611 may decode various kinds of header information.

Inverse quantizer 6612 inverse quantizes the arithmetically decoded coding coefficient. Inverse Haar transformer 6613 applies the inverse Haar transform to the coding coefficient after the inverse quantization. Memory 6614 stores the values of items of attribute information of a plurality of decoded three-dimensional points. For example, the attribute information of the decoded three-dimensional points stored in memory 6614 may be utilized for prediction of an undecoded three-dimensional point.

Figure 19:
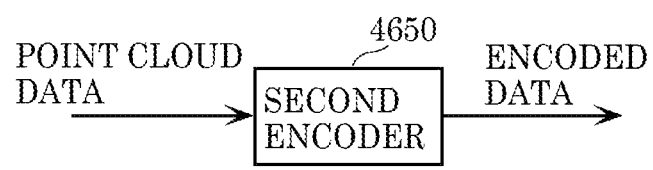
FIG. 19 is a diagram illustrating a structure of a second encoder according to Embodiment 1.
Figure 20:
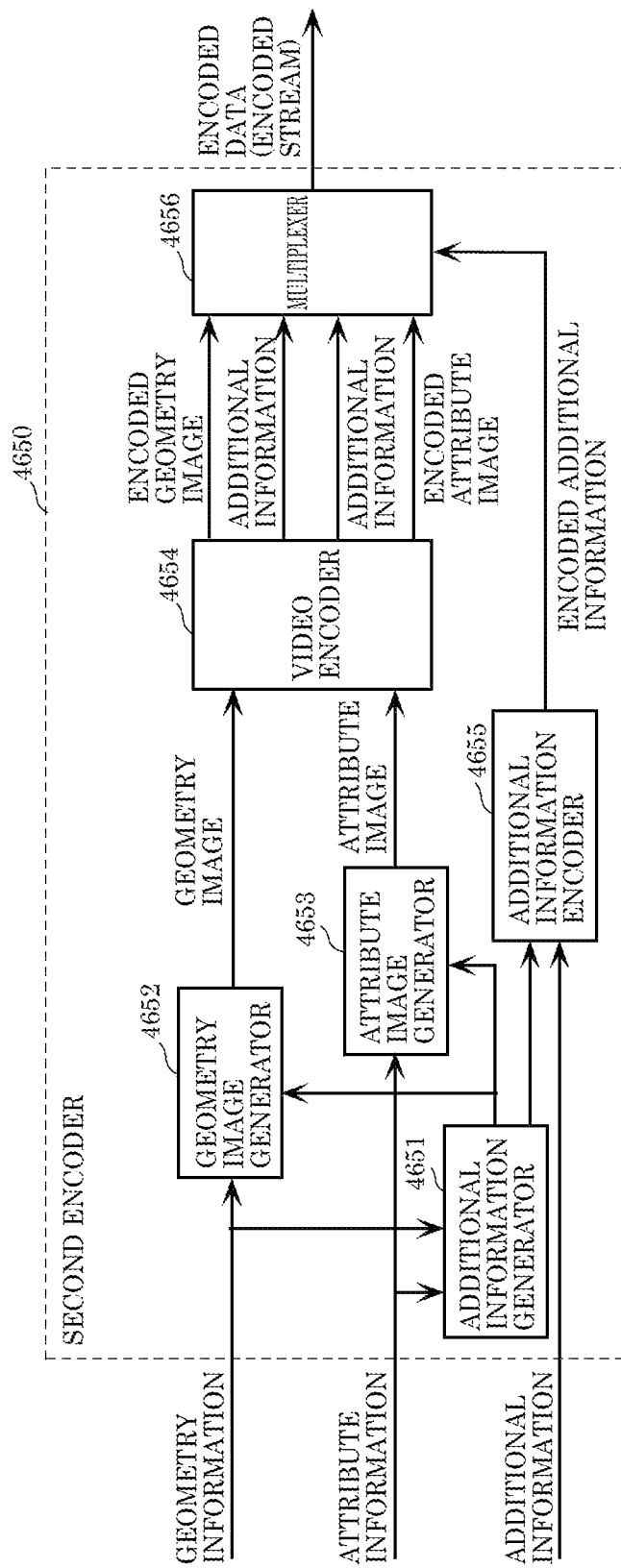
FIG. 20 is a block diagram illustrating the second encoder according to Embodiment 1.

Next, second encoder 4650, which is an example of encoder 4613 that performs encoding in the second encoding method, will be described. FIG. 19 is a diagram showing a configuration of second encoder 4650. FIG. 20 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 21:
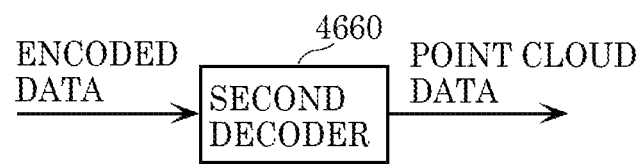
FIG. 21 is a diagram illustrating a structure of a second decoder according to Embodiment 1.
Figure 22:
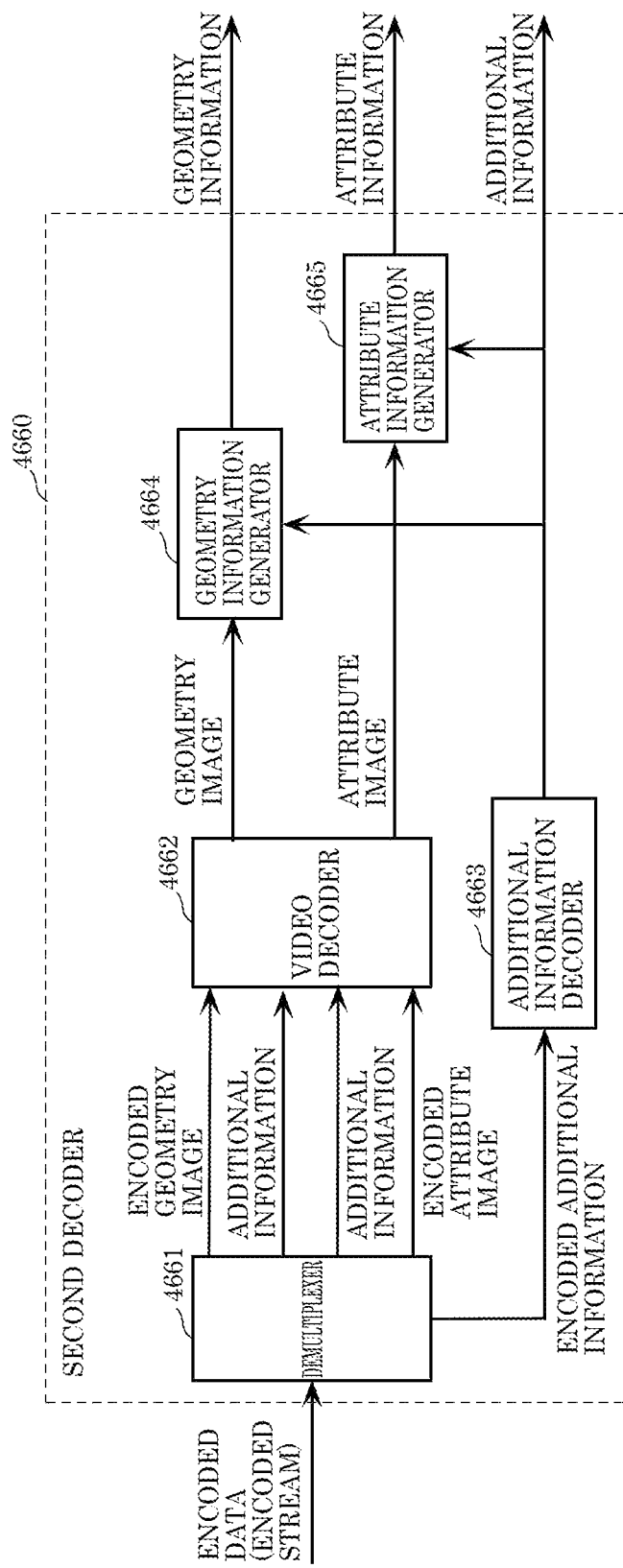
FIG. 22 is a block diagram illustrating the second decoder according to Embodiment 1.

Next, second decoder 4660, which is an example of decoder 4624 that performs decoding in the second encoding method, will be described. FIG. 21 is a diagram showing a configuration of second decoder 4660. FIG. 22 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 23:
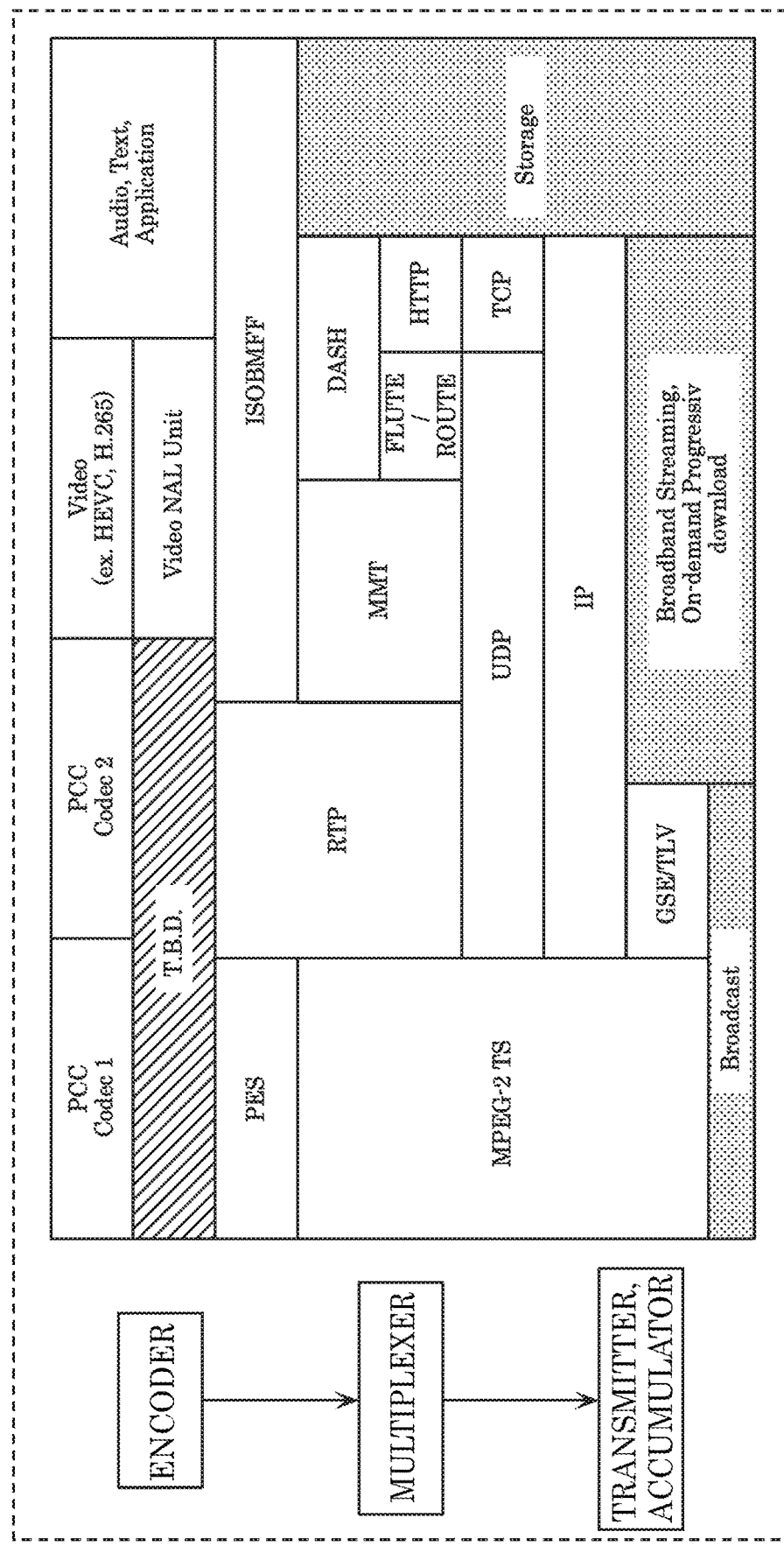
FIG. 23 is a diagram illustrating a protocol stack related to PCC encoded data according to Embodiment 1.

In the following, a problem with the PCC encoding scheme will be described. FIG. 23 is a diagram showing a protocol stack relating to PCC-encoded data. FIG. 23 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

Embodiment 2

In this embodiment, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 24:
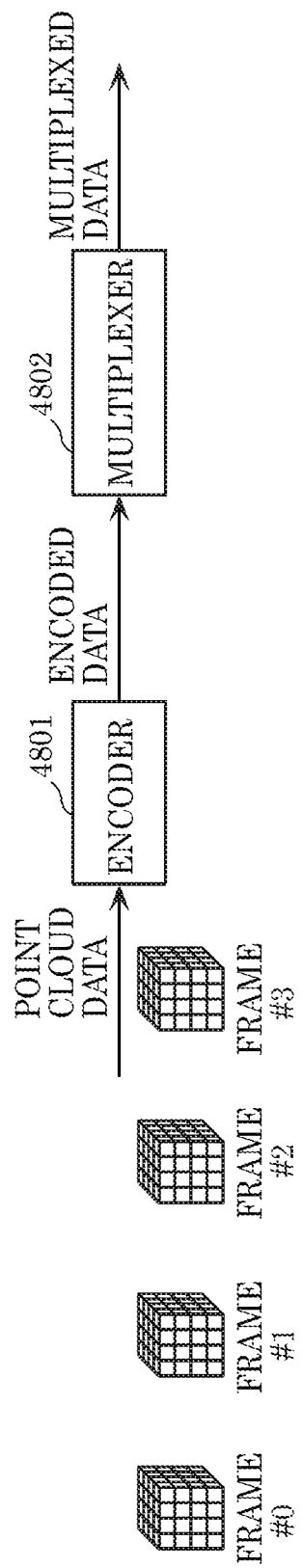
FIG. 24 is a diagram illustrating structures of an encoder and a multiplexer according to Embodiment 2.

FIG. 24 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 25:
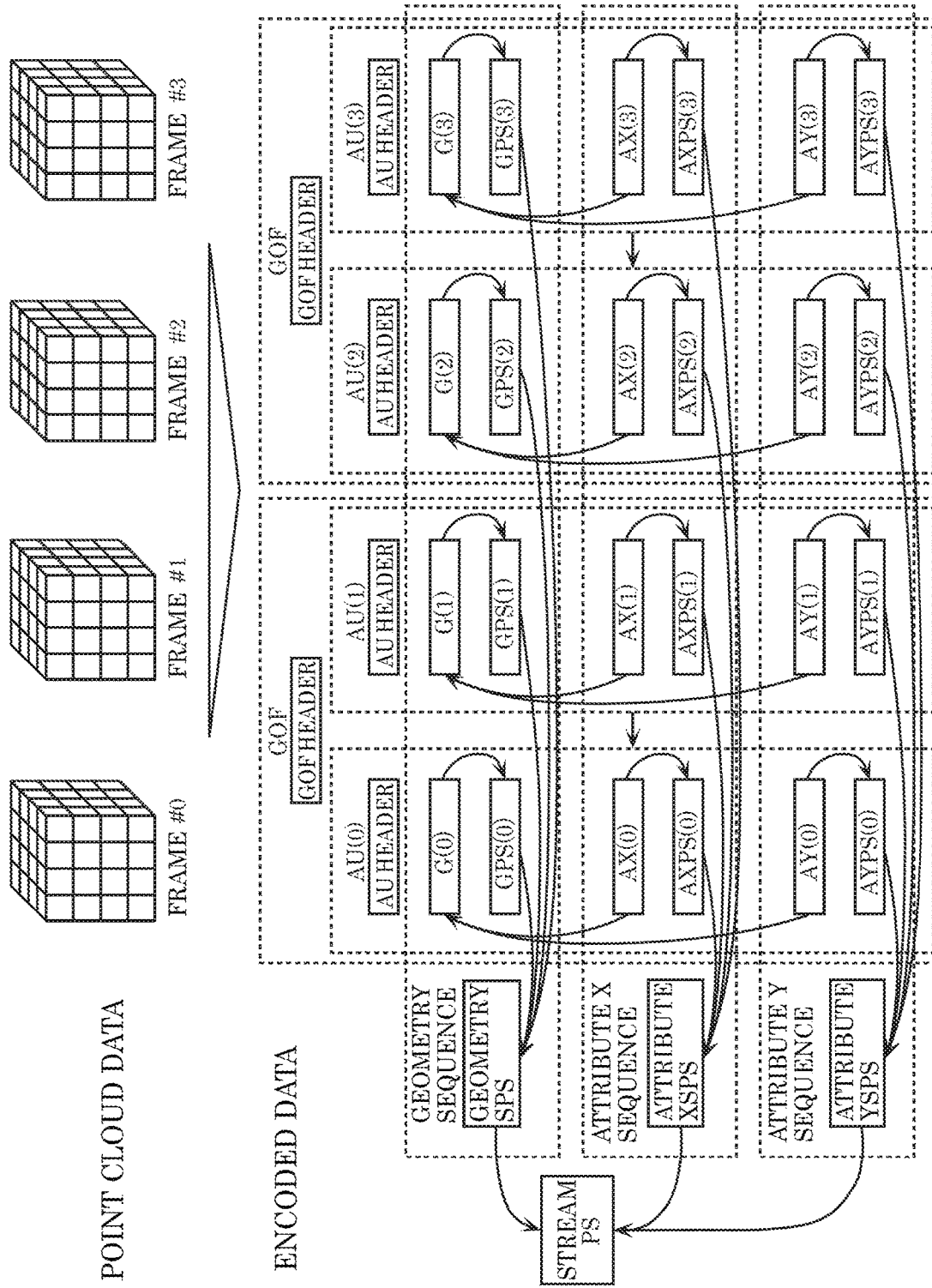
FIG. 25 is a diagram illustrating a structure example of encoded data according to Embodiment 2.

FIG. 25 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 25 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 25 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 25 shows an example in which there is one type of geometry information, and there are two types of attribute information, the present disclosure is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 26:
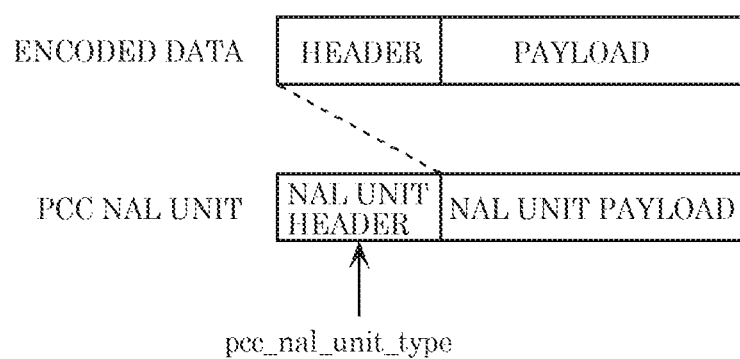
FIG. 26 is a diagram illustrating a structure example of encoded data and a NAL unit according to Embodiment 2.

For example, a data format is defined for each type of encoded data. FIG. 26 is a diagram showing an example of encoded data and a NAL unit.

For example, as shown in FIG. 26, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 27 is a diagram showing a semantics example of pcc_nal_unit_type.

As shown in FIG. 27, when pcc_codec_type is codec 1 (Coded1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pcc_codec_type is codec 2 (Codec2: second encoding method), values of 0 to 2 of pcc_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 28:
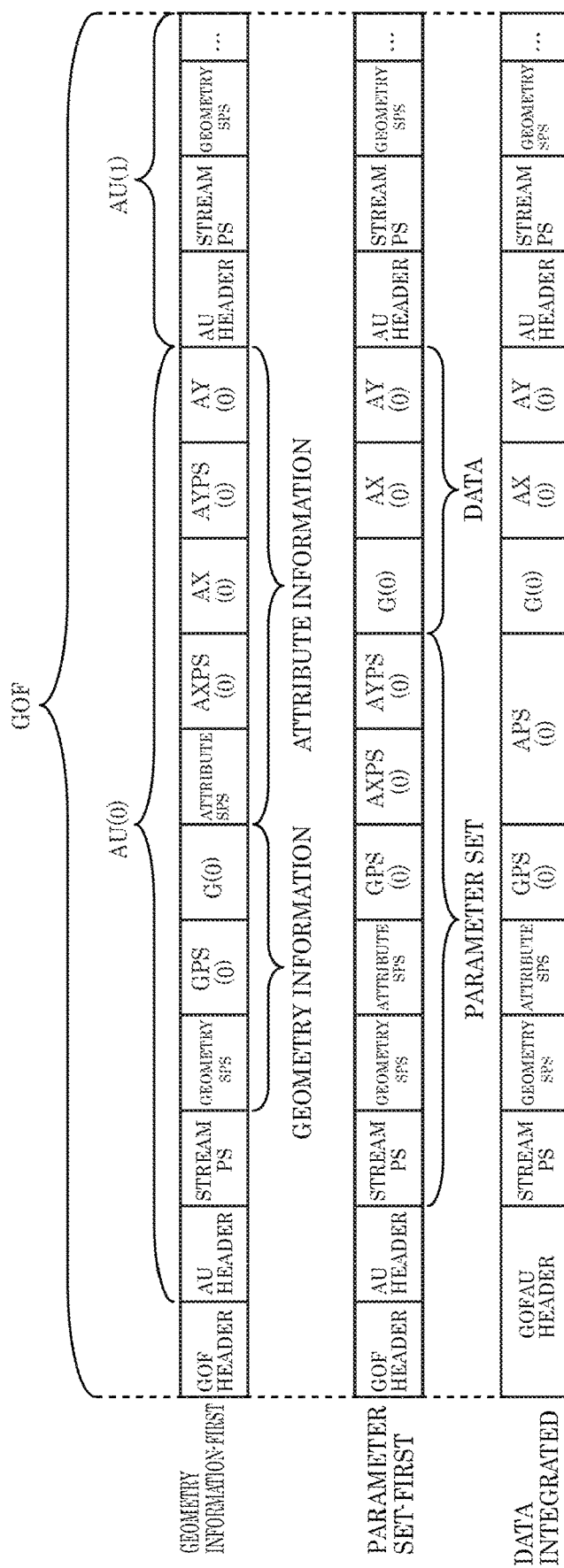
FIG. 28 is a diagram illustrating an example of a transmitting order of NAL units according to Embodiment 2.

FIG. 28 is a diagram showing examples of the order of transmission of NAL units. FIG. 28 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 28 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 28, the GOF header and the AU header may be integrated, or AXPS and AYPS may be integrated. In such a case, an identifier that indicates data having a plurality of functions is defined in pcc_nal_unit_type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the divided slices or tiles as divided data. The divided data includes information for identifying the divided data, and a parameter used for decoding of the divided data is included in the parameter set. In this case, an identifier that indicates that the data is data relating to a tile or slice or data storing a parameter is defined in pcc_nal_unit_type.

Embodiment 3

Although there are tools for data dividing, such as the slice or the tile, in HEVC encoding in order to make parallel processing in a decoding device possible, there are no such tools yet in PCC (Point Cloud Compression) encoding.

In PCC, various data dividing methods can be considered according to parallel processing, compression efficiency, and compression algorithms. Here, the definitions of slice and tile, the data structure, and the transmission/reception methods will be described.

Figure 29:
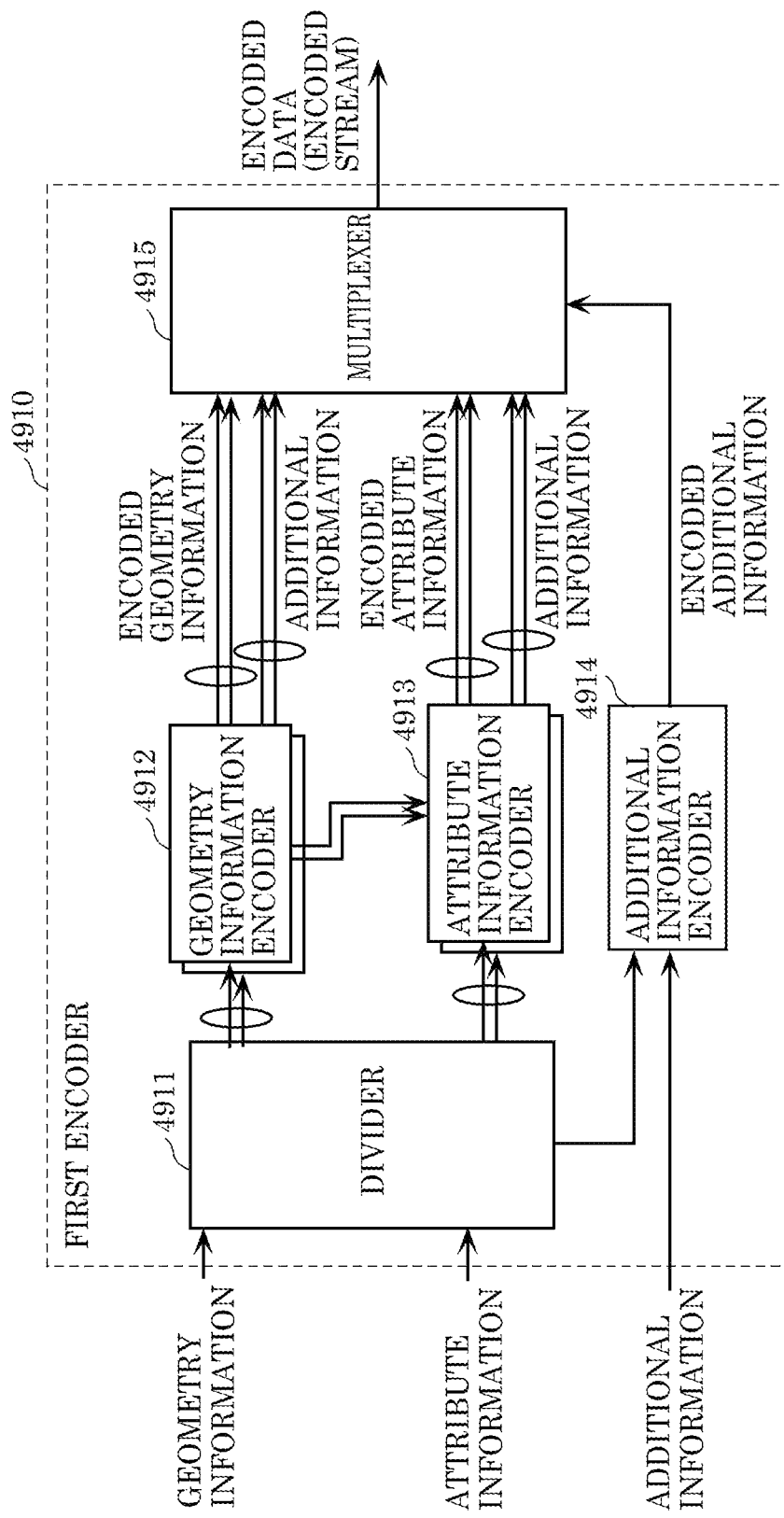
FIG. 29 is a block diagram of a first encoder according to Embodiment 3.

FIG. 29 is a block diagram illustrating the configuration of first encoder 4910 included in a three-dimensional data encoding device according to the present embodiment. First encoder 4910 generates encoded data (an encoded stream) by encoding point cloud data with a first encoding method (GPCC (Geometry based PCC)). First encoder 4910 includes divider 4911, a plurality of geometry information encoders 4912, a plurality of attribute information encoders 4913, additional information encoder 4914, and multiplexer 4915.

Divider 4911 generates a plurality of divided data by dividing point cloud data. Specifically, divider 4911 generates a plurality of divided data by dividing the space of point cloud data into a plurality of subspaces. Here, the subspaces are one of tiles and slices, or a combination of tiles and slices. More specifically, point cloud data includes geometry information, attribute information, and additional information. Divider 4911 divides geometry information into a plurality of divided geometry information, and divides attribute information into a plurality of divided attribute information. Also, divider 4911 generates additional information about division.

A plurality of geometry information encoders 4912 generate a plurality of encoded geometry information by encoding the plurality of divided geometry information. For example, the plurality of geometry information encoders 4912 process the plurality of divided geometry information in parallel.

The plurality of attribute information encoders 4913 generate a plurality of encoded attribute information by encoding the plurality of divided attribute information. For example, the plurality of attribute information encoders 4913 process the plurality of divided attribute information in parallel.

Additional information encoder 4914 generates encoded additional information by encoding the additional information included in point cloud data, and the additional information about data dividing generated by divider 4911 at the time of division.

Multiplexer 4915 generates encoded data (an encoded stream) by multiplexing the plurality of encoded geometry information, the plurality of encoded attribute information, and the encoded additional information, and transmits the generated encoded data. Furthermore, the encoded additional information is used at the time of decoding.

Note that, although FIG. 29 illustrates the example in which the respective numbers of geometry information encoders 4912 and attribute information encoders 4913 are two, the respective numbers of geometry information encoders 4912 and attribute information encoders 4913 may be one, or may be three or more. Furthermore, the plurality of divided data may be processed in parallel in the same chip, such as a plurality of cores in a CPU, may be processed in parallel by the respective cores of a plurality of chips, or may be processed in parallel by the plurality of cores of a plurality of chips.

Figure 30:
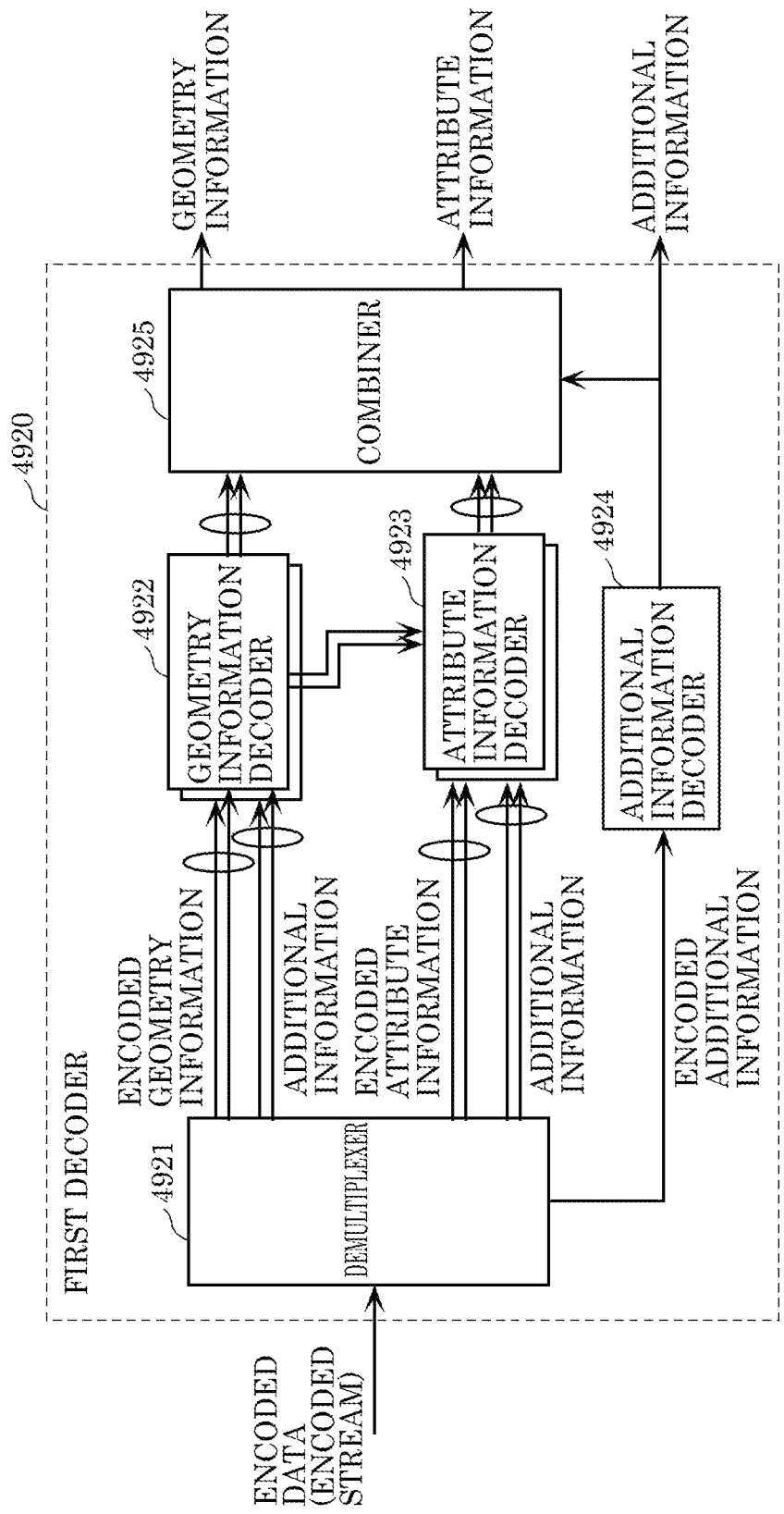
FIG. 30 is a block diagram of a first decoder according to Embodiment 3.

FIG. 30 is a block diagram illustrating the configuration of first decoder 4920. First decoder 4920 restores point cloud data by decoding the encoded data (encoded stream) generated by encoding the point cloud data with the first encoding method (GPCC). First decoder 4920 includes demultiplexer 4921, a plurality of geometry information decoders 4922, a plurality of attribute information decoders 4923, additional information decoder 4924, and combiner 4925.

Demultiplexer 4921 generates a plurality of encoded geometry information, a plurality of encoded attribute information, and encoded additional information by demultiplexing the encoded data (encoded stream).

The plurality of geometry information decoders 4922 generate a plurality of divided geometry information by decoding the plurality of encoded geometry information. For example, the plurality of geometry information decoders 4922 process the plurality of encoded geometry information in parallel.

The plurality of attribute information decoders 4923 generate a plurality of divided attribute information by decoding the plurality of encoded attribute information. For example, the plurality of attribute information decoders 4923 process the plurality of encoded attribute information in parallel.

Additional information decoder 4924 generates additional information by decoding the encoded additional information.

Combiner 4925 generates geometry information by combining the plurality of divided geometry information by using the additional information. Combiner 4925 generates attribute information by combining the plurality of divided attribute information by using the additional information.

Note that, although FIG. 30 illustrates the example in which the respective numbers of geometry information decoders 4922 and attribute information decoders 4923 are two, the respective numbers of geometry information decoders 4922 and attribute information decoders 4923 may be one, or may be three or more. Furthermore, the plurality of divided data may be processed in parallel in the same chip, such as a plurality of cores in a CPU, may be processed in parallel by the respective cores of a plurality of chips, or may be processed in parallel by the plurality of cores of a plurality of chips.

Figure 31:
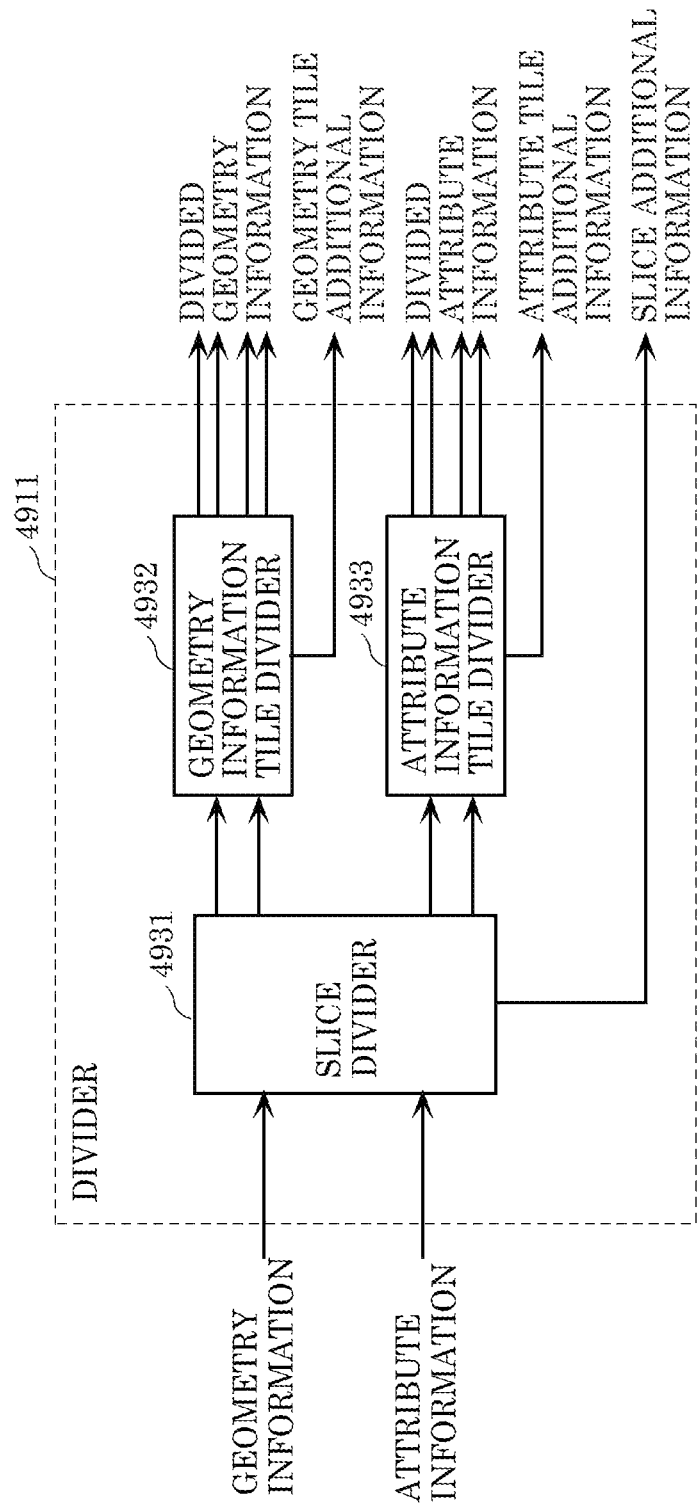
FIG. 31 is a block diagram of a divider according to Embodiment 3.

Next, the configuration of divider 4911 will be described. FIG. 31 is a block diagram of divider 4911. Divider 4911 includes slice divider 4931, geometry information tile divider (geometry tile divider) 4932, and attribute information tile divider (attribute tile divider) 4933.

Slice divider 4931 generates a plurality of slice geometry information by dividing geometry information (position or geometry) into slices. Also, slice divider 4931 generates a plurality of slice attribute information by dividing attribute information (attribute) into slices. Furthermore, slice divider 4931 outputs slice additional information (SliceMetaData) including the information related to slice dividing and the information generated in the slice dividing.

Geometry information tile divider 4932 generates a plurality of divided geometry information (a plurality of tile geometry information) by dividing the plurality of slice geometry information into tiles. Also, geometry information tile divider 4932 outputs geometry tile additional information (geometry tile metadata) including the information related to tile dividing of geometry information, and the information generated in the tile dividing of the geometry information.

Attribute information tile divider 4933 generates a plurality of divided attribute information (a plurality of tile attribute information) by dividing the plurality of slice attribute information into tiles. Also, attribute information tile divider 4933 outputs attribute tile additional information (attribute tile metadata) including the information related to tile dividing of attribute information, and the information generated in the tile dividing of the attribute information.

Note that the number of slices or tiles to be divided is one or more. That is, slice or tile dividing may not be performed.

Note that, although the example in which tile dividing is performed after slice dividing has been illustrated here, slice dividing may be performed after tile dividing. Furthermore, a new division type may be defined in addition to the slice and the tile, and dividing may be performed with three or more division types.

Figure 32:
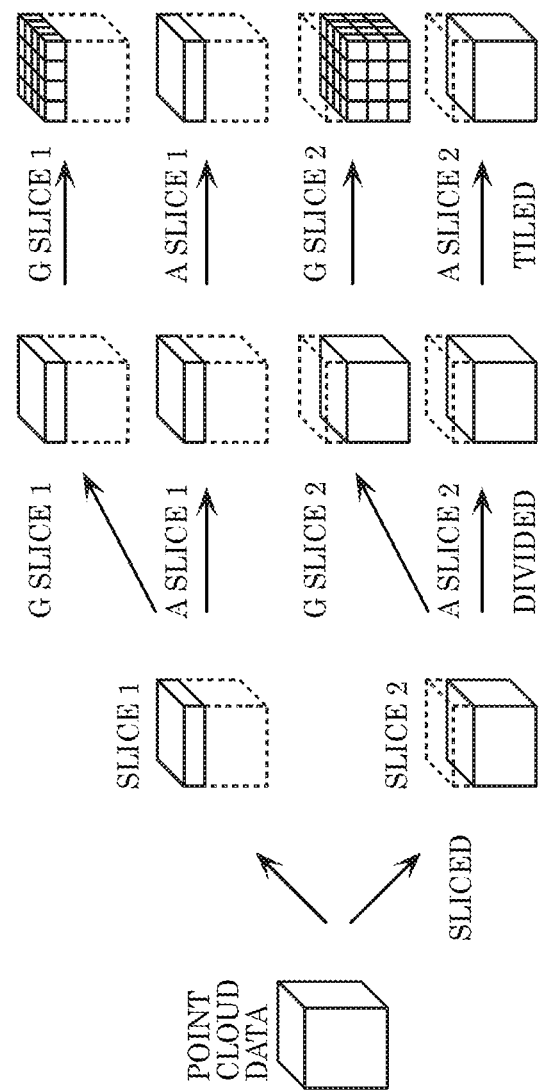
FIG. 32 is a diagram illustrating an example of dividing slices and tiles according to Embodiment 3.

Hereinafter, the dividing method for point cloud data will be described. FIG. 32 is a diagram illustrating an example of slice and tile dividing.

First, the method for slice dividing will be described. Divider 4911 divides three-dimensional point cloud data into arbitrary point clouds on a slice-by-slice basis. In slice dividing, divider 4911 does not divide the geometry information and the attribute information constituting points, but collectively divides the geometry information and the attribute information. That is, divider 4911 performs slice dividing so that the geometry information and the attribute information of an arbitrary point belong to the same slice. Note that, as long as these are followed, the number of divisions and the dividing method may be any number and any method. Furthermore, the minimum unit of division is a point. For example, the numbers of divisions of geometry information and attribute information are the same. For example, a three-dimensional point corresponding to geometry information after slice dividing, and a three-dimensional point corresponding to attribute information are included in the same slice.

Also, divider 4911 generates slice additional information, which is additional information related to the number of divisions and the dividing method at the time of slice dividing. The slice additional information is the same for geometry information and attribute information. For example, the slice additional information includes the information indicating the reference coordinate position, size, or side length of a bounding box after division. Also, the slice additional information includes the information indicating the number of divisions, the division type, etc.

Next, the method for tile dividing will be described. Divider 4911 divides the data divided into slices into slice geometry information (G slice) and slice attribute information (A slice), and divides each of the slice geometry information and the slice attribute information on a tile-by-tile basis.

Note that, although FIG. 32 illustrates the example in which division is performed with an octree structure, the number of divisions and the dividing method may be any number and any method.

Also, divider 4911 may divide geometry information and attribute information with different dividing methods, or may divide geometry information and attribute information with the same dividing method. Additionally, divider 4911 may divide a plurality of slices into tiles with different dividing methods, or may divide a plurality of slices into tiles with the same dividing method.

Furthermore, divider 4911 generates tile additional information related to the number of divisions and the dividing method at the time of tile dividing. The tile additional information (geometry tile additional information and attribute tile additional information) is separate for geometry information and attribute information. For example, the tile additional information includes the information indicating the reference coordinate position, size, or side length of a bounding box after division. Additionally, the tile additional information includes the information indicating the number of divisions, the division type, etc.

Next, an example of the method of dividing point cloud data into slices or tiles will be described. As the method for slice or tile dividing, divider 4911 may use a predetermined method, or may adaptively switch methods to be used according to point cloud data.

At the time of slice dividing, divider 4911 divides a three-dimensional space by collectively handling geometry information and attribute information. For example, divider 4911 determines the shape of an object, and divides a three-dimensional space into slices according to the shape of the object. For example, divider 4911 extracts objects such as trees or buildings, and performs division on an object-by-object basis. For example, divider 4911 performs slice dividing so that the entirety of one or a plurality of objects are included in one slice. Alternatively, divider 4911 divides one object into a plurality of slices.

In this case, the encoding device may change the encoding method for each slice, for example. For example, the encoding device may use a high-quality compression method for a specific object or a specific part of the object. In this case, the encoding device may store the information indicating the encoding method for each slice in additional information (metadata).

Also, divider 4911 may perform slice dividing so that each slice corresponds to a predetermined coordinate space based on map information or geometry information.

At the time of tile dividing, divider 4911 separately divides geometry information and attribute information. For example, divider 4911 divides slices into tiles according to the data amount or the processing amount. For example, divider 4911 determines whether the data amount of a slice (for example, the number of three-dimensional points included in a slice) is greater than a predetermined threshold value. When the data amount of the slice is greater than the threshold value, divider 4911 divides slices into tiles. When the data amount of the slice is less than the threshold value, divider 4911 does not divide slices into tiles.

For example, divider 4911 divides slices into tiles so that the processing amount or processing time in the decoding device is within a certain range (equal to or less than a predetermined value). Accordingly, the processing amount per tile in the decoding device becomes constant, and distributed processing in the decoding device becomes easy.

Additionally, when the processing amount is different between geometry information and attribute information, for example, when the processing amount of geometry information is greater than the processing amount of attribute information, divider 4911 makes the number of divisions of geometry information larger than the number of divisions of attribute information.

Furthermore, for example, when geometry information may be decoded and displayed earlier, and attribute information may be slowly decoded and displayed later in the decoding device according to contents, divider 4911 may make the number of divisions of geometry information larger than the number of divisions of attribute information.

Accordingly, since the decoding device can increase the parallel number of geometry information, it is possible to make the processing of geometry information faster than the processing of attribute information.

Note that the decoding device does not necessarily have to process sliced or tiled data in parallel, and may determine whether or not to process them in parallel according to the number or capability of decoding processors.

By performing division with the method as described above, it is possible to achieve adaptive encoding according to contents or objects. Also, parallel processing in decoding processing can be achieved. Accordingly, the flexibility of a point cloud encoding system or a point cloud decoding system is improved.

Figure 33:
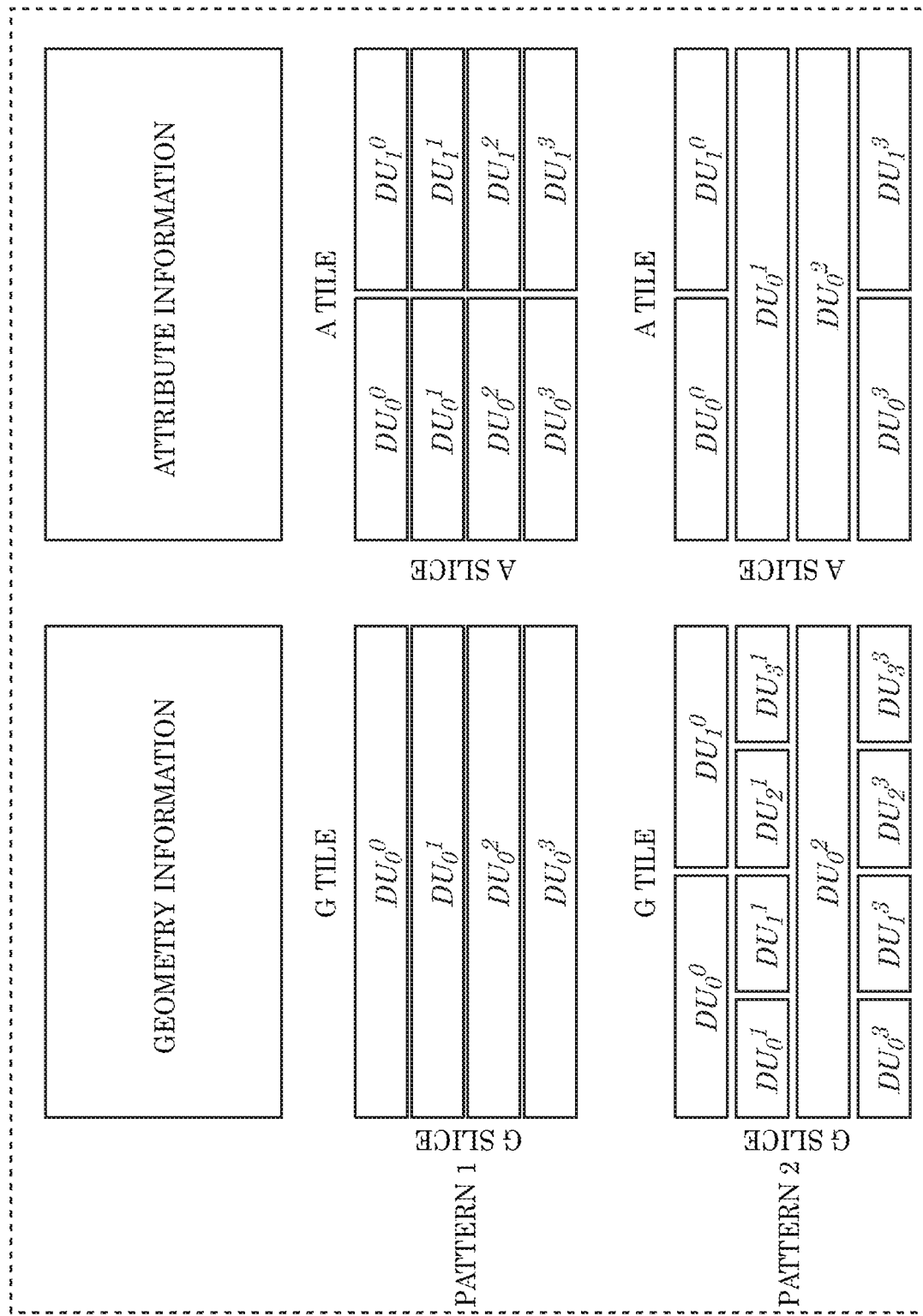
FIG. 33 is a diagram illustrating dividing pattern examples of slices and tiles according to Embodiment 3.

FIG. 33 is a diagram illustrating dividing pattern examples of slices and tiles. DU in the diagram is a data unit (DataUnit), and indicates the data of a tile or a slice. Additionally, each DU includes a slice index (SliceIndex) and a tile index (TileIndex). The top right numerical value of a DU in the diagram indicates the slice index, and the bottom left numerical value of the DU indicates the tile index.

In Pattern 1, in slice dividing, the number of divisions and the dividing method are the same for G slice and A slice. In tile dividing, the number of divisions and the dividing method for G slice are different from the number of divisions and the dividing method for A slice. Additionally, the same number of divisions and dividing method are used among a plurality of G slices. The same number of divisions and dividing method are used among a plurality of A slices.

In Pattern 2, in slice dividing, the number of divisions and the dividing method are the same for G slice and A slice. In tile dividing, the number of divisions and the dividing method for G slice are different from the number of divisions and the dividing method for A slice. Additionally, the number of divisions and the dividing method are different among a plurality of G slices. The number of divisions and the dividing method are different among a plurality of A slices.

Next, the encoding method for divided data will be described. The three-dimensional data encoding device (first encoder 4910) encodes each of divided data. When encoding attribute information, the three-dimensional data encoding device generates, as additional information, dependency information indicating based on which configuration information (geometry information, additional information, or other attribute information) encoding has been performed. That is, the dependency information indicates, for example, the configuration information of a reference destination (dependence destination). In this case, the three-dimensional data encoding device generates the dependency information based on the configuration information corresponding to the divided shape of attribute information. Note that the three-dimensional data encoding device may generate the dependency information based on the configuration information corresponding to a plurality of divided shapes.

Dependency information may be generated by the three-dimensional data encoding device, and the generated dependency information may be transmitted to the three-dimensional decoding device. Alternatively, the three-dimensional decoding device may generate dependency information, and the three-dimensional data encoding device may not transmit the dependency information. Furthermore, the dependency used by the three-dimensional data encoding device may be defined in advance, and the three-dimensional data encoding device may not transmit the dependency information.

Figure 34:
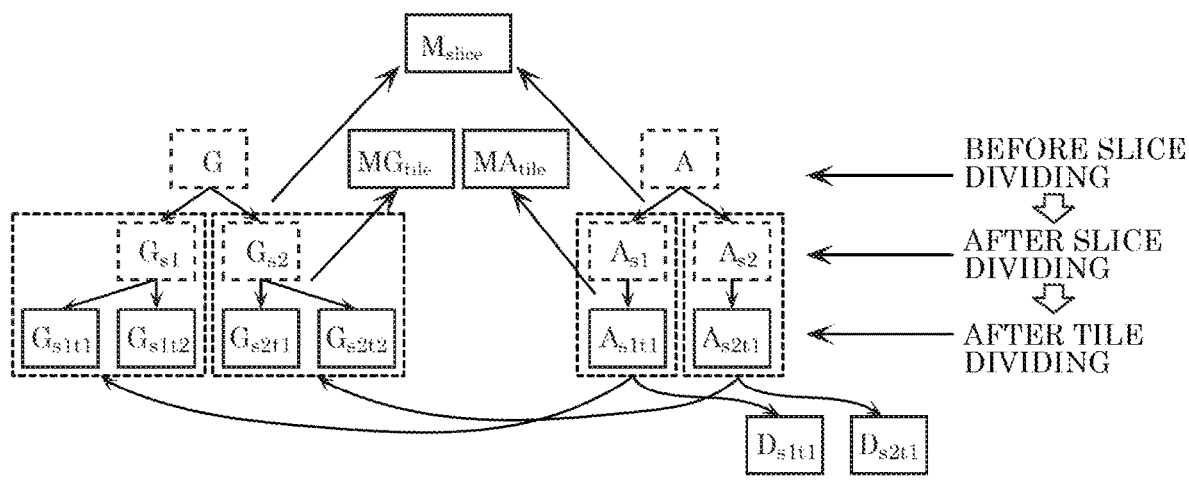
FIG. 34 is a diagram illustrating an example of dependency according to Embodiment 3.

FIG. 34 is a diagram illustrating an example of dependency of each data. The heads of arrows in the diagram indicate dependence destinations, and the origins of the arrows indicate dependence sources. The three-dimensional data decoding device decodes data in the order of a dependence destination to a dependence source. Additionally, the data indicated by solid lines in the diagram is data that is actually transmitted, and the data indicated by dotted lines is data that is not transmitted.

Furthermore, in the diagram, G indicates geometry information, and A indicates attribute information. $G_{s1}$ indicates the geometry information of slice number 1, and $G_{s2}$ indicates the geometry information of slice number 2. $G_{s1t1}$ indicates the geometry information of slice number 1 and tile number 1, $G_{s1t2}$ indicates the geometry information of slice number 1 and tile number 2, $G_{s2t1}$ indicates the geometry information of slice number 2 and tile number 1, and $G_{s2t2}$ indicates the geometry information of slice number 2 and tile number 2. Similarly, $A_{s1}$ indicates the attribute information of slice number 1, and $A_{s2}$ indicates the attribute information of slice number 2. $A_{s1t1}$ indicates the attribute information of slice number 1 and tile number 1, $A_{s1t2}$ indicates the attribute information of slice number 1 and tile number 2, $A_{s2t1}$ indicates the attribute information of slice number 2 and tile number 1, and $A_{s2t2}$ indicates the attribute information of slice number 2 and tile number 2.

Mslice indicates slice additional information, MGtile indicates geometry tile additional information, and MAtile indicates attribute tile additional information. $D_{s1t1}$ indicates the dependency information of attribute information $A_{s1t1}$, and $D_{s2t1}$ indicates the dependency information of attribute information $A_{s2t1}$.

Additionally, the three-dimensional data encoding device may rearrange data in a decoding order, so that it is unnecessary to rearrange data in the three-dimensional data decoding device. Note that data may be rearranged in the three-dimensional data decoding device, or data may be rearranged in both the three-dimensional data encoding device and the three-dimensional data decoding device.

Figure 35:
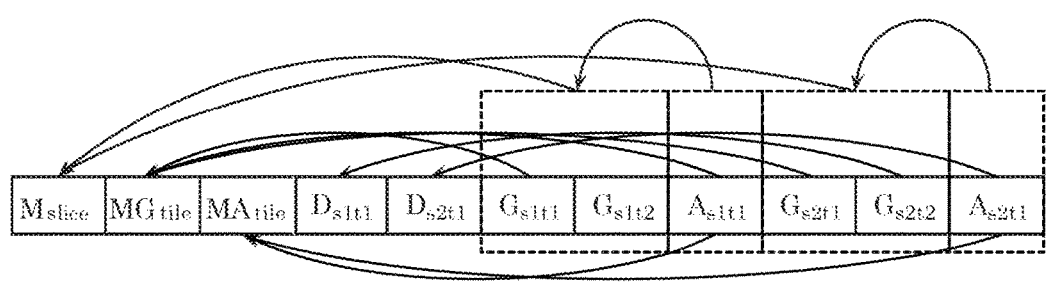
FIG. 35 is a diagram illustrating a data decoding order according to Embodiment 3.

FIG. 35 is a diagram illustrating an example of the data decoding order. In the example of FIG. 35, decoding is sequentially performed from the data on the left. For those data in dependency, the three-dimensional data decoding device decodes the data of a dependence destination first. For example, the three-dimensional data encoding device rearranges data in advance to be in this order, and transmits the data. Note that, as long as it is the order in which the data of dependence destinations become first, it may be any kind of order. Additionally, the three-dimensional data encoding device may transmit additional information and dependency information before data.

Figure 36:
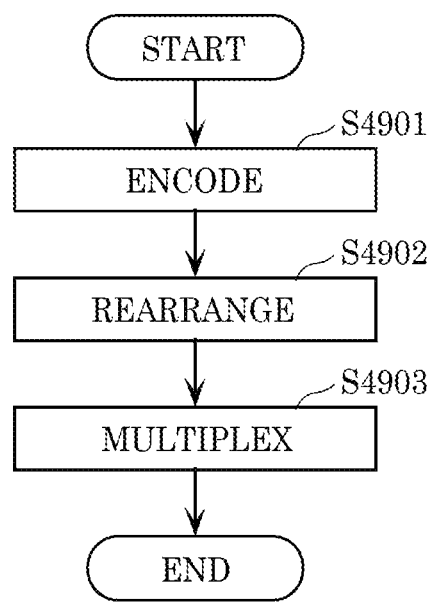
FIG. 36 is a flowchart of encoding processing according to Embodiment 3.

FIG. 36 is a flowchart illustrating the flow of processing by the three-dimensional data encoding device. First, the three-dimensional data encoding device encodes the data of a plurality of slices or tiles as described above (S4901). Next, as illustrated in FIG. 35, the three-dimensional data encoding device rearranges the data so that the data of dependence destinations become first (S4902). Next, the three-dimensional data encoding device multiplexes the rearranged data (forms the rearranged data into a NAL unit) (S4903).

Figure 37:
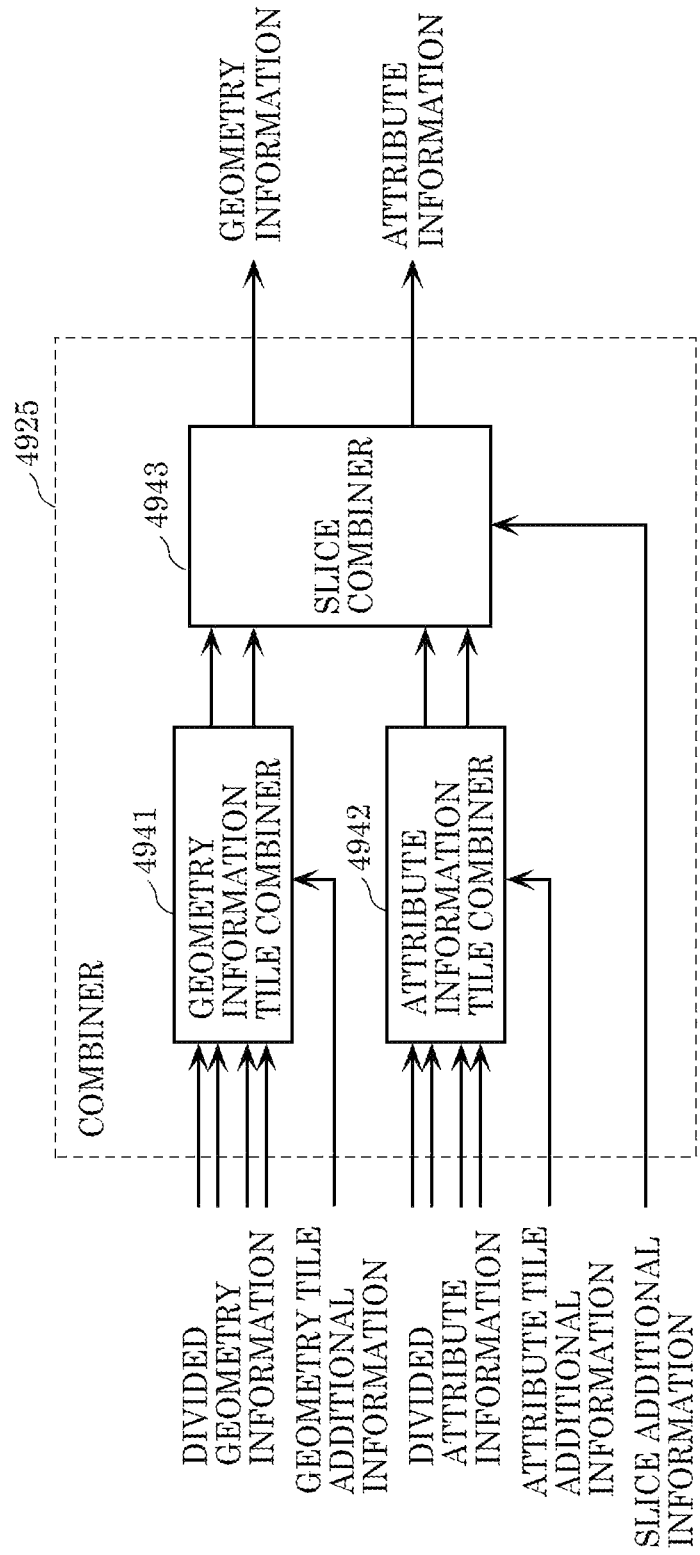
FIG. 37 is a block diagram of a combiner according to Embodiment 3.

Next, the configuration of combiner 4925 included in first decoder 4920 will be described. FIG. 37 is a block diagram illustrating the configuration of combiner 4925. Combiner 4925 includes geometry information tile combiner (geometry tile combiner) 4941, attribute information tile combiner (attribute tile combiner) 4942, and a slice combiner.

Geometry information tile combiner 4941 generates a plurality of slice geometry information by combining a plurality of divided geometry information by using geometry tile additional information. Attribute information tile combiner 4942 generates a plurality of slice attribute information by combining a plurality of divided attribute information by using attribute tile additional information.

Slice combiner 4943 generates geometry information by combining the plurality of slice geometry information by using slice additional information. Additionally, slice combiner 4943 generates attribute information by combining the plurality of slice attribute information by using slice additional information.

Note that the number of slices or tiles to be divided is one or more. That is, slice or tile dividing may not be performed.

Furthermore, although the example in which tile dividing is performed after slice dividing has been illustrated here, slice dividing may be performed after tile dividing. Furthermore, a new division type may be defined in addition to the slice and the tile, and dividing may be performed with three or more division types.

Figure 38:
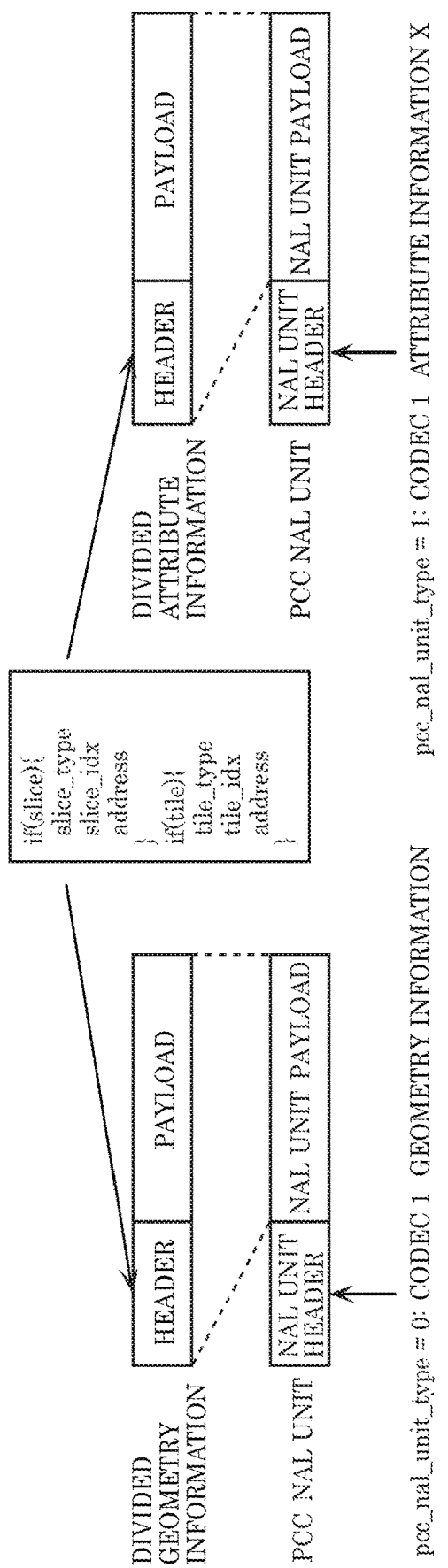
FIG. 38 is a diagram illustrating a structure example of encoded data and a NAL unit according to Embodiment 3.

Next, the configuration of encoded data divided into slices or divided into tiles, and the storing method (multiplexing method) of the encoded data into a NAL unit will be described. FIG. 38 is a diagram illustrating the configuration of encoded data, and the storing method of the encoded data into a NAL unit.

Encoded data (divided geometry information and divided attribute information) is stored in the payload of a NAL unit.

Encoded data includes a header and a payload. The header includes identification information for specifying the data included in the payload. This identification information includes, for example, the type of slice dividing or tile dividing (slice_type, tile_type), the index information for specifying slices or tiles (slice_idx, tile_idx), the geometry information of data (slices or tiles), or the address of data, etc. The index information for specifying slices is also written as the slice index (SliceIndex). The index information for specifying tiles is also written as the tile index (TileIndex). Additionally, the type of division is, for example, the technique based on an object shape as described above, the technique based on map information or geometry information, or the technique based on the data amount or processing amount, etc.

Note that all or a part of the above-described information may be stored in one of the header of divided geometry information and the header of divided attribute information, and may not be stored in the other. For example, when the same dividing method is used for geometry information and attribute information, the type of division (slice_type, tile_type) and the index information (slice_idx, tile_idx) for the geometry information and the attribute information are the same. Therefore, these information may be included in the header of one of the geometry information and the attribute information. For example, when attribute information depends on geometry information, the geometry information is processed first. Therefore, these information may be included in the header of the geometry information, and these information may not be included in the header of the attribute information. In this case, the three-dimensional data decoding device determines that, for example, the attribute information of a dependence source belongs to the same slice or tile as a slice or tile of the geometry information of a dependence destination.

Furthermore, additional information (slice additional information, geometry tile additional information, or attribute tile additional information) related to slice dividing or tile dividing, and dependency information indicating dependency, etc. may be stored and transmitted in an existing parameter set (GPS, APS, geometry SPS, or attribute SPS). When the dividing method is changed for each frame, the information indicating the dividing method may be stored in the parameter set (GPS or APS) for each frame. When the dividing method is not changed within a sequence, the information indicating the dividing method may be stored in the parameter set (geometry SPS or attribute SPS) for each sequence. Furthermore, when the same dividing method is used for geometry information and attribute information, the information indicating the dividing method may be stored in the parameter set of a PCC stream (stream PS).

Also, the above-described information may be stored in any of the above-described parameter sets, or may be stored in a plurality of the parameter sets. Additionally, a parameter set for tile dividing or slice dividing may be defined, and the above-described information may be stored in the parameter set. Furthermore, these information may be stored in the header of encoded data.

Also, the header of encoded data includes the identification information indicating dependency. That is, when there is dependency between data, the header includes the identification information for referring to a dependence destination from a dependence source. For example, the header of data of a dependence destination includes the identification information for specifying the data. The identification information indicating the dependence destination is included in the header of the data of a dependence source. Note that, when the identification information for specifying data, the additional information related to slice dividing or tile dividing, and the identification information indicating dependency can be identified or derived from other information, these information may be omitted.

Figure 39:
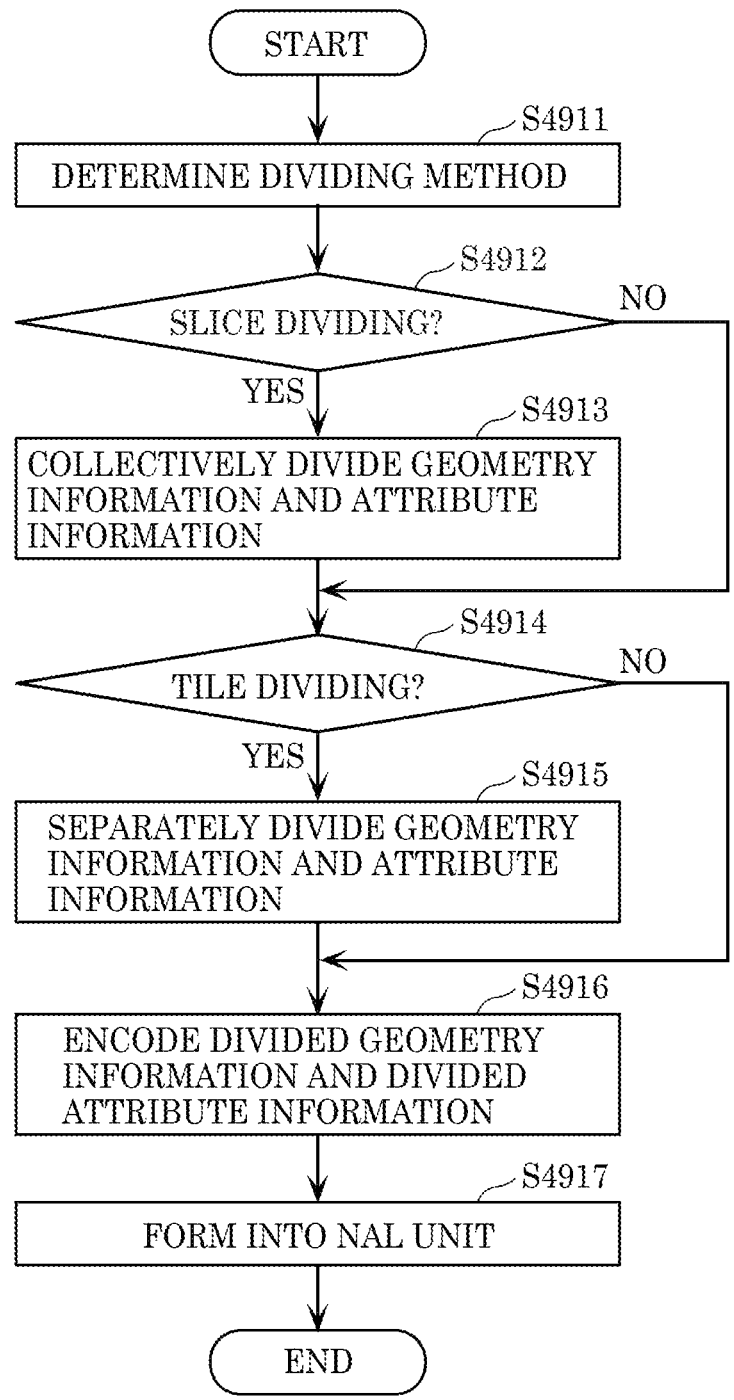
FIG. 39 is a flowchart of encoding processing according to Embodiment 3.

Next, the flows of encoding processing and decoding processing of point cloud data according to the present embodiment will be described. FIG. 39 is a flowchart of the encoding processing of point cloud data according to the present embodiment.

First, the three-dimensional data encoding device determines the dividing method to be used (S4911). This dividing method includes whether or not to perform slice dividing, and whether or not to perform tile dividing. Also, the dividing method may include the number of divisions and the type of division, etc. in the case of performing slice dividing or tile dividing. The type of division is the technique based on an object shape as described above, the technique based on map information or geometry information, or the technique based on the data amount or processing amount, etc. Note that the dividing method may be defined in advance.

When slice dividing is performed (Yes in S4912), the three-dimensional data encoding device generates a plurality of slice geometry information and a plurality of slice attribute information by collectively dividing geometry information and attribute information (S4913). Also, the three-dimensional data encoding device generates slice additional information related to slice dividing. Note that the three-dimensional data encoding device may separately divide geometry information and attribute information.

When tile dividing is performed (Yes in S4914), the three-dimensional data encoding device generates a plurality of divided geometry information and a plurality of divided attribute information by separately dividing the plurality of slice geometry information and the plurality of slice attribute information (or geometry information and attribute information) (S4915). Additionally, the three-dimensional data encoding device generates geometry tile additional information and attribute tile additional information related to tile dividing. Note that the three-dimensional data encoding device may collectively divide slice geometry information and slice attribute information.

Next, the three-dimensional data encoding device generates a plurality of encoded geometry information and a plurality of encoded attribute information by encoding each of the plurality of divided geometry information and the plurality of divided attribute information (S4916). Also, the three-dimensional data encoding device generates dependency information.

Next, the three-dimensional data encoding device generates encoded data (an encoded stream) by forming (multiplexing) the plurality of encoded geometry information, the plurality of encoded attribute information, and additional information into a NAL unit (S4917). Also, the three-dimensional data encoding device transmits the generated encoded data.

Figure 40:
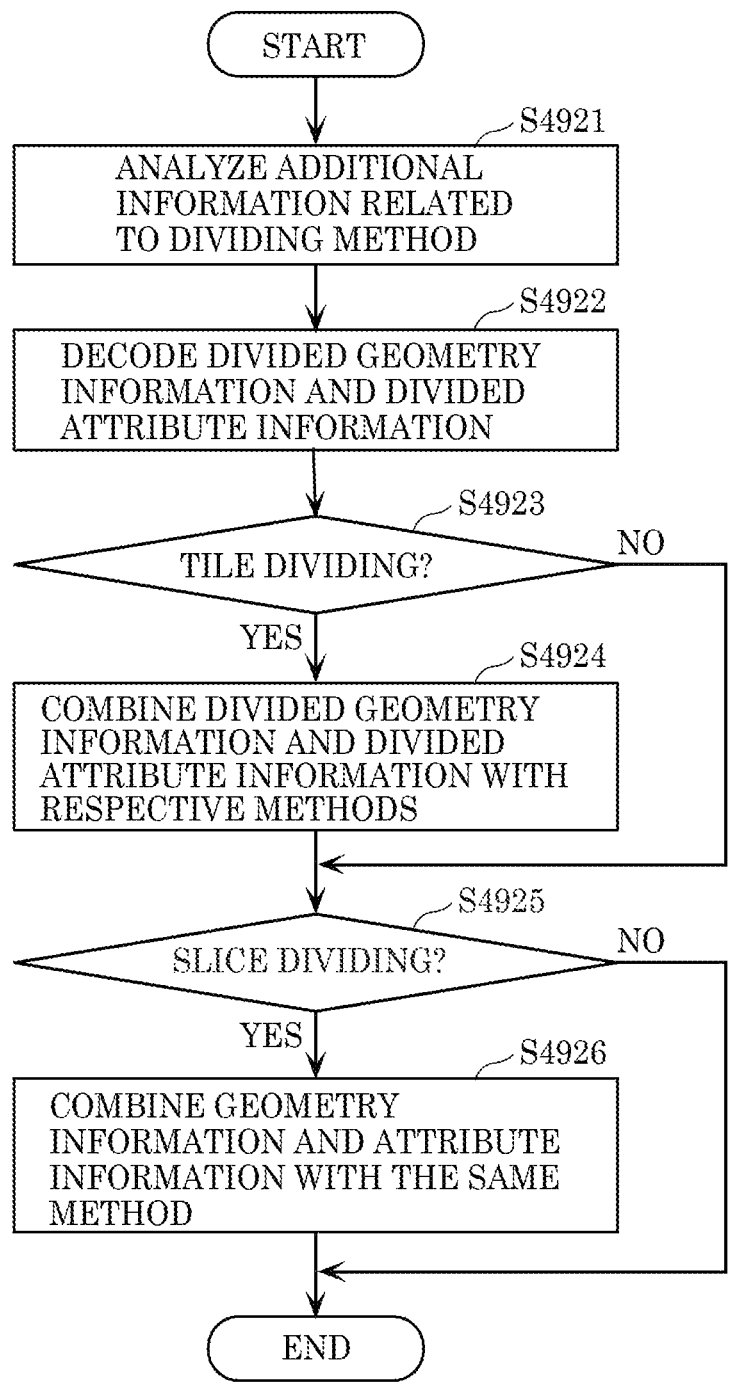
FIG. 40 is a flowchart of decoding processing according to Embodiment 3.

FIG. 40 is a flowchart of the decoding processing of point cloud data according to the present embodiment. First, the three-dimensional data decoding device determines the dividing method by analyzing additional information (slice additional information, geometry tile additional information, and attribute tile additional information) related to the dividing method included in the encoded data (encoded stream) (S4921). This dividing method includes whether or not to perform slice dividing, and whether or not to perform tile dividing. Additionally, the dividing method may include the number of divisions and the type of division, etc. in the case of performing slice dividing or tile dividing.

Next, the three-dimensional data decoding device generates divided geometry information and divided attribute information by decoding a plurality of encoded geometry information and a plurality of encoded attribute information included in the encoded data by using dependency information included in the encoded data (S4922).

When it is indicated by the additional information that tile dividing has been performed (Yes in S4923), the three-dimensional data decoding device generates a plurality of slice geometry information and a plurality of slice attribute information by combining a plurality of divided geometry information and a plurality of divided attribute information with respective methods based on geometry tile additional information and attribute tile additional information (S4924). Note that the three-dimensional data decoding device may combine the plurality of divided geometry information and the plurality of divided attribute information with the same method.

When it is indicated by the additional information that slice dividing has been performed (Yes in S4925), the three-dimensional data decoding device generates geometry information and attribute information by combining the plurality of slice geometry information and the plurality of slice attribute information (the plurality of divided geometry information and the plurality of divided attribute information) with the same method based on slice additional information (S4926). Note that the three-dimensional data decoding device may combine the plurality of slice geometry information and the plurality of slice attribute information with respective different methods.

Figure 41:
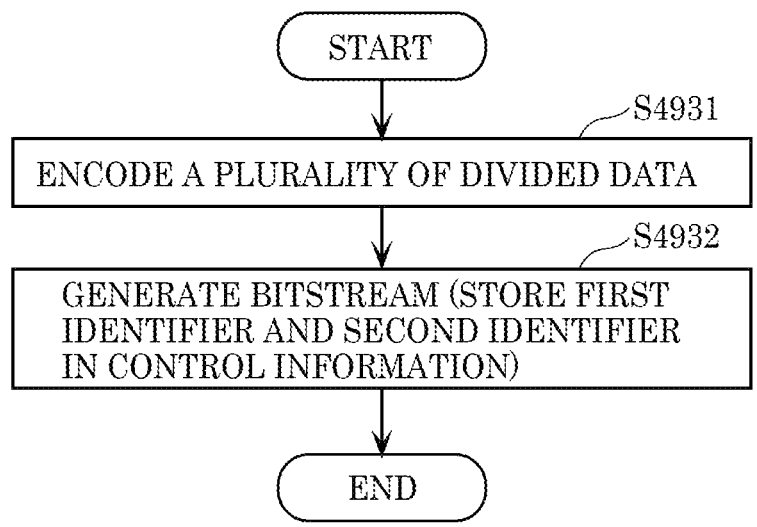
FIG. 41 is a flowchart of encoding processing according to Embodiment 3.

As described above, the three-dimensional data encoding device according to the present embodiment performs the processing illustrated in FIG. 41. First, the three-dimensional data encoding device performs dividing into a plurality of divided data (for example, tiles) included in a plurality of subspaces (for example, slices) divided from a current space in which a plurality of three-dimensional points are included, each of the plurality of divided data including one or more three-dimensional points. Here, the divided data is one or more data aggregates that are included in a subspace, and includes one or more three-dimensional points. Additionally, the divided data is also spaces, and may include a space that does not include a three-dimensional point. Furthermore, a plurality of divided data may be included in one subspace, or one divided data may be included in one subspace. Note that a plurality of subspaces may be set to a current space, or one subspace may be set to the current space.

Next, the three-dimensional data encoding device generates a plurality of encoded data corresponding to a plurality of divided data, respectively, by encoding each of the plurality of divided data (S4931). The three-dimensional data encoding device generates a bit stream including the plurality of encoded data and a plurality of control information (for example, the headers illustrated in FIG. 38) (referred to also as signaling information) for the plurality of respective encoded data (S4932). In each of the plurality of control information, a first identifier (for example, slice_idx) indicating the subspace corresponding to the encoding data corresponding to the control information, and a second identifier (for example, tile_idx) indicating the divided data corresponding to the encoding data corresponding to the control information are stored.

According to this, the three-dimensional data decoding device that decodes a bit stream generated by the three-dimensional data encoding device can easily restore a current space by combining the data of a plurality of divided data by using the first identifier and the second identifier. Therefore, the processing amount in the three-dimensional data decoding device can be reduced.

For example, in the encoding, the three-dimensional data encoding device encodes the geometry information and attribute information of a three-dimensional point(s) included in each of the plurality of divided data. Each of a plurality of encoded data includes the encoded data of geometry information, and the encoded data of attribute information. Each of a plurality of control information includes the control information of the encoded data of geometry information, and the control information of the encoded data of attribute information. The first identifier and the second identifier are stored in the control information of the encoded data of geometry information.

For example, in a bit stream, each of a plurality of control information is located ahead of the encoded data corresponding to the control information.

Additionally, a current space in which a plurality of three-dimensional points are included is set as one or more subspaces, one or more divided data including one or more three-dimensional points are included in the subspaces, the three-dimensional data encoding device generates a plurality of encoded data corresponding to the plurality of respective divided data by encoding each of the divided data, and generates a bit stream including the plurality of encoded data and a plurality of control information for the plurality of respective encoded data, and the first identifier indicating the subspace corresponding to the encoded data corresponding to the control information, and the second identifier indicating the divided data corresponding to the encoded data corresponding to the control information may be stored in each of the plurality of control information.

For example, the three-dimensional data encoding device includes a processor and a memory, and the processor performs the above-described processing by using the memory.

Figure 42:
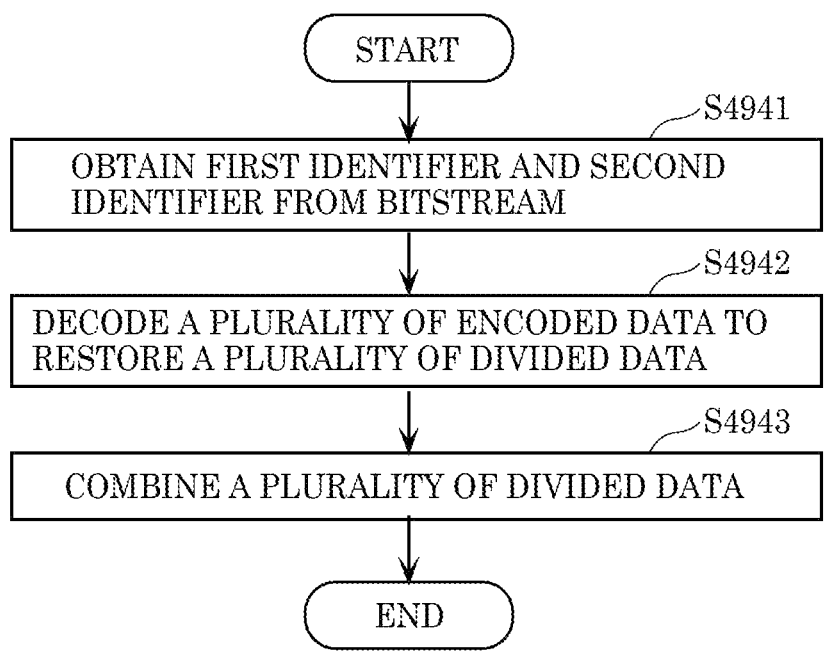
FIG. 42 is a flowchart of decoding processing according to Embodiment 3.

Additionally, the three-dimensional data decoding device according to the present embodiment performs the processing illustrated in FIG. 42. First, the three-dimensional data decoding device obtains the first identifier (for example, slice_idx) and the second identifier (for example, tile_idx) from a bitstream, the bitstream including a plurality of encoded data and a plurality of control information (for example, the headers illustrated in FIG. 38) corresponding to the plurality of respective encoded data, the first identifier and the second identifier being included in the plurality of control information, the plurality of encoded data being generated by encoding each of a plurality of divided data (for example, tiles), the plurality of divided data being included in a plurality of subspaces (for example, slices) obtained by dividing a current space including a plurality of three-dimensional points, the plurality of divided data each including one or more three-dimensional points, the first identifier indicating a subspace corresponding to the encoded data corresponding to the control information, the second identifier indicating the divided data corresponding to the encoded data corresponding to the control information (S4941). Next, the three-dimensional data decoding device restores a plurality of divided data by decoding the plurality of encoded data (S4942). Next, the three-dimensional data decoding device restores the current space by combining the plurality of divided data by using the first identifier and the second identifier (S4943). For example, the three-dimensional data decoding device restores the plurality of subspaces by combining the plurality of divided data by using the second identifier, and restores the current space (the plurality of three-dimensional points) by combining the plurality of subspaces by using the first identifier. Note that the three-dimensional data decoding device may obtain the encoded data of a desired subspace or divided data from a bit stream by using at least one of the first identifier and the second identifier, and may selectively decode or preferentially decode the obtained encoded data.

According to this, the three-dimensional data decoding device can easily restore the current space by combining the data of the plurality of divided data by using the first identifier and the second identifier. Therefore, the processing amount in the three-dimensional data decoding device can be reduced.

For example, each of the plurality of encoded data is generated by encoding the geometry information and attribute information of the three-dimensional point(s) included in the corresponding divided data, and includes the encoded data of the geometry information, and the encoded data of the attribute information. Each of the plurality of control information includes the control information of the encoded data of the geometry information, and the control information of the encoded data of the attribute information. The first identifier and the second identifier are stored in the control information of the encoded data of the geometry information.

For example, in a bit stream, the control information is located ahead of the corresponding encoded data.

For example, the three-dimensional data decoding device includes a processor and a memory, and the processor performs the processes described above using the memory.

Embodiment 4

According to a three-dimensional data encoding device according to Embodiment 4, geometry information of a plurality of three-dimensional points is encoded using a prediction tree generated based on the geometry information.

Figure 43:
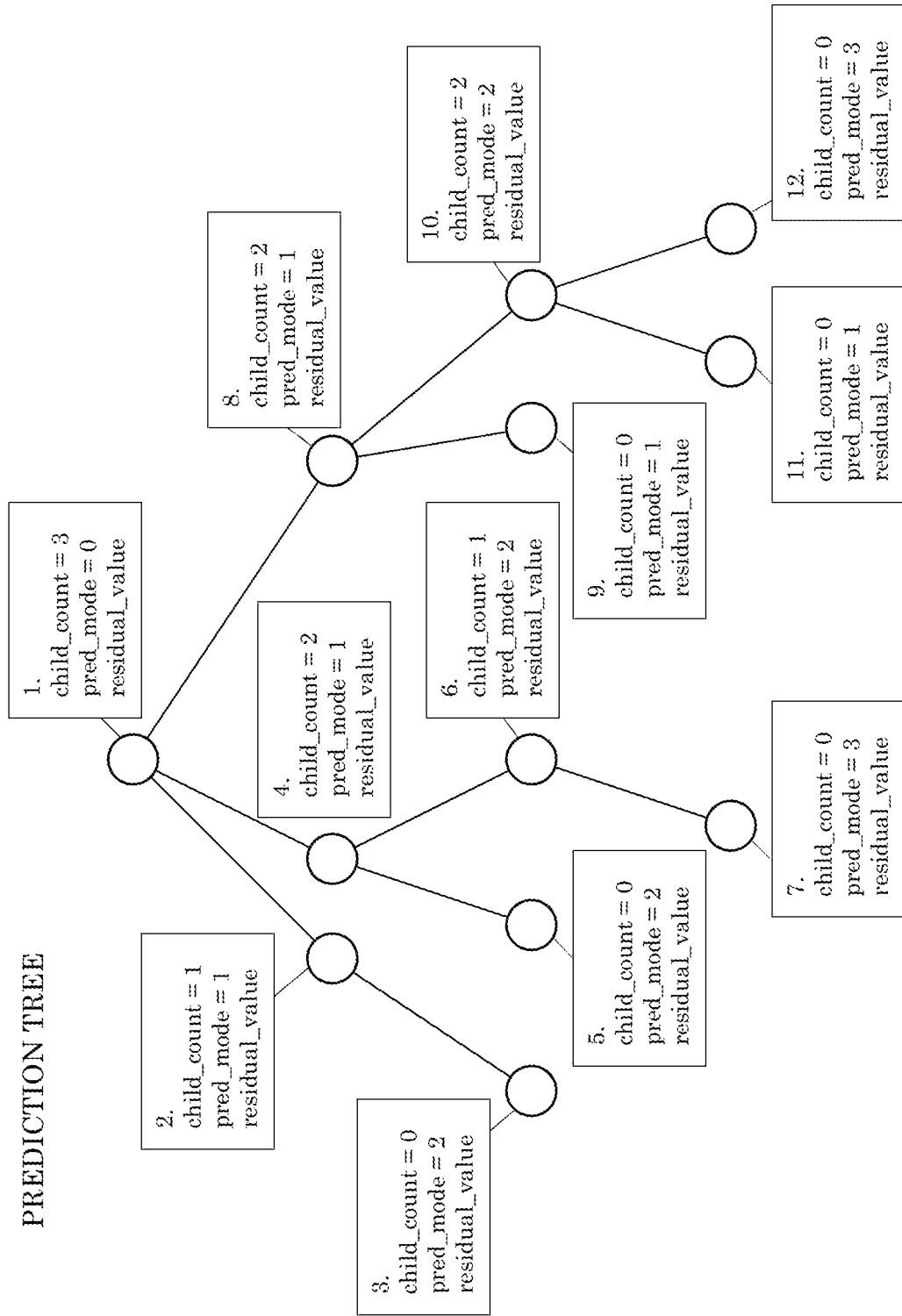
FIG. 43 is a diagram illustrating an example of a prediction tree used in a three-dimensional data encoding method according to Embodiment 4.
Figure 44:
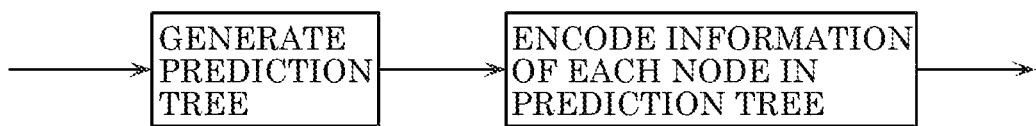
FIG. 44 is a flowchart illustrating an example of a three-dimensional data encoding method according to Embodiment 4.
Figure 45:
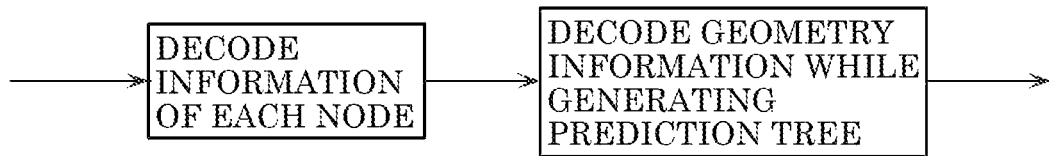
FIG. 45 is a flowchart illustrating an example of a three-dimensional data decoding method according to Embodiment 4.

FIG. 43 is a diagram illustrating an example of a prediction tree used in the three-dimensional data encoding method according to Embodiment 4. FIG. 44 is a flowchart illustrating an example of the three-dimensional data encoding method according to Embodiment 4. FIG. 45 is a flowchart illustrating an example of a three-dimensional data decoding method according to Embodiment 4.

As shown in FIG. 43 and FIG. 44, in the three-dimensional data encoding method, a prediction tree is generated using a plurality of three-dimensional points, and node information included in each node in the prediction tree is then encoded. In this way, a bitstream including encoded node information is obtained. Each item of node information is information concerning one node of the prediction tree, for example. Each item of node information includes geometry information of one node, an index of the one node, the number of child nodes of the one node, a prediction mode used for encoding the geometry information of the one node, and a prediction residual.

As shown in FIG. 43 and FIG. 45, in the three-dimensional data decoding device, each item of encoded node information included in the bitstream is decoded, and then the geometry information is decoded while generating the prediction tree.

Next, a method of generating a prediction tree will be described with reference to FIG. 46.

Figure 46:
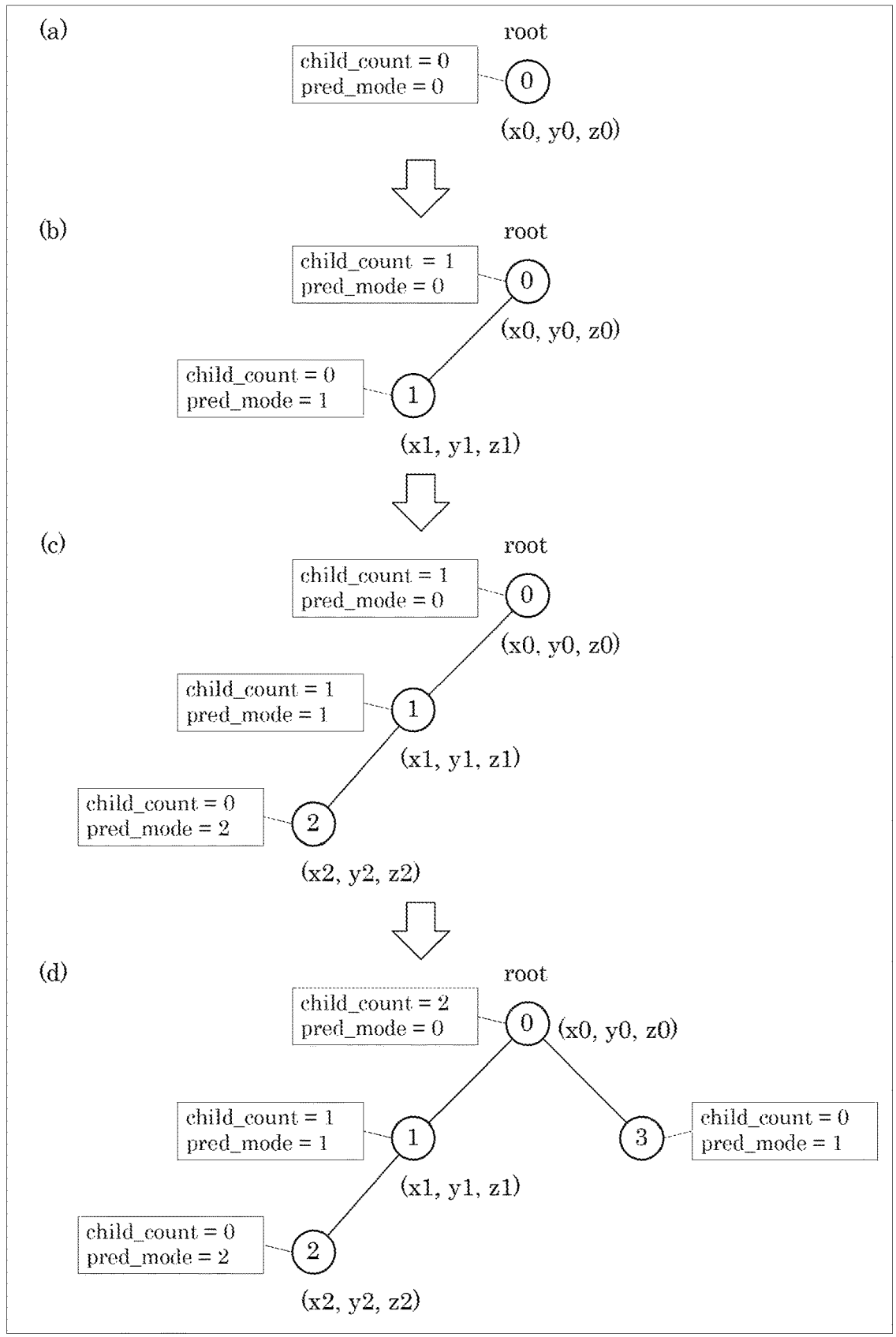
FIG. 46 is a diagram for describing a method of generating a prediction tree according to Embodiment 4.

FIG. 46 is a diagram for describing a method of generating a prediction tree according to Embodiment 4.

In the method of generating a prediction tree, as shown in Part (a) of FIG. 46, the three-dimensional data encoding device first adds point 0 as an initial point of the prediction tree. Geometry information of point 0 is represented by coordinates including three elements (x0, y0, z0). The geometry information of point 0 may be represented by coordinates of the three-dimensional Cartesian coordinate system or coordinates of the polar coordinate system.

child_count is incremented by 1 each time one child node is added to the node for which the child_count is set. Once the generation of the prediction tree is completed, child_count of each node indicates the number of child nodes of the node, and is added to the bitstream. pred_mode indicates the prediction mode for predicting values of the geometry information of each node. Details of the prediction mode will be described later.

As shown in Part (b) of FIG. 46, the three-dimensional data encoding device then adds point 1 to the prediction tree. In this step, the three-dimensional data encoding device may search the point cloud already added to the prediction tree for a point nearest to point 1 and add point 1 as a child node of the nearest point. Geometry information of point 1 is represented by coordinates including three elements (x1, y1, z1). The geometry information of point 1 may be represented by coordinates of the three-dimensional Cartesian coordinate system or coordinates of the polar coordinate system. In the case of FIG. 46, point 0 is the nearest point of point 1, and point 1 is added as a child node of point 0. The three-dimensional data encoding device then increments by 1 the value indicated by child_count of point 0.

Note that the predicted value of the geometry information of each node may be calculated when adding the node to the prediction tree. For example, in the case of Part (b) of FIG. 46, the three-dimensional data encoding device may add point 1 as a child node of point 0 and calculate the geometry information of point 0 as a predicted value. In that case, pred_mode=1 may be set. pred_mode is prediction mode information (prediction mode value) indicating a prediction mode. After calculating the predicted value, the three-dimensional data encoding device may calculate residual_value (prediction residual) of point 1. Here, residual_value is a difference value obtained by subtracting the predicted value calculated in the prediction mode indicated by pred_mode from the geometry information of the node. As described, according to the three-dimensional data encoding method, the difference value with respect to the predicted value, rather than the geometry information itself, is encoded, so that the encoding efficiency can be improved.

As shown in Part (c) of FIG. 46, the three-dimensional data encoding device then adds point 2 to the prediction tree. In this step, the three-dimensional data encoding device may search the point cloud already added to the prediction tree for a point nearest to point 2 and add point 2 as a child node of the nearest point. Geometry information of point 2 is represented by coordinates including three elements (x2, y2, z2). The geometry information of point 2 may be represented by coordinates of the three-dimensional Cartesian coordinate system or coordinates of the polar coordinate system. In the case of FIG. 46, point 1 is the nearest point of point 2, and point 2 is added as a child node of point 1. The three-dimensional data encoding device then increments by 1 the value indicated by child_count of point 1.

As shown in Part (d) of FIG. 46, the three-dimensional data encoding device then adds point 3 to the prediction tree. In this step, the three-dimensional data encoding device may search the point cloud already added to the prediction tree for a point nearest to point 3 and add point 3 as a child node of the nearest point. Geometry information of point 3 is represented by coordinates including three elements (x3, y3, z3). The geometry information of point 3 may be represented by coordinates of the three-dimensional Cartesian coordinate system or coordinates of the polar coordinate system. In the case of FIG. 46, point 0 is the nearest point of point 3, and point 3 is added as a child node of point 0. The three-dimensional data encoding device then increments by 1 the value indicated by child_count of point 0.

In this way, the three-dimensional data encoding device adds all points to the prediction tree and ends the generation of the prediction tree. When the generation of the prediction tree ends, any node having child_count=0 is a leaf of the prediction tree. After the generation of the prediction tree ends, the three-dimensional data encoding device encodes child_count, pred_mode, and residual_value of each node selected in the depth-first order from the root node. Selecting a node in the depth-first order means that the three-dimensional data encoding device selects, as a node subsequent to a node selected, a child node that has not been selected yet of the one or more child nodes of the selected node. When the selected node has no child node, the three-dimensional data encoding device selects a child node that has not been selected yet of the parent node of the selected node.

Note that the order of encoding is not limited to the depth-first order, but may be the width-first order, for example. When selecting a node in the width-first order, the three-dimensional data encoding device selects, as a node subsequent to a node selected, a node that has not been selected yet of the one or more nodes at the same depth (layer) as the selected node. When there is no node at the same depth as the selected node, the three-dimensional data encoding device selects a node that has not been selected yet of the one or more nodes at the subsequent depth.

Note that points 0 to 3 are examples of three-dimensional points.

Note that although child_count, pred_mode, and residual_value are calculated when adding each point to the prediction tree in the three-dimensional data encoding method described above, the present invention is not necessarily limited to this, and they may be calculated after the generation of the prediction tree ends.

The three-dimensional data encoding device to which a plurality of three-dimensional points are input may re-order the input three-dimensional points in ascending or descending Morton order and process the three-dimensional points in the latter order. This allows the three-dimensional data encoding device to efficiently search for the nearest point of the three-dimensional point to be processed and improve the encoding efficiency. The three-dimensional data encoding device need not re-order the three-dimensional points and may process the three-dimensional points in the order of input. For example, the three-dimensional data encoding device may generate a prediction tree without a branch in the order of input of a plurality of three-dimensional points. Specifically, the three-dimensional data encoding device may add an input three-dimensional point subsequent to a predetermined three-dimensional point in the order of input of a plurality of three-dimensional points as a child node of the predetermined three-dimensional point.

Figure 47:
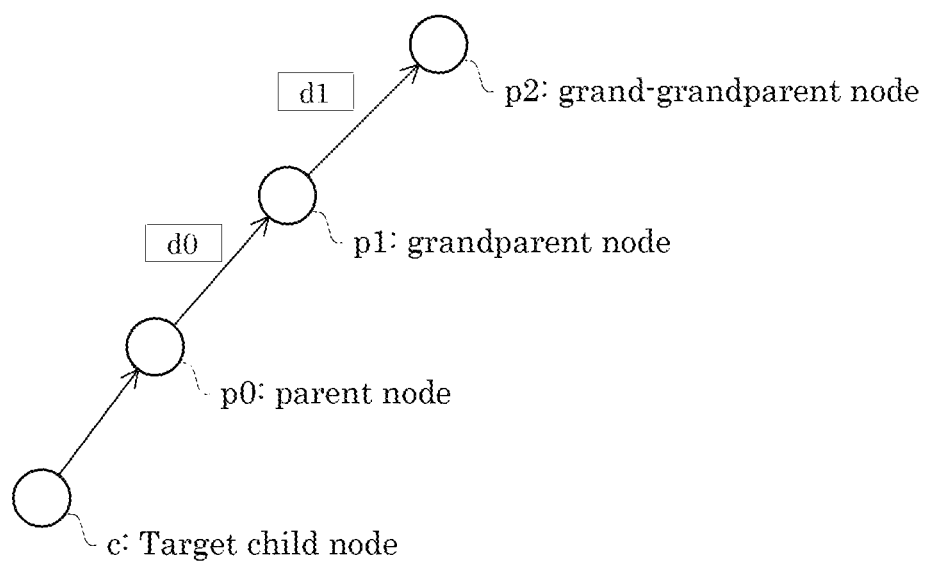
FIG. 47 is a diagram for describing a first example of prediction modes according to Embodiment 4.

Next, a first example of prediction modes will be described with reference to FIG. 47. FIG. 47 is a diagram for describing a first example of prediction modes according to Embodiment 4. FIG. 47 is a diagram illustrating a part of a prediction tree.

As shown below, eight prediction modes may be set. As an example, a case where a predicted value for point c is calculated as shown in FIG. 47 will be described. In the prediction tree, as shown, the parent node of point c is point p0, the grandparent node of point c is point p1, and the great grandparent node of point c is point p2. Note that point c, point p0, point p1, and point p2 are examples of three-dimensional points.

A prediction mode whose prediction mode value is 0 (referred to as prediction mode 0, hereinafter) may be set without prediction. That is, in prediction mode 0, the three-dimensional data encoding device may calculate geometry information of input point c as a predicted value of point c.

A prediction mode whose prediction mode value is 1 (referred to as prediction mode 1, hereinafter) may be set for a differential prediction with respect to point p0. That is, the three-dimensional data encoding device may calculate geometry information of point p0, which is the parent node of point c, as a predicted value of point c.

A prediction mode whose prediction mode value is 2 (referred to as prediction mode 2, hereinafter) may be set for a linear prediction based on point p0 and point p1. That is, the three-dimensional data encoding device may calculate, as a predicted value of point c, a prediction result of a linear prediction based on geometry information of point p0, which is the parent node of point c, and geometry information of point p1, which is the grandparent node of point c.

$$\text{Predicted value} = 2 \times p0 - p1 \quad \text{(Equation T1)}$$

In Equation T1, p0 denotes geometry information of point p0, and p1 denotes geometry information of point p1.

A prediction mode whose prediction mode value is 3 (referred to as prediction mode 3, hereinafter) may be set for a parallelogram prediction based on point p0, point p1, and point p2. That is, the three-dimensional data encoding device may calculate, as a predicted value of point c, a prediction result of a parallelogram prediction based on geometry information of point p0, which is the parent node of point c, geometry information of point p1, which is the grandparent node of point c, and geometry information of point p2, which is the great grandparent node of point c. Specifically, the three-dimensional data encoding device calculates a predicted value of point c in prediction mode 3 according to the following equation T2.

$$\text{Predicted value} = p0 + p1 - p2 \quad \text{(Equation T2)}$$

In Equation T2, p0 denotes geometry information of point p0, p1 denotes geometry information of point p1, and p2 denotes geometry information of point p2.

A prediction mode whose prediction mode value is 4 (referred to as prediction mode 4, hereinafter) may be set for a differential prediction with respect to point p1. That is, the three-dimensional data encoding device may calculate geometry information of point p1, which is the grandparent node of point c, as a predicted value of point c.

A prediction mode whose prediction mode value is 5 (referred to as prediction mode 5, hereinafter) may be set for a differential prediction with respect to point p2. That is, the three-dimensional data encoding device may calculate geometry information of point p2, which is the great grandparent node of point c, as a predicted value of point c.

A prediction mode whose prediction mode value is 6 (referred to as prediction mode 6, hereinafter) may be set for an average of geometry information of any two or more of point p0, point p1, and point p2. That is, the three-dimensional data encoding device may calculate, as a predicted value of point c, an average value of any two or more of geometry information of point p0, which is the parent node of point c, geometry information of point p1, which is the grandparent node of point c, and geometry information of point p2, which is the great grandparent node of point c. For example, when the three-dimensional data encoding device uses geometry information of point p0 and geometry information of point p1 for calculation of a predicted value, the three-dimensional data encoding device calculates a predicted value of point c in prediction mode 6 according to the following Equation T3.

$$\text{Predicted value} = (p0 + p1)/2 \quad \text{(Equation T3)}$$

In Equation T3, p0 denotes geometry information of point p0, and p1 denotes geometry information of point p1.

A prediction mode whose prediction mode value is 7 (referred to as prediction mode 7, hereinafter) may be set for a non-linear prediction based on distance d0 between point p0 and point p1 and distance d1 between point p2 and point p1. That is, the three-dimensional data encoding device may calculate, as a predicted value of point c, a prediction result of a non-linear prediction based on distance d0 and distance d1.

Note that the prediction method assigned to each prediction mode is not limited to the example described above. The eight prediction modes described above and the eight prediction methods described above need not be combined in the manner described above, and can be combined in any manner. For example, when prediction modes are encoded by an entropy encoding, such as arithmetic encoding, a prediction method of high frequency of use may be assigned to prediction mode 0. In this way, the encoding efficiency can be improved. The three-dimensional data encoding device may can also improve the encoding efficiency by dynamically changing the assignment of prediction modes according to the frequency of use of the prediction modes while performing the encoding process. For example, the three-dimensional data encoding device may count the frequency of use of each prediction mode in the encoding and assign a prediction mode indicated by a smaller value to a prediction method of a higher frequency of use. In this way, the encoding efficiency can be improved. Note that M denotes a prediction mode count indicating the number of prediction modes, and in the example described above, there are eight prediction modes 0 to 7, and therefore, M=8.

As predicted values (px, py, pz) of geometry information (x, y, z) of a three-dimensional point, the three-dimensional data encoding device may calculate predicted values used for calculation of geometry information of a three-dimensional point to be encoded based on geometry information of a three-dimensional point that is at a short distance from the three-dimensional point to be encoded among peripheral three-dimensional points of the three-dimensional point to be encoded. The three-dimensional data encoding device may add prediction mode information (pred_mode) for each three-dimensional point so that a predicted value to be calculated can be selected according to the prediction mode.

For example, when the total number of prediction modes is M, it is possible that geometry information of nearest three-dimensional point p0 is assigned to prediction mode 0, . . . , and geometry information of three-dimensional point p2 is assigned to prediction mode M−1, and the prediction mode used for prediction is added for each three-dimensional point to the bitstream.

Note that prediction mode count M may be added to the bitstream. The value of prediction mode count M need not be added to the bitstream, and may be defined by profile, level or the like of a standard. The value of prediction mode count M calculated from number N of three-dimensional points used for prediction may also be used. For example, prediction mode count M may be calculated according to M=N+1.

FIG. 48 is a diagram illustrating an example of a syntax of a header of geometry information. NumNeighborPoint, NumPredMode, Thfix, QP, and unique_point_per_leaf in the syntax in FIG. 48 will be sequentially described.

NumNeighborPoint denotes an upper limit of the number of peripheral points used for generation of a predicted value of geometry information of a three-dimensional point. When number M of peripheral points is less than NumNeighborPoint (M<NumNeighborPoint), a predicted value may be calculated using the M peripheral points in the predicted value calculation process.

NumPredMode denotes total number M of prediction modes used for prediction of geometry information. Note that maximum possible value MaxM of the prediction mode count may be defined by a standard or the like. The three-dimensional data encoding device may add the value of (MaxM−M) (0<M<=MaxM) to the header as NumPredMode, and binarize and encode (MaxM−1) with a truncated unary code. Prediction mode count NumPredMode need not be added to the bitstream, and the value of NumPredMode may be defined by profile or level of a standard or the like. The prediction mode count may be defined as NumNeighborPoint+NumPredMode.

Thfix is a threshold for determining whether to fix the prediction mode or not. Distance d0 between point p1 and point p0 and distance d1 between point p2 and point p1 used for prediction are calculated, and the prediction mode is fixed to be α if absolute difference value distdiff=|d0−d1| is less than threshold Thfix[i]. α is a prediction mode for calculating a predicted value based on a linear prediction, and is "2" in the embodiment described here. Note that Thfix need not be added to the bitstream, and the value may be defined by profile or level of a standard or the like.

QP denotes a quantization parameter used for quantizing geometry information. The three-dimensional data encoding device may calculate a quantization step from the quantization parameter, and quantize geometry information using the calculated quantization step.

unique_point_per_leaf is information that indicates whether a duplicated point (a point having the same geometry information as another point) is included in the bitstream or not. When unique_point_per_leaf=1, it shows that there are no duplicated points in the bitstream. When unique_point_per_leaf=0, it shows that there is one or more duplicated points in the bitstream.

Note that although the determination of whether to fix the prediction mode or not has been described as being performed using the absolute difference value between distance d0 and distance d1 in this embodiment, the present invention is not limited to this, and the determination may be made in any manner. For example, the determination may be performed by calculating distance d0 between point p1 and point p0. Specifically, it may be determined that point p 1 cannot be used for prediction and the prediction mode value may be fixed at "1" (a predicted value of p0) when distance d0 is greater than a threshold, and a prediction mode may be set otherwise. In this way, the encoding efficiency can be improved while reducing the overhead.

NumNeighborPoint, NumPredMode, Thfix, and unique_point_per_leaf described above may be entropy-encoded and added to the header. For example, these values may be binarized and arithmetically encoded. These values may be encoded with a fixed length, in order to reduce the processing amount.

FIG. 49 is a diagram illustrating an example of a syntax of geometry information. NumOfPoint, child_count, pred_mode, and residual_value[j] in the syntax in FIG. 49 will be sequentially described.

NumOfPoint denotes the total number of three-dimensional points included in a bitstream.

child_count denotes the number of child nodes of an i-th three-dimensional point (node[i]).

pred_mode denotes a prediction mode for encoding or decoding geometry information of the i-th three-dimensional point. pred_mode assumes a value from 0 to M−1 (M denotes the total number of prediction modes). When pred_mode is not in the bitstream (when the condition that distdiff>=Thfix[i] && NumPredMode>1 is not satisfied), pred_mode may be estimated to be fixed value α. α is a prediction mode for calculating a predicted value based on a linear prediction, and is "2" in the embodiment described here. Note that α is not limited to "2", and any value of 0 to M−1 may be set as an estimated value. An estimated value in the case where pred_mode is not in the bitstream may be additionally added to the header or the like. pred_mode may be binarized and arithmetically encoded with a truncated unary code using the number of prediction modes to which a predicted value is assigned.

Note that when NumPredMode=1, that is, when the prediction mode count is 1, the three-dimensional data encoding device need not encode a prediction mode value representing a prediction mode and may generate a bitstream that includes no prediction mode value. When the three-dimensional data decoding device obtains a bitstream that includes no prediction mode value, the three-dimensional data decoding device may calculate a predicted value of a particular prediction mode in the predicted value calculation. The particular prediction mode is a previously determined prediction mode.

residual_value[j] denotes encoded data of a prediction residual between geometry information and a predicted value thereof. residual_value[0] may represent element x of the geometry information, residual_value[1] may represent element y of the geometry information, and residual_value[2] may represent element z of the geometry information.

FIG. 50 is a diagram illustrating another example of the syntax of geometry information. The example in FIG. 50 is a modification of the example in FIG. 49.

As shown in FIG. 50, pred_mode may denote a prediction mode for each of three elements of geometry information (x, y, z). That is, pred_mode[0] denotes a prediction mode for element x, pred_mode[1] denotes a prediction mode for element y, and pred_mode[2] denotes a prediction mode for element z. pred_mode[0], pred_mode[1], and pred_mode[2] may be added to the bitstream.

Figure 51:
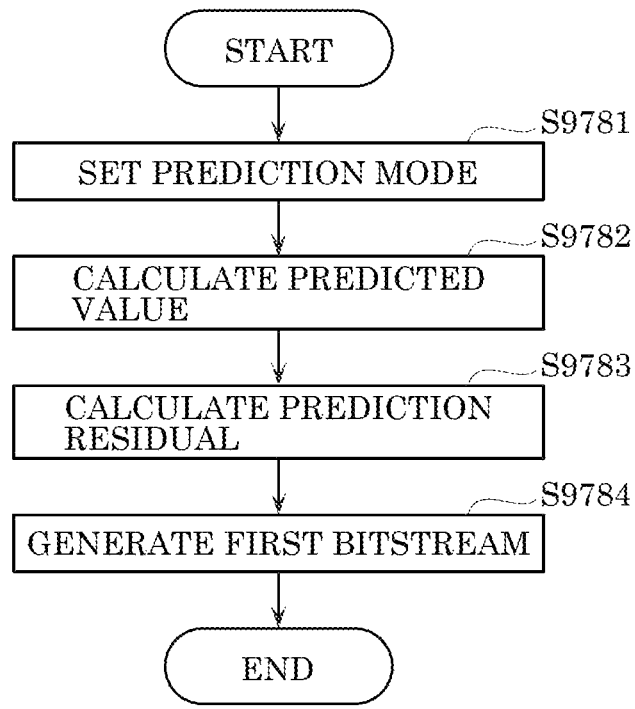
FIG. 51 is a flowchart of a process by a three-dimensional data encoding device according to Embodiment 4.

As described above, the three-dimensional data encoding device according to one aspect of the present embodiment performs the process shown by FIG. 51. The three-dimensional encoding device performs a three-dimensional data encoding method for encoding three-dimensional points having a hierarchical structure. The three-dimensional data encoding device sets one prediction mode out of two or more prediction modes each for calculating a predicted value of an item of first geometry information of a first three-dimensional point using one or more items of second geometry information of one or more second three-dimensional points surrounding the first three-dimensional point (S9781). Next, the three-dimensional data encoding device calculates a predicted value of the one prediction mode set (S9782). Then, the three-dimensional data encoding device calculates a prediction residual that is a difference between the item of first geometry information and the predicted value calculated (S9783). After that, the three-dimensional data encoding device generates a first bitstream including the one prediction mode set and the prediction residual (S9784). In the setting (S9781), the one prediction mode is set based on a depth of the first three-dimensional point in the hierarchical structure.

According to this, geometry information can be encoded using a predicted value in one prediction mode among two or more prediction modes that is set based on the depth in the hierarchical structure, so that the encoding efficiency of the geometry information can be improved.

For example, in the setting (S9784), the three-dimensional data encoding device sets a prediction mode value that is less than or equal to a value of the depth of the first three-dimensional point in the hierarchical structure. The prediction mode value indicates the one prediction mode.

For example, the first bitstream further includes a prediction mode count indicating a total number of the two or more prediction modes.

For example, in the generating (S9784), the three-dimensional data encoding device encodes a prediction mode value indicating the one prediction mode set using the prediction mode count. The first bitstream includes the prediction mode value encoded as the one prediction mode set.

For example, in the generating (S9784), the three-dimensional data encoding device encodes the prediction mode value using a truncated unary code in which the prediction mode count is set as a maximum value. Therefore, the code amount of the prediction mode value can be reduced.

For example, each of the item of first geometry information and the one or more items of second geometry information includes three elements. In the setting (S9781), the three-dimensional data encoding device sets, for the three elements in common, a prediction mode for calculating a predicted value of each of the three elements included in the item of first geometry information. Therefore, the code amount of the prediction mode value can be reduced.

For example, each of the item of first geometry information and the one or more items of second geometry information includes three elements. In the setting (S9781), the three-dimensional data encoding device sets, for the three elements independently of each other, a prediction mode for calculating a predicted value of each of the three elements included in the item of first geometry information. Therefore, the three-dimensional data decoding device can independently decode each element.

For example, each of the item of first geometry information and the one or more items of second geometry information includes three elements. In the setting (S9781), the three-dimensional data encoding device sets, for two elements among the three elements in common, a prediction mode for calculating a predicted value of each of the three elements included in the item of first geometry information, and sets the prediction mode for a remaining one element independently of the two elements. Therefore, the code amount of the prediction mode value can be reduced for the two elements. Therefore, the three-dimensional data decoding device can independently decode the remaining one element.

For example, in the generating (S9784), when the prediction mode count is 1, the three-dimensional data encoding device does not encode the prediction mode value, and generates a second bitstream not including the prediction mode value indicating the one prediction mode. Therefore, the code amount of the bitstream can be reduced.

For example, in the generating (S9784), when a prediction mode in which the predicted value calculated in the calculating is 0 is set, the three-dimensional data encoding device does not encode an item of positive and negative information, and generates a third bitstream not including the item of positive and negative information, the item of positive and negative information indicating whether the prediction residual is positive or negative. Therefore, the code amount of the bitstream can be reduced.

For example, the three-dimensional data encoding device includes a processor and memory, and the processor performs the above-described process using the memory.

Figure 52:
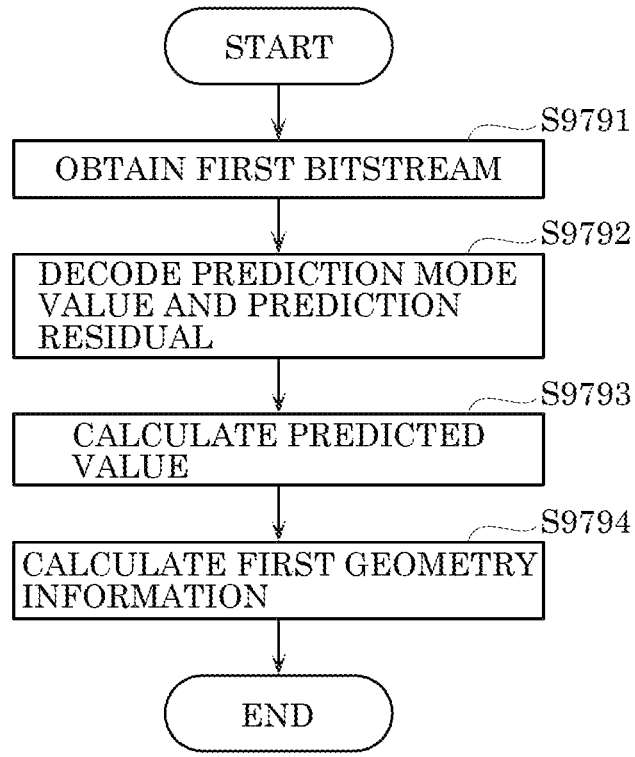
FIG. 52 is a flowchart of a process by a three-dimensional data decoding device according to Embodiment 4.

The three-dimensional data decoding device according to one aspect of the present embodiment performs the process shown by FIG. 52. The three-dimensional data decoding device performs a three-dimensional decoding method for decoding three-dimensional points having a hierarchical structure. The three-dimensional data decoding device obtains a first bitstream including an encoded prediction mode of a first three-dimensional point among the three-dimensional points and an encoded prediction residual (S9791). Next, the three-dimensional data decoding device decodes a prediction mode value indicating the encoded prediction mode, and the encoded prediction residual (S9792). Then, the three-dimensional data decoding device calculates a predicted value of a prediction mode obtained in the decoding and indicated by the prediction mode value (S9793). After that, the three-dimensional data decoding device calculates an item of first geometry information of the first three-dimensional point by adding the predicted value and a prediction residual obtained in the decoding (S9794). The encoded prediction mode included in the first bitstream is a prediction mode set based on a depth of the first three-dimensional point in the hierarchical structure.

According to this, geometry information can be encoded using a predicted value in one prediction mode among two or more prediction modes that is set based on the depth in the hierarchical structure, so that the encoding efficiency of the geometry information can be improved.

For example, the prediction mode value indicating the encoded prediction mode included in the first bitstream is less than or equal to a value of the depth of the first three-dimensional point in the hierarchical structure.

For example, the first bitstream includes a prediction mode count indicating a total number of two or more prediction modes.

For example, in the decoding (S9792), the three-dimensional data decoding device decodes the prediction mode value using a truncated unary code in which the total number of the two or more prediction modes is set as a maximum value.

For example, each of the item of first geometry information and one or more items of second geometry information of one or more second three-dimensional points includes three elements, the one or more second three-dimensional points surrounding the first three-dimensional point. A prediction mode for calculating a predicted value of each of the three elements included in the item of first geometry information is set for the three elements in common.

For example, each of the item of first geometry information and one or more items of second geometry information of one or more second three-dimensional points includes three elements, the one or more second three-dimensional points surrounding the first three-dimensional point. A prediction mode for calculating a predicted value of each of the three elements included in the item of first geometry information is set for the three elements independently of each other.

For example, each of the item of first geometry information and one or more items of second geometry information of one or more second three-dimensional points includes three elements, the one or more second three-dimensional points surrounding the first three-dimensional point. A prediction mode for calculating a predicted value of each of the three elements included in the item of first geometry information is set for two elements among the three elements in common, and is set for a remaining one element independently of the two elements.

For example, in the obtaining (S9791), when a second bitstream not including the prediction mode value is obtained in the obtaining, the three-dimensional data decoding device calculates a predicted value of a specific prediction mode in the calculating of the predicted value.

For example, in the obtaining (S9791), when a third bitstream not including positive and negative information is obtained in the obtaining, the three-dimensional data decoding device uses the prediction residual as 0 or a positive number in the calculating of the item of first geometry information (S9794).

For example, the three-dimensional data decoding device includes a processor and memory, and the processor performs the above-described process using the memory.

Embodiment 5

In order to divide point cloud data into tiles and slices and efficiently encode or decode the divisional data, an appropriate control is needed on the encoder side and the decoder side. By making the encoding and decoding of each piece of divisional data independent, rather than dependent, from the other pieces of divisional data, a multi-thread or multi-core processor can be used to process the pieces of divisional data in the respective threads/cores in parallel, and the performance is improved.

There are various methods of dividing point cloud data into tiles and slices. For example, there is a method of dividing point cloud data based on an attribute of an object, such as a road surface, of point cloud data or a characteristic, such as color information such as green, of point cloud data.

CABAC is an abbreviation of context-based adaptive binary arithmetic coding, which is an encoding method that realizes an arithmetic encoding (entropy encoding) with high compression ratio by increasing the probability precision by successively updating a context (a model for estimating the probability of occurrence of an input binary symbol) based on the encoded information.

In order to process pieces of divisional data such as tiles or slices in parallel, each piece of divisional data needs to be independently encoded or decoded. In order to make CABAC for the pieces of divisional data independent from each other, CABAC needs to be initialized at the top of each piece of divisional data. However, there is no mechanism therefor.

A CABAC initialization flag is used to initialize CABAC in CABAC encoding and decoding.

Figure 53:
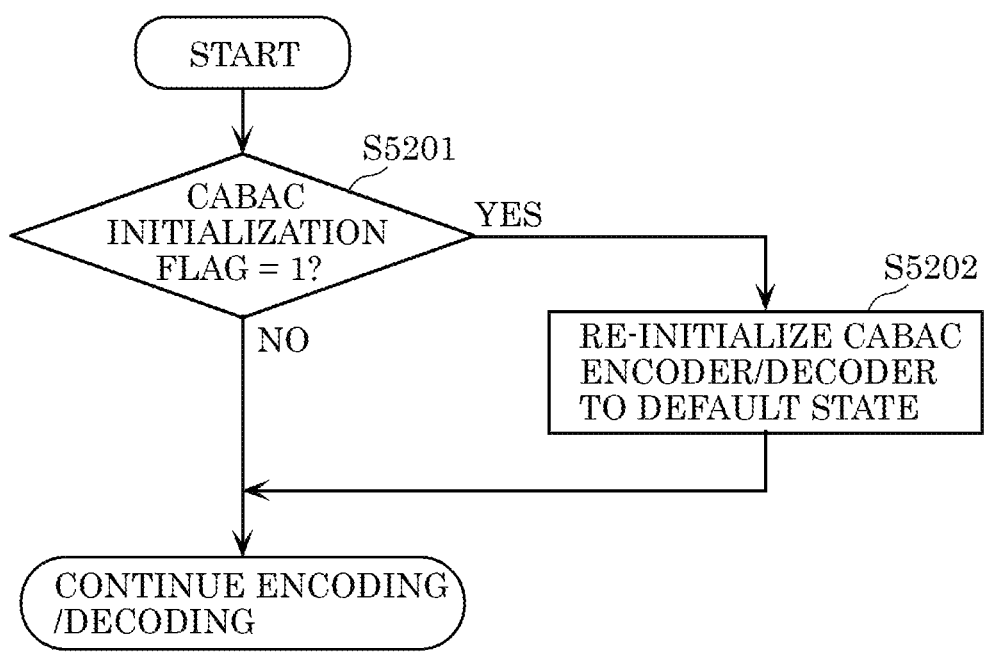
FIG. 53 is a flowchart of a process of re-initializing a CABAC encoding/decoding engine in response to a CABAC initialization flag in encoding or decoding according to Embodiment 5.

FIG. 53 is a flowchart of a process of initializing CABAC in response to a CABAC initialization flag.

The three-dimensional data encoding device or three-dimensional data decoding device determines whether the CABAC initialization flag is 1 or not in encoding or decoding (S5201).

When the CABAC initialization flag is 1 (if Yes in S5201), the three-dimensional data encoding device or three-dimensional data decoding device initializes a CABAC encoder/decoder to a default state (S5202), and continues the encoding or decoding.

When the CABAC initialization flag is not 1 (if No in S5201), the three-dimensional data encoding device or three-dimensional data decoding device does not perform the initialization, and continues the encoding or decoding.

That is, when initializing CABAC, cabac_init_flag is set to 1, and the CABAC encoder or CABAC decoder is initialized or re-initialized. When initializing CABAC, an initial value (default state) of a context used for the CABAC process is set.

Figure 54:
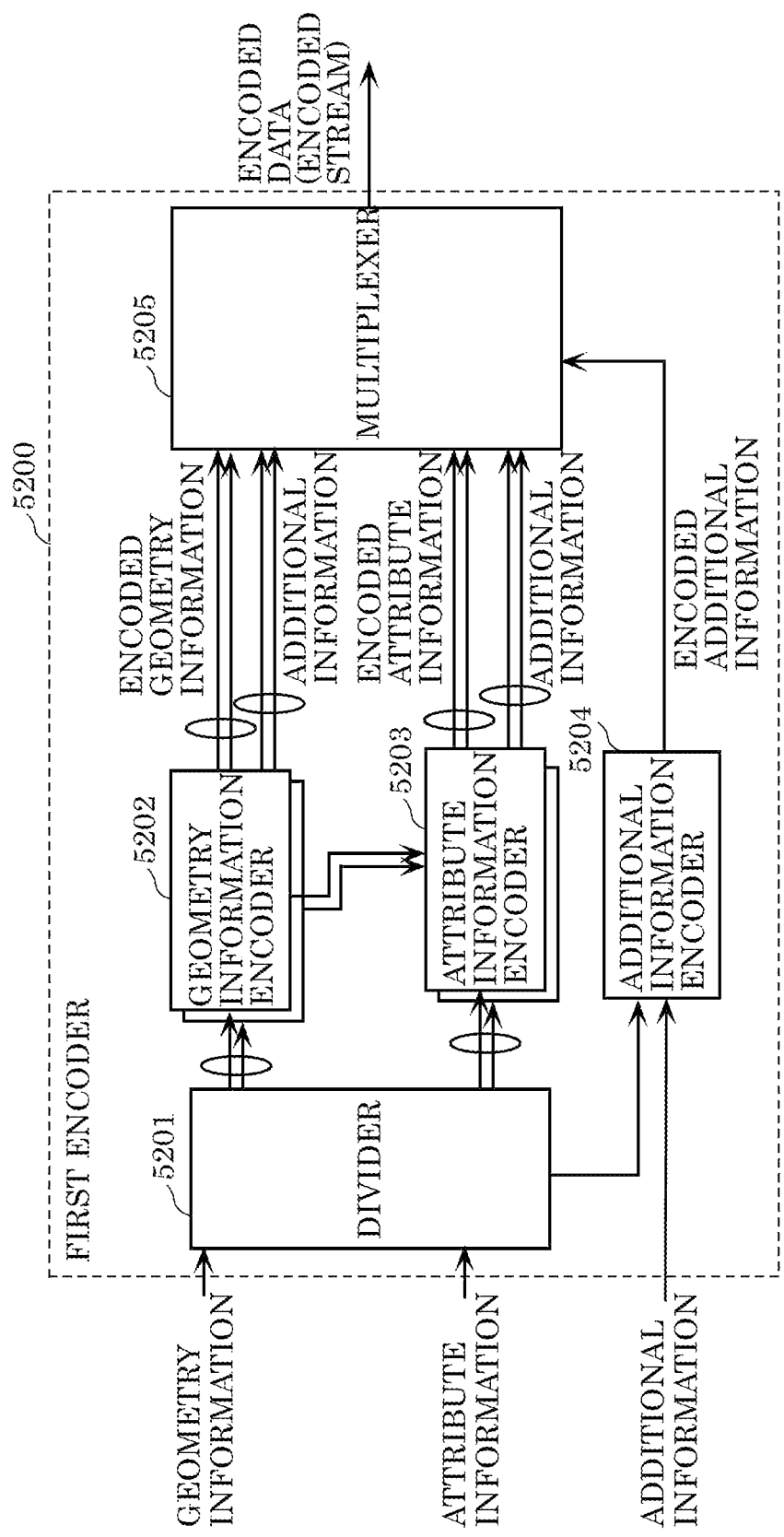
FIG. 54 is a block diagram illustrating a configuration of first encoder included in a three-dimensional data encoding device according to Embodiment 5.
Figure 55:
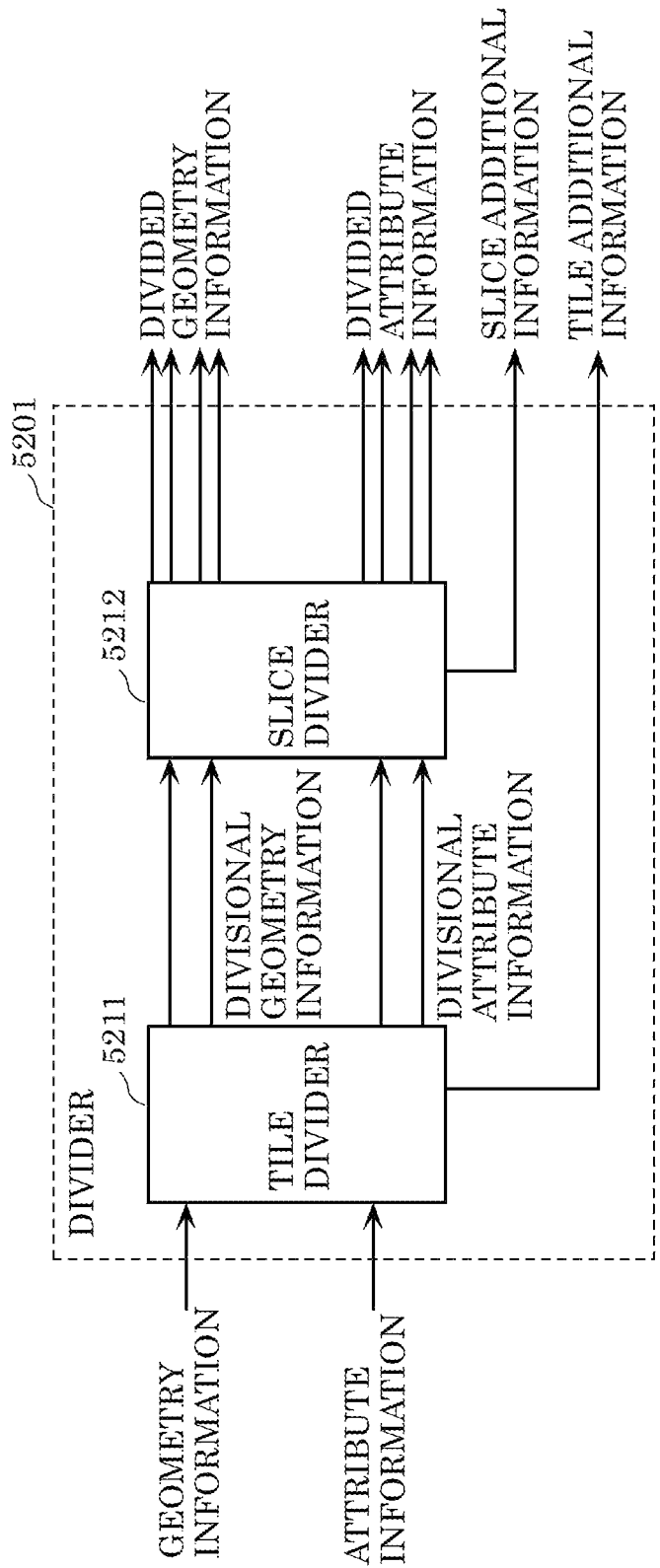
FIG. 55 is a block diagram illustrating a configuration of a divider according to Embodiment 5.
Figure 56:
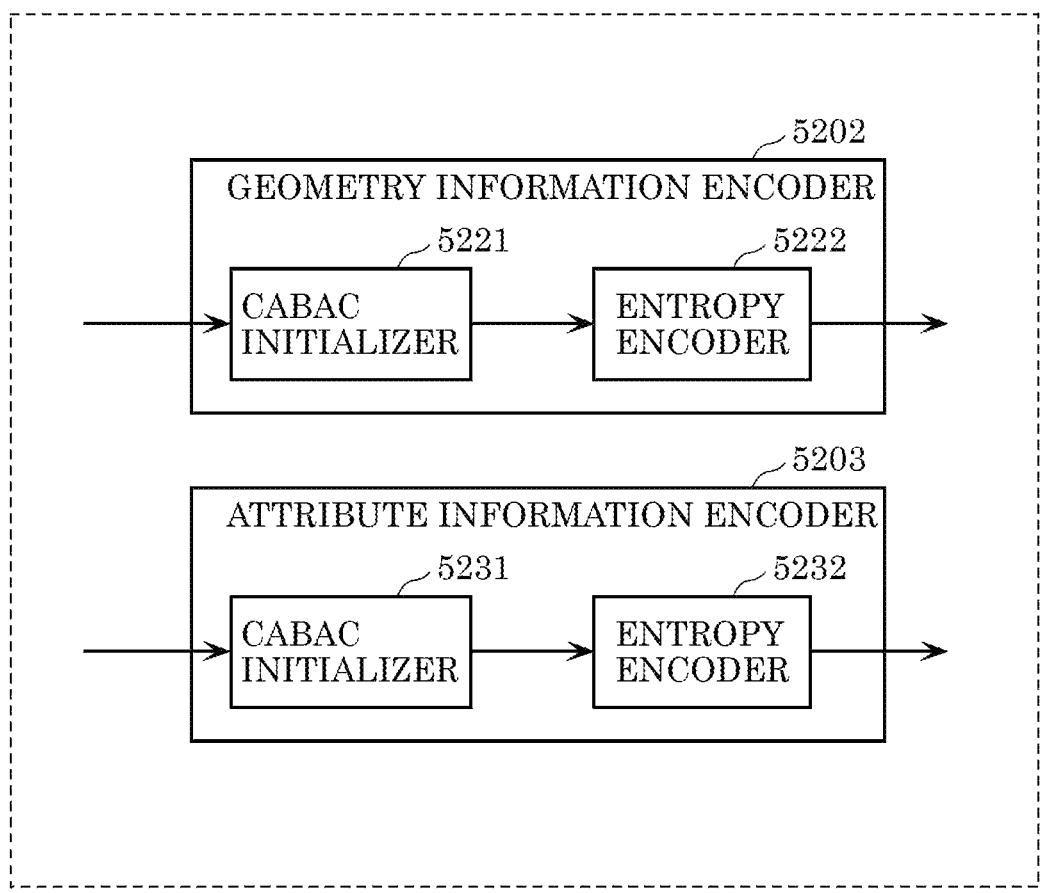
FIG. 56 is a block diagram illustrating a configuration of a geometry information encoder and an attribute information encoder according to Embodiment 5.

An encoding process will be described. FIG. 54 is a block diagram illustrating a configuration of first encoder 5200 included in the three-dimensional data encoding device according to this embodiment. FIG. 55 is a block diagram illustrating a configuration of divider 5201 according to this embodiment. FIG. 56 is a block diagram illustrating a configuration of geometry information encoder 5202 and attribute information encoder 5203 according to this embodiment.

First encoder 5200 generates encoded data (encoded stream) by encoding point cloud data in a first encoding method (geometry-based PCC (GPCC)). First encoder 5200 includes divider 5201, a plurality of geometry information encoders 5202, a plurality of attribute information encoders 5203, additional information encoder 5204, and multiplexer 5205.

Divider 5201 generates a plurality of pieces of divisional data by dividing point cloud data. Specifically, divider 5201 generates a plurality of pieces of divisional data by dividing a space of point cloud data into a plurality of subspaces. Here, a subspace is a combination of tiles or slices or a combination of tiles and slices. More specifically, point cloud data includes geometry information, attribute information, and additional information. Divider 5201 divides geometry information into a plurality of pieces of divisional geometry information, and divides attribute information into a plurality of pieces of divisional attribute information. Divider 5201 also generates additional information concerning the division.

As illustrated in FIG. 55, divider 5201 includes tile divider 5211 and slice divider 5212. For example, tile divider 5211 divides a point cloud into tiles. Tile divider 5211 may determine a quantization value used for each divisional tile as tile additional information.

Slice divider 5212 further divides a tile obtained by tile divider 5211 into slices. Slice divider 5212 may determine a quantization value used for each divisional slice as slice additional information.

The plurality of geometry information encoders 5202 generate a plurality of pieces of encoded geometry information by encoding a plurality of pieces of divisional geometry information. For example, the plurality of geometry information encoders 5202 processes a plurality of pieces of divisional geometry information in parallel.

As illustrated in FIG. 56, geometry information encoder 5202 includes CABAC initializer 5221 and entropy encoder 5222. CABAC initializer 5221 initializes or re-initializes CABAC in response to a CABAC initialization flag. Entropy encoder 5222 encodes divisional geometry information according to CABAC.

The plurality of attribute information encoders 5203 generate a plurality of pieces of encoded attribute information by encoding a plurality of pieces of divisional attribute information. For example, the plurality of attribute information encoders 5203 process a plurality of pieces of divisional attribute information in parallel.

As illustrated in FIG. 56, attribute information encoder 5203 includes CABAC initializer 5231 and entropy encoder 5232. CABAC initializer 5231 initializes or re-initializes CABAC in response to a CABAC initialization flag. Entropy encoder 5232 encodes divisional attribute information according to CABAC.

Additional information encoder 5204 generates encoded additional information by encoding additional information included in the point cloud data and additional information concerning the data division generated in the division by divider 5201.

Multiplexer 5205 generates encoded data (encoded stream) by multiplexing a plurality of pieces of encoded geometry information, a plurality of pieces of encoded attribute information, and encoded additional information, and transmits the generated encoded data. The encoded additional information is used for decoding.

Note that, although FIG. 54 shows an example in which there are two geometry information encoders 5202 and two attribute information encoders 5203, the number of geometry information encoders 5202 and the number of attribute information encoders 5203 may be one, or three or more. The plurality of pieces of divisional data may be processed in parallel in the same chip, such as by a plurality of cores of a CPU, processed in parallel by cores of a plurality of chips, or processed in parallel by a plurality of cores of a plurality of chips.

Figure 57:
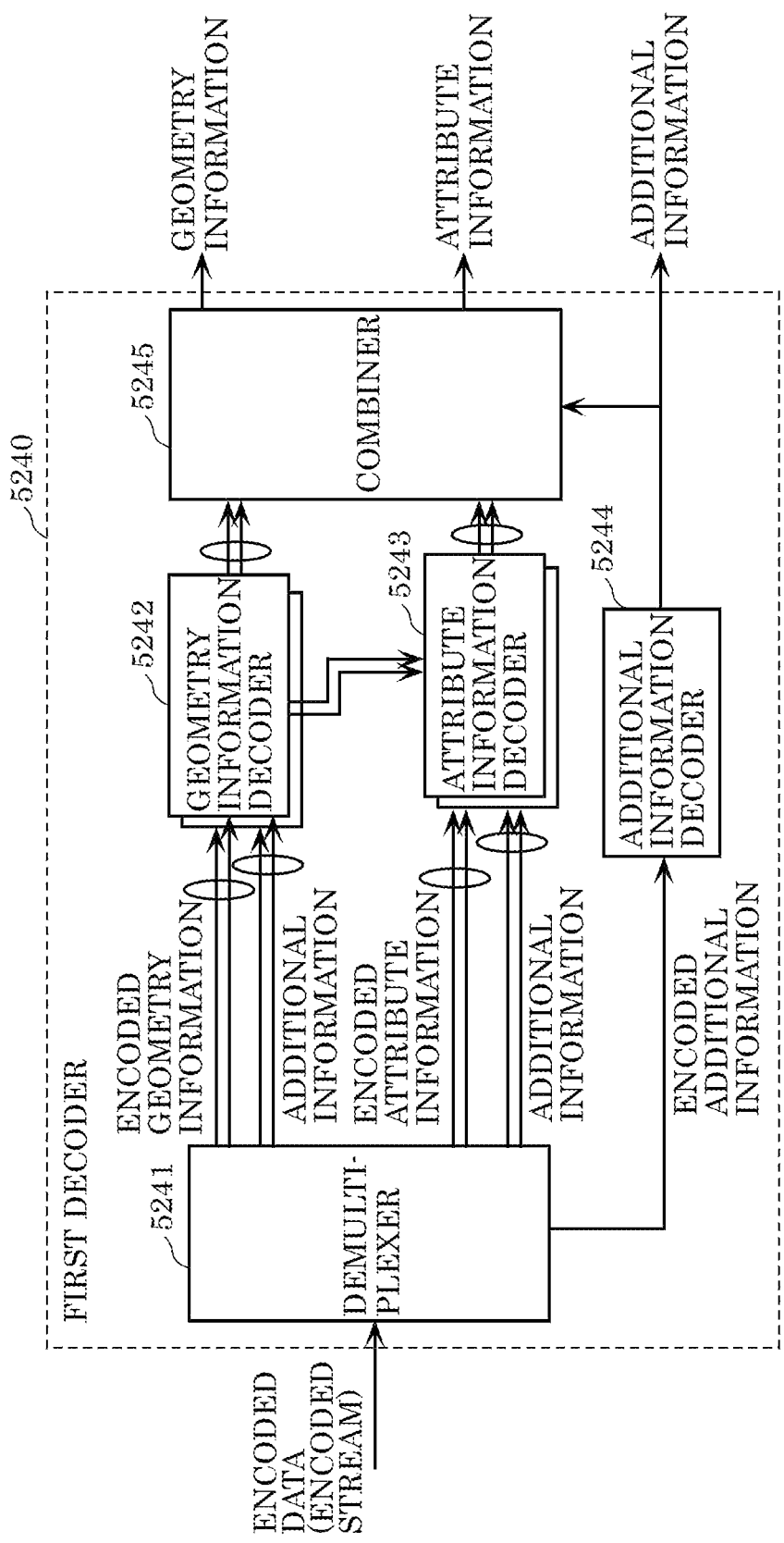
FIG. 57 is a block diagram illustrating a configuration of a first decoder according to Embodiment 5.
Figure 58:
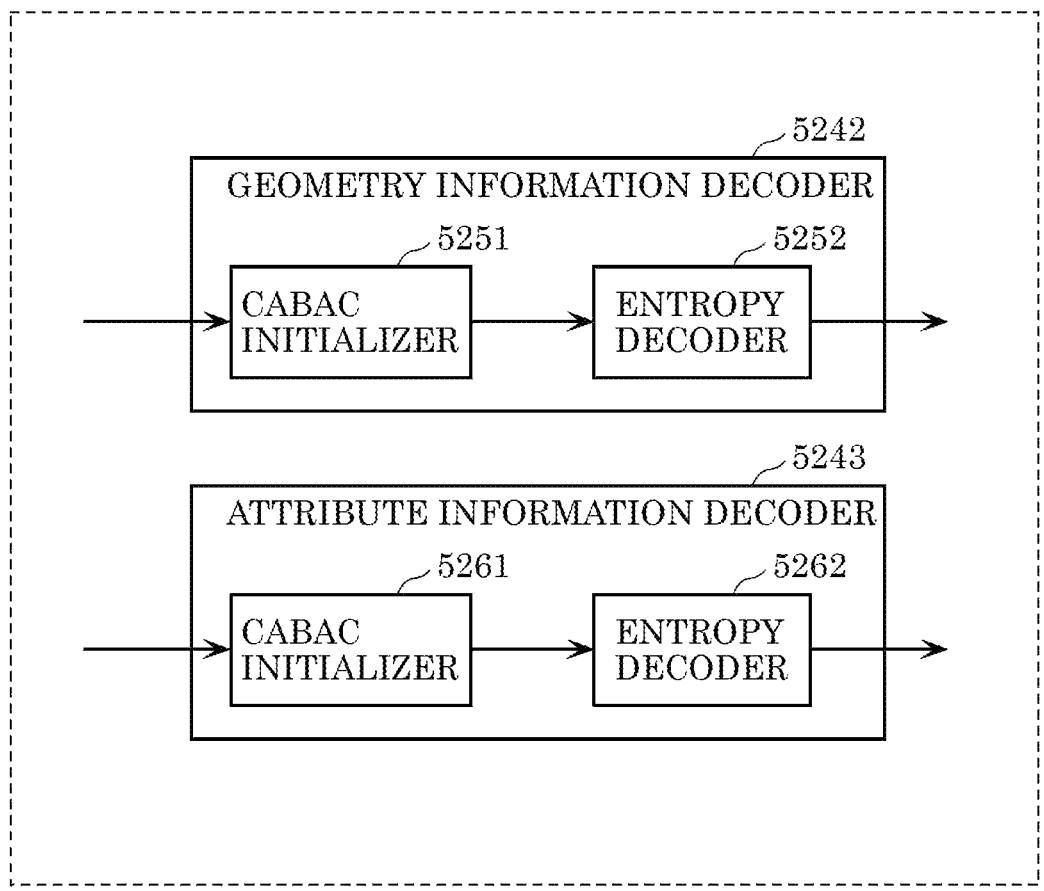
FIG. 58 is a block diagram illustrating a configuration of a geometry information decoder and an attribute information decoder according to Embodiment 5.

Next, a decoding process will be described. FIG. 57 is a block diagram illustrating a configuration of first decoder 5240. FIG. 58 is a block diagram illustrating a configuration of geometry information decoder 5242 and attribute information decoder 5243.

First decoder 5240 reproduces point cloud data by decoding encoded data (encoded stream) generated by encoding the point cloud data in the first encoding method (GPCC). First decoder 5240 includes demultiplexer 5241, a plurality of geometry information decoders 5242, a plurality of attribute information decoders 5243, additional information decoder 5244, and combiner 5245.

Demultiplexer 5241 generates a plurality of pieces of encoded geometry information, a plurality of pieces of encoded attribute information, and encoded additional information by demultiplexing encoded data (encoded stream).

The plurality of geometry information decoders 5242 generates a plurality of pieces of quantized geometry information by decoding a plurality of pieces of encoded geometry information. For example, the plurality of geometry information decoders 5242 process a plurality of pieces of encoded geometry information in parallel.

As illustrated in FIG. 58, geometry information decoder 5242 includes CABAC initializer 5251 and entropy decoder 5252. CABAC initializer 5251 initializes or re-initializes CABAC in response to a CABAC initialization flag. Entropy decoder 5252 decodes geometry information according to CABAC.

The plurality of attribute information decoders 5243 generate a plurality of pieces of divisional attribute information by decoding a plurality of pieces of encoded attribute information. For example, the plurality of attribute information decoders 5243 process a plurality of pieces of encoded attribute information in parallel.

As illustrated in FIG. 58, attribute information decoder 5243 includes CABAC initializer 5261 and entropy decoder 5262. CABAC initializer 5261 initializes or re-initializes CABAC in response to a CABAC initialization flag. Entropy decoder 5262 decodes attribute information according to CABAC.

The plurality of additional information decoders 5244 generate additional information by decoding encoded additional information.

Combiner 5245 generates geometry information by combining a plurality of pieces of divisional geometry information using additional information. Combiner 5245 generates attribute information by combining a plurality of pieces of divisional attribute information using additional information. For example, combiner 5245 first generates point cloud data associated with a tile by combining decoded point cloud data associated with slices using slice additional information. Combiner 5245 then reproduces the original point cloud data by combining point cloud data associated with tiles using tile additional information.

Note that, although FIG. 57 shows an example in which there are two geometry information decoders 5242 and two attribute information decoders 5243, the number of geometry information decoders 5242 and the number of attribute information decoders 5243 may be one, or three or more. The plurality of pieces of divisional data may be processed in parallel in the same chip, such as by a plurality of cores of a CPU, processed in parallel by cores of a plurality of chips, or processed in parallel by a plurality of cores of a plurality of chips.

Figure 59:
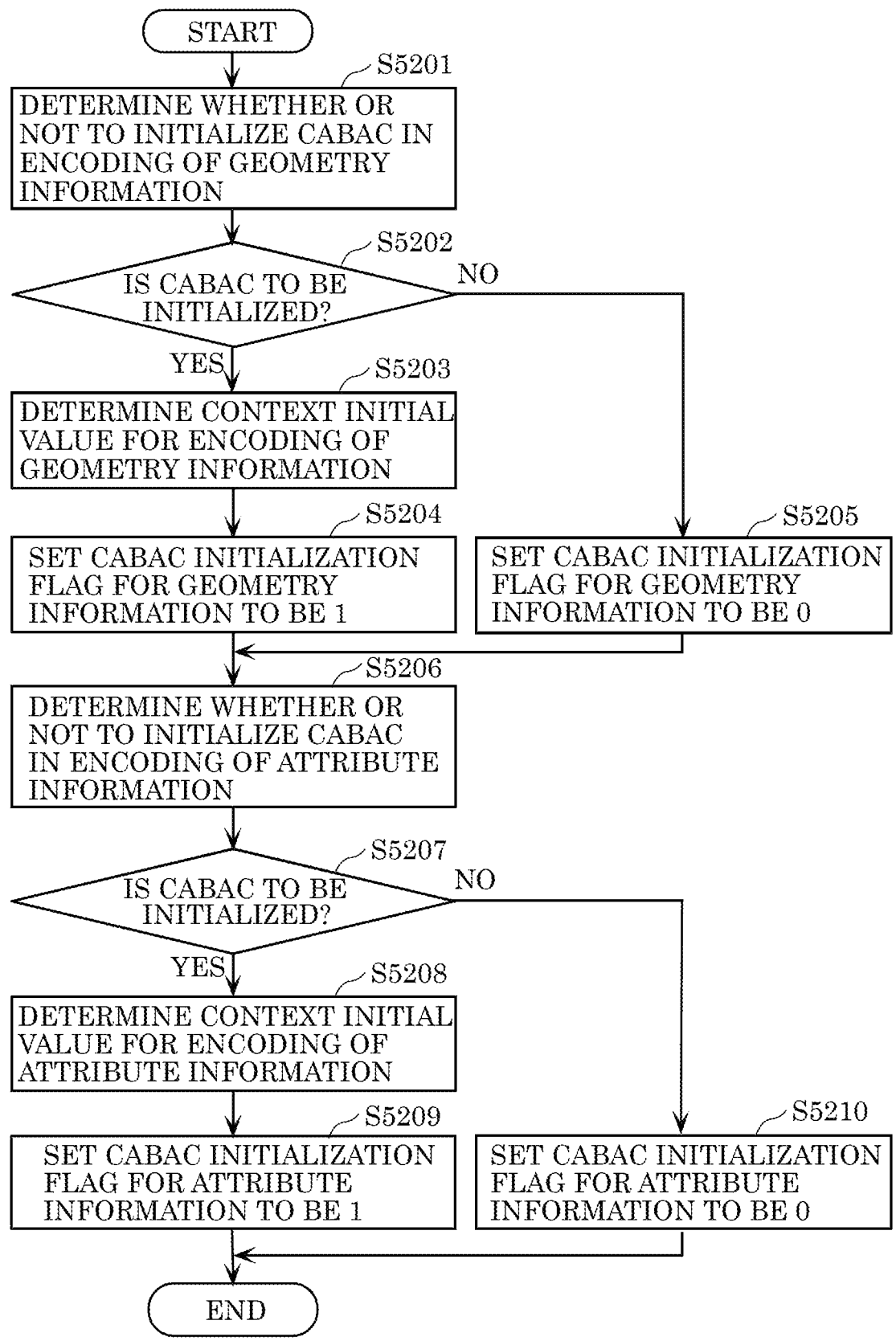
FIG. 59 is a flowchart illustrating an example of a process associated with the initialization of CABAC in the encoding of geometry information or the encoding of attribute information according to Embodiment 5.

FIG. 59 is a flowchart illustrating an example of a process associated with the initialization of CABAC in the encoding of geometry information or the encoding of attribute information.

First, the three-dimensional data encoding device determines, for each slice, whether or not to initialize CABAC in the encoding of geometry information for the slice based on a predetermined condition (S5201).

When it is determined to initialize CABAC (if Yes in S5202), the three-dimensional data encoding device determines a context initial value used for the encoding of geometry information (S5203). The context initial value is set by considering encoding characteristics. The initial value may be a predetermined value or may be adaptively determined depending on the characteristics of data in the slice.

The three-dimensional data encoding device then sets the CABAC initialization flag for geometry information to be 1, and sets the context initial value (S5204). When initializing CABAC, the initialization process is performed using the context initial value in the encoding of geometry information.

On the other hand, when it is determined not to initialize CABAC (if No in S5202), the three-dimensional data encoding device sets the CABAC initialization flag for geometry information to be 0 (S5205).

The three-dimensional data encoding device then determines, for each slice, whether or not to initialize CABAC in the encoding of attribute information for the slice based on a predetermined condition (S5206).

When it is determined to initialize CABAC (if Yes in S5207), the three-dimensional data encoding device determines a context initial value used for the encoding of attribute information (S5208). The context initial value is set by considering encoding characteristics. The initial value may be a predetermined value or may be adaptively determined depending on the characteristics of data in the slice.

The three-dimensional data encoding device then sets the CABAC initialization flag for attribute information to be 1, and sets the context initial value (S5209). When initializing CABAC, the initialization process is performed using the context initial value in the encoding of attribute information.

On the other hand, when it is determined not to initialize CABAC (if No in S5207), the three-dimensional data encoding device sets the CABAC initialization flag for attribute information to be 0 (S5210).

Note that, in the flowchart of FIG. 59, the processing concerning geometry information and the processing concerning attribute information may be performed in reverse order or in parallel.

Note that, although the flowchart of FIG. 59 shows a slice-based process as an example, a tile-based process or a process on a basis of other data units can be performed in the same manner as the slice-based process. That is, slice in the flowchart of FIG. 59 can be replaced with tile or other data units.

The predetermined condition for the geometry information and the predetermined condition for the attribute information may be the same condition or different conditions.

Figure 60:
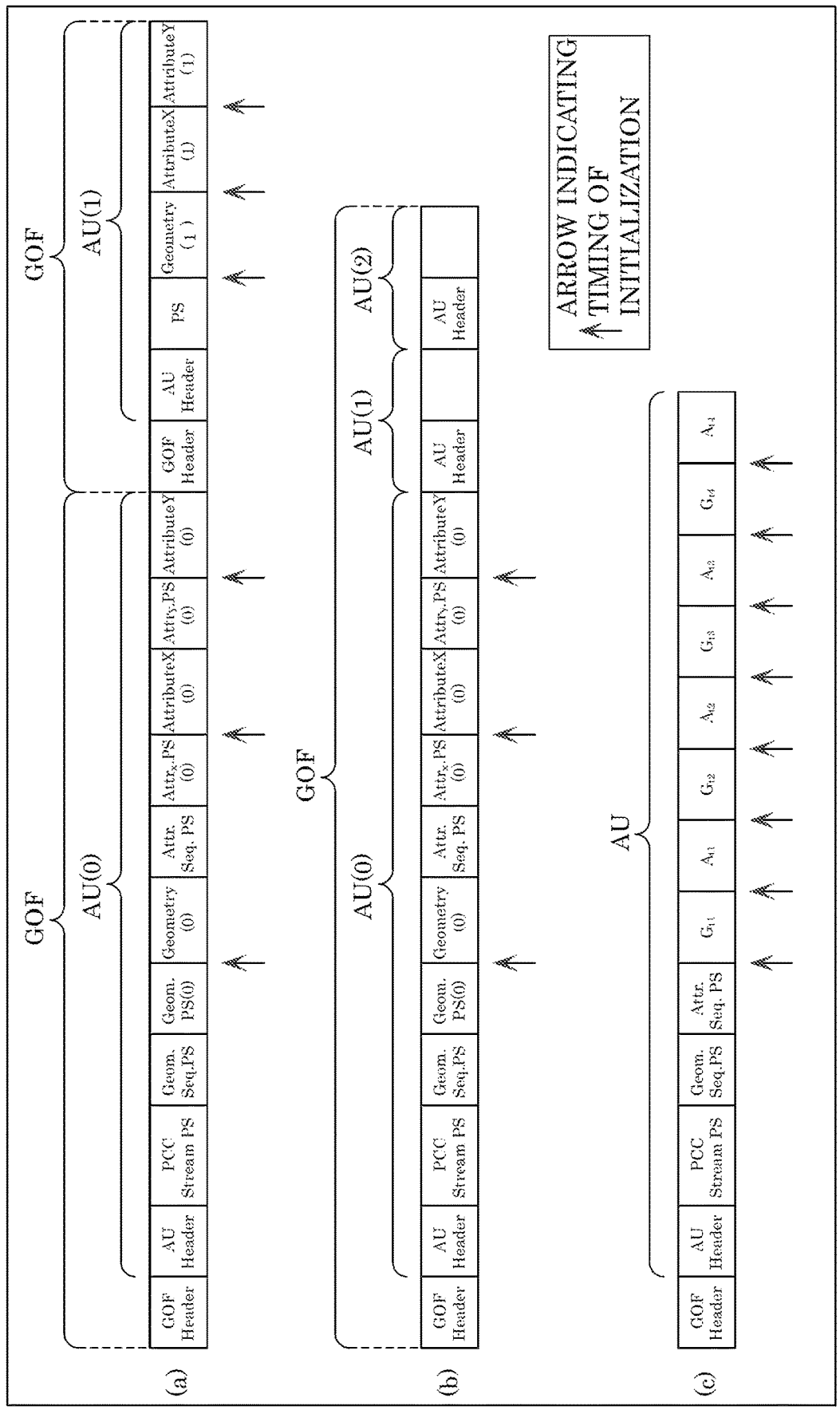
FIG. 60 is a diagram illustrating an example of timings of CABAC initialization for point cloud data in the form of a bitstream according to Embodiment 5.

FIG. 60 is a diagram illustrating an example of timings of CABAC initialization for point cloud data in the form of a bitstream.

Point cloud data includes geometry information and zero or more pieces of attribute information. That is, point cloud data may include no attribute information or include a plurality of pieces of attribute information.

For example, as attribute information on a three-dimensional point, point cloud data may include color information, may include color information and reflection information, or may include one or more pieces of color information each linked to one or more pieces of point-of-view information.

In any configuration, the method described in this embodiment can be applied.

Next, a condition for determination of whether to initialize CABAC will be described.

It may be determined to initialize CABAC in the encoding of geometry information or attribute information when any of the conditions described below is satisfied.

For example, CABAC may be initialized at the leading data of geometry information or attribute information (each piece of attribute information if there is a plurality of pieces of attribute information). For example, CABAC may be initialized at the top of data forming a PCC frame that can be singly decoded. That is, as illustrated in part (a) of FIG. 60, if PCC frames may be decoded on a frame basis, CABAC can be initialized at the leading data of a PCC frame.

For example, as illustrated in part (b) of FIG. 60, if frames cannot be singly decoded, such as when an inter-prediction is used between PCC frames, CABAC may be initialized at the leading data of a random access unit (GOF, for example).

For example, as illustrated in part (c) of FIG. 60, CABAC may be initialized at the top of one or more pieces of divisional slice data, at the top of one or more pieces of divisional tile data, or at the top of other divisional data.

Although part (c) of FIG. 60 shows tiles as an example, this description holds true for slices. CABAC may be always initialized at the top of a tile or slice or may not be always initialized at the top of a tile or slice.

Figure 61:
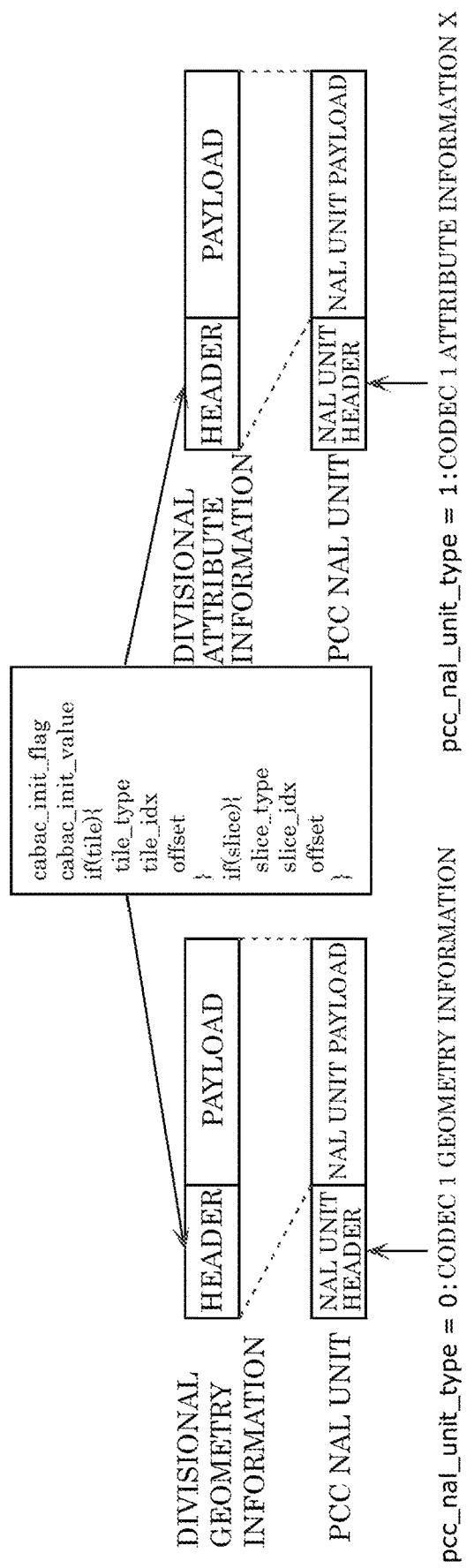
FIG. 61 is a diagram illustrating a configuration of encoded data and a method of storing the encoded data into a NAL unit according to Embodiment 5.

FIG. 61 is a diagram illustrating a configuration of encoded data and a method of storing the encoded data into a NAL unit.

Initialization information may be stored in a header of encoded data or in metadata. The initialization information may also be stored in both the header and the metadata. The initialization information is cabac_init_flag, a CABAC initial value, or an index of a table capable of identifying an initial value.

In this embodiment, "metadata" in a description that something is stored in metadata can be replaced with "header of encoded data" or vice versa.

When the initialization information is stored in the header of encoded data, the initialization information may be stored in the first NAL unit in the encoded data, for example. Initialization information on the encoding of geometry information is stored in geometry information, and initialization information on the encoding of attribute information is stored in attribute information.

cabac_init_flag for the encoding of attribute information and cabac_init_flag for the encoding of geometry information may be set to be the same value or different values. When the flags are set to be the same value, cabac_init_flag may be shared for geometry information and attribute information. When the flags are set to be different values, cabac_init_flag for geometry information and cabac_init_flag for attribute information indicate different values.

The initialization information for geometry information and the initialization information for attribute information may be stored in common metadata, at least one of individual metadata of geometry information and individual metadata of attribute information, or both the common metadata and the individual metadata. A flag may be used which indicates in which of the individual metadata for geometry information, the individual metadata for attribute information, and the common metadata the initialization information is stored.

Figure 62:
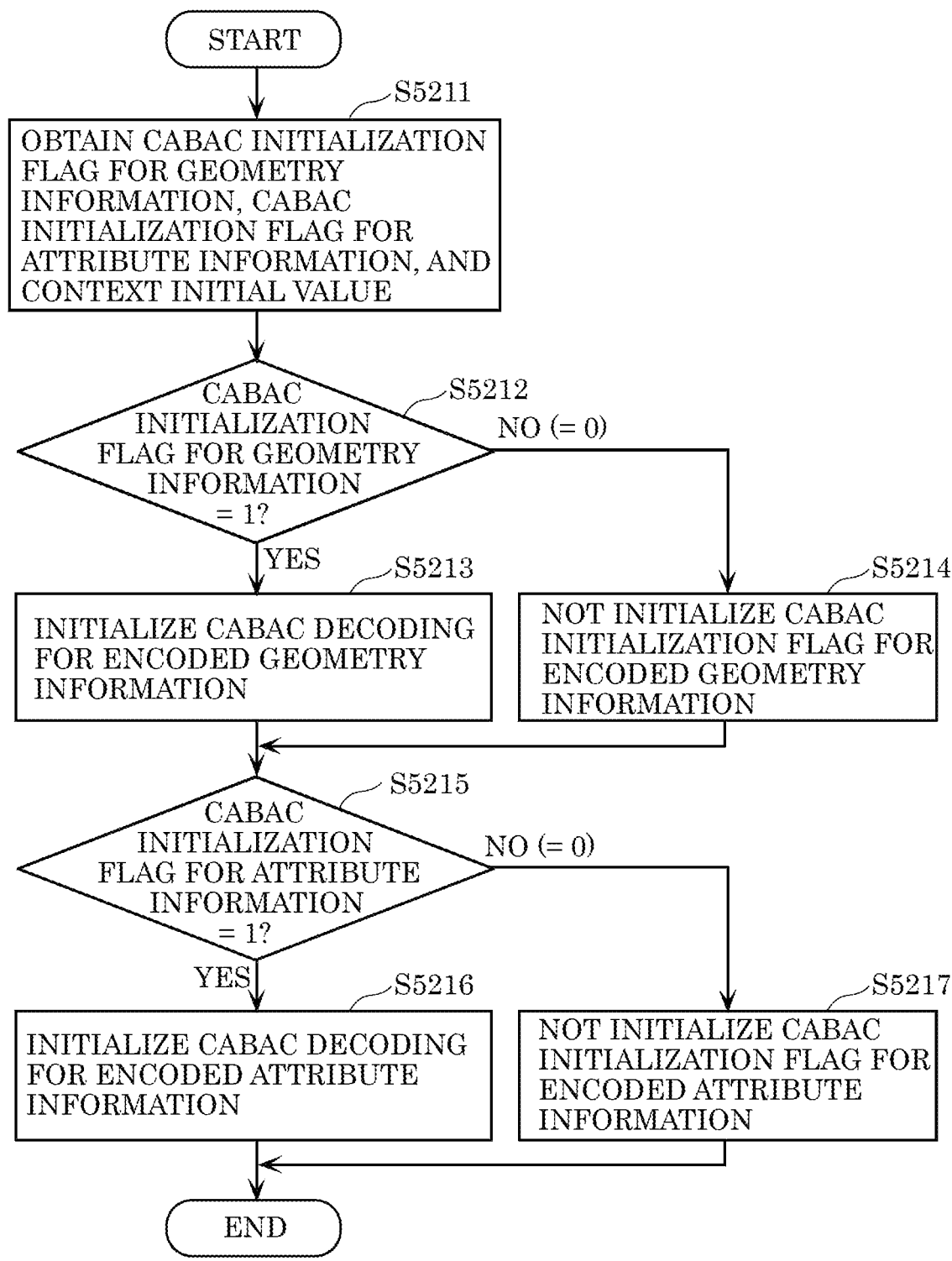
FIG. 62 is a flowchart illustrating an example of a process associated with the initialization of CABAC in the decoding of geometry information or the decoding of attribute information according to Embodiment 5.

FIG. 62 is a flowchart illustrating an example of a process associated with the initialization of CABAC in the decoding of geometry information or the decoding of attribute information.

The three-dimensional data decoding device analyzes encoded data to obtain a CABAC initialization flag for geometry information, a CABAC initialization flag for attribute information, and a context initial value (S5211).

The three-dimensional data decoding device then determines whether the CABAC initialization flag for geometry information is 1 or not (S5512).

When the CABAC initialization flag for geometry information is 1 (if Yes in S5212), the three-dimensional data decoding device initializes the CABAC decoding for the encoded geometry information using the context initial value in the encoding of the geometry information (S5213).

On the other hand, when the CABAC initialization flag for geometry information is 0 (if No in S5212), the three-dimensional data decoding device does not initialize the CABAC decoding for the encoded geometry information (S5214).

The three-dimensional data decoding device then determines whether the CABAC initialization flag for attribute information is 1 or not (S5215).

When the CABAC initialization flag for attribute information is 1 (if Yes in S5215), the three-dimensional data decoding device initializes the CABAC decoding for the encoded attribute information using the context initial value in the encoding of the attribute information (S5216).

On the other hand, when the CABAC initialization flag for attribute information is 0 (if No in S5215), the three-dimensional data decoding device does not initialize the CABAC decoding for the encoded attribute information (S5217).

Note that, in the flowchart of FIG. 62, the processing concerning geometry information and the processing concerning attribute information may be performed in reverse order or in parallel.

Note that the flowchart of FIG. 62 can be applied to any of the case of slice division and the case of tile division.

Figure 63:
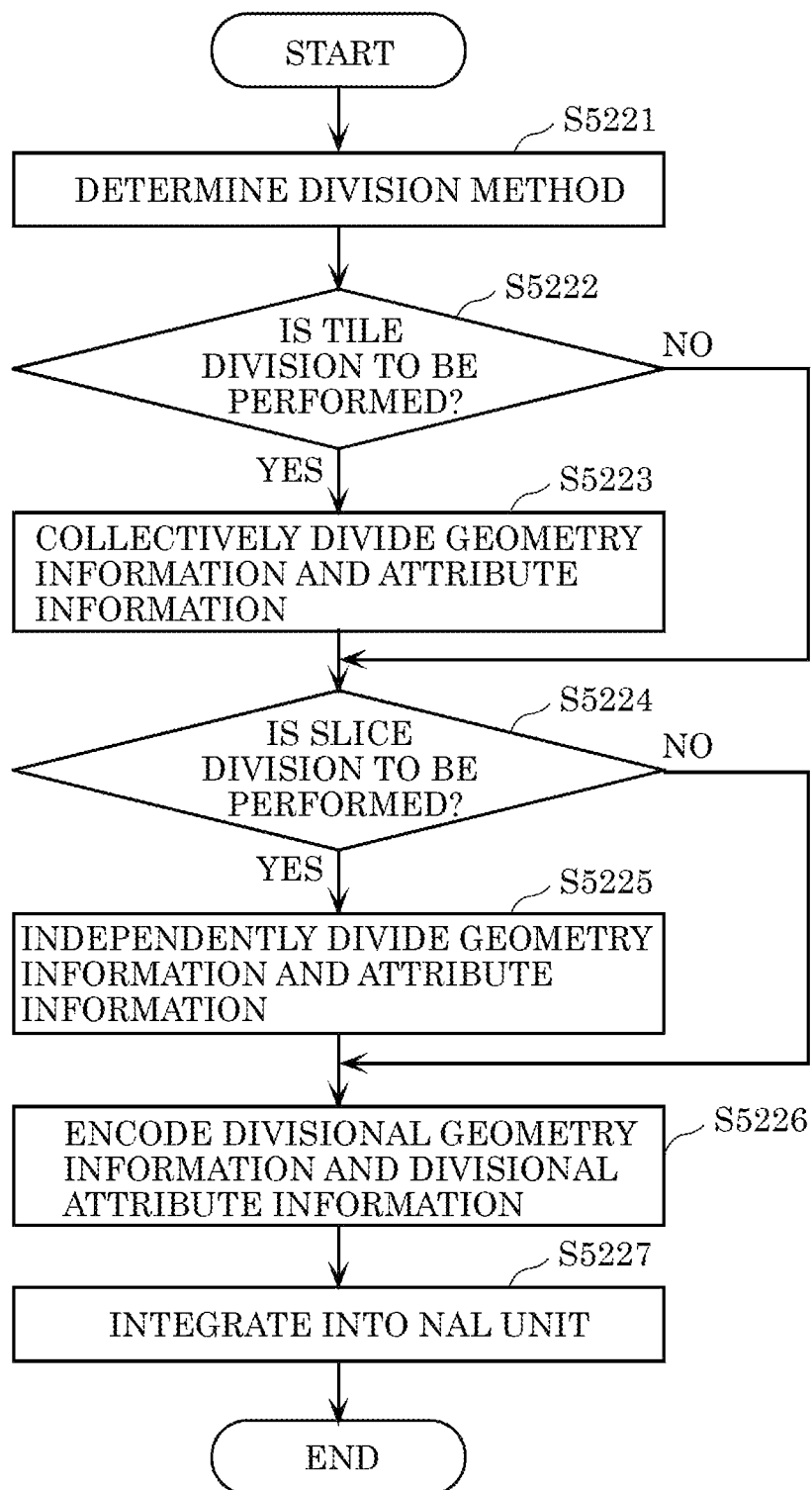
FIG. 63 is a flowchart of a process of encoding point cloud data according to Embodiment 5.

Next, a flow of a process of encoding point cloud data and a flow of a process of decoding point cloud data according to this embodiment will be described. FIG. 63 is a flowchart of a process of encoding point cloud data according to this embodiment.

First, the three-dimensional data encoding device determines a division method to be used (S5221). The division method includes a determination of whether to perform tile division or not and a determination of whether to perform slice division or not. The division method may include the number of tiles or slices in the case where tile division or slice division is performed, and the type of division, for example. The type of division is a scheme based on an object shape, a scheme based on map information or geometry information, or a scheme based on a data amount or processing amount, for example. The division method may be determined in advance.

When tile division is to be performed (if Yes in S5222), the three-dimensional data encoding device generates a plurality of pieces of tile geometry information and a plurality of pieces of tile attribute information by dividing the geometry information and the attribute information on a tile basis (S5223). The three-dimensional data encoding device also generates tile additional information concerning the tile division.

When slice division is to be performed (if Yes in S5224), the three-dimensional data encoding device generates a plurality of pieces of divisional geometry information and a plurality of pieces of divisional attribute information by dividing the plurality of pieces of tile geometry information and the plurality of pieces of tile attribute information (or the geometry information and the attribute information) (S5225). The three-dimensional data encoding device also generates geometry slice additional information and attribute slice additional information concerning the slice division.

The three-dimensional data encoding device then generates a plurality of pieces of encoded geometry information and a plurality of pieces of encoded attribute information by encoding each of the plurality of pieces of divisional geometry information and the plurality of pieces of divisional attribute information (S5226). The three-dimensional data encoding device also generates dependency information.

The three-dimensional data encoding device then generates encoded data (encoded stream) by integrating (multiplexing) the plurality of pieces of encoded geometry information, the plurality of pieces of encoded attribute information and the additional information into a NAL unit (S5227). The three-dimensional data encoding device also transmits the generated encoded data.

Figure 64:
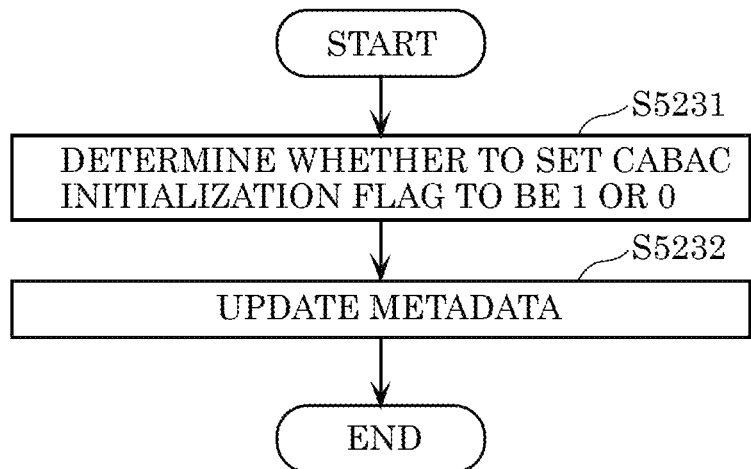
FIG. 64 is a flowchart illustrating an example of a process of updating additional information according to Embodiment 5.

FIG. 64 is a flowchart illustrating an example of a process of determining the value of the CABAC initialization flag and updating additional information in the tile division (S5223) and the slice division (S5525).

In steps S5223 and S5225, tile geometry information and tile attribute information and/or slice geometry information and slice attribute information may be independently divided in respective manners, or may be collectively divided in a common manner. In this way, additional information divided on a tile basis and/or on a slice basis is generated.

In these steps, the three-dimensional data encoding device determines whether to set the CABAC initialization flag to 1 or 0 (S5231).

The three-dimensional data encoding device then updates the additional information to include the determined CABAC initialization flag (S5232).

Figure 65:
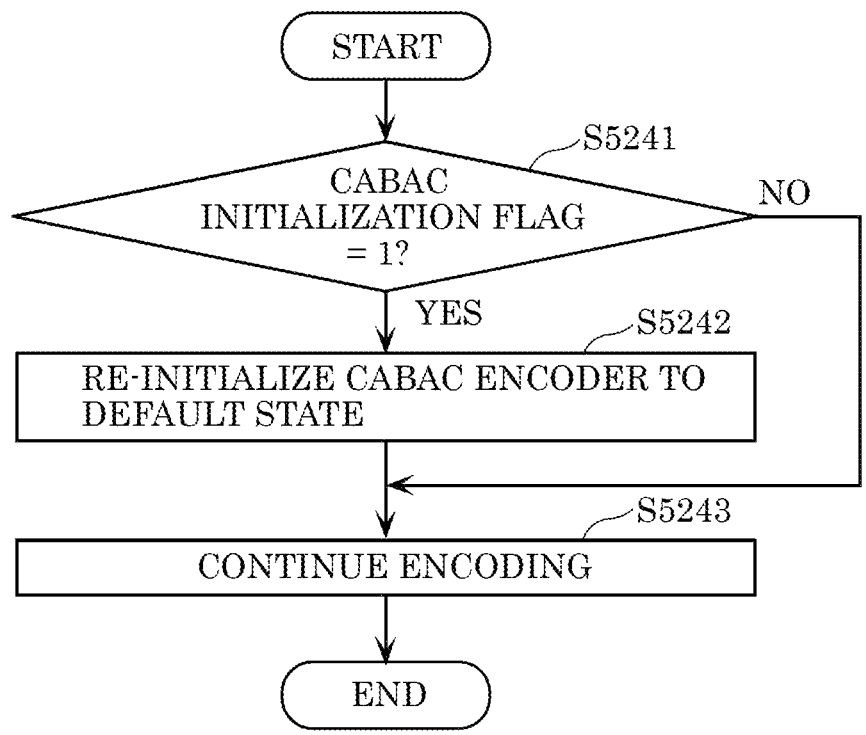
FIG. 65 is a flowchart illustrating an example of a process of initializing CABAC according to Embodiment 5.

FIG. 65 is a flowchart illustrating an example of a process of initializing CABAC in the processing of encoding (S5226).

The three-dimensional data encoding device determines whether the CABAC initialization flag is 1 or not (S5241).

When the CABAC initialization flag is 1 (if Yes in S5241), the three-dimensional data encoding device re-initializes the CABAC encoder to the default state (S5242).

The three-dimensional data encoding device then continues the encoding process until a condition for stopping the encoding process is satisfied, such as until there is no data to be encoded (S5243).

Figure 66:
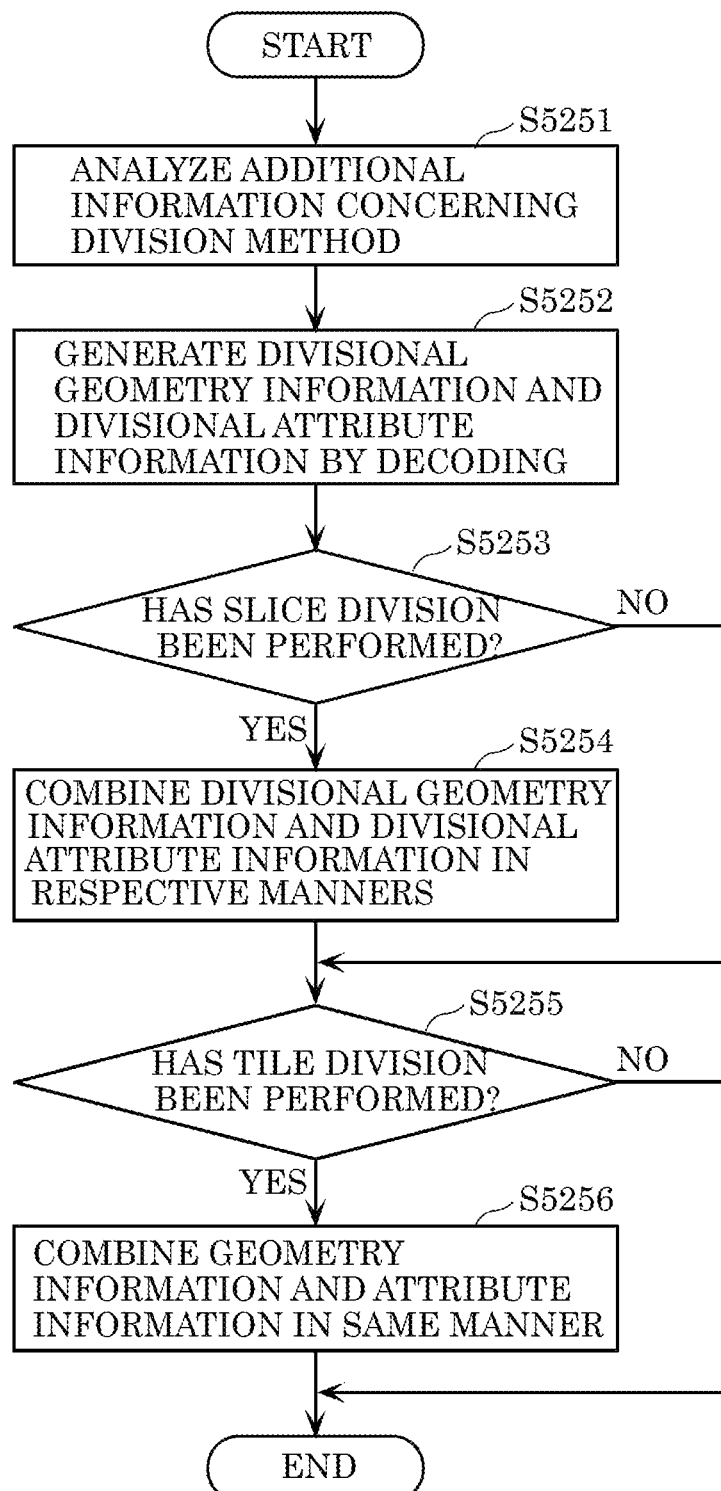
FIG. 66 is a flowchart illustrating a process of decoding point cloud data according to Embodiment 5.

FIG. 66 is a flowchart illustrating a process of decoding point cloud data according to this embodiment. First, the three-dimensional data decoding device determines the division method by analyzing additional information (tile additional information, geometry slice additional information, and attribute slice additional information) concerning the division method included in encoded data (encoded stream) (S5251). The division method includes a determination of whether to perform tile division or not and a determination of whether to perform slice division or not. The division method may include, for example, the number of tiles or slices and the type of division in the case where tile division or slice division is performed.

The three-dimensional data decoding device then generates divisional geometry information and divisional attribute information by decoding a plurality of pieces of encoded geometry information and a plurality of pieces of encoded attribute information included in the encoded data using dependency information included in the encoded data (S5252).

If the additional information indicates that slice division has been performed (if Yes in S5253), the three-dimensional data decoding device generates a plurality of pieces of tile geometry information and a plurality of pieces of tile attribute information by combining the plurality of pieces of divisional geometry information and the plurality of pieces of divisional attribute information based on the geometry slice additional information and the attribute slice additional information (S5254).

If the additional information indicates that tile division has been performed (if Yes in S5255), the three-dimensional data decoding device generates geometry information and attribute information by combining the plurality of pieces of tile geometry information and the plurality of pieces of tile attribute information (the plurality of pieces of divisional geometry information and the plurality of pieces of divisional attribute information) based on the tile additional information (S5256).

Figure 67:
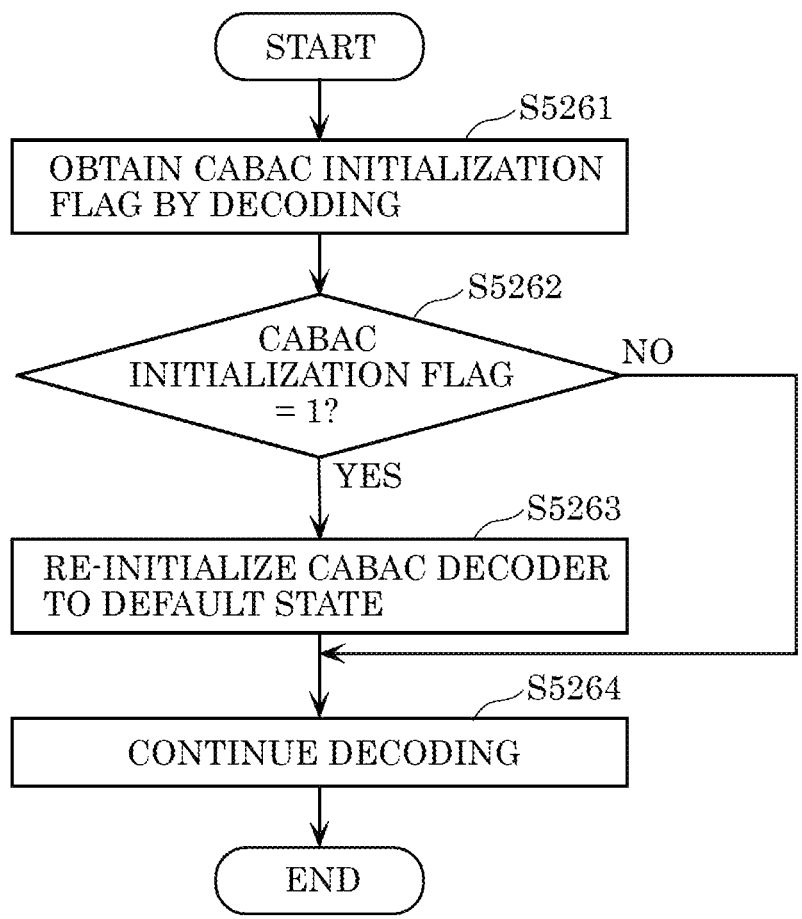
FIG. 67 is a flowchart illustrating an example of a process of initializing a CABAC decoder according to Embodiment 5.

FIG. 67 is a flowchart illustrating an example of a process of initializing the CABAC decoder in the combining (S5254) of information divided into slices and the combining (S5256) of information divided into tiles.

Pieces of slice geometry information and pieces of slice attribute information or pieces of tile geometry information or pieces of tile attribute information may be combined in respective manners or in the same manner.

The three-dimensional data decoding device obtains the CABAC initialization flag by decoding the additional information in the encoded stream.

The three-dimensional data decoding device then determines whether the CABAC initialization flag is 1 or not (S5262).

When the CABAC initialization flag is 1 (if Yes in S5262), the three-dimensional data decoding device re-initializes the CABAC decoder to the default state (S5263).

On the other hand, when the CABAC initialization flag is not 1 (if No in S5262), the three-dimensional data decoding device does not re-initialize the CABAC decoder and proceeds to step S5264.

The three-dimensional data decoding device then continues the decoding process until a condition for stopping the decoding process is satisfied, such as until there is no data to be decoded (S5264).

Next, other conditions concerning the determination of whether to initialize CABAC will be described.

Whether to initialize the encoding of geometry information or the encoding of attribute information may be determined by considering the coding efficiency on a basis of data units, such as tiles or slices. In that case, CABAC may be initialized at the leading data of a tile or slice that satisfies a predetermined condition.

Next, conditions concerning the determination of whether to initialize CABAC in the encoding of geometry information will be described.

For example, the three-dimensional data encoding device may determine the density of point cloud data for each slice, that is, the number of points per unit area belonging to each slice, compare the data density of the slice with the data density of another slice, and determine that the coding efficiency is better when CABAC is not initialized and determine not to initialize CABAC if the variation of the data density satisfies a predetermined condition. On the other hand, if the variation of the data density does not satisfy the predetermined condition, the three-dimensional data encoding device may determine that the coding efficiency is better when CABAC is initialized, and determine to initialize CABAC.

Here, "another slice" may be the preceding slice in the decoding order or a spatially neighboring slice, for example. The three-dimensional data encoding device may not perform the comparison of the data density with that of another slice and may determine whether to initialize CABAC based on whether the data density of the slice is a predetermined data density or not.

When it is determined to initialize CABAC, the three-dimensional data encoding device determines the context initial value used for the encoding of geometry information. The context initial value is set at a value that provides good encoding characteristics in response to the data density. The three-dimensional data encoding device may retain an initial value table for the data density in advance and selects an optimal initial value from the table.

Note that the three-dimensional data encoding device may determine whether to initialize CABAC based on the number of points, the distribution of points, or the imbalance of points, for example, rather than based on the density of a slice described above as an example. Alternatively, the three-dimensional data encoding device may determine whether to initialize CABAC based on a feature quantity or the number of feature points obtained from information on points or based on a recognized object. In that case, a determination criterion may be retained in a memory in the form of a table that associates the determination criterion with a feature quantity or the number of feature points obtained from information on points or an object recognized based on information on points.

For example, the three-dimensional data encoding device may determine an object associated with geometry information of map information and determine whether to initialize CABAC based on the object based on the geometry information. Alternatively, the three-dimensional data encoding device may determine whether to initialize CABAC based on information or a feature quantity obtained by projecting three-dimensional data onto a two-dimensional plane.

Next, conditions concerning the determination of whether to initialize CABAC in the encoding of attribute information will be described.

For example, the three-dimensional data encoding device may compare a color characteristic of the relevant slice with the color characteristic of the preceding slice, and determine that the coding efficiency is better when CABAC is not initialized and determine not to initialize CABAC if the variation of the color characteristic satisfies a predetermined condition. On the other hand, if the variation of the color characteristic does not satisfy the predetermined condition, the three-dimensional data encoding device may determine that the coding efficiency is better when CABAC is initialized, and determine to initialize CABAC. The color characteristic is luminance, chromaticity, or chroma, a histogram thereof, or color continuity, for example.

Here, "another slice" may be the preceding slice in the decoding order or a spatially neighboring slice, for example. The three-dimensional data encoding device may not perform the comparison of the data density with that of another slice and may determine whether to initialize CABAC based on whether the data density of the slice is a predetermined data density or not.

When it is determined to initialize CABAC, the three-dimensional data encoding device determines the context initial value used for the encoding of attribute information. The context initial value is set at a value that provides good encoding characteristics in response to the data density. The three-dimensional data encoding device may retain an initial value table for the data density in advance and select an optimal initial value from the table.

When the attribute information is reflectance, the three-dimensional data encoding device may determine whether to initialize CABAC based on reflectance-based information.

When a three-dimensional point has a plurality of pieces of attribute information, the three-dimensional data encoding device may independently determine initialization information for each piece of attribute information based on the piece of attribute information, may determine initialization information for the plurality of pieces of attribute information based on one of the pieces of attribute information, or may determine initialization information for the plurality of pieces of attribute information using a plurality of pieces of attribute information.

Although an example has been described in which the initialization information for geometry information is determined based on the geometry information, and the initialization information for attribute information is determined based on the attribute information, the initialization information for geometry information and attribute information may be determined based on the geometry information, based on the attribute information, or based on both the geometry information and the attribute information.

The three-dimensional data encoding device may determine initialization information based on a result of simulation of the coding efficiency performed by turning on and off cabac_init_flag or selecting one or more initial values from an initial value table, for example.

When the data division method into tiles, slices or the like is determined based on geometry information or attribute information, the three-dimensional data encoding device may determine initialization information based on the same information as information based on the determination of the division method.

Figure 68:
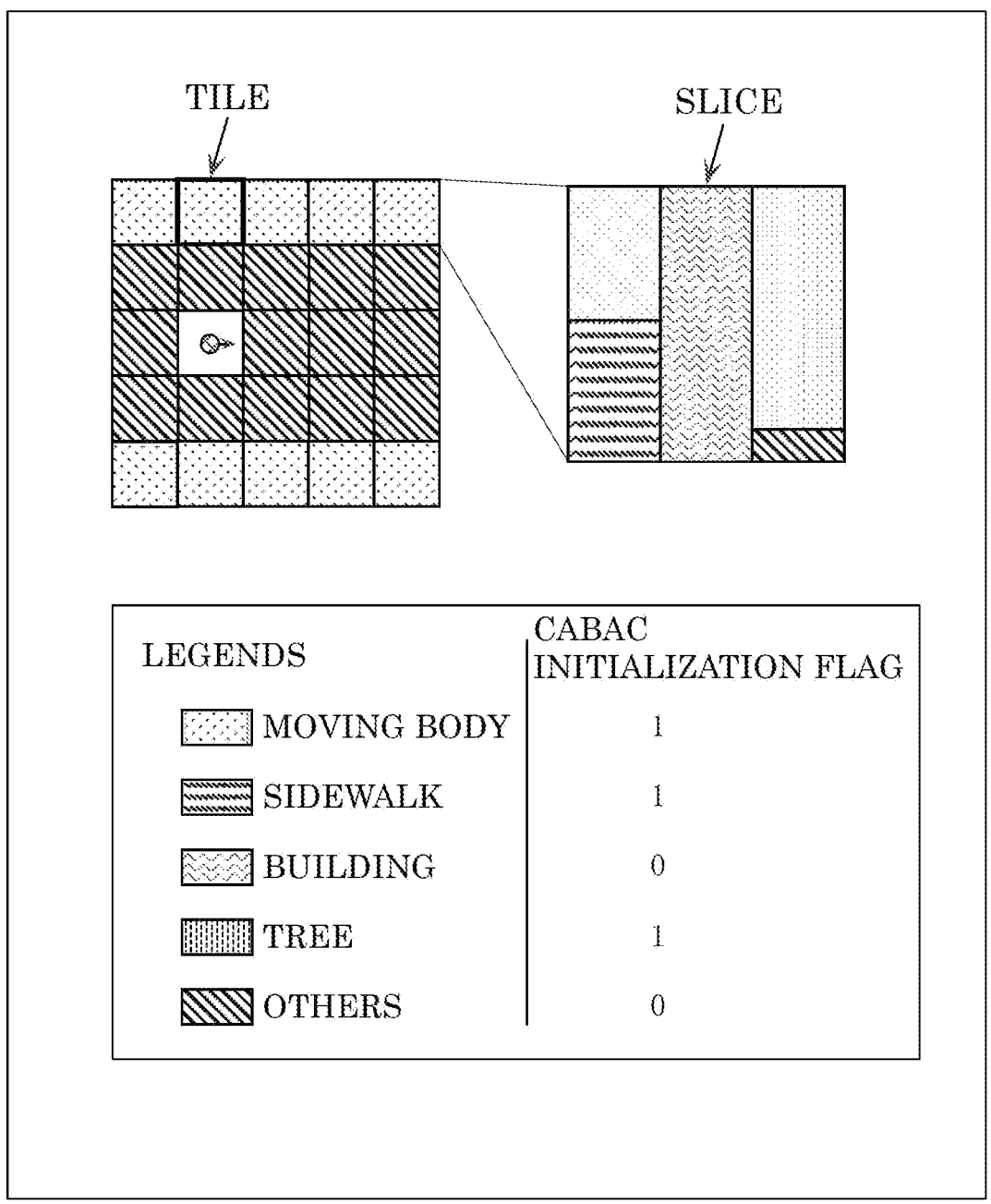
FIG. 68 is a diagram illustrating an example of tiles and slices according to Embodiment 5.

FIG. 68 is a diagram illustrating an example of tiles and slices.

For example, slices in one tile having part of PCC data are recognized as indicated by legends. The CABAC initialization flag can be used to determine whether re-initialization of a context is needed or not in successive slices. For example, in FIG. 68, when one tile includes slice data divided on a basis of objects (such as a moving body, a sidewalk, a building, a tree or other objects), the CABAC initialization flags for slices of a moving body, a sidewalk, and a tree are set to be 1, and the CABAC initialization flags for slices of a building and other objects are set to be 0. This means that, if the sidewalk and the building may be both dense permanent structures and have similar coding efficiencies, the coding efficiency may be able to be improved by avoiding re-initialization of CABAC between the slices for the sidewalk and the building. On the other hand, if the building and the tree may be significantly different in density and coding efficiency, the coding efficiency may be able to be improved by initializing CABAC between the slices for the building and the tree.

Figure 69:
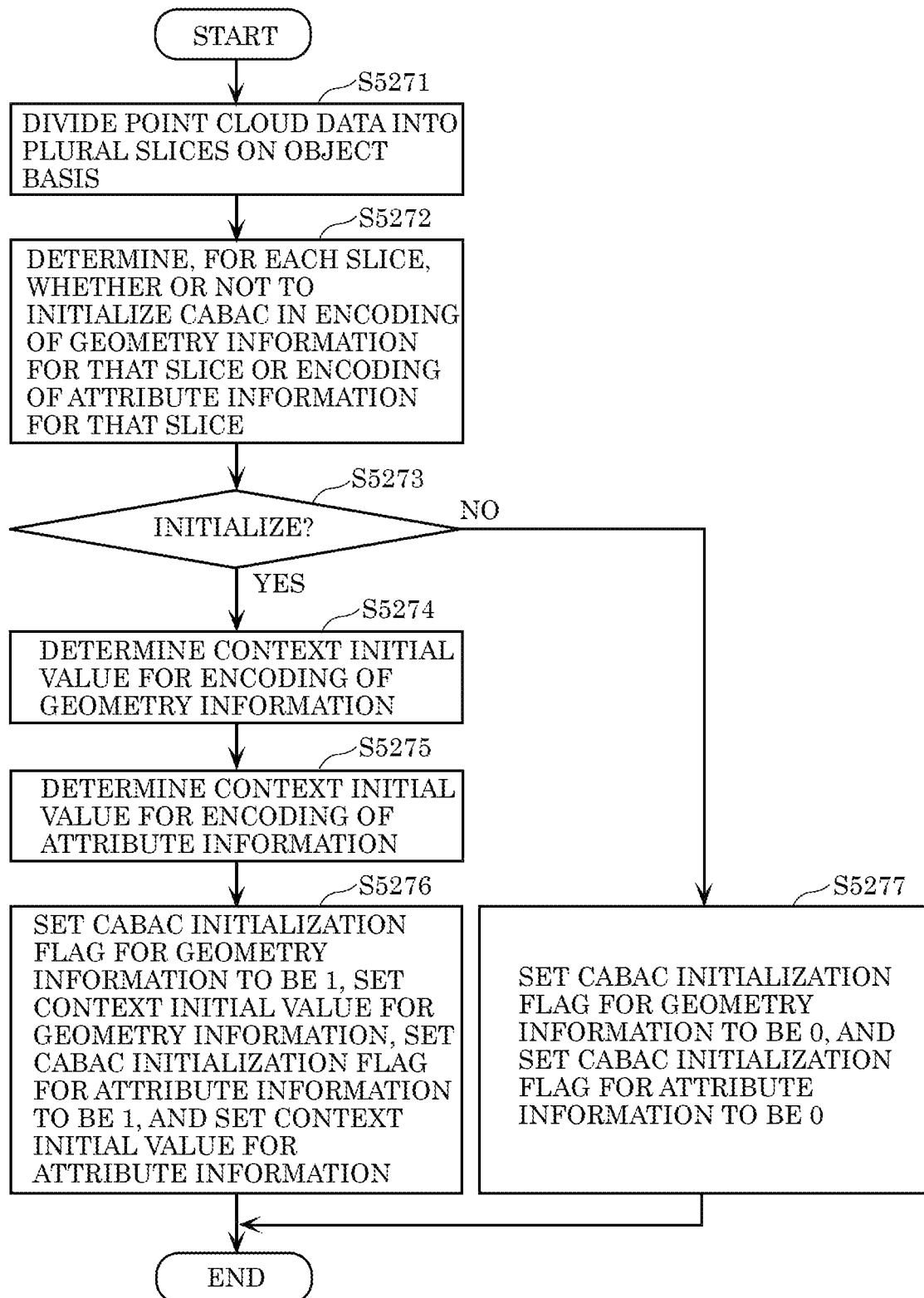
FIG. 69 is a flowchart illustrating an example of a method of determining whether to initialize CABAC and determining a context initial value according to Embodiment 5.

FIG. 69 is a flowchart illustrating an example of the method of determining whether to initialize CABAC and determining a context initial value.

First, the three-dimensional data encoding device divides point cloud data into slices based on an object determined from geometry information (S5271).

The three-dimensional data encoding device then determines, for each slice, whether to initialize CABAC for the encoding of geometry information and the encoding of attribute information based on the data density of the object of the slice (S5272). In other words, the three-dimensional data encoding device determines CABAC initialization information (CABAC initialization flag) for the encoding of geometry information and the encoding of attribute information based on the geometry information. The three-dimensional data encoding device determines an initialization with high coding efficiency based on the point cloud data density, for example. The CABAC initialization information may be indicated by cabac_init_flag that is common to the geometry information and the attribute information.

When it is determined to initialize CABAC (if Yes in S5273), the three-dimensional data encoding device determines a context initial value for the encoding of geometry information (S5274).

The three-dimensional data encoding device then determines a context initial value for the encoding of attribute information (S5275).

The three-dimensional data encoding device then sets the CABAC initialization flag for geometry information to be 1, sets the context initial value for geometry information, sets the CABAC initialization flag for attribute information to be 1, and sets the context initial value for attribute information (S5276). Note that when initializing CABAC, the three-dimensional data encoding device performs the initialization process using a context initial value in each of the encoding of geometry information and the encoding of attribute information.

On the other hand, when it is determined not to initialize CABAC (if No in S5273), the three-dimensional data encoding device sets the CABAC initialization flag for geometry information to be 0, and sets the CABAC initialization flag for attribute information to be 0 (S5277).

Figure 70:
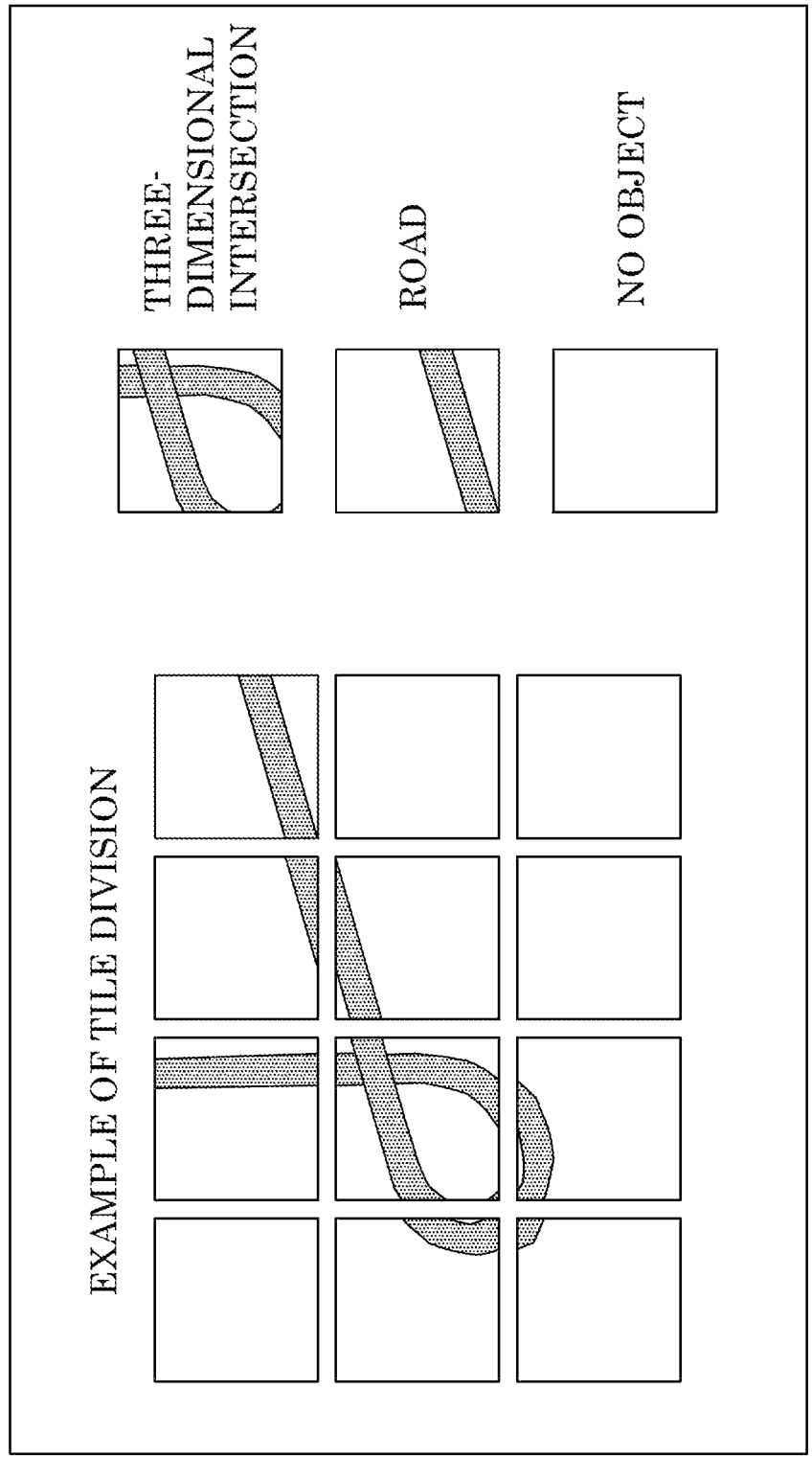
FIG. 70 is a diagram illustrating an example of a case where a map, which is a top view of point cloud data obtained by LiDAR, is divided into tiles according to Embodiment 5.
Figure 71:
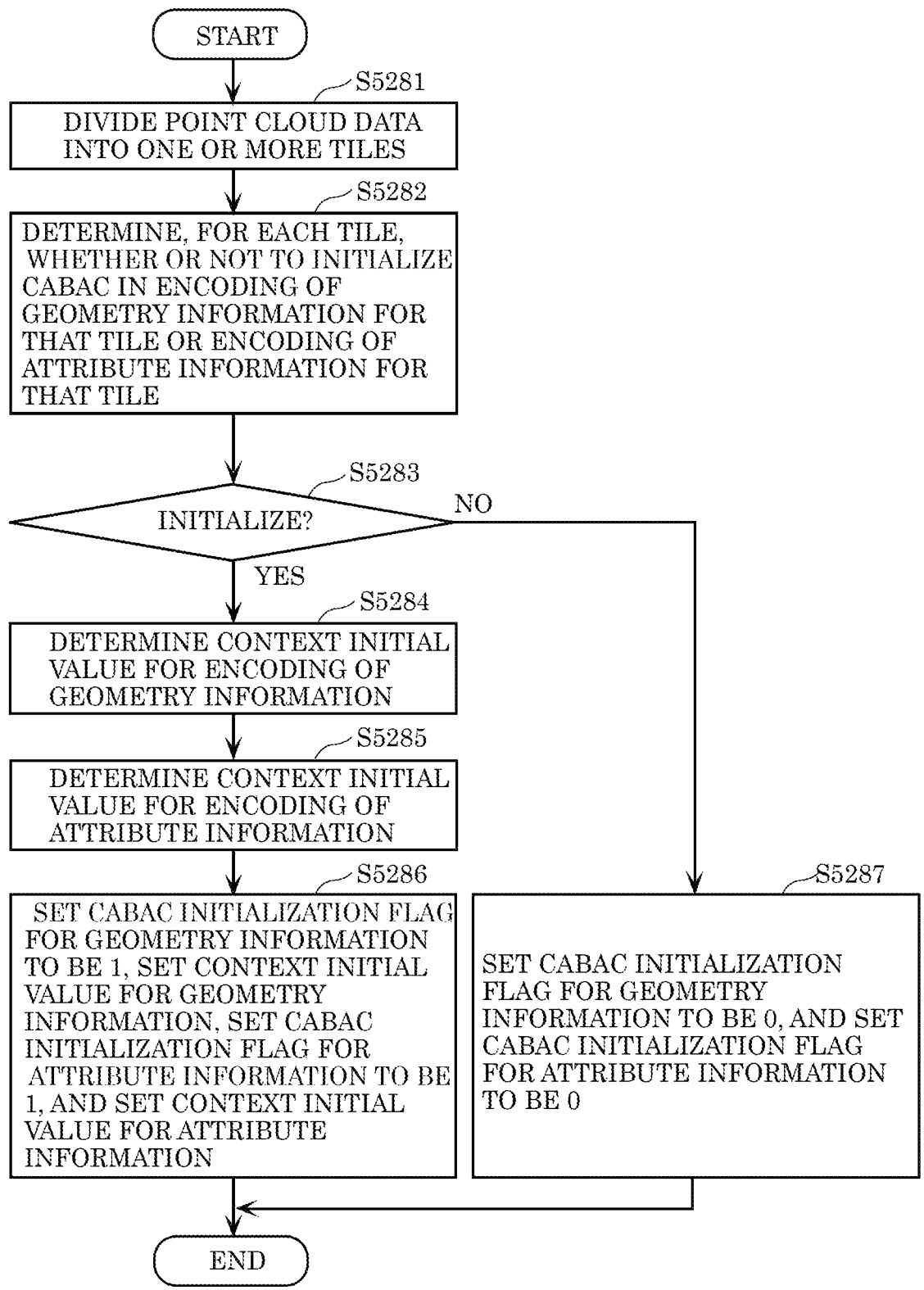
FIG. 71 is a flowchart illustrating another example of the method of determining whether to initialize CABAC and determining a context initial value according to Embodiment 5.

FIG. 70 is a diagram illustrating an example of a case where a map, which is a top view of point cloud data obtained by LiDAR, is divided into tiles. FIG. 71 is a flowchart illustrating another example of the method of determining whether to initialize CABAC and determining a context initial value.

In large-scale map data, the three-dimensional data encoding device divides point cloud data into one or more tiles based on geometry information in a two-dimensional top-view division manner (S5281). The three-dimensional data encoding device may divide point cloud data into square areas as illustrated in FIG. 70, for example. The three-dimensional data encoding device may also divide point cloud data into tiles of different shapes or sizes. The division into tiles may be performed in one or more methods determined in advance or may be adaptively performed.

The three-dimensional data encoding device then determines an object in each tile, and determines whether to initialize CABAC in the encoding of geometry information for the tile or the encoding of attribute information for the tile (S5282). Note that, in the division into slices, the three-dimensional data encoding device recognizes an object (a tree, a human being, a moving body, or a building), and determines whether to perform the slice division and determine an initial value based on the object.

When it is determined to initialize CABAC (if Yes in S5283), the three-dimensional data encoding device determines a context initial value for the encoding of geometry information (S5284).

The three-dimensional data encoding device then determines a context initial value for the encoding of attribute information (S5285).

In steps S5284 and S5285, an initial value for a tile having particular encoding characteristics may be stored as the initial value and used as an initial value for a tile having the same encoding characteristics.

The three-dimensional data encoding device then sets the CABAC initialization flag for geometry information to be 1, sets the context initial value for geometry information, sets the CABAC initialization flag for attribute information to be 1, and sets the context initial value for attribute information (S5286). Note that when initializing CABAC, the three-dimensional data encoding device performs the initialization process using a context initial value in each of the encoding of geometry information and the encoding of attribute information.

On the other hand, when it is determined not to initialize CABAC (if No in S5283), the three-dimensional data encoding device sets the CABAC initialization flag for geometry information to be 0, and sets the CABAC initialization flag for attribute information to be 0 (S5287).

Embodiment 6

In the context-based adaptive binary arithmetic coding (CABAC) in the embodiment described above, the three-dimensional data encoding device may encode the three-dimensional points included in the data unit using one of encoding schemes different from each other. That is, for each data unit, the three-dimensional data encoding device determines, from among the encoding schemes, an encoding scheme suitable for the data unit as an encoding scheme for encoding three-dimensional points included in the data unit. In encoding of geometry information items of three-dimensional points, the encoding schemes include, for example, an octree encoding, which is an encoding scheme using an octree, and prediction-tree encoding, which is an encoding scheme using a prediction tree.

Signaling of a CABAC initialization flag (hereinafter, also referred to as initialization information or identification information) in such CABAC encoding will be described.
[Signaling]
The initialization information is stored in a header of an encoded data item. Examples of the initialization information include caba_init_flag, a CABAC initial value, and an index of a table capable of identifying an initial value. The initialization information is used for initializing CABAC in CABAC encoding and CABAC decoding. In other words, the initialization information (identification information) is information indicating whether a context used for encoding is continuously used.

The three-dimensional data encoding device may store the initialization information in metadata or may write the initialization information in both the header and the metadata. It should be noted that, in the present embodiment, storing in metadata may be interpreted as storing in a header of encoded data; conversely, storing in a header of encoded data may be interpreted as storing in metadata.

It should be noted that the three-dimensional data encoding device may apply the initialization information to any one of encoding geometry information and encoding attribute information. In a case where the initialization information is stored in a header of encoded data, the three-dimensional data encoding device may store, as geometry information, initialization information of encoding of geometry information and may store, as attribute information, initialization information of attribute information.
[Header of Geometry Information]
CABAC is an abbreviation of context-based adaptive binary arithmetic coding, which is an encoding method in which a context (a model for estimating an occurrence probability of a binary symbol being input) is successively updated based on encoded information, thus increasing a precision of the probability, so that an arithmetic encoding (entropy encoding) with high compression ratio is realized. To perform parallel processing on data units (divided data items) obtained by dividing a point cloud data item such as tiles or slices, each data unit needs to be encoded or decoded independently. To subject the data units to CABAC independently, CABAC needs to be initialized at a beginning of each data unit in encoding and decoding. The CABAC initialization flag is used for initializing CABAC in CABAC encoding and CABAC decoding.

Figure 72:
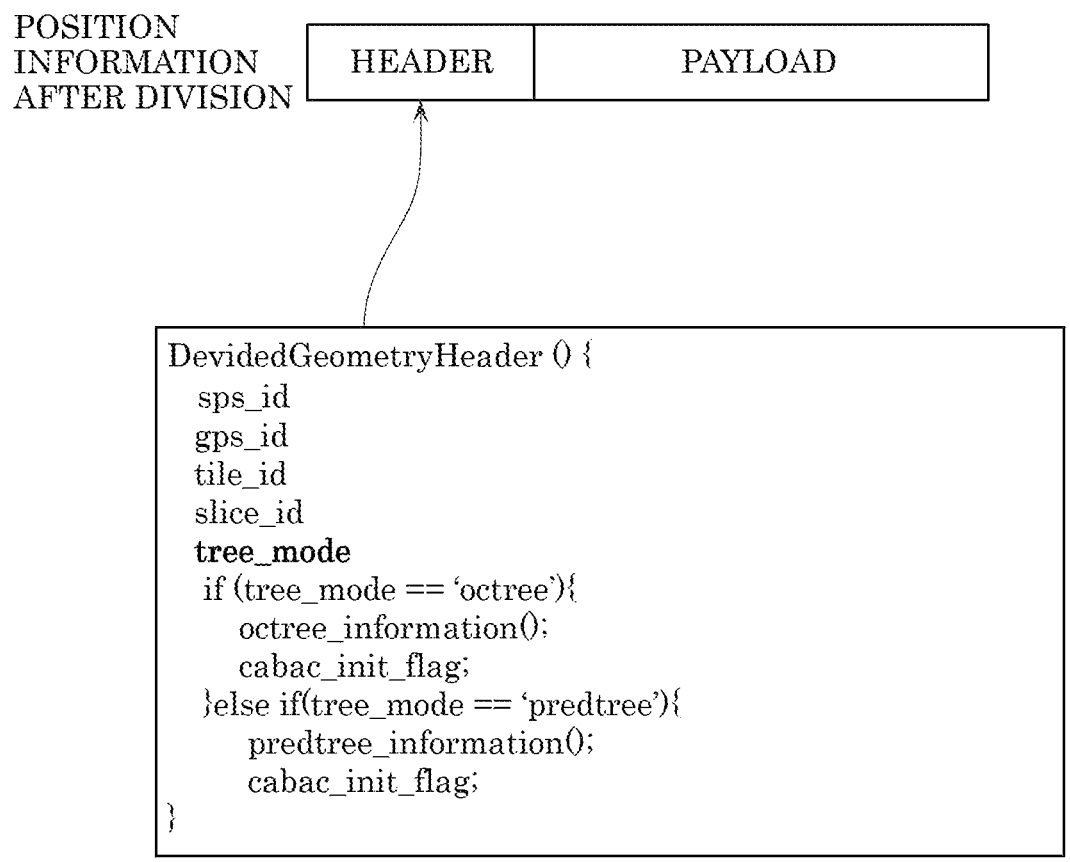
FIG. 72 is a diagram illustrating an example of a data structure of a geometry information item included in each data unit after division according to Embodiment 6, and a syntax of a header of the geometry information item.

FIG. 72 is a diagram illustrating an example of a data structure of a geometry information item included in each data unit after the division, and a syntax of a header of the geometry information item.

In encoding of geometry information, the three-dimensional data encoding device may apply the initialization information to any one of or both encoding schemes (encoding methods) such as octree encoding and prediction-tree encoding. The octree encoding and the prediction-tree encoding are encoding schemes using different tree structures from each other.

In a case of the octree encoding, which uses an octree structure, the three-dimensional data encoding device retains a context to be used in the octree encoding (i.e., a context for the octree encoding). In a case of the prediction-tree encoding, which uses a prediction-tree structure, the three-dimensional data encoding device retains a context to be used in the prediction-tree encoding (i.e., a context for the prediction-tree encoding).

Storing the initialization information in a header of each divided data unit of geometry information enables the three-dimensional data encoding device to switch whether to initialize a context to be used for the encoding, for each divided data unit. In other words, Storing the identification information in a header of each divided data unit of geometry information enables the three-dimensional data encoding device to switch whether to continuously use a context used for the encoding, for each divided data unit.

SPS_ID indicates an identifier of an SPS (parameter set) that is to be referred to by the data unit. GPS_ID indicates an identifier of a GPS (geometry information parameter set) that is to be referred to by the data unit. Tile_id indicates an identifier of a tile to which the data unit belongs (identifier 1 of divided data). Slice_id indicates an identifier of a slice to which the data unit belongs (identifier 2 of divided data).

Tree_mode indicates a tree structure to be used in encoding of geometry information of the data unit. In a case where there are two types of tree structures, tree_mode may be a flag. For example, tree_mode may be configured to indicate an octree (octree) when its flag is zero and to indicate a prediction tree (predtree) when the flag is one. It should be noted that tree_mode need not be provided in a slice header when tree_mode is provided in a GPS.

Based on tree_mode, the three-dimensional data encoding device may switch among structures of metadata to be used in respective encodings and perform signaling.

For example, when the tree structure is an octree (tree_mode=='octree'), the three-dimensional data encoding device signals a parameter to be used for the octree encoding (octree_information). Further, a flag indicating whether to initialize a context in the octree encoding (cabac_init_flag), in other words, an identification information item indicating whether to continuously use a context, may be provided.

For example, when the tree structure is a prediction tree (tree_mode=='predtree'), the three-dimensional data encoding device signals a parameter to be used for the prediction-tree encoding (predtree_information). Further, a flag indicating whether to initialize a context in the prediction-tree encoding (cabac_init_flag), in other words, an identification information item indicating whether to continuously use a context, may be provided.

It should be noted that use of the following method makes it possible to reduce an amount of information signaled, thus improving compression efficiency. The three-dimensional data encoding device may use cabac_init_flag as a flag that is common to encoding schemes to perform signaling before a conditional branch based on tree_mode.

The three-dimensional data encoding device may be configured to apply initialization of a context to some tree structure(s) and not to apply the initialization to the other tree structure(s). In this case, the three-dimensional data encoding device may generate a header according to a syntax that makes the header not contain the initialization information for a tree structure to which the initialization of a context is not applied, and makes the header contain the initialization information for a tree structure to which the initialization is applied. For example, in a case where initialization is performed on all divided data units, the three-dimensional data encoding device may be configured to provide the initialization information in a higher parameter set such as an SPS and a GPS in common and not to provide initialization information in each data unit.

Figure 73:
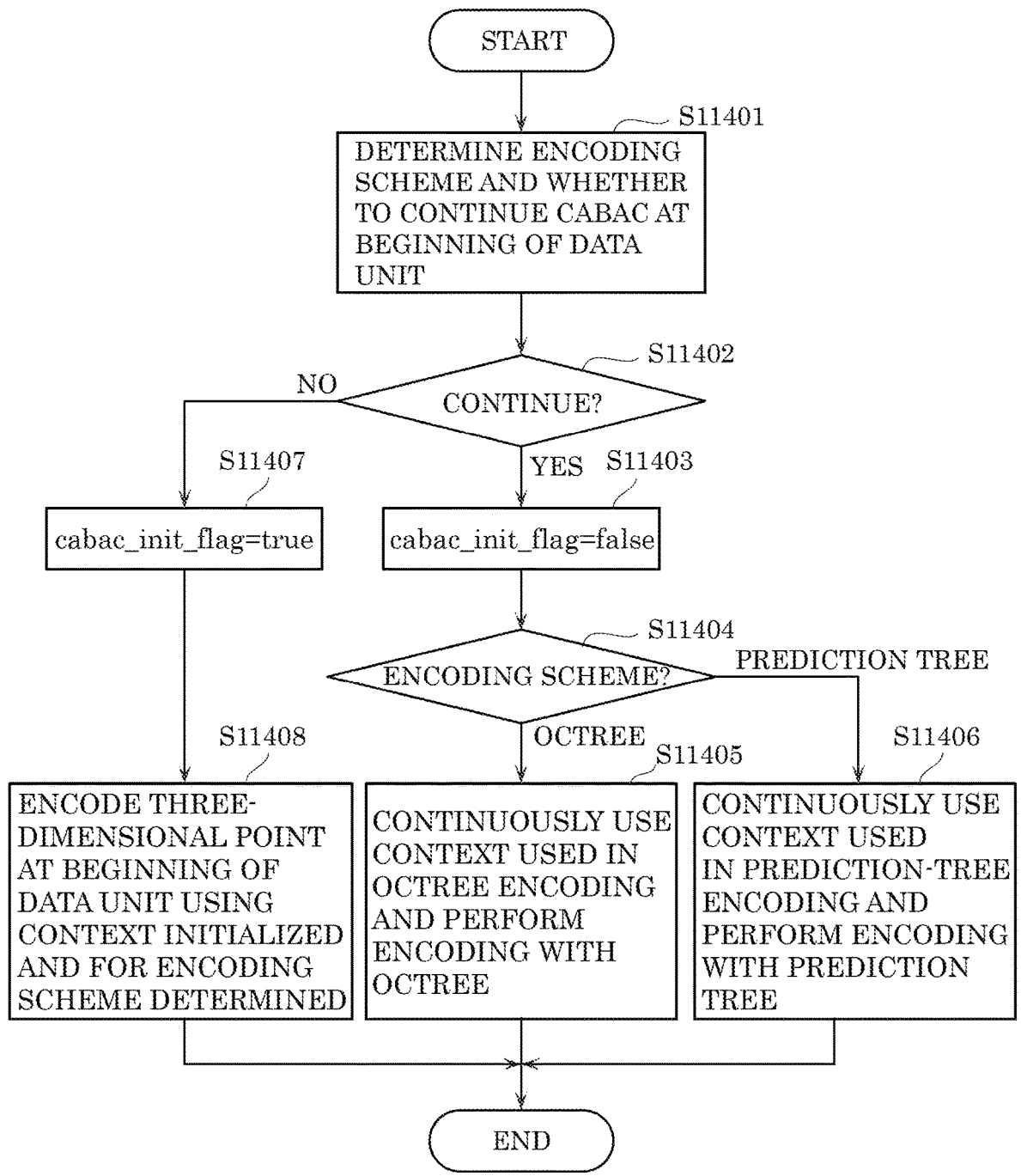
FIG. 73 is a flowchart illustrating an example of a three-dimensional data encoding method according to Embodiment 6.

FIG. 73 is a flowchart illustrating an example of a three-dimensional data encoding method. Here, encoding of geometry information items of three-dimensional points included in a data unit will be described.

The three-dimensional data encoding device determines an encoding scheme for a data unit being a processing target and determines whether to continue CABAC in encoding of a geometry information item of a three-dimensional point at a beginning of the data unit being the processing target (S11401). In other words, the three-dimensional data encoding device determines any one of the octree encoding and the prediction-tree encoding as an encoding scheme for the data unit and determines whether to continuously use a context used for the encoding.

Next, when it is determined to continuously use the context (Yes in S11402), the three-dimensional data encoding device sets cabac_init_flag to false (S11403). That is, the three-dimensional data encoding device sets an identification information item such that the identification information item indicates that the context used for the encoding is continuously used. The three-dimensional data encoding device sets the identification information such that the identification information indicates a determination result of step S11402.

Next, when the octree encoding is determined as the encoding scheme (Octree in S11404), the three-dimensional data encoding device continuously uses a context used in the octree encoding and performs the encoding with an octree (S11405). The context used in the octree encoding is a context that is used in octree encoding of a data unit immediately before the data unit being the processing target. The context is, for example, temporarily stored in a memory of the three-dimensional data encoding device, and the three-dimensional data encoding device reads the context stored in the memory and uses the context in the encoding of the data unit being the processing target.

In contrast, when the prediction-tree encoding is determined as the encoding scheme (Prediction tree in S11404), the three-dimensional data encoding device continuously uses a context used in the prediction-tree encoding and performs the encoding with a prediction tree (S11406). The context used in the prediction-tree encoding is a context that is used in prediction-tree encoding of a data unit immediately before the data unit being the processing target. The context is, for example, temporarily stored in a memory of the three-dimensional data encoding device, and the three-dimensional data encoding device reads the context stored in the memory and uses the context in the encoding of the data unit being the processing target.

As illustrated in steps S11405 and S11406, the three-dimensional data encoding device continuously uses the context used in the encoding scheme determined from among the encoding schemes in step S11401 and executes the encoding.

It should be noted that, in a case where the context is continuously used, the three-dimensional data encoding device changes a value of the context continuously used, based on the encoding scheme (octree or prediction tree) for the geometry information item. For example, a context for the octree encoding is a context for entropy encoding of an Occupancy code, a quantized value, duplicated points in a leaf node, and the like, and a context for the prediction-tree encoding is a context for entropy encoding of the number of nodes, a prediction mode, and the like.

When it is determined not to continuously use the context (No in S11402), that is, when it is determined to initialize the context, the three-dimensional data encoding device sets cabac_init_flag to true (S11407). That is, the three-dimensional data encoding device sets an identification information item such that the identification information item indicates that the context used for the encoding is not continuously used. The three-dimensional data encoding device sets the identification information such that the identification information indicates a determination result of step S11402.

Next, the three-dimensional data encoding device encodes the geometry information item of the three-dimensional point at a beginning of the data unit using a context initialized and for the encoding scheme determined in step S11401 (S11408).

As described above, when performing the octree encoding, the three-dimensional data encoding device performs the encoding using a context for the octree encoding, and when performing the prediction-tree encoding, the three-dimensional data encoding device performs the encoding using a context for the prediction-tree encoding. That is, in the three-dimensional data encoding method, a context to be continuously used in the encoding is changed based on the encoding scheme for the geometry information item.

Figure 74:
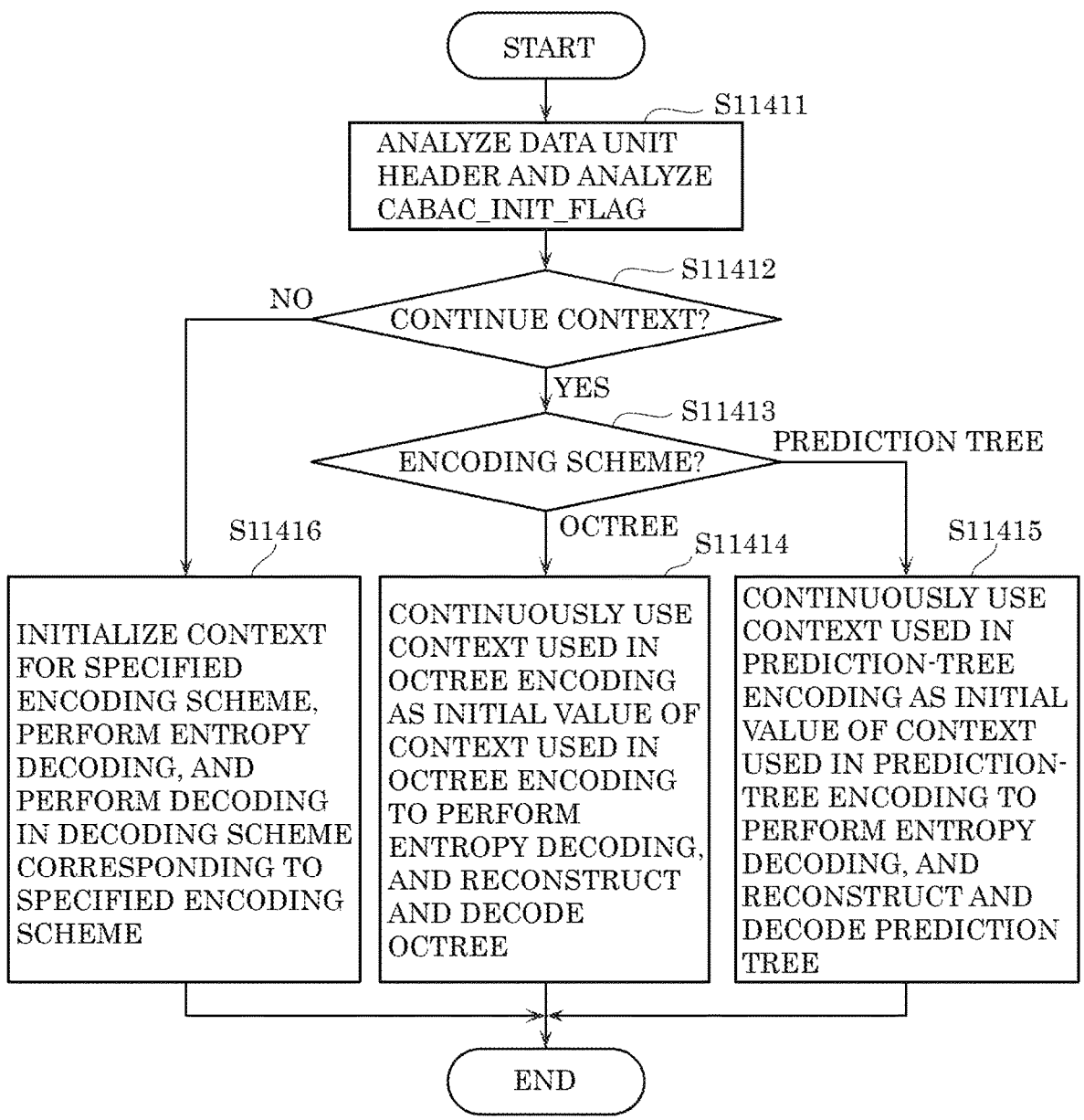
FIG. 74 is a flowchart illustrating an example of a three-dimensional data decoding method according to Embodiment 6.

FIG. 74 is a flowchart illustrating an example of a three-dimensional data decoding method. Here, decoding of geometry information items of three-dimensional points included in a data unit will be described.

The three-dimensional data decoding device analyzes a header of an encoded data unit (encoded data) being a processing target and analyzes cabac_init_flag (S11411).

The three-dimensional data decoding device determines whether cabac_init_flag indicates that a context is continuously used (S11412).

When cabac_init_flag indicates that the context is continuously used (Yes in S11412), that is, when cabac_init_flag is set to false, the three-dimensional data decoding device determines an encoding scheme for the encoded data being the processing target (S11413).

When the encoding scheme for the encoded data being the processing target is the octree encoding (Octree in S11413), the three-dimensional data decoding device continuously uses the context used in the octree encoding as an initial value of a context used in the octree encoding to perform entropy decoding and reconstructs and decodes the octree (S11414).

When the encoding scheme for the encoded data being the processing target is the prediction-tree encoding (Prediction tree in S11413), the three-dimensional data decoding device continuously uses the context used in the prediction-tree encoding as an initial value of a context used in the prediction-tree encoding to perform entropy decoding and reconstructs and decodes the prediction tree (S11415).

As described above, when cabac_init_flag (the identification information item) indicates that the context used for the encoding is continuously used, the three-dimensional data decoding device continuously uses the context used in the encoding scheme for the encoded data to decode the encoded data.

When cabac_init_flag indicates that the context is not continuously used (No in S11412), that is, when cabac_init_flag is set to true, the three-dimensional data decoding device initializes a context for a specified encoding scheme, performs entropy decoding, and performs decoding in a decoding scheme corresponding to the specified encoding scheme (S11416).

It should be noted that, in the embodiment, the description is given of a method of changing a context continuously used, based on the encoding scheme (octree or prediction tree) for the geometry information item; however, the method can be applied to an encoding scheme for an attribute information item as well. Examples of the encoding scheme for an attribute information item include an LoD-base encoding scheme and a Transform-base encoding scheme. In this case, the three-dimensional data encoding device may change the context continuously used, based on the encoding scheme for an attribute information item. That is, when performing LoD-base encoding, the three-dimensional data encoding device performs the encoding using a context for the LoD-base encoding, and when performing the Transform-base encoding, the three-dimensional data encoding device performs the encoding using a context for the Transform-base encoding.

It should be noted that, when cabac_init_flag is signaled in encoding of attribute information items, the signaling may be performed independently for the LoD-base encoding scheme and the Transform-base encoding scheme or may be signaled in common. That is, the three-dimensional data encoding device may store cabac_init_flag for each encoding scheme in a header or may store cabac_init_flag that is common to encoding schemes in a header. When using one encoding scheme from the encoding schemes, the three-dimensional data encoding device makes cabac_init_flag sharable (i.e., unifies cabac_init_flags), by which an amount of information for the signaling can be reduced.

Further, cabac_init_flag for encoding of attribute information items and cabac_init_flag for encoding of geometry information items may be made to have the same value or different values.

In a case where cabac_init_flag for encoding of attribute information items and cabac_init_flag for encoding of geometry information items are made to have the same value, cabac_init_flag for encoding of attribute information items and cabac_init_flag for encoding of geometry information items may be made sharable and stored in metadata that is common to sequences, such as an SPS. In this case, in the encoding, when it is determined that the context used for the encoding is continuously used, the three-dimensional data encoding device (i) encodes geometry information items of three-dimensional points continuously using a context used in an encoding scheme for the three-dimensional points that is included in encoding schemes and (ii) encodes attribute information items of the three-dimensional points continuously using a context used in an encoding scheme for the attribute information items. Contrariwise, in the encoding, when it is determined that the context used for the encoding is not continuously used, the three-dimensional data encoding device (i) encodes geometry information items of three-dimensional points using a context initialized and for an encoding scheme for the three-dimensional points that is included in encoding schemes and (ii) encodes attribute information items of the three-dimensional points continuously using a context initialized and for an encoding scheme for the attribute information items.

In this case, when the identification information item indicates that the context used for the encoding is continuously used, the three-dimensional data decoding device (i) calculates encoded geometry information items of three-dimensional points by performing decoding continuously using a context used in an encoding scheme being included in the encoding schemes and used for encoding the geometry information items of the three-dimensional points and (ii) calculates attribute information items of the three-dimensional points by performing decoding continuously using a context used in an encoding scheme for the attribute information items. Contrariwise, when the identification information item indicates that the context used for the encoding is not continuously used, the three-dimensional data decoding device (i) calculates encoded geometry information items of three-dimensional points by performing decoding using a context initialized and for an encoding scheme that is included in the encoding schemes and used for encoding the geometry information items of the three-dimensional points and (ii) decodes attribute information items of the three-dimensional points by performing decoding using a context initialized and for an encoding scheme for the attribute information items.

In a case where cabac_init_flag for encoding of attribute information items and cabac_init_flag for encoding of geometry information items are made to have different values, the three-dimensional data encoding device stores cabac_init_flag for encoding of attribute information items and cabac_init_flag for encoding of geometry information items in an APS, a GPS, a data unit header, or the like.

The three-dimensional data encoding device may store cabac_init_flag for encoding of attribute information items and cabac_init_flag for encoding of geometry information items in metadata common to the geometry information items and the attribute information items, in any one of or both individual metadata items, or in the common metadata and the individual metadata items. Further, the three-dimensional data encoding device may use a flag indicating where cabac_init_flag for encoding of attribute information items and cabac_init_flag for encoding geometry information items are written.

It should be noted that, in encoding of a geometry information item, when switching of an encoding scheme is performed between data units, the three-dimensional data encoding device may determine to initialize a context for a data unit that is first encoded after the switching of the encoding scheme rather than continuously using the context.

Figure 75:
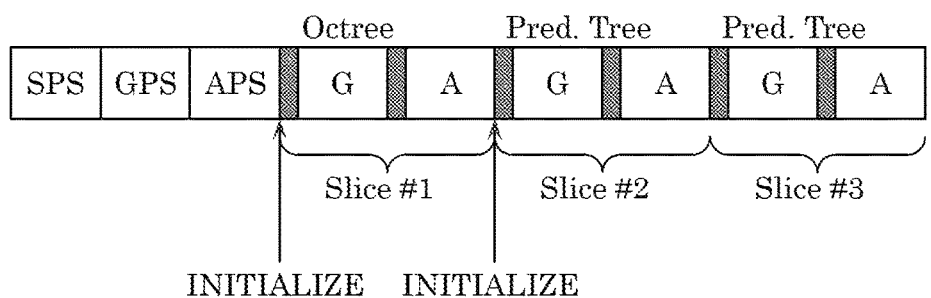
FIG. 75 is a diagram for describing initialization of a context in a case where an encoding scheme according to Embodiment 6 is switched.

FIG. 75 is a diagram for describing initialization of a context in a case where an encoding scheme is switched. FIG. 75 illustrates an example of a case where a data unit of slice #1 is encoded in the octree encoding (Octree), and data units of slice #2 and slice #3 are encoded in the prediction-tree encoding (predtree).

The three-dimensional data encoding device sets an initialization flag (cabac_init_flag) used for encoding a geometry information item of a data unit at a beginning of the octree encoding (slice #1) to ON (true). The three-dimensional data encoding device sets an initialization flag (cabac_init_flag) used for encoding a geometry information item of a data unit at a beginning of the prediction-tree encoding (slice #2) to ON (true). It should be noted that an initialization flag for slice #3 may be set to either ON or OFF.

As described above, in a case where an encoding scheme for a first data unit is different from an encoding scheme for a second data unit, which is encoded next to the first data unit, the three-dimensional data encoding device determines that a context used for the encoding is not continuously used and encodes three-dimensional points of the second data unit using a context initialized and for the encoding scheme for the second data unit that is included in the encoding schemes. In this case, an identification information item corresponding to the second data unit (the second identification information item) is set in such a manner as to indicate that the context used for the encoding is not continuously used.

Figure 76:
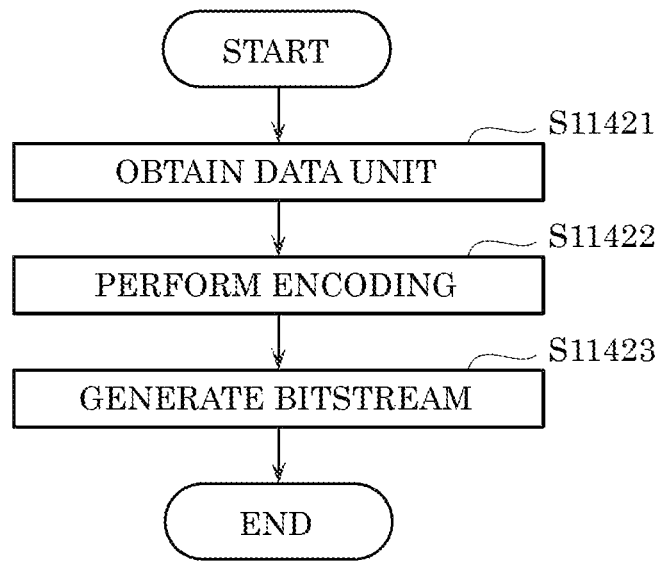
FIG. 76 is a flowchart of processing by a three-dimensional data encoding device according to Embodiment 6.

As stated above, the three-dimensional data encoding device according to one aspect of the present embodiment performs the process shown in FIG. 76. The three-dimensional data encoding device obtains a first data unit including first three-dimensional points (S11421). Next, the three-dimensional data encoding device encodes the first three-dimensional points included in the first data unit obtained, using one of encoding schemes different from each other (S11422). Then, the three-dimensional data encoding device generates a bitstream including first encoded data and a first identification information item, the first encoded data being obtained by encoding the first three-dimensional points (S11423). The encoding of the first three-dimensional points (S11422) includes: determining whether a context used for encoding is continuously used; and encoding the first three-dimensional points using a context corresponding to a determination result in the determining, the context being included in contexts used in an encoding scheme used for the encoding and included in the encoding schemes. The first identification information item includes the determination result in the determining.

According to the aspect, since whether to continue the context used for the encoding is determined, and thus encoding efficiency can be improved, and since the bitstream including the first identification information is generated, the three-dimensional data decoding device is enabled to perform decoding appropriately.

For example, in the encoding of the first three-dimensional points (S11422), when it is determined that the context used for the encoding is continuously used, the first three-dimensional points are encoded continuously using a context used in an encoding scheme for the first three-dimensional points, the encoding scheme being included in the encoding schemes, and the first identification information item indicates that the context used for the encoding is continuously used.

For example, in the encoding of the first three-dimensional points (S11422), when it is determined that the context used for the encoding is not continuously used, the first three-dimensional points are encoded using a context initialized and for an encoding scheme for the first three-dimensional points, the encoding scheme being included in the encoding schemes, and the first identification information item indicates that the context used for the encoding is not continuously used.

For example, each of the first three-dimensional points includes a geometry information item and an attribute information item. The encoding schemes are encoding schemes for geometry information. In the encoding of the first three-dimensional points (S11422), attribute information items of the first three-dimensional points are encoded using an other encoding scheme. In the encoding of the first three-dimensional points (S11422), when it is determined that the context used for the encoding is continuously used, (i) geometry information items of the first three-dimensional points are encoded continuously using a context used in an encoding scheme for the first three-dimensional points, the encoding scheme being included in the encoding schemes, and (ii) the attribute information items of the first three-dimensional points are encoded continuously using a context used in the other encoding scheme.

For example, in the encoding of the first three-dimensional points (S11422), when it is determined that the context used for the encoding is not continuously used, (i) the geometry information items of the first three-dimensional points are encoded using a context initialized and for an encoding scheme for the first three-dimensional points, the encoding scheme being included in the encoding schemes, and (ii) the attribute information items of the first three-dimensional points are encoded using a context initialized and for the other encoding scheme.

For example, the three-dimensional data encoding device includes a processor and memory, and the processor performs the above-described process using the memory.

Figure 77:
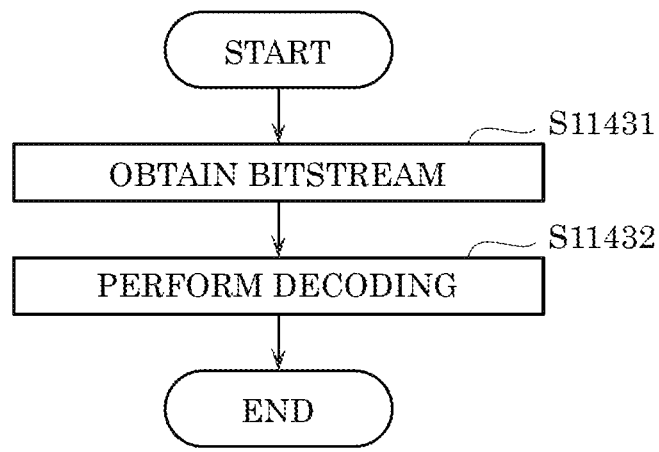
FIG. 77 is a flowchart of processing by a three-dimensional data decoding device according to Embodiment 6.

The three-dimensional data decoding device according to one aspect of the present embodiment performs the process shown in FIG. 77. The three-dimensional data decoding device obtains a bitstream including first encoded data and a first identification information item (S11431), the first encoded data being obtained by encoding first three-dimensional points, the first identification information item indicating whether a context used for encoding is continuously used. Next, the three-dimensional data decoding device decodes the first encoded data using a decoding scheme corresponding to an encoding scheme used for encoding the first encoded data (S11432), the encoding scheme being included in encoding schemes different from each other. In the decoding of the first encoded data (S11432), the first encoded data is decoded using a context according to the first identification information item.

According to the aspect, appropriate first three-dimensional points can be calculated by decoding the first encoded data according to the first identification information included in the bitstream.

For example, in the decoding of the first encoded data (S11432), when the first identification information item indicates that the context used for the encoding is continuously used, the first encoded data is decoded continuously using a context used in the encoding scheme corresponding to the decoding scheme.

For example, in the decoding of the first encoded data (S11432), when the first identification information item indicates that the context used for the encoding is not continuously used, the first encoded data is decoded using a context initialized and for the encoding scheme used for encoding the first encoded data.

For example, the first encoded data includes geometry information items of the first three-dimensional points encoded, and attribute information items of the first three-dimensional points encoded. The encoding schemes are encoding schemes for geometry information. The attribute information items of the first three-dimensional points encoded are encoded using an other encoding scheme. In the decoding of the first encoded data (S11432), when the first identification information item indicates that the context used for the encoding is continuously used, (i) the geometry information items of the first three-dimensional points are calculated by decoding the first encoded data continuously using a context used in an encoding scheme used for encoding the geometry information items of the first three-dimensional points, the encoding scheme being included in the encoding schemes, and (ii) the attribute information items of the first three-dimensional points are calculated by decoding the first encoded data continuously using a context used in the other encoding scheme.

For example, in the decoding of the first encoded data (S11432), when the first identification information item indicates that the context used for the encoding is not continuously used, (i) the geometry information items of the first three-dimensional points are calculated by decoding the first encoded data using a context initialized and for the encoding scheme used for encoding the geometry information items of the first three-dimensional points, and (ii) the attribute information items of the first three-dimensional points are calculated by decoding the first encoded data using a context initialized and for the other encoding scheme.

For example, the bitstream further includes second encoded data and a second identification information item, the second encoded data being obtained by encoding second three-dimensional points, the second identification information item indicating whether a context used for encoding is continuously used. The second three-dimensional points are encoded next to the first three-dimensional points. The second identification information item indicates that the context used for the encoding is not continuously used.

For example, the three-dimensional data decoding device includes a processor and memory, and the processor performs the above-described process using the memory.

Embodiment 7

In entropy encoding, in the case of indicating whether to continue the context, to indicate that the context is continued, it is preferred to ensure that the corresponding context is continued in the three-dimensional data decoding device. For example, if continuing the context is indicated even though the context is not saved or not available, the three-dimensional data decoding device cannot decode the three-dimensional point cloud. To address this, the following constraints may be imposed to ensure that the three-dimensional data decoding device can decode the three-dimensional point cloud when continuing the context.

[Encoding Constraints]

Examples of changing the context used in encoding include switching the encoding scheme such as prediction tree or octree, as well as switching encoding parameters.

Switching encoding parameters may include, for example, changing the number of divisions of a tree structure, such as switching octree in octree encoding to quadtree or binary tree. Switching encoding parameters may also include, for example, switching the context for occupancy codes, such as switching between bitwise encoding in which the context is assigned to each bit of an 8-bit occupancy code and bytewise encoding in which the context is assigned to the entire occupancy code. Switching encoding parameters may also include switching between referring to only the current node and referring to nodes up to adjacent nodes in octree encoding.

Flags indicating whether these encoding parameters are switched may be included in the SPS (sequence parameter set), GPS (geometry information parameter set), data unit header, and the like.

If the context used is switched as described above, the three-dimensional data encoding device may first reset the context in entropy encoding of the data unit. That is, the three-dimensional data encoding device may perform encoding using the reset (initialized) context, rather than using the saved context.

Similarly, in attribute information encoding, as in geometry information encoding, the three-dimensional data encoding device may reset the context in entropy encoding of the data unit if the context used is switched.

In encoding, a constraint may be imposed such that encoding parameters are not switched if entropy encoding is not reset.

For example, in encoding, it may be specified that encoding parameters are the same in the parameter set (e.g., GPS1) referred to by the "previous data unit DU_prev" for which the context is saved, and in the parameter set (GPS2) referred to by the "current data unit DU_cur" for which entropy encoding is started using the context of DU_prev.

Alternatively, in encoding, it may be specified that the geometry parameter sets of GPS1 and GPS2 are the same and describe identical content. That is, it may be specified that the parameter sets have the same identifier GPS_id.

APSs may be similarly specified. For example, in encoding, it may be specified that encoding parameters are the same in the parameter set (e.g., APS1) referred to by the "previous data unit DU_prev" for which the context is saved, and in the parameter set (APS2) referred to by the "current data unit DU_cur" for which entropy encoding is started using the context of DU_prev.

Alternatively, in encoding, it may be specified that the geometry parameter sets of APS1 and APS2 are the same and have identical content. That is, it may be specified that the parameter sets have the same identifier APS_id.

If the context is continued, the data unit header of DU_cur may store the ID of the slice to which DU_cur belongs and the ID of the slice to which DU_prev belongs.

[Decoding Constraints]

Constraints on the three-dimensional data decoding device may be imposed as follows.

If entropy encoding of DU_cur uses the context saved for DU_prev, i.e., if cabac_init_flag=0, the three-dimensional data decoding device determines whether the slice ID of the data unit decoded before decoding DU_cur matches the slice ID of DU_prev. If they match, the three-dimensional data decoding device may decode DU_cur. The three-dimensional data decoding device thus checks if a target slice for which the context has been saved by the three-dimensional data encoding device matches a target slice for which the context has been saved by the three-dimensional data decoding device. If the check finds that these slices do not match, the three-dimensional data decoding device may determine that conformance condition is violated (or nonconformance to specifications). The conformance specifications for bitstreams define requirements for bitstreams generated by an encoder to be correctly decoded by a decoder, and may therefore be regarded as specifications for the decoder to recognize constraints regarding the encoding method used by the encoder. Specifying an encoding method that allows the decoder to correctly decode bitstreams as the conformance specifications of the bitstream and determining whether bitstreams conform to the specifications in the decoder thus make it possible to determine whether the bitstreams can be correctly decoded.

If different contexts are used for the parameter set referred to by DU_cur and the parameter set referred to by DU_prev due to switching of an encoding parameter, the three-dimensional data decoding device may determine the occurrence of conformance-condition is violated (or nonconformance to the specifications). Upon determining the occurrence of conformance-condition is violated (or nonconformance to the specifications), the three-dimensional data decoding device may stop decoding or may perform a specific avoidance process.

If the parameter set referred to by DU_cur and the parameter set referred to by DU_prev have different GPS_id or APS_id, the three-dimensional data decoding device may determine that conformance condition is violated (or nonconformance to the specifications).

FIGS. 78 to 82 illustrate syntax examples. FIG. 78 illustrates an exemplary syntax of an SPS. FIG. 79 illustrates an exemplary syntax of the header (DevidedGeometryHeader) of divided geometry information. FIG. 80 is a diagram illustrating an exemplary syntax of the header (DevidedAttributeHeader) of divided attribute information. FIG. 81 is a diagram illustrating another exemplary syntax of the header (DevidedAttributeHeader) of the divided attribute information. FIG. 82 is a diagram illustrating another exemplary syntax of the header (DevidedGeometryHeader) of the divided geometry information.

The flag indicating whether to initialize the context for encoding has been represented above as cabac_init_flag. This flag is here represented as entropy_continue_flag. The definition of entropy_continue_flag, however, is reverse to that of cabac_init_flag. The initialization flag entropy_continue_flag indicates whether to continue entropy encoding without initialization, i.e., indicates that the context used for encoding the previous data unit is saved and applied to the next data unit.

As illustrated in FIG. 78, the SPS includes the flag entropy_continue_enable indicating whether the function of continuing the context from one data unit to another is present (used). The flag entropy_continue_enable is an example of third identification information.

As illustrated in FIG. 79, the header (DevidedGeometryHeader) of the divided geometry information includes the identifiers (gps_id), (tile_id), and (frame_id) of the GPS, tile, and frame, respectively, referred to by the data unit including this divided geometry information.

If entropy_continue_enable in the SPS is valid, (i.e., if entropy_continue_enable indicates the presence of the function of continuing the context), the header (DevidedGeometryHeader) of the divided geometry information indicates the flag geom_du_entropy_continue_flag. This flag indicates whether the data unit including this divided geometry information is encoded by continuously using the context used for encoding the previous data unit preceding that data unit. The header (DevidedGeometryHeader) of the divided geometry information thus includes the flag geom_du_entropy_continue_flag. Further, if geom_du_entropy_continue_flag is valid, the header (DevidedGeometryHeader) of the divided geometry information indicates the slice ID (slice2_id) to which the previous data unit belongs. The header (DevidedGeometryHeader) of the divided geometry information thus includes the slice ID (slice2_id). The flag geom_du_entropy_continue_flag is an example of first identification information.

As illustrated in FIG. 80, the header (DevidedAttributeHeader) of the divided attribute information includes: the identifier (aps_id) of the APS (attribute information parameter set) referred to by the data unit including this divided attribute information; the number (attr_index) of this attribute information in the order of the attribute information items described in the SPS; and the slice ID (geom_slice_id) of the geometry information corresponding to this attribute information.

If entropy_continue_enable in the SPS is valid (i.e., if entropy_continue_enable indicates the presence of the function of continuing the context), the header (DevidedAttributeHeader) of the divided attribute information shows the flag attr_du_entropy_continue_flag. This flag indicates whether the data unit including this divided attribute information is encoded by continuously using the context used for encoding the previous data unit preceding that data unit. The header (DevidedAttributeHeader) of the divided attribute information thus includes the flag attr_du_entropy_continue_flag. Further, if attr_du_entropy_continue_flag is valid, the header (DevidedAttributeHeader) of the divided attribute information shows the slice ID (slice2_id) to which the previous data unit belongs. The header (DevidedAttributeHeader) of the divided attribute information thus includes the slice ID (slice2_id). The flag geom_du_entropy_continue_flag is an example of the first identification information.

As described above, if entropy_continue_enable in the SPS is valid (i.e., if entropy_continue_enable indicates the presence of the function of continuing the context), the header (DevidedGeometryHeader) of the divided geometry information includes the flag_geom_du_entropy_continue_flag, and the header (DevidedAttributeHeader) of the divided attribute information includes the flag attr_du_entropy_continue_flag. The three-dimensional data encoding device may determine whether to perform context-based encoding (second determination). If the three-dimensional data encoding device determines to perform context-based encoding, the device may determine whether to encode the current data unit by continuously using the context used to encode the previous data unit preceding the current data unit (first determination). In this case, the three-dimensional data encoding device generates a bitstream that includes entropy_continue_enable (the third identification information) indicating whether context-based encoding is performed. If entropy_continue_enable (the third identification information) indicates that context-based encoding is performed, the header of the data unit indicates geom_du_entropy_continue_flag (the first identification information) or attr_du_entropy_continue_flag (the first identification information).

As above, the header of the divided geometry information and the header of the divided attribute information include geom_du_entropy_continue_flag and attr_du_entropy_continue_flag, respectively. This enables determining whether to continue the context individually for the geometry information and the attribute information, thereby enabling flexible control.

As illustrated in FIG. 81, the flag indicating whether to continue the context used to encode the attribute information (attr_du_entropy_continue_flag) may be determined to be valid if entropy encoding of the geometry information is continued. If this flag is valid, the header (DevidedAttributeHeader) of the divided attribute information may indicate whether entropy encoding of the data unit of this attribute information is valid.

Thus, if the three-dimensional data encoding device determines to continuously use the context used to encode the previous data unit, the three-dimensional data encoding device may (i) encode the geometry information on the current data unit by continuously using the context used to encode the geometry information on the previous data unit, and (ii) encode the attribute information on the current data unit by continuously using the context used to encode the attribute information on the previous data unit. Then, in the three-dimensional data decoding device, if the first identification information indicates that the context used to encode the previous data unit is continuously used, the three-dimensional data decoding device may (i) calculate the geometry information on the three-dimensional points in the data unit by decoding the data unit while continuously using the context used to encode the geometry information on the previous data unit, and (ii) calculate the attribute information on the three-dimensional points in the data unit by decoding the data unit while continuously using the context used to encode the attribute information on the previous data unit.

Alternatively, if entropy_continue_enable is true, attr_du_entropy_continue_flag may be set in the header (DevidedAttributeHeader) of the divided attribute information. Then, if geom_du_entropy_continue_flag is false, attr_du_entropy_continue_flag may be set to false irrespective of the value of attr_du_entropy_continue_flag.

Alternatively, it may be specified that conformance condition is violated (or nonconformance to the specifications) if geom_du_entropy_continue_flag is false and if attr_du_entrpy_continue_flag is true.

Note that controlling the geometry information encoding and controlling the attribute information encoding may be integrated. That is, geom_du_entropy_continue_flag and attr_du_entropy_continue_flag may be merged. In this case, the header of the divided attribute information does not need to indicate attr_du_entropy_continue_flag. In entropy encoding of the divided attribute information, whether to continue the context used to encode the previous data unit is determined according to du_entropy_continue_flag indicated in the data unit header of the geometry information corresponding to geom_slice_id.

If DU_cur and DU_prev refer to the same parameter sets, DU_cur does not need to indicate the parameter set IDs (GPS_id and APS_id). The three-dimensional data decoding device may refer to DU_prev indicated in the header of DU_cur and then refer to the parameter sets having the parameter set IDs indicated in the header of DU_prev.

If DU_cur and DU_prev are defined to belong to the same tile, tile_id does not need to be indicated. That is, the header of the divided geometry information does not need to include tile_id. This can reduce the processing of determining whether DU_cur and DU_prev are the same. This can also prevent confusion such as indicating that entropy encoding is being continued even though the context has been switched.

It may be specified that at least one of gps_id and tile_id is indicated if du_entropy_continue_flag is false, and such that neither gps_id nor tile_id is indicated if du_entropy_continue_flag is true.

The flag geom_entropy_continue_enable_flag indicates whether to continue the context of entropy encoding. It may be specified that the following condition 1 or 2 needs to be satisfied for geom_entropy_continue_enable_flag to be set to true. Condition 1 is that mutual encoding dependence of slices (data units) is permitted. Condition 2 is that reordering of slices (data units) is not permitted.

The order of slices (data units) may be indicated by, for example, the IDs of the data units (slice IDs). The IDs of data unis may be IDs (numbers) for identifying the data units on a one-frame basis, or may be IDs (numbers) for identifying the data units on a random access unit basis. A lead data unit in a random access unit is assigned a predetermined ID (a predetermined number). Each data unit is thus assigned a sequential number of the data unit in the random access unit. If the three-dimensional data encoding device determines to continuously use the context used for encoding the previous data unit, the three-dimensional data encoding device does not need to reorder data units in order to satisfy condition 2. In this case, the three-dimensional data encoding device may further generate a bitstream that includes second identification information indicating whether to permit reordering of data units in the random access unit. If du_entropy_continue_flag (the first identification information) indicates that the context is not continuously used and if the second identification information indicates that reordering is not permitted, the three-dimensional data decoding device may determine that the bitstream obtained satisfies the conformance condition. If du_entropy_continue_flag (the first identification information) indicates that the context is not continuously used or if the second identification information indicates that reordering is permitted, the three-dimensional data decoding device may determine that the bitstream obtained does not satisfy the conformance condition.

In this case, whether geom_entropy_continue_enable_flag is valid may be indicated if condition 1 or 2 is satisfied. Alternatively, the violation of conformance condition (or nonconformance to the specifications) may be determined if geom_entropy_continue_enable_flag is true and condition 1 or 2 is not satisfied. Further, geom_entropy_continue_enable_flag and the flag indicating condition 1 or 2 may be merged and replaced with any of the flags.

It may be specified that, if the current data unit is the lead data unit in the random access unit, du_entropy_continue_flag should be set to false on a random access basis. That is, in this case, the three-dimensional data encoding device may determine not to continuously use the context used to encode the previous data unit. If the current data unit is not the lead data unit in the random access unit, the three-dimensional data encoding device may determine to continuously use the context used to encode the previous data unit.

If du_entropy_continue_flag (the first identification information) indicates that the context used to encode the previous data unit is not continuously used and if the data unit is the lead data unit in the random access unit, the three-dimensional data decoding device may determine that the bitstream satisfies the conformance condition. That is, if the data unit is the lead data unit in the random access unit, the three-dimensional data decoding device determines that the conformance condition for the bitstream is that (i.e., is satisfied if) the first identification information indicates that the context used to encode the previous data unit is not continuously used. If du_entropy_continue_flag (the first identification information) indicates that the context used to encode the previous data unit is continuously used or if the data unit is not the lead data unit in the random access unit, the three-dimensional data decoding device may determine that the bitstream does not satisfy the conformance condition.

For example, the random access unit may be on a one-frame basis. In this case, the three-dimensional data encoding device may determine to encode a lead slice (data unit) in a frame without continuously using the context used to encode the previous data unit. If du_entropy_continue_flag (the first identification information) indicates that the context used to encode the previous data unit is not continuously used and if the data unit is the lead data unit in the frame, the three-dimensional data decoding device may determine that the bitstream satisfies the conformance condition.

As another example, the random access unit may be on a multi-frame basis, or a GOF (Group Of Frames). In this case, the three-dimensional data encoding device may determine to encode the lead slice (data unit) in the GOF without continuously using the context used to encode the previous data unit. If du_entropy_continue_flag (the first identification information) indicates that the context used to encode the previous data unit is not continuously used and if the data unit is the lead data unit in the GOF, the three-dimensional data decoding device may determine that the bitstream satisfies the conformance condition.

The random access unit may also be on a one-tile basis. In this case, the three-dimensional data encoding device may determine to encode the lead slice (data unit) in a tile without continuously using the context used to encode the previous data unit. If du_entropy_continue_flag (the first identification information) indicates that the context used to encode the previous data unit is not continuously used and if the data unit is the lead data unit in the tile, the three-dimensional data decoding device may determine that the bitstream satisfies the conformance condition.

A parameter set or a header referred to by a data unit may include a random access point flag indicating whether the data unit is the lead data unit (a random access point). If the random access point flag indicates that the data unit is the lead data unit, du_entropy_continue_flag may be valid in the header (i.e., may be included in the header). Further, du_entropy_continue_flag and the random access point flag may be merged.

Figure 83:
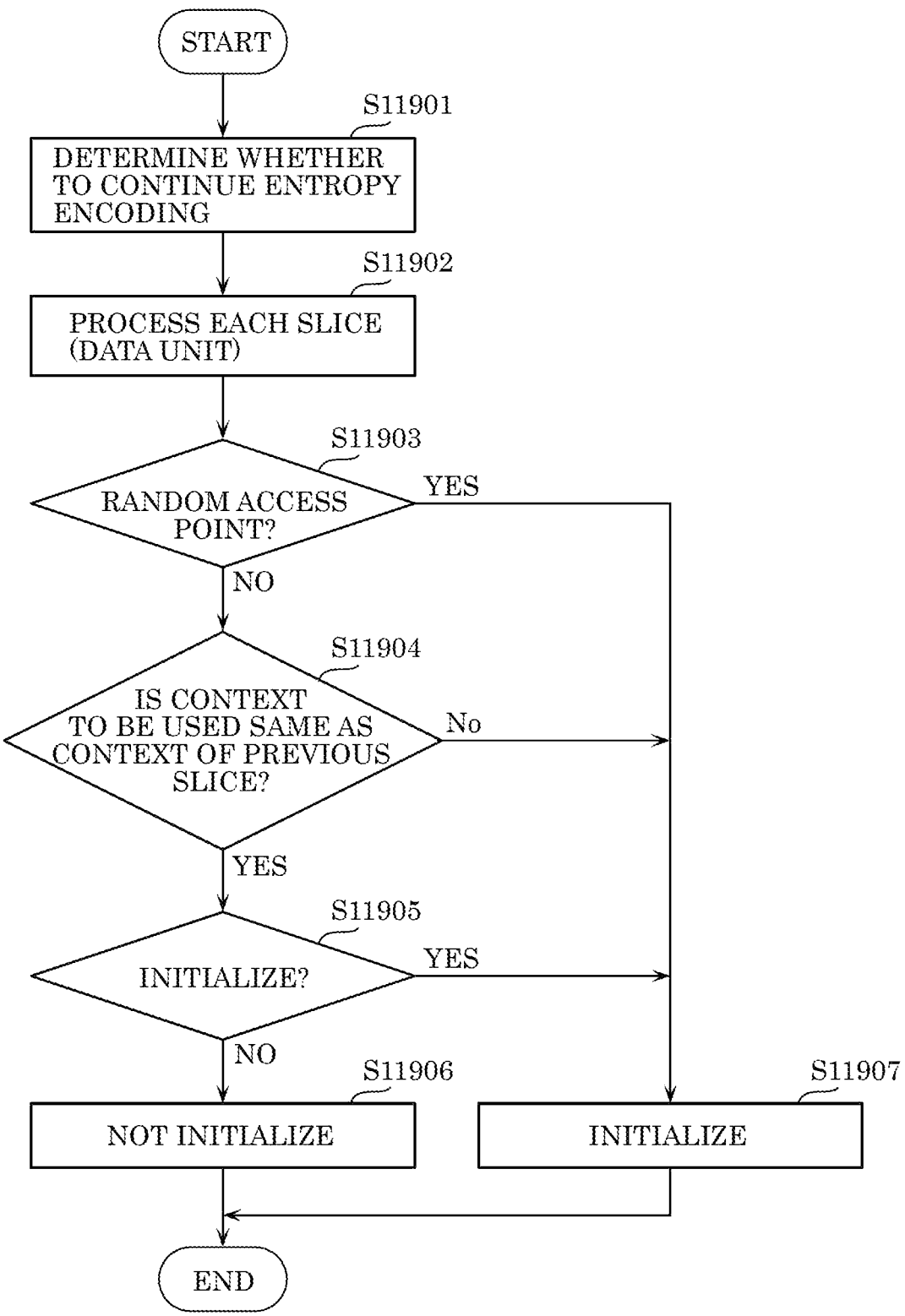
FIG. 83 is a flowchart illustrating an example of first determination for determining whether to initialize entropy encoding in the three-dimensional data encoding device according to Embodiment 7.

FIG. 83 is a flowchart illustrating an example of first determination for determining whether to initialize entropy encoding in the three-dimensional data encoding device.

The three-dimensional data encoding device determines whether to continue entropy encoding (S11901).

The three-dimensional data encoding device processes each slice (data unit) (S11902).

The three-dimensional data encoding device determines whether the current slice is the random access point (S11903). The random access point is the lead slice in a frame if random access on a one-frame basis is possible, or is the lead slice in a GOF if random access on a multi-frame (GOF) basis is possible, or is the lead slice in a tile if random access on a tile basis is possible.

If the three-dimensional data encoding device determines that the current slice is not the random access point (No at S11903), the three-dimensional data encoding device determines whether the context to be used to encode the current slice is the same as the context used to encode the previous slice (S11904). The three-dimensional data encoding device may determine whether to use a different context (i.e., the context is not the same) based on, for example, a flag indicating whether the tree structure is octree or prediction tree, a flag indicating whether binary tree or quadtree is used, or a flag indicating whether a bitwise context is used.

If the three-dimensional data encoding device determines that the context to be used to encode the current slice is the same as the context used to encode the previous slice (Yes at S11904), the three-dimensional data encoding device determines whether to initialize the context (S11905).

If the three-dimensional data encoding device determines not to initialize the context (No at S11905), the three-dimensional data encoding device to continuously use the context without initializing the context (S11906).

If the three-dimensional data encoding device determines that the current slice is the random access point (Yes at S11903), or determines that the context to be used to encode the current slice is not the same as the context used to encode the previous slice (No at S11904), or determines to initialize the context (Yes at S11905), the three-dimensional data encoding device determines to initialize (i.e., not to continue) the context (S11907).

Figure 84:
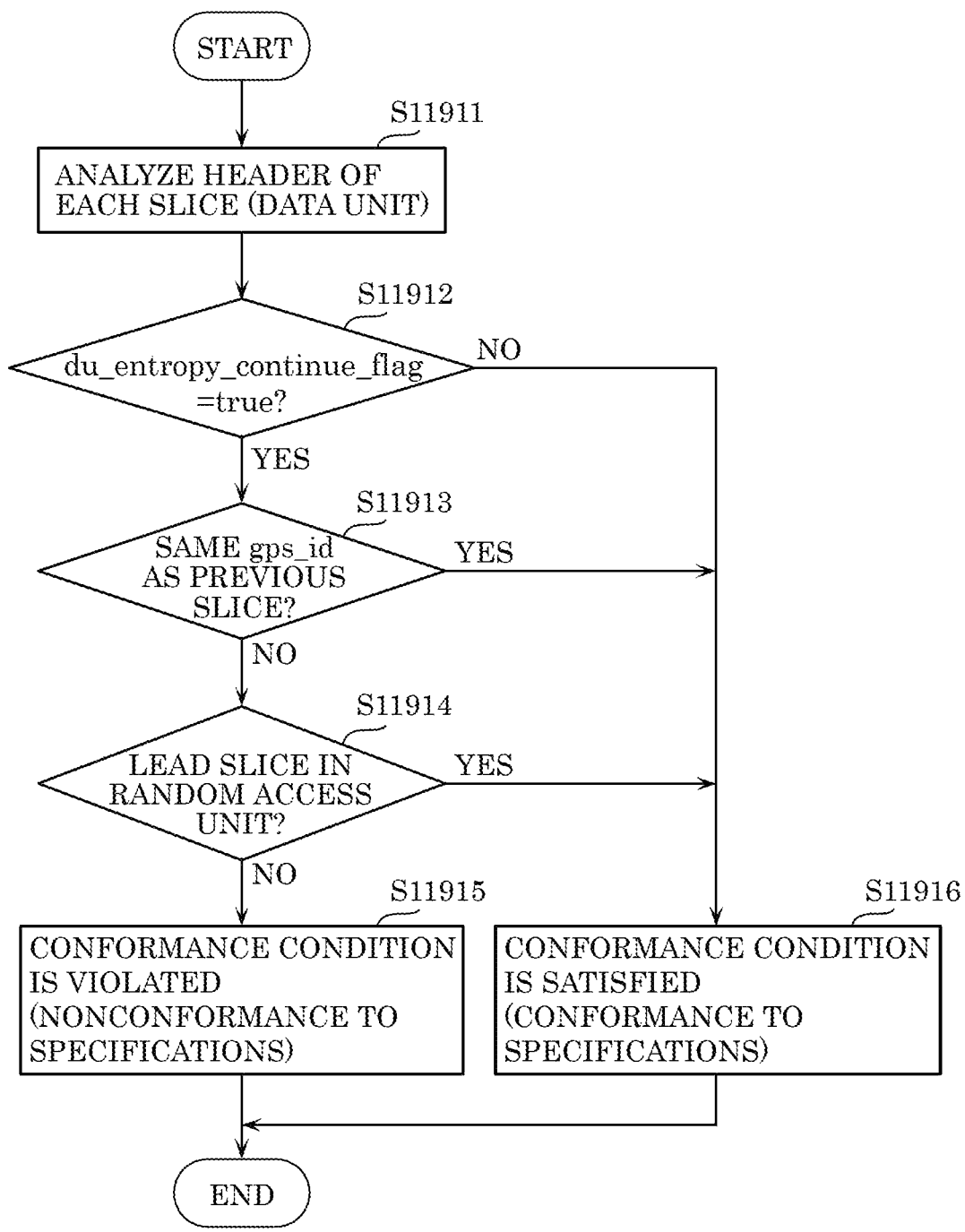
FIG. 84 is a flowchart illustrating an exemplary process of determining whether a flag of entropy encoding satisfies a conformance condition (conforms to specifications) in the three-dimensional data decoding device according to Embodiment 7.

FIG. 84 is a flowchart illustrating an exemplary process of determining whether a flag of entropy encoding satisfies the conformance condition (conforms to the specifications) in the three-dimensional data decoding device.

The three-dimensional data decoding device analyzes the header of each slice (data unit) (S11911).

The three-dimensional data decoding device determines whether du_entropy_continue_flag (the first identification information) is true (S11912).

If the three-dimensional data decoding device determines that du_entropy_continue_flag (the first identification information) is true (Yes at S11912), the three-dimensional data encoding device determines whether the identifier (gps_id) of the GPS referred to by the current slice is the same as the identifier (gps_id) of the GPS referred to by the previous slice (S11913).

If the three-dimensional data decoding device determines that the identifier (gps_id) of the GPS referred to by the current slice is not the same as the identifier (gps_id) of the GPS referred to by the previous slice (No at S11913), the three-dimensional data decoding device determines whether the current slice is the lead slice in the random access unit (S11914). For frame-based random access, the three-dimensional data decoding device may determine a frame boundary based on detection of a data unit indicating a frame boundary, or on detection of a change in frame index.

If the three-dimensional data decoding device determines that the current slice is not the lead slice in the random access unit (No at S11914), the three-dimensional data decoding device determines that the conformance condition is violated (nonconformance to the specifications) (S11915).

If the three-dimensional data decoding device determines that du_entropy_continue_flag (the first identification information) is not true (i.e., is false) (No at S11912), or determines that the identifier (gps_id) of the GPS referred to by the current slice is the same as the identifier (gps_id) of the GPS referred to by the previous slice (Yes at S11913), or determines that the current slice is the lead slice in the random access unit (Yes at S11914), the three-dimensional data decoding device determines that the conformance condition is satisfied (conformance to the specifications) (S11916).

Figure 85:
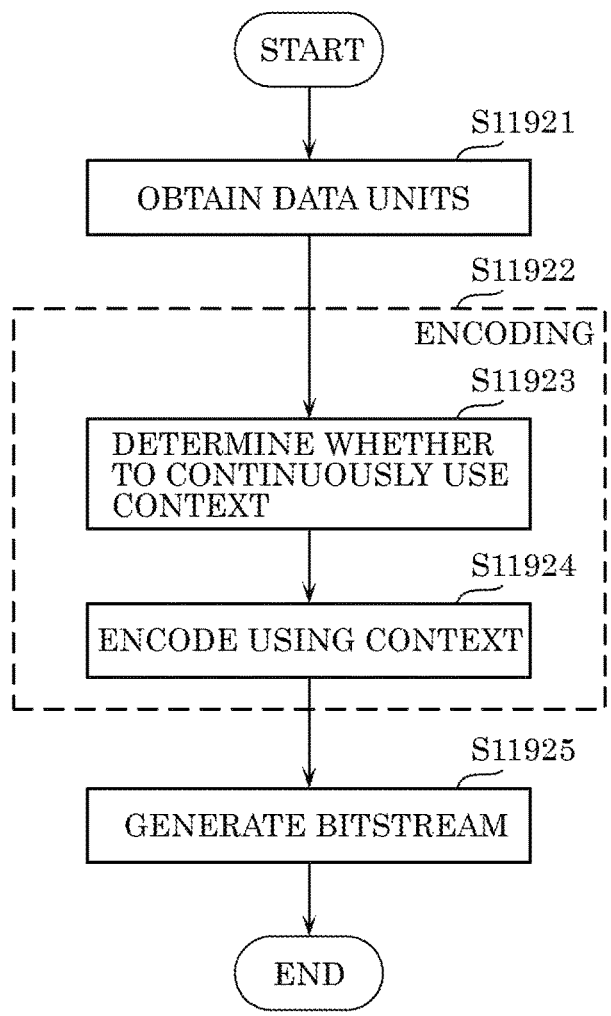
FIG. 85 is a flowchart of a process in the three-dimensional data encoding device according to Embodiment 7.

As stated above, the three-dimensional data encoding device according to one aspect of the present embodiment performs the process shown in FIG. 85. The three-dimensional data encoding device obtains a data unit including three-dimensional points (S11921). Next, the three-dimensional data encoding device encodes the three-dimensional points included in the data unit (S11922). The three-dimensional data encoding device generates a bitstream including encoded data obtained by encoding the data unit (S11925). In the encoding (S11922), the three-dimensional data encoding device makes a first determination for determining whether to continuously use a context to encode the data unit (S11923), the context being used in encoding a previous data unit preceding the data unit. Then, the three-dimensional data encoding device encodes the data unit using a context according to a result of the first determination after S11923 (S11924). In n the first determination (S11923), when the data unit is a lead data unit in a random access unit, the three-dimensional data encoding device determines not to continuously use the context used in encoding the previous data unit.

Accordingly, if the current data unit is the lead data unit in the random access unit, determination is made not to continuously use the context used in encoding the previous data unit. This enables a three-dimensional data decoding device to appropriately decode the bitstream.

For example, the random access unit is one frame unit.
For example, the random access unit is frame units.
For example, the random access unit is one tile unit.
For example, the data unit is assigned a sequential number in the random access unit. When it is determined to continuously use the context used in encoding the previous data unit in the first determination (S11923), the three-dimensional data encoding device does not reorder sequential numbers of data units in the random access unit.

For example, in the encoding, the three-dimensional data encoding device further makes a second determination for determining whether to perform encoding continuously using the context used in encoding the previous data unit. When it is determined to perform the encoding using the context used in encoding the previous data unit in the second determination, the three-dimensional data encoding device makes the first determination (S11923).

For example, each of the three-dimensional points includes geometry information and attribute information. In the encoding (S11922), when it is determined to continuously use the context used in encoding the previous data unit in the first determination (S11923), the three-dimensional data encoding device (i) encodes geometry information of the data unit continuously using a context used in encoding geometry information of the previous data unit, and (ii) encodes attribute information of the data unit continuously using a context used in encoding attribute information of the previous data unit.

For example, the three-dimensional data encoding device includes a processor and memory, and the processor performs the above process using the memory.

Figure 86:
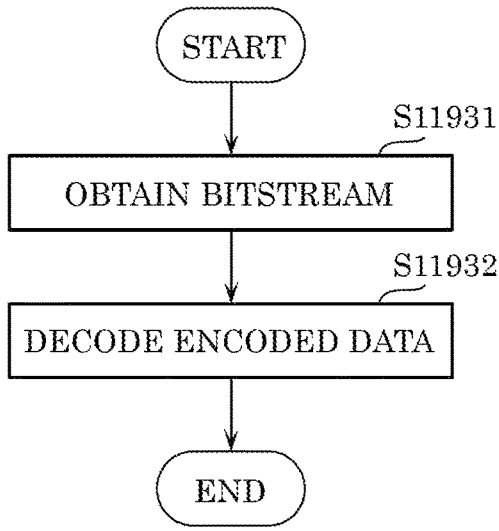
FIG. 86 is a flowchart of a process in the three-dimensional data decoding device according to Embodiment 7.

The three-dimensional data decoding device according to one aspect of the present embodiment performs the process shown in FIG. 86. The three-dimensional data decoding device obtains a bitstream including encoded data and first identification information (S11931), the encoded data being obtained by encoding a data unit including three-dimensional points, the first identification information indicating whether a context is to be continuously used to encode the data unit, the context being used in encoding a previous data unit preceding the data unit. The three-dimensional data decoding device decodes the encoded data using a context according to the first identification information (S11932). In the decoding (S11932), when the data unit is a lead data unit in a random access unit, the three-dimensional data decoding device determines that the first identification information indicating that the context used in encoding the previous data unit is not to be continuously used is a conformance condition for the bitstream (i.e., satisfies a conformance condition for the bitstream).

Thus, if the three-dimensional data decoding device determines that the conformance condition is satisfied, the three-dimensional data decoding device can appropriately decode the bitstream, for example by continuing the decoding. If the three-dimensional data decoding device determines that the conformance condition is not satisfied, the three-dimensional data decoding device can prevent inappropriate decoding of the bitstream, for example by stopping the decoding or performing a specific avoidance process.

For example, the random access unit is one frame unit.
For example, the random access unit is frame units.
For example, the random access unit is one tile unit.
For example, the data unit is assigned a sequential number in the random access unit. For example, the bitstream further includes second identification information indicating whether reordering of sequential numbers of data units in the random access unit is to be permitted. In the decoding (S11932), when the first identification information indicates that the context is not to be continuously used, and the second identification information indicates that the reordering of the sequential numbers is not to be permitted, the three-dimensional data decoding device determines that the bitstream satisfies the conformance condition.

For example, the bitstream further includes third identification information indicating whether encoding is to be performed using the context. When the third identification information indicates that the encoding is to be performed using the context, the first identification information is indicated by a header of the data unit.

For example, the encoded data includes geometry information and attribute information of the three-dimensional points encoded. In the decoding (S11932), when the first identification information indicates that the context used in encoding the previous data unit is to be continuously used, the three-dimensional data decoding device (i) calculates the geometry information of the three-dimensional points included in the data unit by performing decoding continuously using a context used in encoding geometry information of the previous data unit, and (ii) calculates the attribute information of the three-dimensional points included in the data unit by performing decoding continuously using a context used in encoding attribute information of the previous data unit.

For example, the three-dimensional data decoding device includes a processor and memory, and the processor performs the above process using the memory.

Embodiment 8

In the present embodiment, another example of the entropy encoding will be described. FIG. 87 is a diagram illustrating an example syntax of an SPS. FIG. 88 is a diagram illustrating an example syntax of an APS. FIG. 89 is a diagram illustrating an example syntax of a header of divided geometry information (DevidedGeometryHeader). FIG. 90 is a diagram illustrating an example syntax of a header of divided attribute information (DevidedAttributeHeader).

In the entropy encoding, a switching flag (identification information) for switching whether to enable a function of continuing context used for the entropy encoding for each data unit of attribute information may be provided.

The switching flag may be provided in a parameter set (SPS or APS) referred to by attribute information. Specifically, the switching flag (entropy_continue_attr_enable_flag) may be provided in an SPS as illustrated in FIG. 87 or may be provided in an APS as illustrated in FIG. 88. The entropy_continue_attr_enable_flag is a flag indicating whether to enable the function of continuing context used for encoding attribute information. The entropy_continue_attr_enable_flag may be provided in a case where an entropy_continue_enable_flag provided in an SPS is true. The entropy_continue_enable_flag is a flag indicating whether to enable a function of continuing context. An Sps.entropy_continue_enable_flag illustrated in FIG. 88 means entropy_continue_enable_flag that is signaled in an SPS.

Further, as illustrated in FIG. 89, a flag (geom_du_entropy_continue_flag) indicating whether to continue context for each data unit may be provided in a header of divided geometry information (DevidedGeometryHeader). Further, as illustrated in FIG. 90, information regarding continuation of context in a header of divided attribute information (DevidedAttributeHeader) need not be provided.

Figure 91:
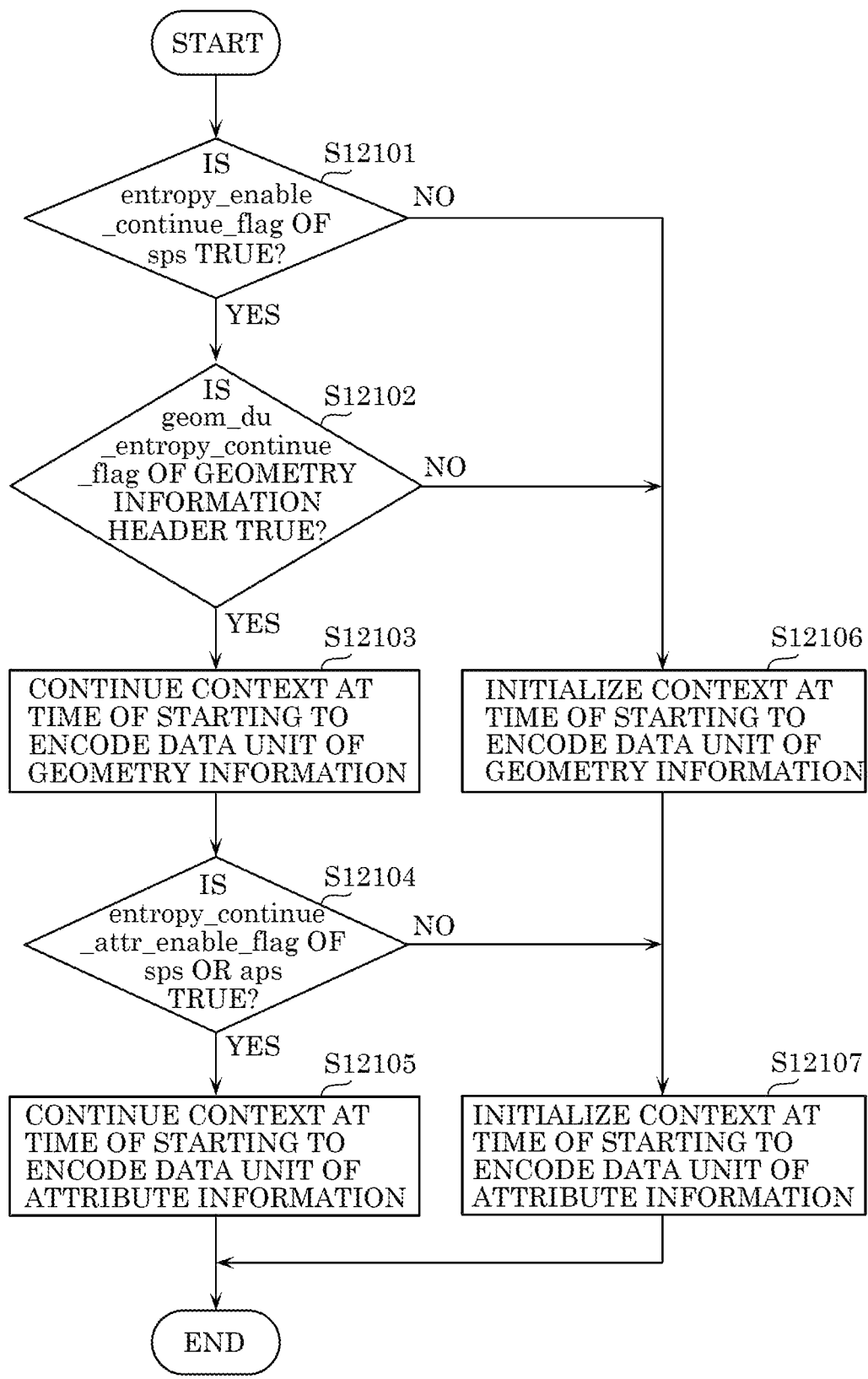
FIG. 91 is a flowchart illustrating an example of a process of determining whether to continue context used for entropy encoding in a three-dimensional data encoding device according to Embodiment 8.

Using the syntax illustrated in FIG. 87 to FIG. 90, a continuous flag for each data unit (geometry information and attribute information) may be calculated as illustrated in a flowchart in FIG. 91. FIG. 91 is a flowchart illustrating an example of a process of determining whether to continue context used for entropy encoding in a three-dimensional data encoding device.

First, the three-dimensional data encoding device determines whether an entropy_continue_enable_flag of an SPS indicates true (S12101).

When the entropy_continue_enable_flag of the SPS indicates true (Yes in S12101), the three-dimensional data encoding device determines whether a geom_du_entropy_continue_flag in a header of divided geometry information (DevidedGeometryHeader) is true (S12102).

In a case where the geom_du_entropy_continue_flag in the header of the divided geometry information (DevidedGeometryHeader) indicates true (Yes in S12102), the three-dimensional data encoding device determines to use, at the time of starting to encode a data unit of geometry information, context that is saved (retained or stored) in a storage device (memory) for a data unit of previous geometry information (S12103). That is, the three-dimensional data encoding device determines in this case to use the context used for encoding the data unit of the previous geometry information continuously.

Next, the three-dimensional data encoding device determines whether an entropy_continue_attr_enable_flag in the SPS or an APS is true (S12104).

In the case where the entropy_continue_attr_enable_flag in the SPS or the APS indicates true (Yes in S12104), the three-dimensional data encoding device determines to use, at the time of starting to encode a data unit of attribute information, context that is saved in the storage device (memory) for a data unit of previous attribute information (S12105). That is, the three-dimensional data encoding device determines in this case to use the context used for encoding the data unit of the previous attribute information continuously.

When the entropy_continue_enable_flag of the SPS indicates false (No in S12101) or when the geom_du_entropy_continue_flag in the header of the divided geometry information (DevidedGeometryHeader) indicates false (No in S12102), the three-dimensional data encoding device determines to initialize the context at the time of starting to encode the data unit of geometry information (S12106). That is, the three-dimensional data encoding device determines in this case not to use the context used for encoding the data unit of the previous geometry information continuously but initialize the context.

When the entropy_continue_attr_enable_flag of the SPS or the APS indicates false (No in S12104) or after step S12106, the three-dimensional data encoding device determines to initialize the context at the time of starting to encode the data unit of the attribute information (S12107). That is, the three-dimensional data encoding device determines in this case not to use the context used for encoding the data unit of the previous attribute information continuously but initialize the context.

Providing an entropy_continue_attr_enable_flag in an SPS enables the three-dimensional data encoding device to perform control on all attribute components in common such as all colors and reflectivities. Providing an entropy_cotinue_attr_enable_flag in an APS enables the three-dimensional data encoding device to perform control on all attribute components in common such as color and reflectivity.

The determination of whether to continue context for a data unit of attribute information may depend on a result of the determination of whether to continue context for each data unit of geometry information. In this case, a possible combination (Gometry DU, Attribute DU) of whether to continue context for a data unit of geometry information (ON/OFF) and whether to continue context for a data unit of attribute information (ON/OFF) may be any one of (ON, ON), (ON, OFF), and (OFF, OFF).

In the entropy encoding, coding performance can be improved by saving context used for encoding a previous data unit or a data unit in the storage device (memory) and applying the context saved in the storage device (memory) to the encoding of the next data unit. In a case where the entropy encoding is performed bitwise, and bitwise context is used, there is entropy context to be continued in the bitwise entropy encoding. However, in a case where the entropy encoding is performed bytewise, there is no entropy context to be continued in the bytewise entropy encoding because there is no bytewise context. Thus, the methods described above do not include a method for continuing bytewise entropy encoding.

In the present embodiment, a method for continuing entropy encoding in a case where an occupancy code is encoded bytewise in the encoding of geometry information using an N-ary tree (N is an integer greater than or equal to two; e.g., octree) will be described. Further, a method for switching between methods for continuing the entropy encoding based on an encoding scheme (bitwise encoding or bytewise encoding) will be described.

In the bytewise encoding, the three-dimensional data encoding device uses a lookup table to convert an occupancy code into index information in the table and encodes the converted index information. Here, as described in the above embodiment, the occupancy code is 8-bit information that indicates at which position in octree representation of a three-dimensional point cloud after the division one node has the next node or leaf. Hereafter, the occupancy code may be also called an occupancy map. Hereinafter, the occupancy code will be referred to as an occupancy map.

Figure 92:
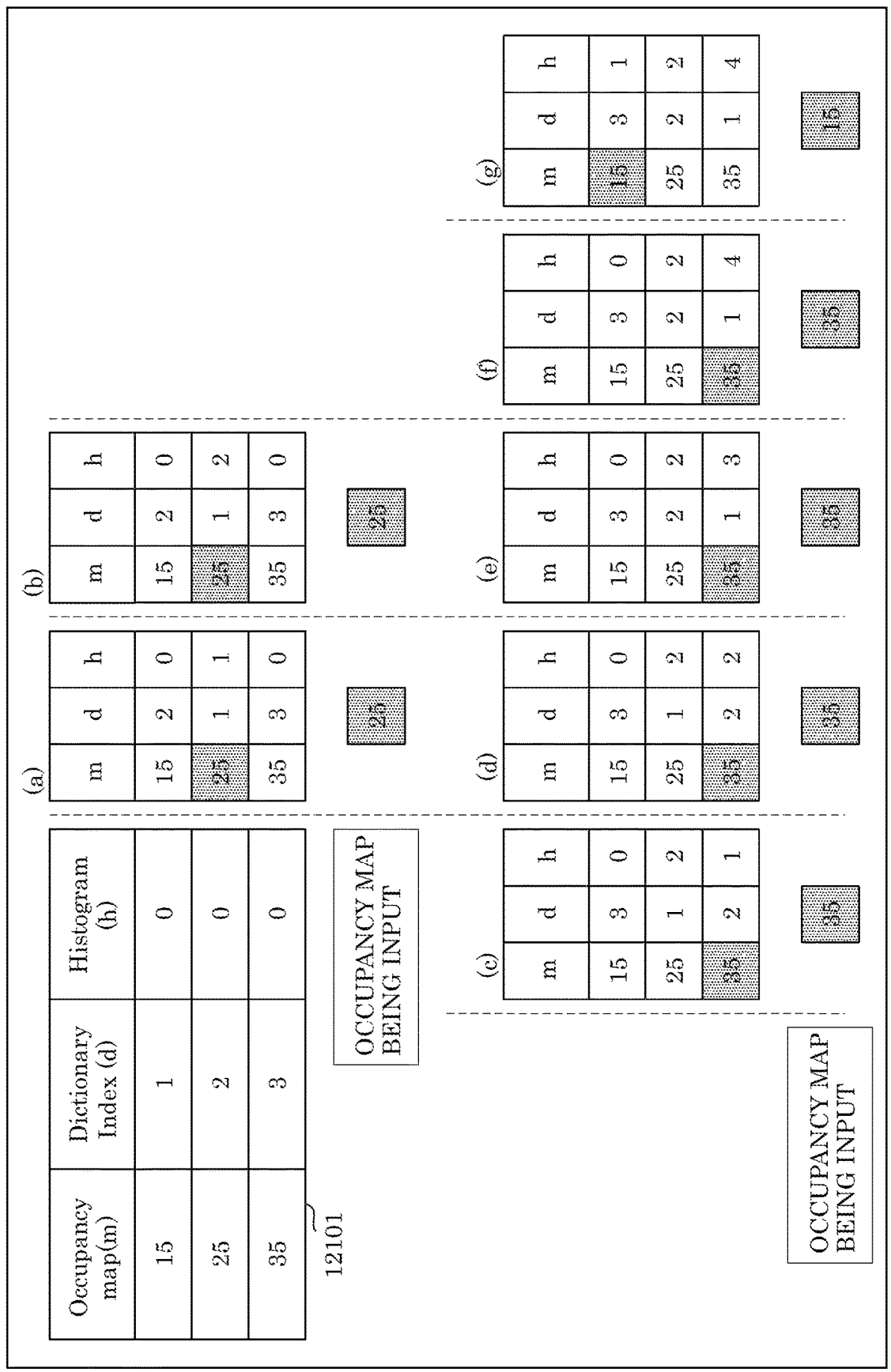
FIG. 92 is a diagram for describing how to update a table according to Embodiment 8.

FIG. 92 is a diagram for describing how to update the table.

Using table 12101 illustrated in FIG. 92, the three-dimensional data encoding device converts the occupancy map into a table indicating a relation between a histogram that shows total numbers of occurrences of occupancy maps and a dictionary index that shows an order of the total numbers of occurrences. In FIG. 92, the occupancy map is denoted as m, the dictionary index is denoted as d, and the histogram is denoted as h. Although FIG. 92 illustrates an example of the table of three occupancy maps: 15, 25, or 35. However, the table is not limited to this and may be of four or more occupancy maps.

The three-dimensional data encoding device updates the table every time an occupancy map is encoded. When encoding an occupancy map, the three-dimensional data encoding device adds one to a value corresponding to the occupancy map in the histogram. For example, as illustrated in (a) of FIG. 92, when an input occupancy map indicates 25, the three-dimensional data encoding device adds one to a value corresponding to an occupancy map of 25 in the histogram.

Next, based on the updated histogram, the three-dimensional data encoding device updates the dictionary index. That is, based on the updated total numbers of occurrences of occupancy maps, the three-dimensional data encoding device gives (sets) the order of the total numbers of occurrences in the form of the dictionary index. Note that the dictionary index is only required to indicate a total number of occurrences of an occupancy map or an occurrence frequency of an occupancy map.

For example, as illustrated in (a) of FIG. 92, after updating a value in the histogram, the three-dimensional data encoding device sets 2 to an index corresponding to an occupancy map of 15, sets 1 to an index corresponding to an occupancy map of 25, and sets 3 to an index corresponding to an occupancy map of 35 so as to give indexes in descending order of values in the updated histogram. Note that the value of an occupancy map of 15 in the histogram and the value of an occupancy map of 35 in the histogram are the same, and in this case, a smaller value may be set to an index of a smaller occupancy map. This is not limitative; a larger value may be set to the index of a smaller occupancy map.

In (b) of FIG. 92, an occupancy map of 25 is input, in each of (c) to (f) of FIG. 92, an occupancy map of 35 is input, and in (g) of FIG. 92, an occupancy map of 15 is input. When each of the occupancy maps is input, the three-dimensional data encoding device adds one to a value corresponding to the input occupancy map in the histogram and gives the dictionary index in descending order of calculated values in the histogram. Therefore, a smaller value of an occupancy map in the dictionary index means that the occupancy map has a higher occurrence frequency (input frequency).

Next, the three-dimensional data encoding device encodes index information indicating the dictionary index being set. In the bytewise encoding, the three-dimensional data encoding device can reduce code amount by converting occupancy maps into index information.

In this manner, the three-dimensional data encoding device derives index information for occupancy maps using the table and encodes the derived index information. The three-dimensional data encoding device then updates the table saved in the storage device (memory) to a table indicating a relation between the updated histogram and the index being set.

From an encoded bitstream, the three-dimensional data decoding device decodes index information included in the encoded bitstream and derives occupancy maps using a table saved in a storage device (memory) by the same method as used by the three-dimensional data encoding device. The three-dimensional data decoding device then updates the table by the same method as used by the three-dimensional data encoding device.

The histogram and the index information in the table may be updated until the encoding of occupancy maps in a slice (data unit) is completed and may be initialized at the beginning of the next slice. Further, the table used at the end of a slice may be stored, and the stored table may be continuously used in the encoding of the next slice. In the bytewise entropy encoding, a table that is learned for a previous slice is continuously used in the encoding of the next slice, from which the improvement in the encoding can be expected. As seen from the above, the bitwise encoding and the bytewise encoding are different from each other in that context is continuously used in the bitwise encoding, while a table is continuously used in the bytewise encoding.

Although the description is given with the bytewise encoding taken as an example, this is not limitative. The technique is also applicable to a case where a table is used for a histogram (occupancy map, etc.) for counting occurrences of values, rather than using context, and applicable to another type of additional information that is used for the encoding, such as learning parameters. Further, the technique is applicable not only to the encoding of geometry information but also to the encoding of attribute information. Even in a case where additional information is saved in a storage device (memory), and the saved additional information is applied to the next data unit, the improvement in coding efficiency can be expected.

Figure 93:
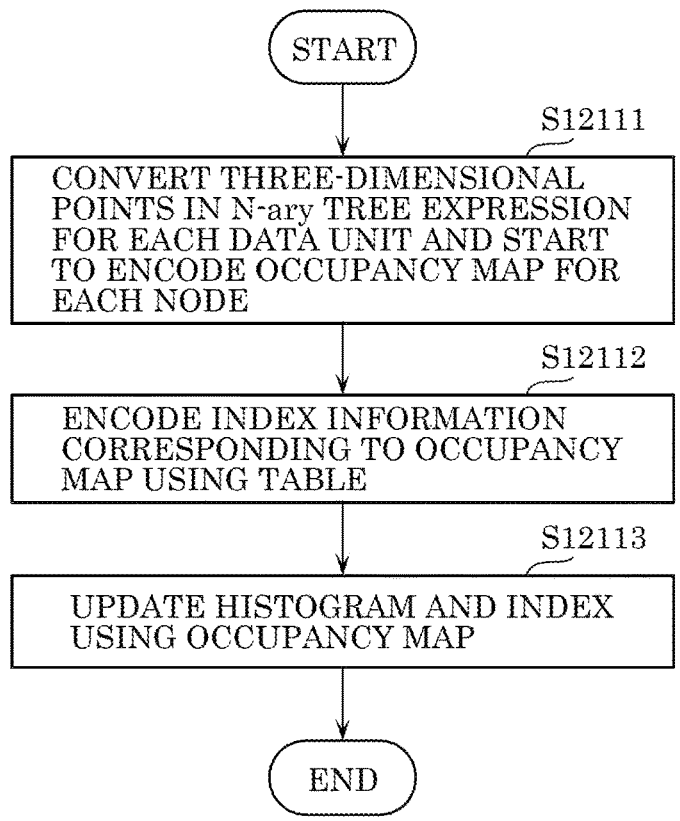
FIG. 93 is a flowchart of encoding an occupancy map by the three-dimensional data encoding device according to Embodiment 8.

FIG. 93 is a flowchart of encoding an occupancy map by the three-dimensional data encoding device.

For each data unit, the three-dimensional data encoding device converts three-dimensional points into N-ary tree expression and starts the encoding of an occupancy map for each node (S12111). For each of three-dimensional points included in a data unit to be processed, the three-dimensional data encoding device generates occupancy maps by converting geometry information of the three-dimensional point into N-ary tree expression (e.g., octree representation). That is, the three-dimensional data encoding device uses an octree to convert geometry information items on the three-dimensional points in the data unit to be encoded into a plurality of occupancy maps.

Next, the three-dimensional data encoding device uses the table to generate index information items corresponding to occupancy maps and encodes the generated index information items (S12112). The three-dimensional data encoding device converts each of the occupancy maps into an index using a table that indicates a correspondence relation between occupancy maps and indexes and encodes the indexes to generate encoded data.

Next, the three-dimensional data encoding device updates the histogram and the indexes using the occupancy maps, thus updating a table saved in a storage device (memory) (S12113). The three-dimensional data encoding device updates the table based on the converted index and stores the table in the memory.

Figure 94:
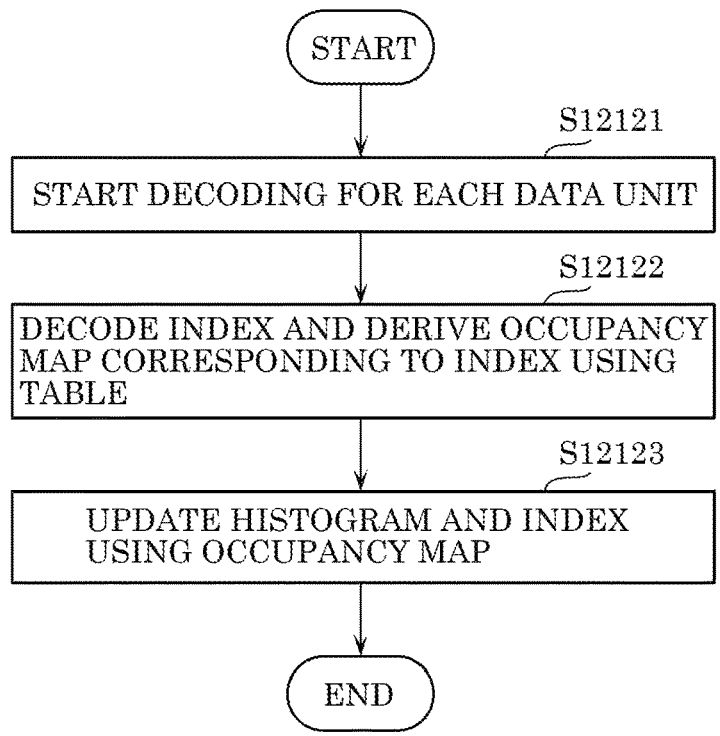
FIG. 94 is a flowchart of decoding an occupancy map by a three-dimensional data decoding device according to Embodiment 8.

FIG. 94 is a flowchart of decoding an occupancy map by the three-dimensional data decoding device.

For each data unit in a bitstream, the three-dimensional data decoding device starts a decoding process (S12121). The bitstream includes, for example, encoded data obtained by encoding a data unit including three-dimensional points and first identification information indicating whether a table used in encoding a data unit preceding the data unit is to be initialized and used to encode the data unit.

Next, the three-dimensional data decoding device decodes encoded index information items included in a bitstream and uses the decoded index information items and a table saved in a storage device (memory) to derive occupancy maps corresponding to indexes indicated by the index information items (S12122). That is, the three-dimensional data decoding device calculates the geometry information of the three-dimensional points by deriving an occupancy map corresponding to, in the table, the index obtained by decoding the encoded data.

Next, the three-dimensional data decoding device updates the histogram and the indexes using the occupancy maps, thus updating the table saved in the storage device (memory) (S12123).

Figure 95:
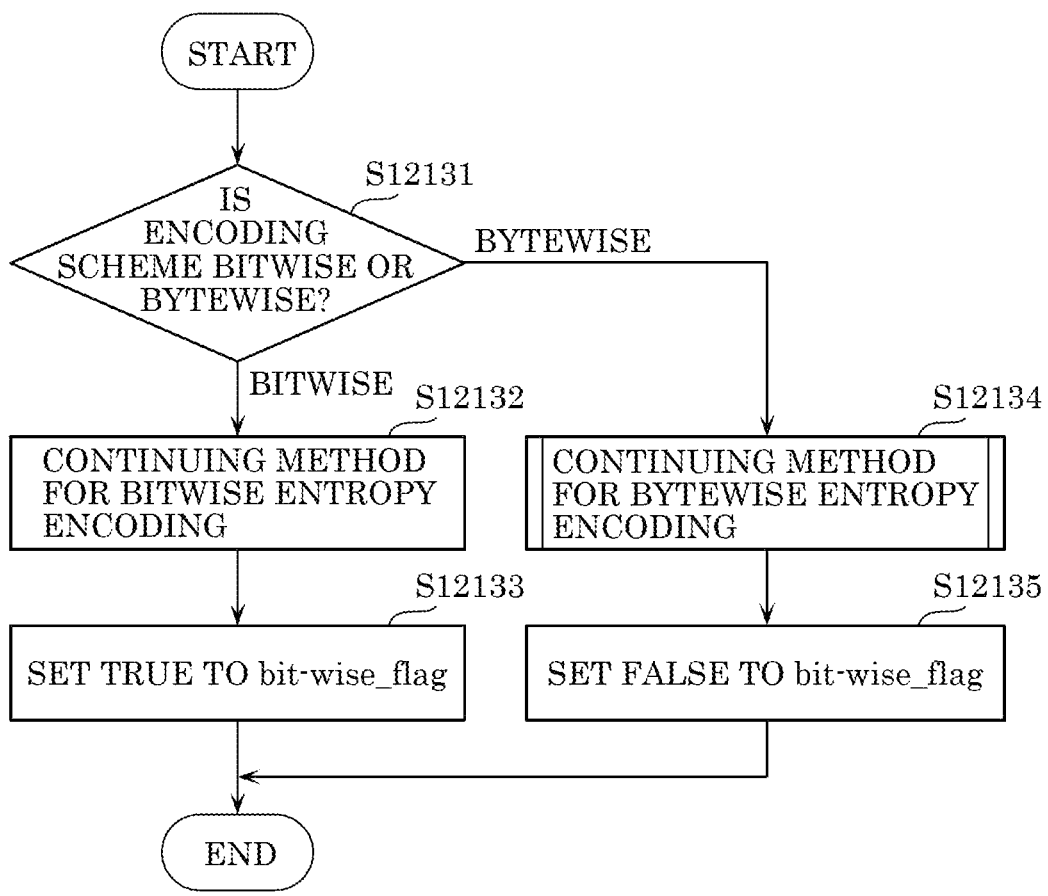
FIG. 95 is a flowchart of a process of switching between entropy encoding schemes in the three-dimensional data encoding device according to Embodiment 8.

FIG. 95 is a flowchart of a process of switching between entropy encoding schemes in the three-dimensional data encoding device.

The three-dimensional data encoding device determines the encoding scheme is bitwise or bytewise (S12131).

When determining the encoding scheme is bitwise ("bitwise" in S12131), the three-dimensional data encoding device performs the encoding by a continuing method for the bitwise entropy encoding (S12132).

The three-dimensional data encoding device sets true to a flag (bit-wise_flag) indicating whether the encoding scheme is bitwise or not (bytewise) (S12133). The three-dimensional data encoding device generates a bitstream including the flag and transmits the bitstream to the three-dimensional data decoding device.

When determining the encoding scheme is bytewise ("bytewise" in S12131), the three-dimensional data encoding device performs the encoding by a continuing method for the bytewise entropy encoding (S12134).

The three-dimensional data encoding device sets false to a flag (bit-wise_flag) indicating whether the encoding scheme is bitwise or not (bytewise) (S12133). The three-dimensional data encoding device generates a bitstream including the flag and transmits the bitstream to the three-dimensional data decoding device.

Figure 96:
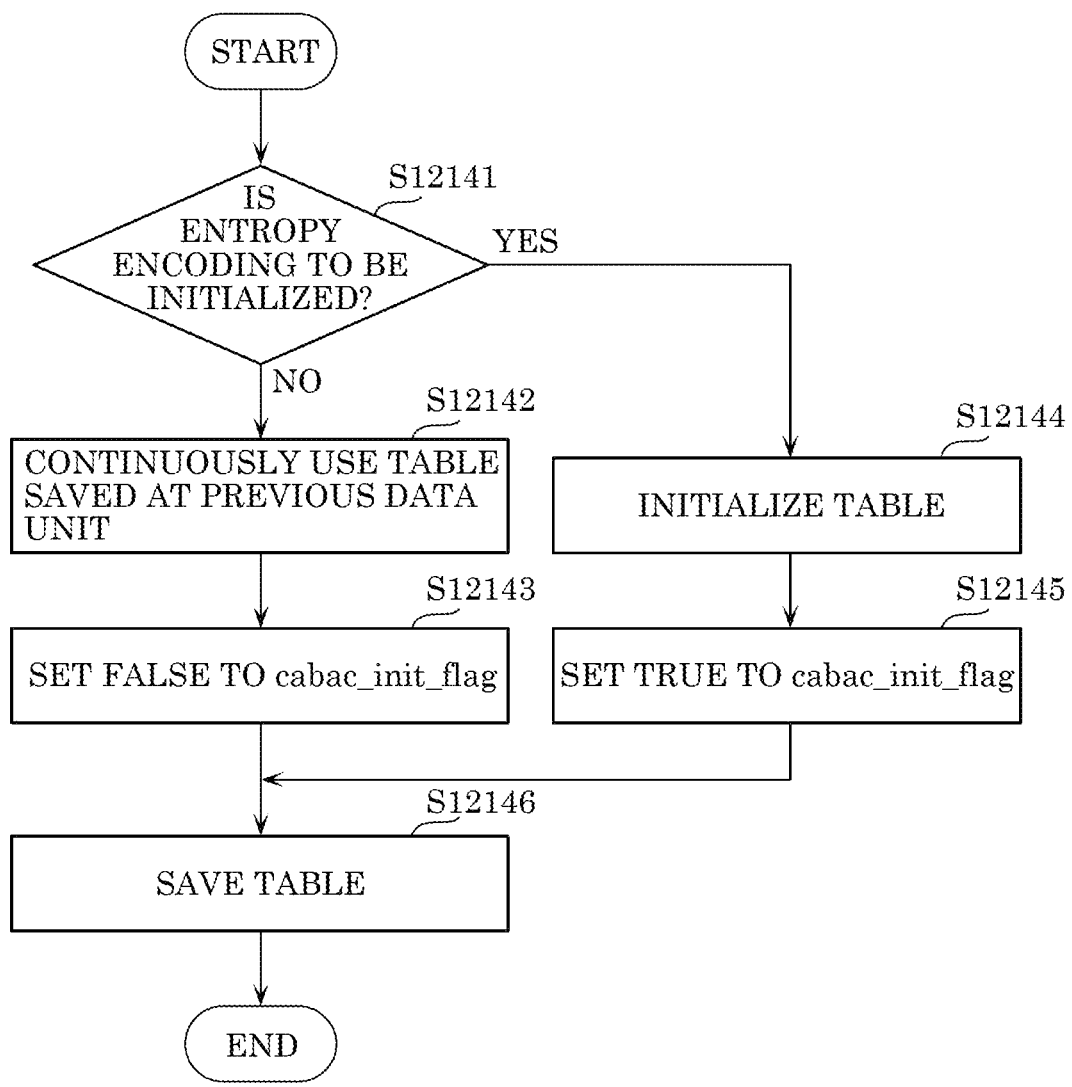
FIG. 96 is a flowchart of the continuing method for bytewise entropy encoding in the three-dimensional data encoding device according to Embodiment 8.

FIG. 96 is a flowchart of the continuing method for the bytewise entropy encoding in the three-dimensional data encoding device.

The three-dimensional data encoding device determines whether to initialize the entropy encoding (S12141). The three-dimensional data encoding device determines whether to initialize a table used for the bytewise entropy encoding, that is, whether to use the table continuously.

When determining not to initialize the entropy encoding (No in S12142), that is, when determining to use the table continuously, the three-dimensional data encoding device performs the encoding continuously using a table that is saved in a storage device (memory) in the encoding of a previous data unit (S12142).

Next, the three-dimensional data encoding device sets false to cabac_init_flag (S12143). That is, the three-dimensional data encoding device sets a value indicating that the table is used continuously to a flag (identification information) indicating whether the table is to be used continuously.

When determining to initialize the entropy encoding (Yes in S12142), that is, when determining not to use the table continuously, the three-dimensional data encoding device initializes the table saved in the storage device (memory) in the encoding of the previous data unit and performs the encoding (S12144).

Next, the three-dimensional data encoding device sets true to cabac_init_flag (S12145). That is, the three-dimensional data encoding device sets a value indicating that the table is not used continuously to a flag (identification information) indicating whether the table is to be used continuously.

The three-dimensional data encoding device updates the table based on the entropy encoding and saves the updated table in the storage device (memory) (S12146).

Figure 97:
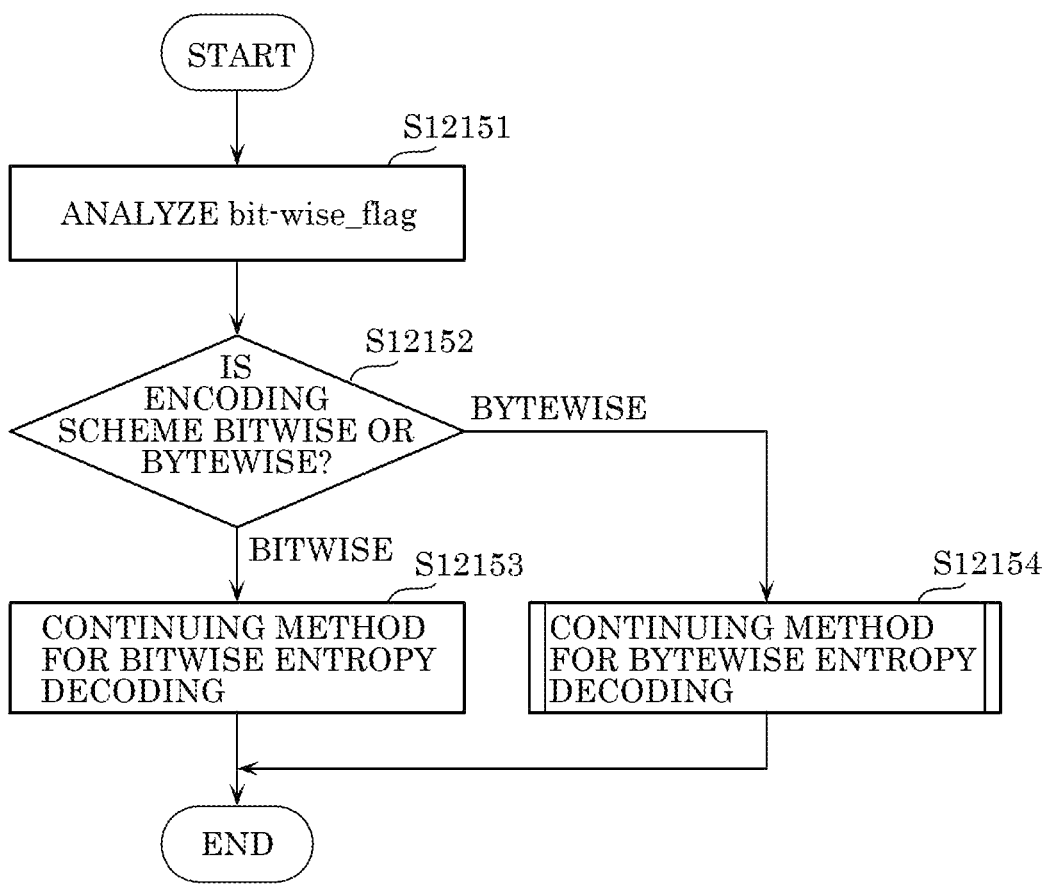
FIG. 97 is a flowchart of a process of switching between entropy decoding schemes in the three-dimensional data decoding device according to Embodiment 8.

FIG. 97 is a flowchart of a process of switching between entropy decoding schemes in the three-dimensional data decoding device.

The three-dimensional data decoding device analyzes bit-wise_flag corresponding to a data unit to be decoded included in a bitstream (S12151).

Next, the three-dimensional data decoding device determines, as a result of the analysis, whether the encoding scheme of the data unit to be decoded is bitwise or bytewise (S12152). That is, the three-dimensional data decoding device determines whether bit-wise_flag corresponding to the data unit to be decoded indicates true.

When the encoding scheme of the data unit to be decoded is bitwise, that is, when bit-wise_flag indicates true, the three-dimensional data decoding device performs the decoding by the continuing method for bitwise entropy encoding (S12153).

When the encoding scheme of the data unit to be decoded is bytewise, that is, when bit-wise_flag indicates false, the three-dimensional data decoding device performs the decoding by the continuing method for bytewise entropy encoding (S12154).

Figure 98:
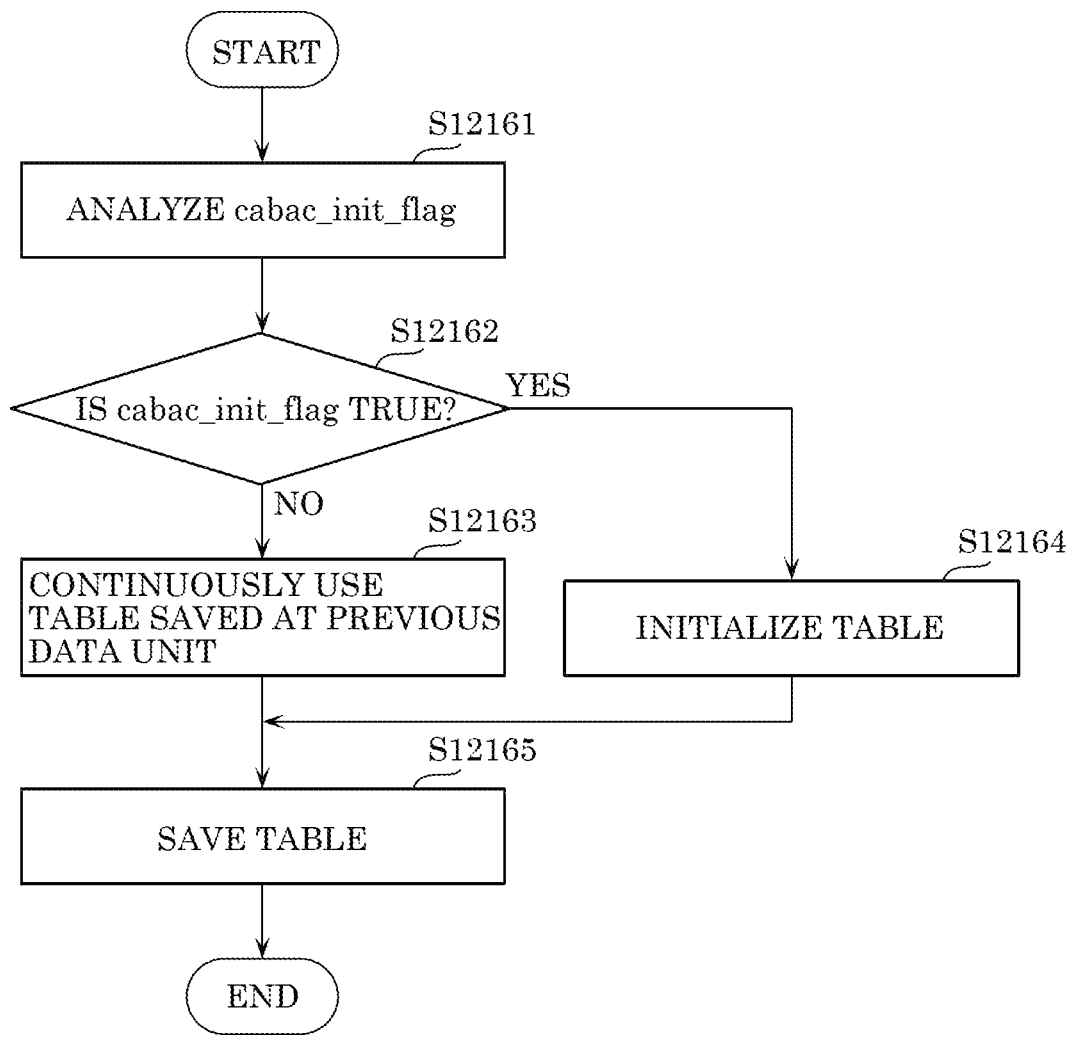
FIG. 98 is a flowchart of the continuing method for bytewise entropy decoding in the three-dimensional data decoding device according to Embodiment 8.

FIG. 98 is a flowchart of the continuing method for the bytewise entropy decoding in the three-dimensional data decoding device.

The three-dimensional data decoding device analyzes cabac_init_flag included in a bitstream (S12161).

Next, the three-dimensional data decoding device determines whether cabac_init_flag indicates true (S12162).

When cabac_init_flag indicates false (No in S12162), the three-dimensional data decoding device performs the decoding continuously using a table that is saved in a storage device (memory) in the decoding of a previous data unit (S12163).

When cabac_init_flag indicates true (Yes in S12162), the three-dimensional data decoding device initializes the table saved in the storage device (memory) in the decoding of the previous data unit and performs the decoding (S12164).

The three-dimensional data decoding device updates the table based on the entropy decoding and saves the updated table in the storage device (memory) (S12165).

Figure 99:
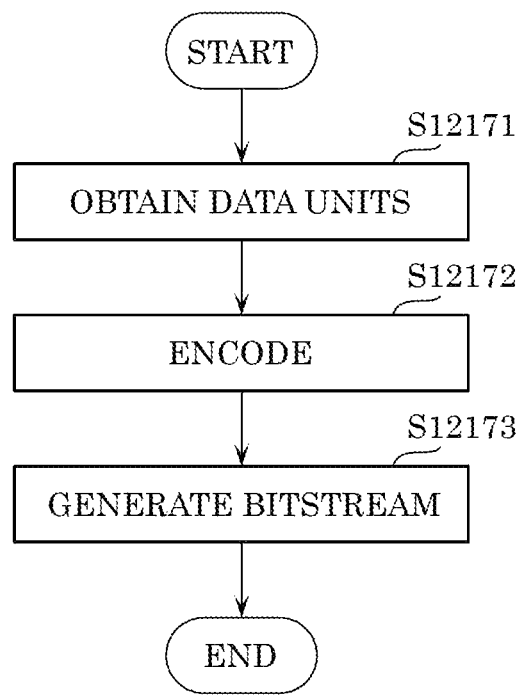
FIG. 99 is a flowchart of processing by a three-dimensional data encoding device according to Embodiment 8.

As stated above, the three-dimensional data encoding device according to one aspect of the present embodiment performs the process shown in FIG. 99. The three-dimensional data encoding device obtains data units each including three-dimensional points (S12171). Next, the three-dimensional data encoding device encodes the three-dimensional points included in each of the data units (S12172). Then, the three-dimensional data encoding device generates a bitstream including encoded data obtained by encoding the three-dimensional points (S12173). In the encoding (S12172), the three-dimensional data encoding device converts geometry information of three-dimensional points included in a data unit to be encoded into occupancy maps using an N-ary tree, N being an integer greater than or equal to 2; converts each of the occupancy maps into an index using a table indicating a correspondence relation between occupancy maps and indexes, and generates the encoded data by encoding the index; updates the table according to the index resulting from the conversion, and stores the table into memory; determines whether the table stored in the memory is to be initialized, when a lead three-dimensional point included in a next data unit following the data unit to be encoded is encoded; and when it is determined that the table stored in the memory is not to be initialized, starts encoding of the next data unit using the table stored in the memory. The bitstream further includes first identification information indicating a result of the determination.

Accordingly, since the index obtained using the table is encoded in the encoding of an occupancy map into which geometry information is converted, and a bitstream including the first identification information indicating whether the table used for the encoding is to be initialized is generated, the three-dimensional data decoding device is thus enabled to decode the bitstream appropriately.

For example, the index indicates a total number of occurrences of an occupancy map or an occurrence frequency of an occupancy map. Accordingly, coding efficiency can be improved by, for example, setting a smaller value to the index as the total number of occurrences or the occurrence frequency increases.

For example, when indicating that the table is to be initialized, the first identification information indicates that context of a preceding data unit is to be initialized, and attribute information of the three-dimensional points is to be encoded; and when indicating that the table is not to be initialized, the first identification information indicates that the attribute information is to be encoded continuously using the context of the preceding data unit.

For example, the bitstream further includes second identification information indicating whether a function of continuing entropy between the data units is to be used. When the second identification information indicates that the function of continuing the entropy between the data units is to be used, the first identification information is shown.

For example, the three-dimensional data encoding device includes a processor and memory. Using the memory, the processor performs the above process.

Figure 100:
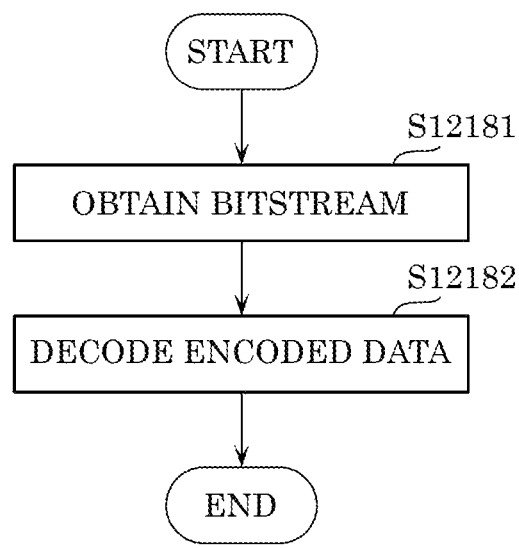
FIG. 100 is a flowchart of processing by a three-dimensional data decoding device according to Embodiment 8.

The three-dimensional data decoding device according to one aspect of the present embodiment performs the process shown in FIG. 100. The three-dimensional data decoding device obtains a bitstream including encoded data and first identification information, the encoded data being obtained by encoding a data unit including three-dimensional points, the first identification information indicating whether a table is to be initialized and used to encode the data unit, the table being used in encoding a preceding data unit preceding the data unit (S12181). The three-dimensional data decoding device decodes the encoded data using the table according to the first identification information (S12182). The table indicates a correspondence relation between occupancy maps and indexes, the occupancy map representing geometry information of the three-dimensional points using an N-ary tree, N being an integer greater than or equal to 2. The encoded data includes the index encoded. In the decoding (S12182), the three-dimensional data decoding device calculates the geometry information of the three-dimensional points by deriving an occupancy map corresponding to, in the table, the index obtained by decoding the encoded data.

Accordingly, since the occupancy map can be derived using the index obtained by decoding the encoded data and the table corresponding to the first identification information, it is possible to cause the three-dimensional data decoding device to decode the bitstream appropriately.

For example, the index indicates a total number of occurrences of an occupancy map or an occurrence frequency of an occupancy map.

For example, when indicating that the table is to be initialized, the first identification information indicates that context of a preceding data unit is to be initialized, and attribute information of the three-dimensional points is to be encoded; and when indicating that the table is not to be initialized, the first identification information indicates that the attribute information is to be encoded continuously using the context of the preceding data unit.

For example, the bitstream further includes second identification information indicating whether a function of continuing entropy between the data units is to be used. When the second identification information indicates that the function of continuing the entropy between the data units is to be used, the first identification information is shown.

For example, the three-dimensional data decoding device includes a processor and memory. Using the memory, the processor performs the above process.

Embodiment 9

In a case where point cloud data items are divided into data units (slices), when CABAC has been initialized, the data units have no dependences on one another and can be encoded or decoded independently. However, the current data structure of a data unit (slice) does not support a function of parallel processing on data.

Therefore, in the prediction-tree encoding, a function that is capable of parallel processing on data blocks in a data unit (slice) is provided by adding a function of initializing a context on a prediction tree basis in a data item in each data unit (slice) and adding an information item for accessing a block of one or more prediction trees.

Figure 101:
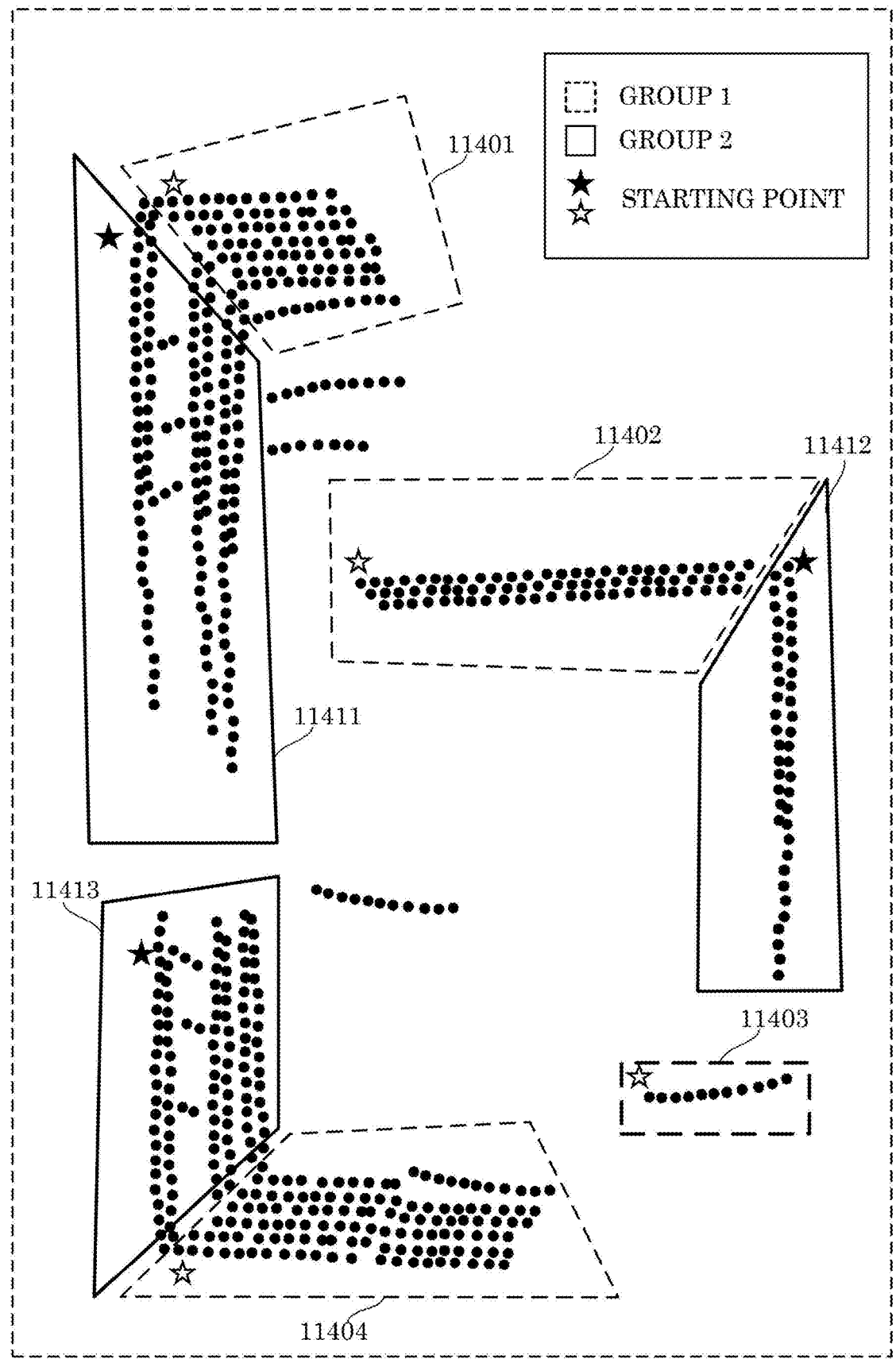
FIG. 101 is a diagram illustrating an example of a three-dimensional point cloud in a case where encoding is performed with the three-dimensional point cloud divided into slices for groups according to Embodiment 9.
Figure 102:
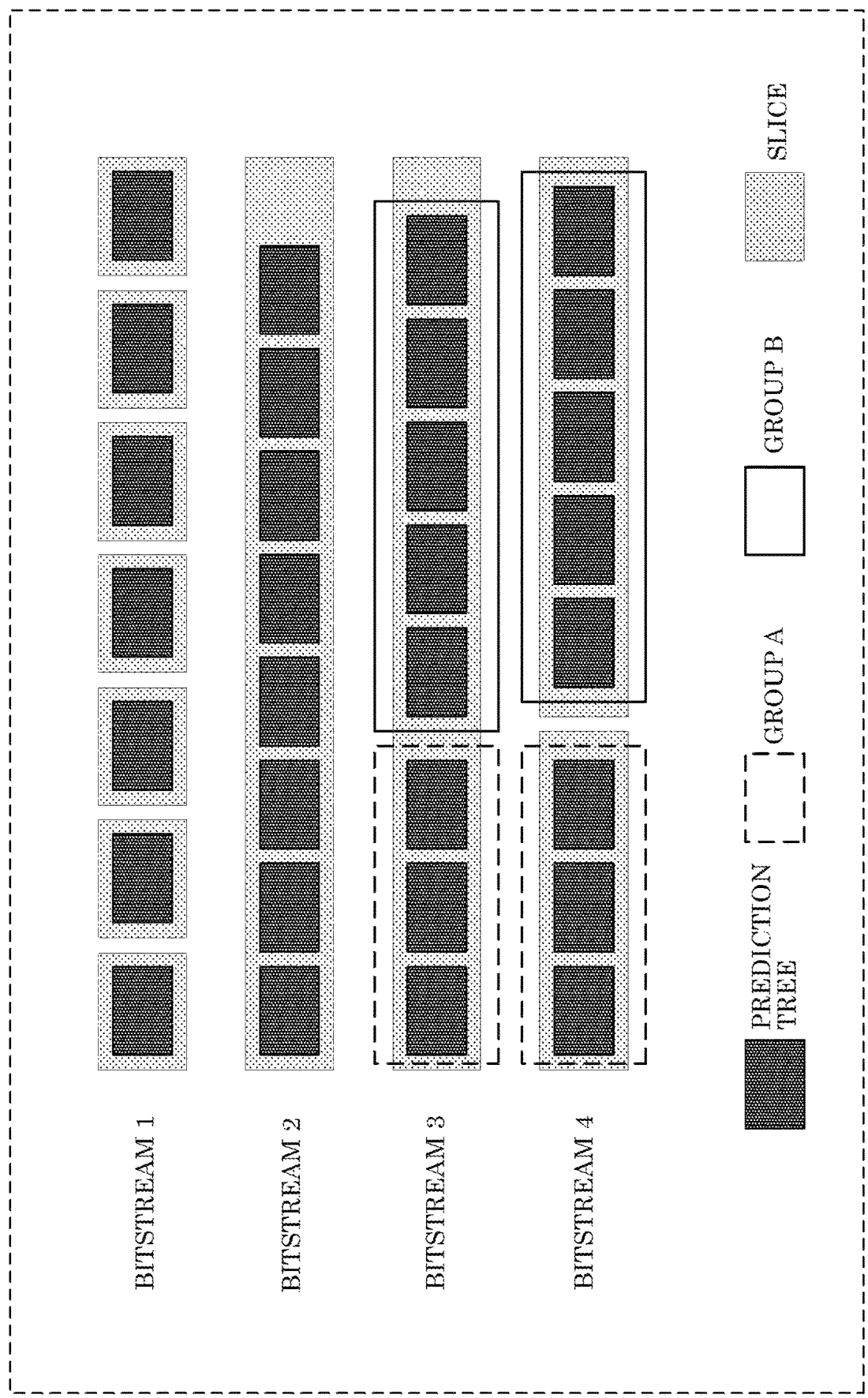
FIG. 102 is a diagram illustrating various configuration examples of a bitstream according to Embodiment 9.

FIG. 101 is a diagram illustrating an example of a three-dimensional point cloud in a case where encoding is performed with the three-dimensional point cloud divided into slices for groups. FIG. 102 is a diagram illustrating various configuration examples of a bitstream.

As illustrated in FIG. 101, the three-dimensional point cloud may be divided into data units 11401 to 11404 and 11411 to 11413. Further, of data units 11401 to 11404 and 11411 to 11413, data units 11401 to 11404 may be grouped into group 1, and data units 11411 to 11413 may be grouped into group 2.

Next, a relation between slices and prediction trees will be described with reference to FIG. 102.

The three-dimensional data encoding device may encode a data unit of one slice with one prediction tree as in bitstream 1 or may encode a data unit of one slice with prediction trees as in bitstream 2. Alternatively, in a case where a point cloud can be clustered or grouped based on properties of the point cloud, the three-dimensional data encoding device may perform encoding with slices divided into by groups as in bitstream 4 or may perform encoding without the division into slices as in bitstream 3. In a case where a bitstream is not divided into slices for encoding, the three-dimensional data encoding device may arrange the point cloud in such a manner that the point cloud is in order of groups and may perform the encoding using a prediction tree for each group.

Figure 103:
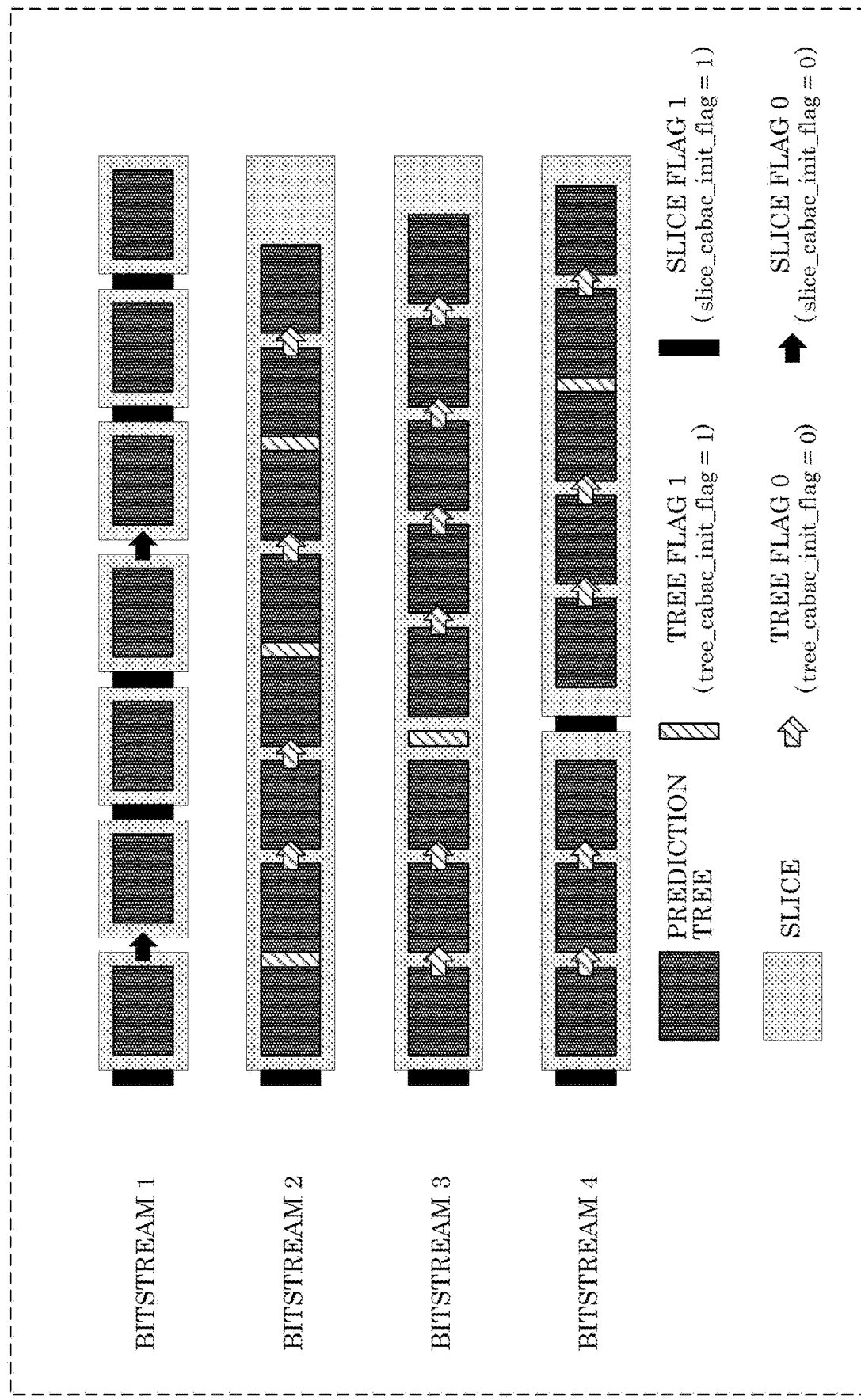
FIG. 103 illustrates an example in which whether to initialize slice-based CABAC is indicated by a slice flag, and whether to initialize tree-based CABAC in a slice is indicated by a tree flag according to Embodiment 9.

FIG. 103 illustrates an example in which whether to initialize slice-based CABAC is indicated by a slice flag (slice_cabac_init_flag), and whether to initialize tree-based CABAC in a slice is indicated by a tree flag (tree_cabac_init_flag). Bitstream 1 to 4 in FIG. 103 are the same as bitstream 1 to 4 in FIG. 102.

When initializing CABAC at a beginning of each processing block, the three-dimensional data encoding device sets slice_cabac_init_flag or tree_cabac_init_flag to one and transmits slice_cabac_init_flag or tree_cabac_init_flag set to one as metadata. It should be noted that slice_cabac_init_flag or tree_cabac_init_flag set to one indicates that CABAC is to be initialized at a beginning of each processing block. Slice_cabac_init_flag is an initialization flag for controlling the initialization of CABAC on a slice basis. Tree_cabac_init_flag is an initialization flag for controlling the initialization of CABAC on a tree structure basis.

The three-dimensional data decoding device analyzes the metadata, and when slice_cabac_init_flag or tree_cabac_init_flag is one, the three-dimensional data decoding device initializes CABAC. FIG. 103 illustrates that CABAC has been initialized when tree_cabac_init_flag indicates one or slice_cabac_init_flag indicates one, and illustrates that CABAC has not been initialized and a context is continued (i.e., the context is continuously used) when tree_cabac_init_flag indicates zero or slice_cabac_init_flag indicates zero.

Setting tree_cabac_init_flag enables CABAC to be initialized on a prediction tree basis. Setting tree_cabac_init_flag enables reset at a beginning of a given prediction tree; for example, tree_cabac_init_flag may be set such that, for example, CABAC is initialized at a beginning of each group. Alternatively, tree_cabac_init_flag may be set such that CABAC is initialized at a boundary at which encoding parameters for a prediction tree are changed. It should be noted that, in a case where an initialization flag is provided for each slice, a tree-structure-based initialization flag at a beginning of the slice need not be provided.

Prediction tables for specific groups have properties that are similar to each other between the groups, and thus continuing CABAC increases the possibility of improving encoding efficiency. Therefore, in bitstream 3, the initialization flag may be set such that CABAC is initialized at a beginning of each group so that CABAC is continued in the same group.

Figure 104:
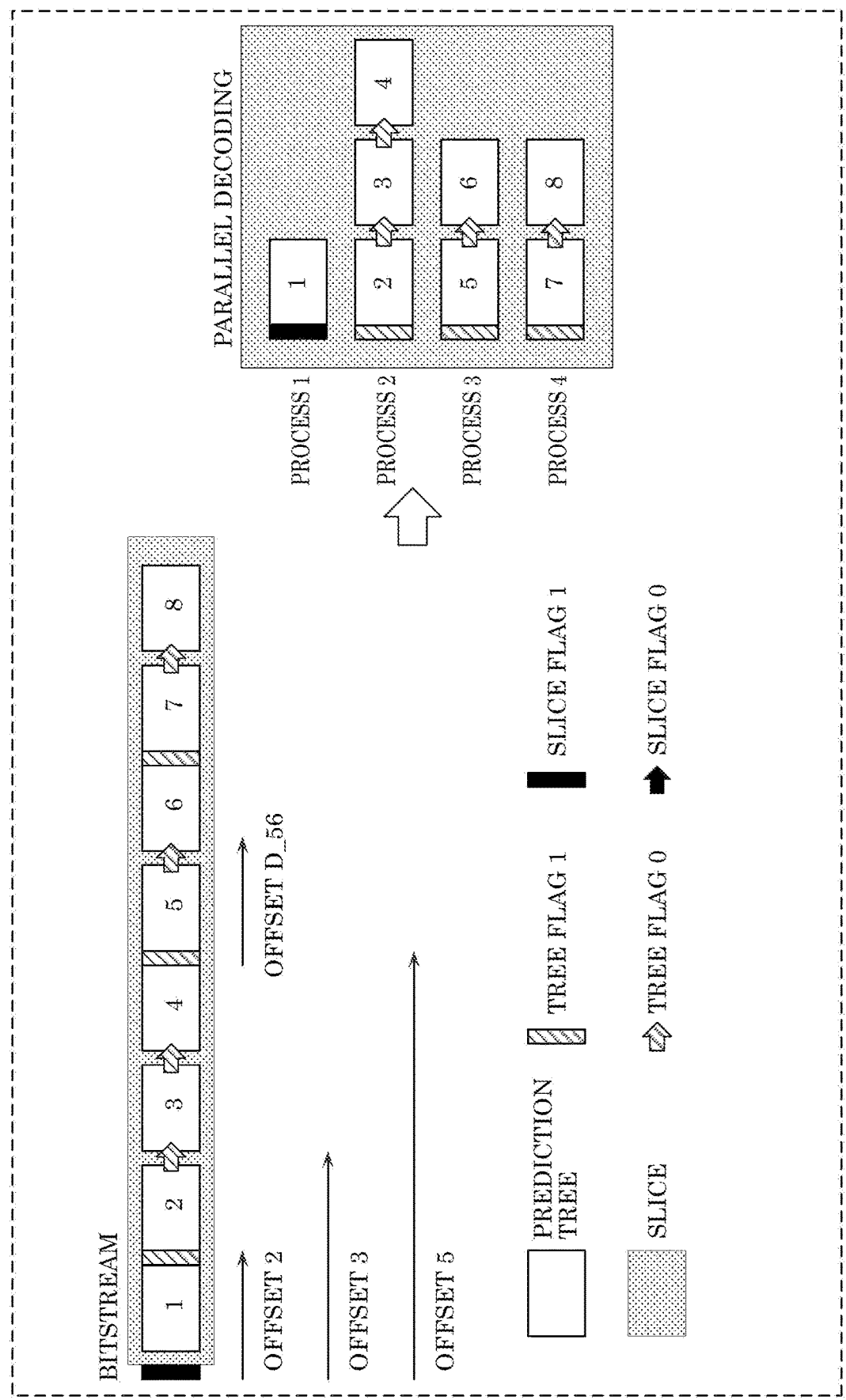
FIG. 104 is a diagram for describing a method of decoding prediction trees by parallel processing according to Embodiment 9.

FIG. 104 is a diagram for describing a method of decoding prediction trees by parallel processing.

FIG. 104 illustrates a bitstream in which CABAC is initialized at a beginnings of prediction trees 1, 2, 5, and 7 in one slice. In such a bitstream, the three-dimensional data decoding device can handle a decoding process on prediction tree 1, a decoding process on prediction trees 2 to 4, a decoding process on prediction trees 5 and 6, and a decoding process on prediction trees 7 and 8, independently. In order for the three-dimensional data decoding device to perform the parallel processing, the three-dimensional data decoding device needs to directly access storage locations of data units in a memory that allow the data units to be decoded independently. Thus, the three-dimensional data encoding device includes an offset information item of a beginning of an encoded data (an information item indicating a storage location) in the encoded data item. The offset information item is, for example, an information item of bytes from a beginning of a slice. In FIG. 104, an offset information item indicated by offset 2 is the number of bytes from a beginning of the slice to an encoded data item of prediction tree 2. The offset information item may be provided for each prediction tree or may be provided for each block of one or more prediction trees that are processed independently. Further, as with offset D_56, the offset information item may be provided in terms of the number of bytes of a difference of prediction tree 6 from a beginning of prediction tree 5, which is immediately before prediction tree 6.

Figure 105:
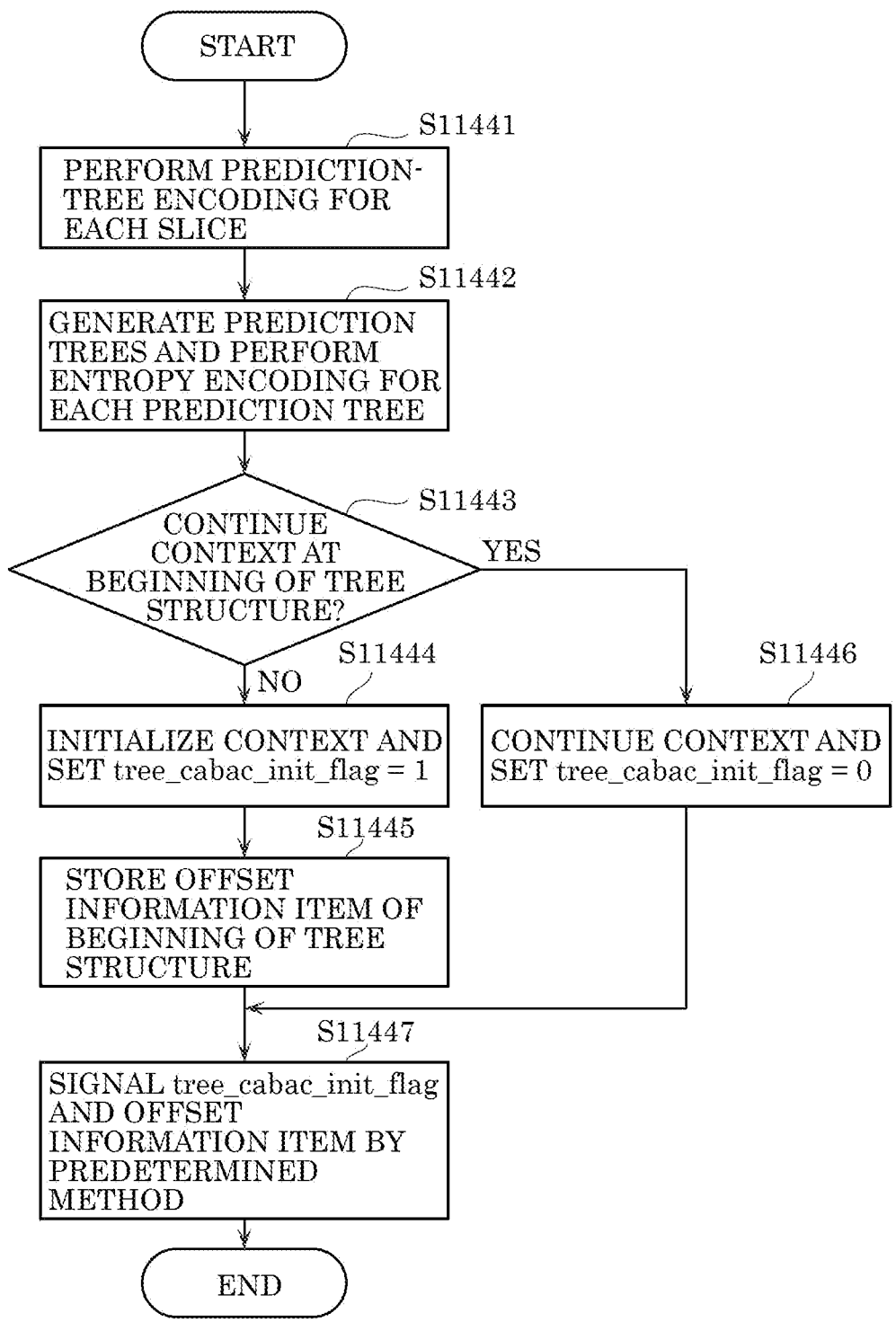
FIG. 105 is a diagram illustrating an example of a three-dimensional data encoding method according to Embodiment 9.

FIG. 105 is a diagram illustrating an example of a three-dimensional data encoding method.

The three-dimensional data encoding device executes the prediction-tree encoding for each slice (S11441).

Next, the three-dimensional data encoding device generates prediction trees and executes entropy encoding for each prediction tree (S11442).

Next, the three-dimensional data encoding device determines whether to continue a context at a beginning of a tree structure (prediction tree) (S11443).

When it is determined not to continue the context at the beginning of the tree structure (prediction tree) (No in S11443), the three-dimensional data encoding device initializes the context and sets tree_cabac_init_flag to one (S11444).

Next, the three-dimensional data encoding device stores an offset information item of the beginning of the tree structure (an information item indicating a storage location) (S11445).

In contrast, when it is determined to continue the context at the beginning of the tree structure (prediction tree) (Yes in S11443), the three-dimensional data encoding device continues the context and sets tree_cabac_init_flag to zero (S11446).

Next, the three-dimensional data encoding device signals at least tree_cabac_init_flag, out of tree_cabac_init_flag and the offset information item, by a predetermined method (S11447).

Figure 106:
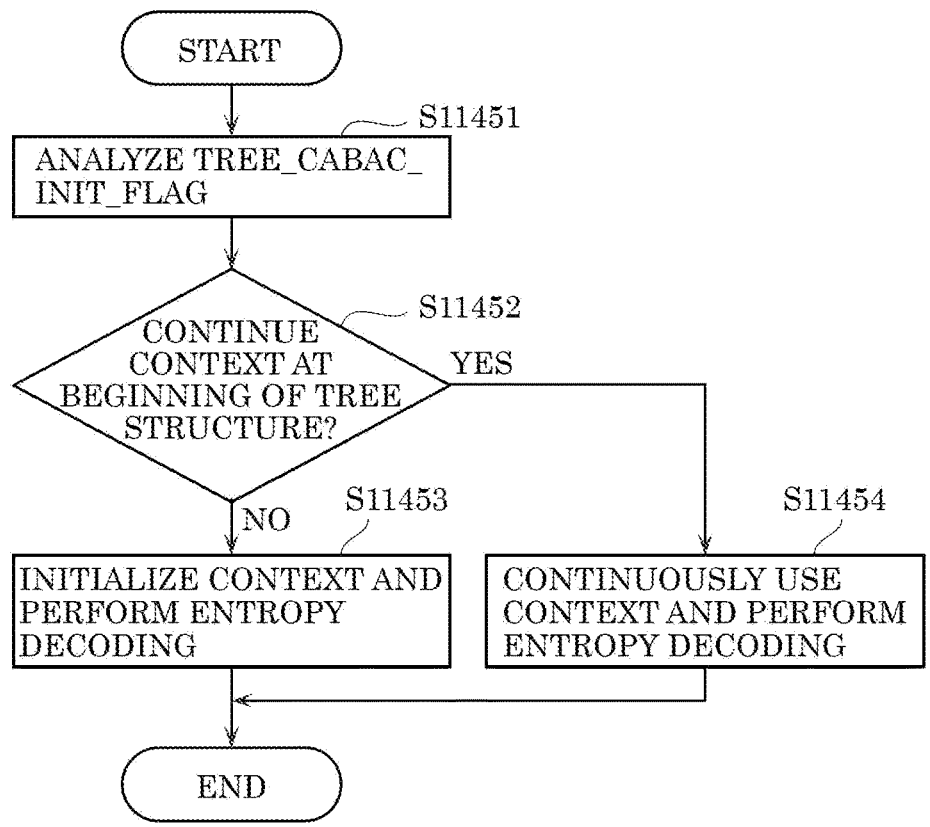
FIG. 106 is a diagram illustrating an example of a three-dimensional data decoding method according to Embodiment 9.

FIG. 106 is a diagram illustrating an example of a three-dimensional data decoding method.

The three-dimensional data decoding device analyzes tree_cabac_init_flag (S11451).

Next, the three-dimensional data decoding device determines whether tree_cabac_init_flag indicates that a context is continued at a beginning of a tree structure (prediction tree) (S11452).

When tree_cabac_init_flag indicates that the context is not continued at the beginning of the tree structure (prediction tree) (No in S11452), the three-dimensional data decoding device initializes the context and executes entropy decoding (S11453).

When tree_cabac_init_flag indicates that the context is continued at the beginning of the tree structure (prediction tree) (Yes in S11452), the three-dimensional data decoding device continuously uses the context and executes the entropy decoding (S11454).

Figure 107:
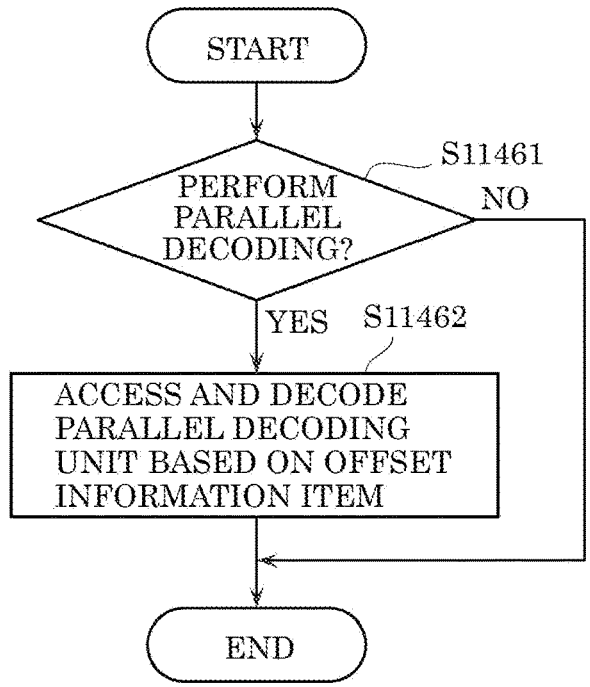
FIG. 107 is a diagram illustrating an example of parallel decoding in a three-dimensional data decoding method according to Embodiment 9.

FIG. 107 is a diagram illustrating an example of parallel decoding in a three-dimensional data decoding method.

The three-dimensional data decoding device determines whether to perform the parallel decoding (S11461).

When it is determined to perform the parallel decoding (Yes in S11461), the three-dimensional data decoding device accesses a parallel decoding unit based on an offset information item and decodes encoded units in parallel (S11462).

In such a manner, the three-dimensional data encoding device is capable of independent processing by eliminating dependences on tree structures by initializing CABAC. Further, since an offset information item of a beginning of a tree structure is provided, the three-dimensional data decoding device can randomly access encoded data items that are encoded with prediction trees, thus can perform decoding processes independently, and thus can perform the decoding processes in parallel. Further, the three-dimensional data encoding device and the three-dimensional data decoding device can make timings for initialization the same between the encoding and the decoding since CABAC is initialized based on tree_cabac_init_flag.

FIG. 108 is a diagram illustrating an example of a syntax of a data unit of a geometry information item in a case where an initialization flag is stored in a data item of the geometry information item.

In the data unit of the geometry information item, an encoded data item encoded by the prediction-tree encoding may be provided with a node information item, for example a prediction mode (pred_mode), in a loop for three-dimensional points. In a case where pred_mode=0 (direct mode), pred_mode indicates that the node is a root node. The root node is a node (three-dimensional point) at a beginning of a prediction tree; in a case where a processing target is the root node, an initialization flag indicating whether CABAC is initialized at the root node (tree_cabac_init_flag) may be provided. It should be noted that, in place of the initialization flag, whether CABAC is initialized may be indicated by a random access flag. For example, when the random access flag is ON, it may be considered that CABAC is necessarily initialized.

FIG. 109 is a diagram illustrating an example of a syntax of a header of a geometry information item in a case where an initialization flag and an offset information item are stored in the header.

The initialization flag and the offset information may be collectively provided in a data unit header of the geometry information item. In the data unit header of the geometry information item, the number of prediction trees included in a data unit of the geometry information item (num_predtree_minus2) may be provided, or tree_cabac_init_flag for each prediction tree may be provided. When tree_cabac_init_flag is set to one, the data unit header is provided with the offset information item. The offset information item may be an offset (difference information item) from a beginning of the data unit or may be an offset (difference information item) from a beginning of a previous prediction tree. It should be noted that an information item of a prediction tree at a beginning may be set in such a manner as not to be included in the header as num_predtree_minus2, and the information item of the prediction tree at the beginning may be set in such a manner as to be included in the header as num_predtree_minus1.

FIG. 110 is a diagram illustrating an example of a syntax of a header of a geometry information item in a case where an initialization flag and an offset information item are stored in the header on a random access basis.

num_rap indicates the number of units that can be subjected to the parallel decoding (random access). The offset information item may be provided in each of the units on which the parallel decoding can be performed. It should be noted that tree_cabac_init_flag need not be provided, and CABAC may be initialized at a beginning of a prediction tree indicated by the offset information item.

Further, an identifier (tree_id) may be provided for each prediction tree in a data item of a geometry information item, and an identifier (tree_id) of a prediction tree that can be randomly accessed may be provided in the header. In such a manner, an order of a prediction tree can be determined (identified) by clearly specifying a number of the prediction tree.

The offset information item needs to be provided in the header, and tree_cabac_init_flag may be provided in either the data item or the header. The offset information item may be provided in the header, and tree_cabac_init_flag may be provided in the data item.

It should be noted that, when CABAC is initialized, an initial value for CABAC may be set to a predetermined value or may be signaled as with cabac_init_flag or offset.

Further, attribute information items are enabled to be subjected to the parallel processing by using the same method as that for the geometry information items. The initialization flag or the offset information item may be provided by the same signaling method. The initialization flag may be included in a header or a data item of an attribute information item.

It should be noted that units on which the parallel decoding can be performed may be made common to geometry information items and attribute information items. In this case, an information item of the units of attribute information items on which the parallel decoding can be performed, and the initialization flag may be provided in a header of a geometry information item because they are shared with geometry information items, and the offset information items of attribute information items may be provided in headers of the attribute information items.

Embodiment 10

Figure 111:
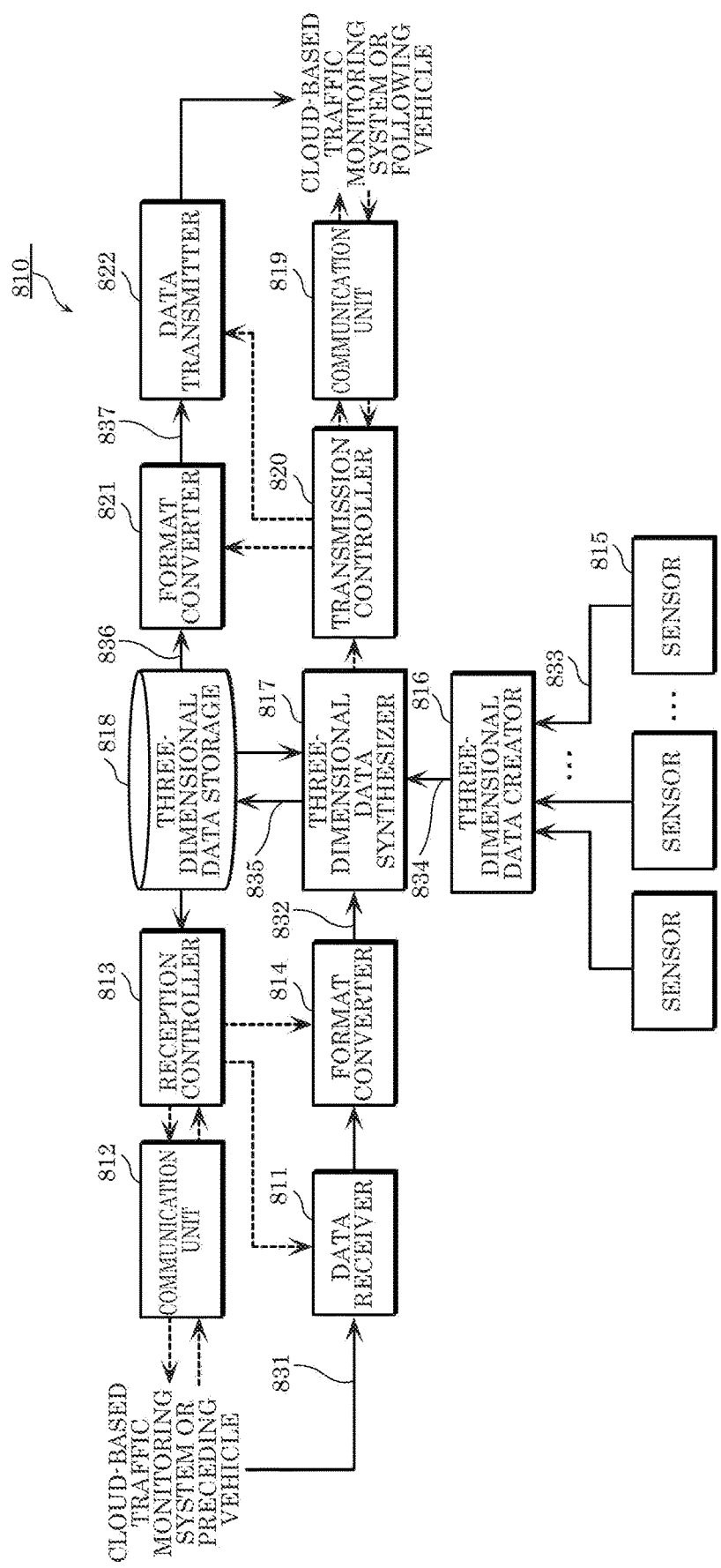
FIG. 111 is a block diagram of a three-dimensional data creation device according to Embodiment 10.

The following describes the structure of three-dimensional data creation device 810 according to the present embodiment. FIG. 111 is a block diagram of an exemplary structure of three-dimensional data creation device 810 according to the present embodiment. Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point group data), when sensors 815 are laser sensors such as LiDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Figure 112:
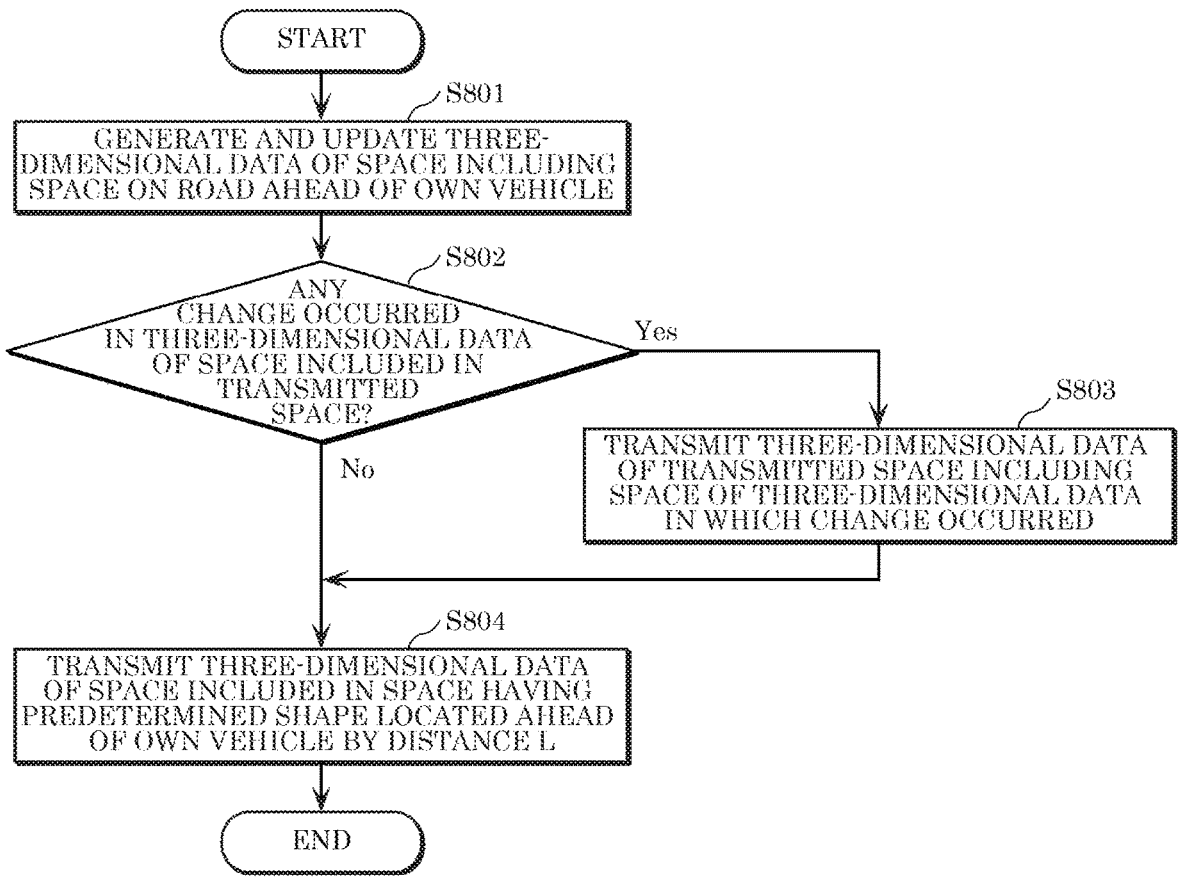
FIG. 112 is a flowchart of a three-dimensional data creation method according to Embodiment 10.

The following describes the steps performed by three-dimensional data creation device 810 of transmitting three-dimensional data to a following vehicle. FIG. 112 is a flowchart showing exemplary steps performed by three-dimensional data creation device 810 of transmitting three-dimensional data to a cloud-based traffic monitoring system or a following vehicle.

First, three-dimensional data creation device 810 generates and updates three-dimensional data 835 of a space that includes space on the road ahead of the own vehicle (S801). More specifically, three-dimensional data creation device 810 synthesizes three-dimensional data 834 created on the basis of sensor information 833 of the own vehicle with three-dimensional data 831 created by the cloud-based traffic monitoring system or the preceding vehicle, etc., for example, thereby forming three-dimensional data 835 of a space that also includes the space ahead of the preceding vehicle undetectable by sensors 815 of the own vehicle.

Three-dimensional data creation device 810 then judges whether any change has occurred in three-dimensional data 835 of the space included in the space already transmitted (S802).

When a change has occurred in three-dimensional data 835 of the space included in the space already transmitted due to, for example, a vehicle or a person entering such space from outside (Yes in S802), three-dimensional data creation device 810 transmits, to the cloud-based traffic monitoring system or the following vehicle, the three-dimensional data that includes three-dimensional data 835 of the space in which the change has occurred (S803).

Three-dimensional data creation device 810 may transmit three-dimensional data in which a change has occurred, at the same timing of transmitting three-dimensional data that is transmitted at a predetermined time interval, or may transmit three-dimensional data in which a change has occurred soon after the detection of such change. Stated differently, three-dimensional data creation device 810 may prioritize the transmission of three-dimensional data of the space in which a change has occurred to the transmission of three-dimensional data that is transmitted at a predetermined time interval.

Also, three-dimensional data creation device 810 may transmit, as three-dimensional data of a space in which a change has occurred, the whole three-dimensional data of the space in which such change has occurred, or may transmit only a difference in the three-dimensional data (e.g., information on three-dimensional points that have appeared or vanished, or information on the displacement of three-dimensional points).

Three-dimensional data creation device 810 may also transmit, to the following vehicle, meta-data on a risk avoidance behavior of the own vehicle such as hard breaking warning, before transmitting three-dimensional data of the space in which a change has occurred. This enables the following vehicle to recognize at an early stage that the preceding vehicle is to perform hard braking, etc., and thus to start performing a risk avoidance behavior at an early stage such as speed reduction.

When no change has occurred in three-dimensional data 835 of the space included in the space already transmitted (No in S802), or after step S803, three-dimensional data creation device 810 transmits, to the cloud-based traffic monitoring system or the following vehicle, three-dimensional data of the space included in the space having a predetermined shape and located ahead of the own vehicle by distance L (S804).

The processes of step S801 through step S804 are repeated, for example at a predetermined time interval.

When three-dimensional data 835 of the current space to be transmitted includes no difference from the three-dimensional map, three-dimensional data creation device 810 may not transmit three-dimensional data 837 of the space.

In the present embodiment, a client device transmits sensor information obtained through a sensor to a server or another client device.

Figure 113:
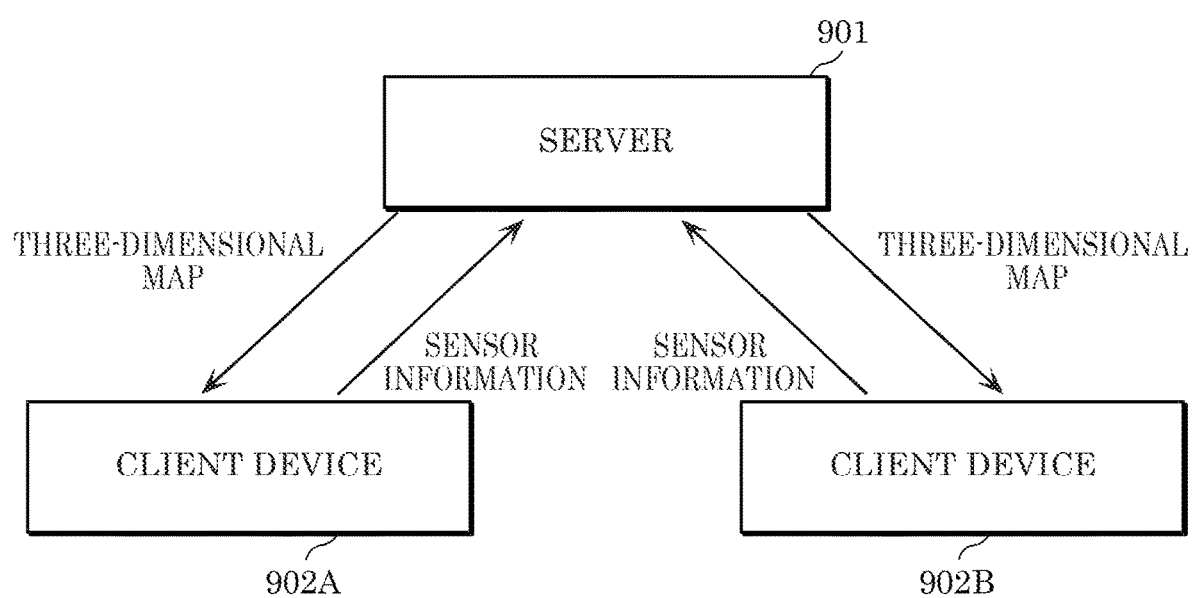
FIG. 113 is a diagram showing a structure of a system according to Embodiment 10.

A structure of a system according to the present embodiment will first be described. FIG. 113 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 114:
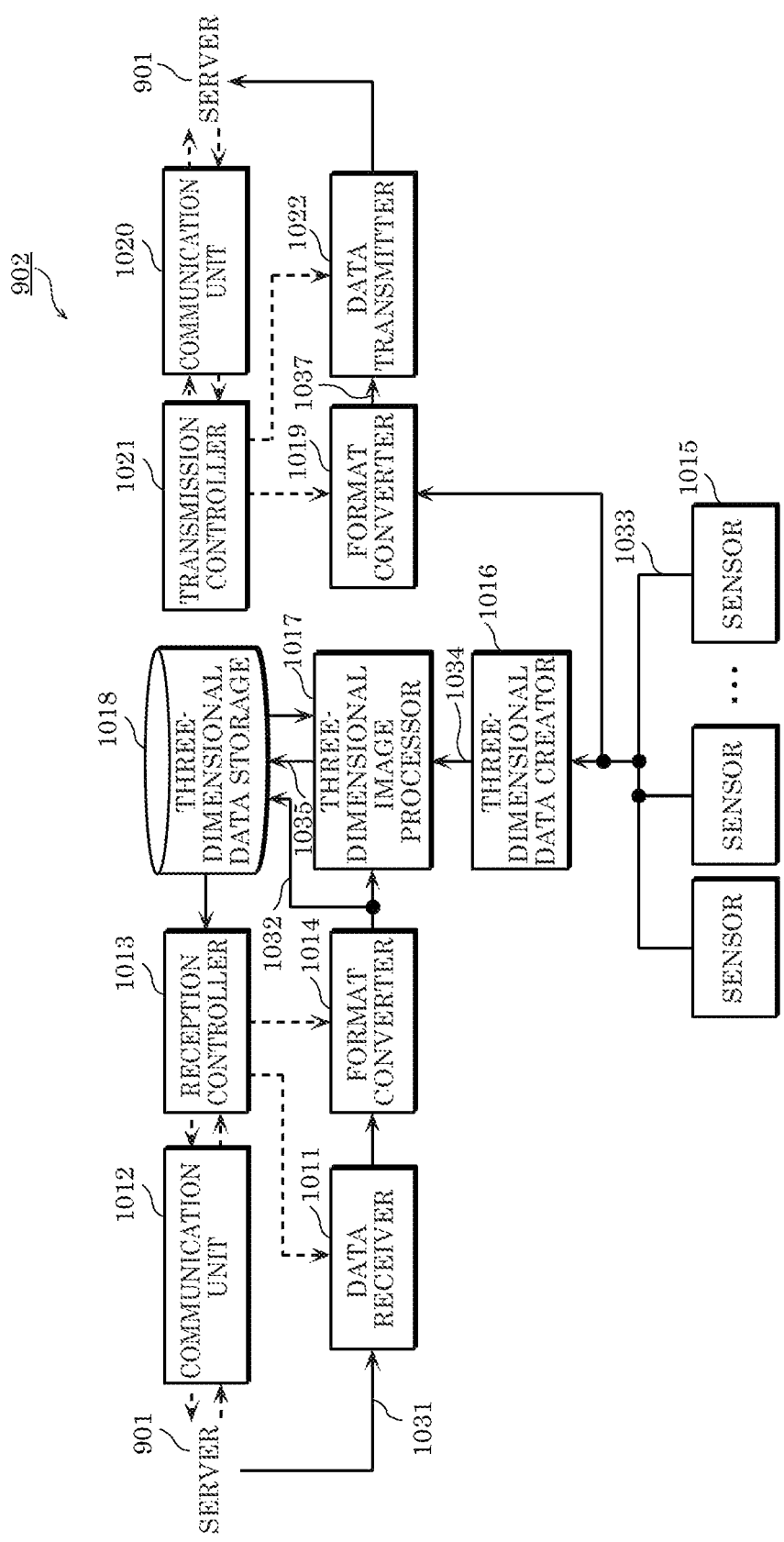
FIG. 114 is a block diagram of a client device according to Embodiment 10.

FIG. 114 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g., transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 1015 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LiDAR, a luminance image obtained by a visible light camera, an infrared image obtained by an infrared camera, a depth image obtained by a depth sensor, sensor position information, and sensor speed information.

Figure 115:
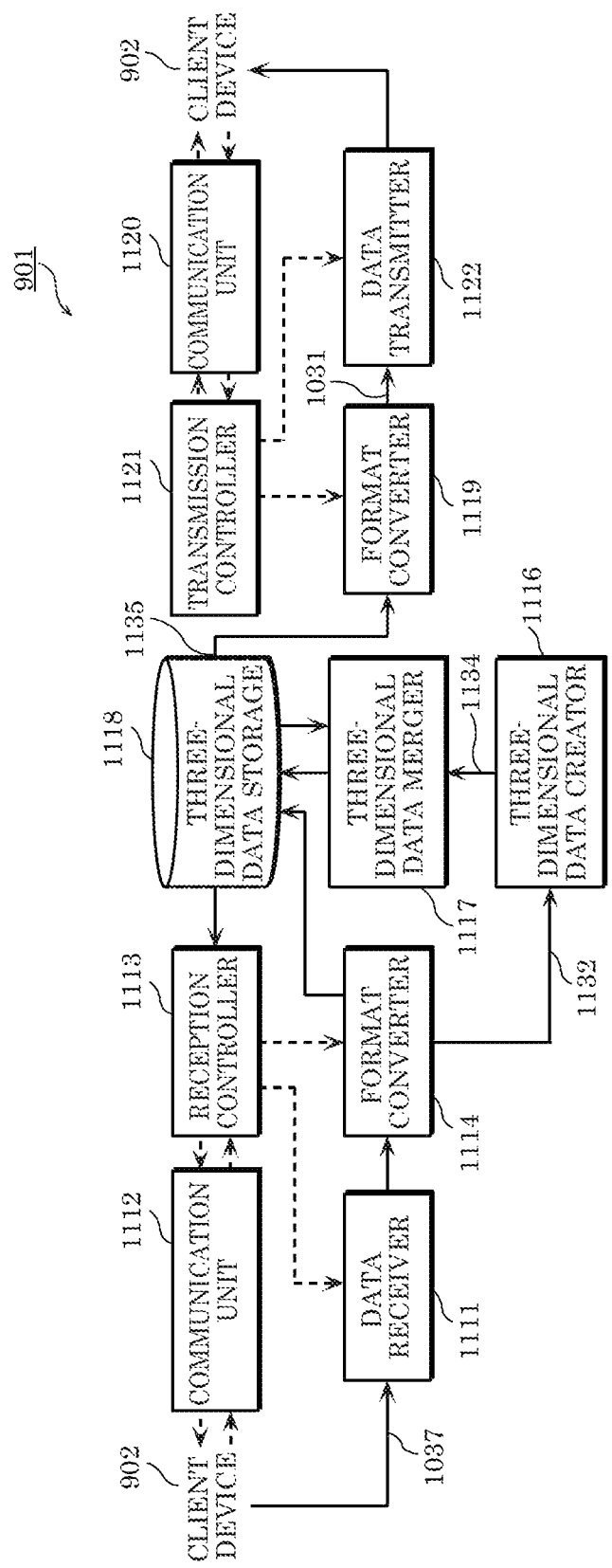
FIG. 115 is a block diagram of a server according to Embodiment 10.

A structure of server 901 will be described next. FIG. 115 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g., transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

An operational flow of client device 902 will be described next. FIG. 116 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

FIG. 117 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

Figure 118:
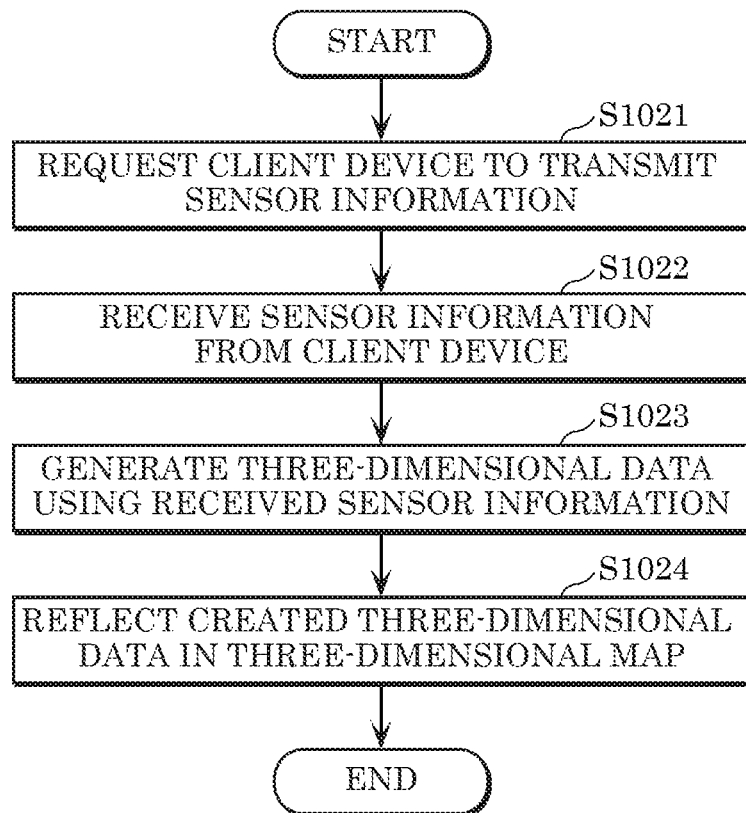
FIG. 118 is a flowchart of a three-dimensional data creation process performed by the server according to Embodiment 10.

An operational flow of server 901 will be described next. FIG. 118 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

Figure 119:
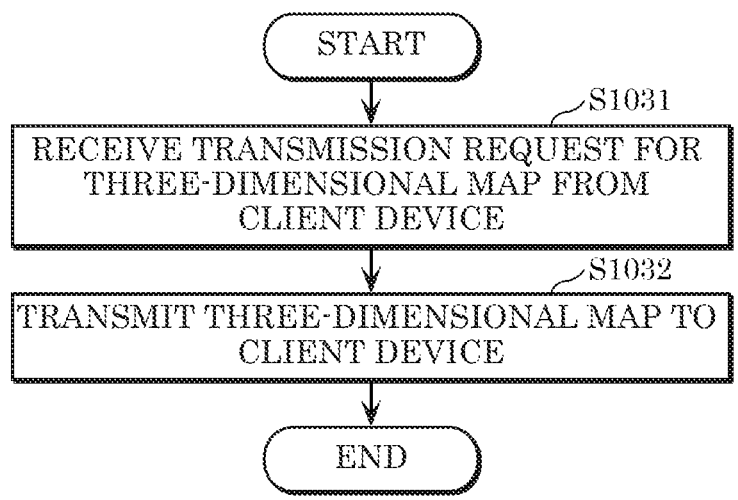

FIG. 119 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

The following describes variations of the present embodiment.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LiDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Figure 120:
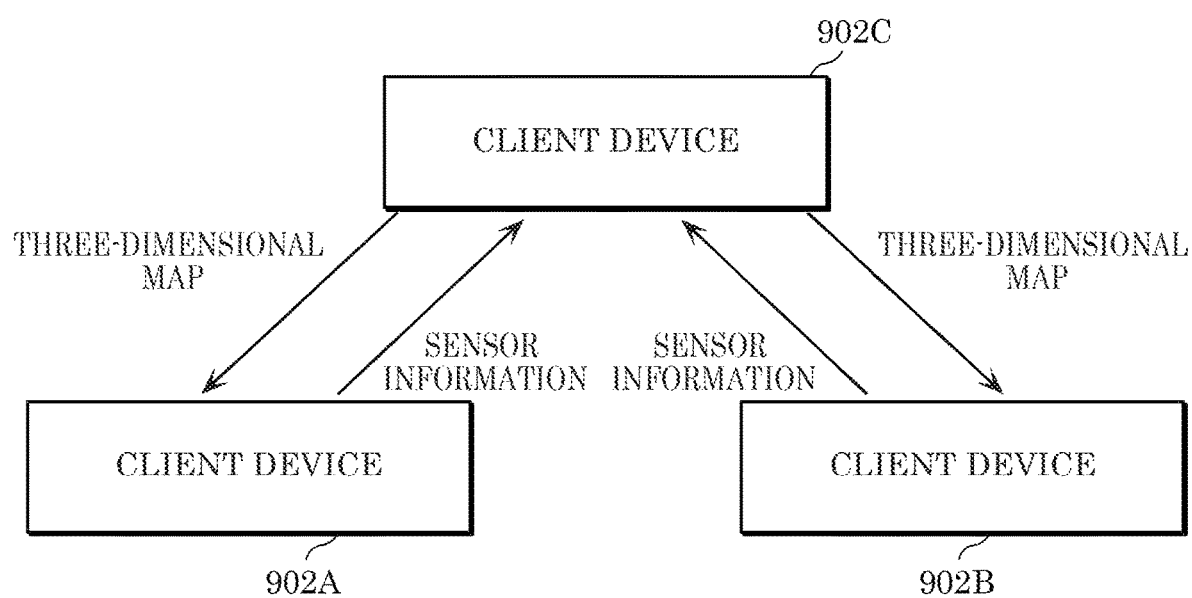

Server 901 is not limited to only being a server such as a cloud-based traffic monitoring system, and may also be another (vehicle-mounted) client device. FIG. 120 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

Figure 121:
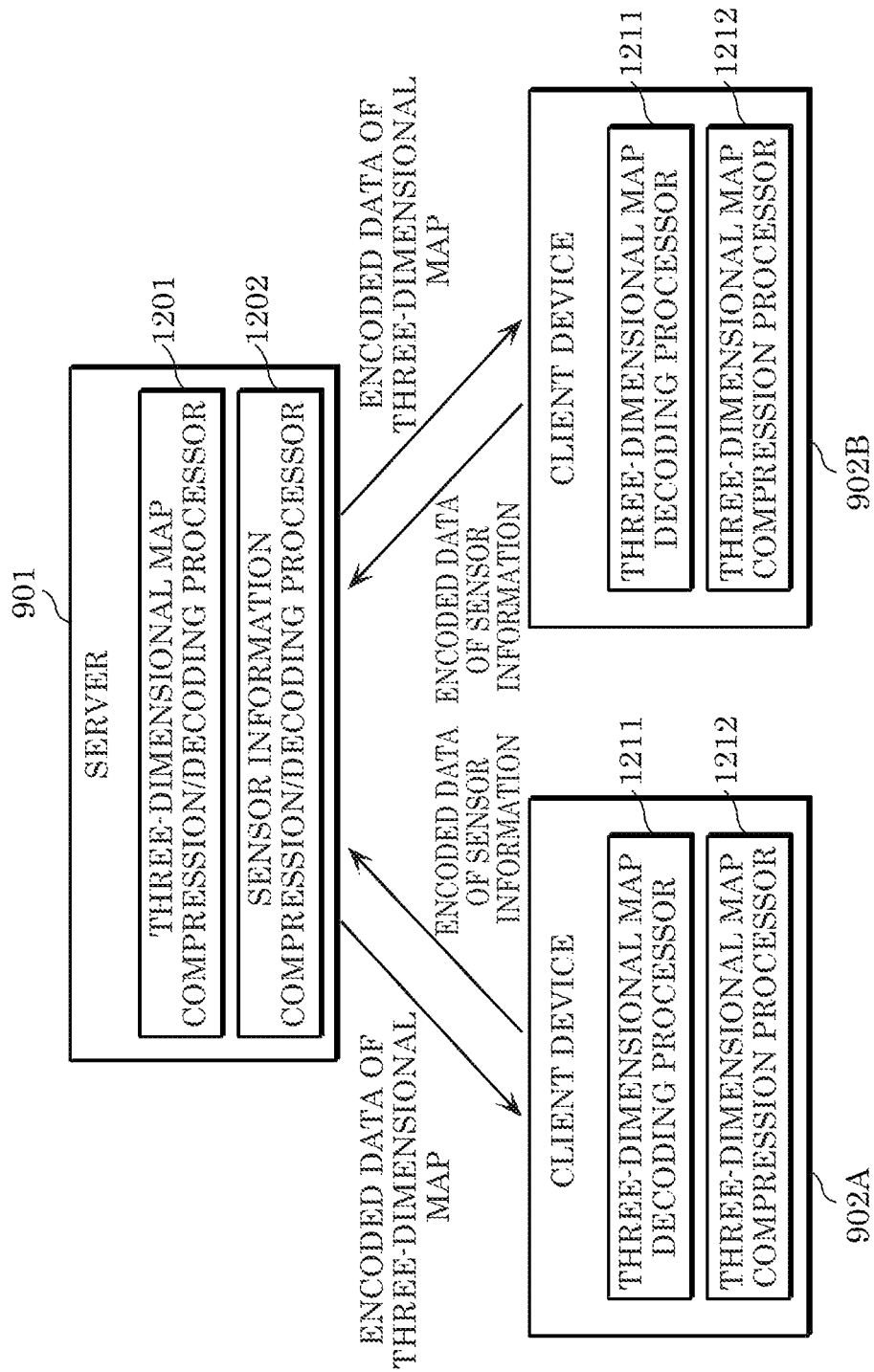

FIG. 121 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits obtained sensor information 1033 to server 901 or another client device 902.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1033 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another client device 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Figure 122:
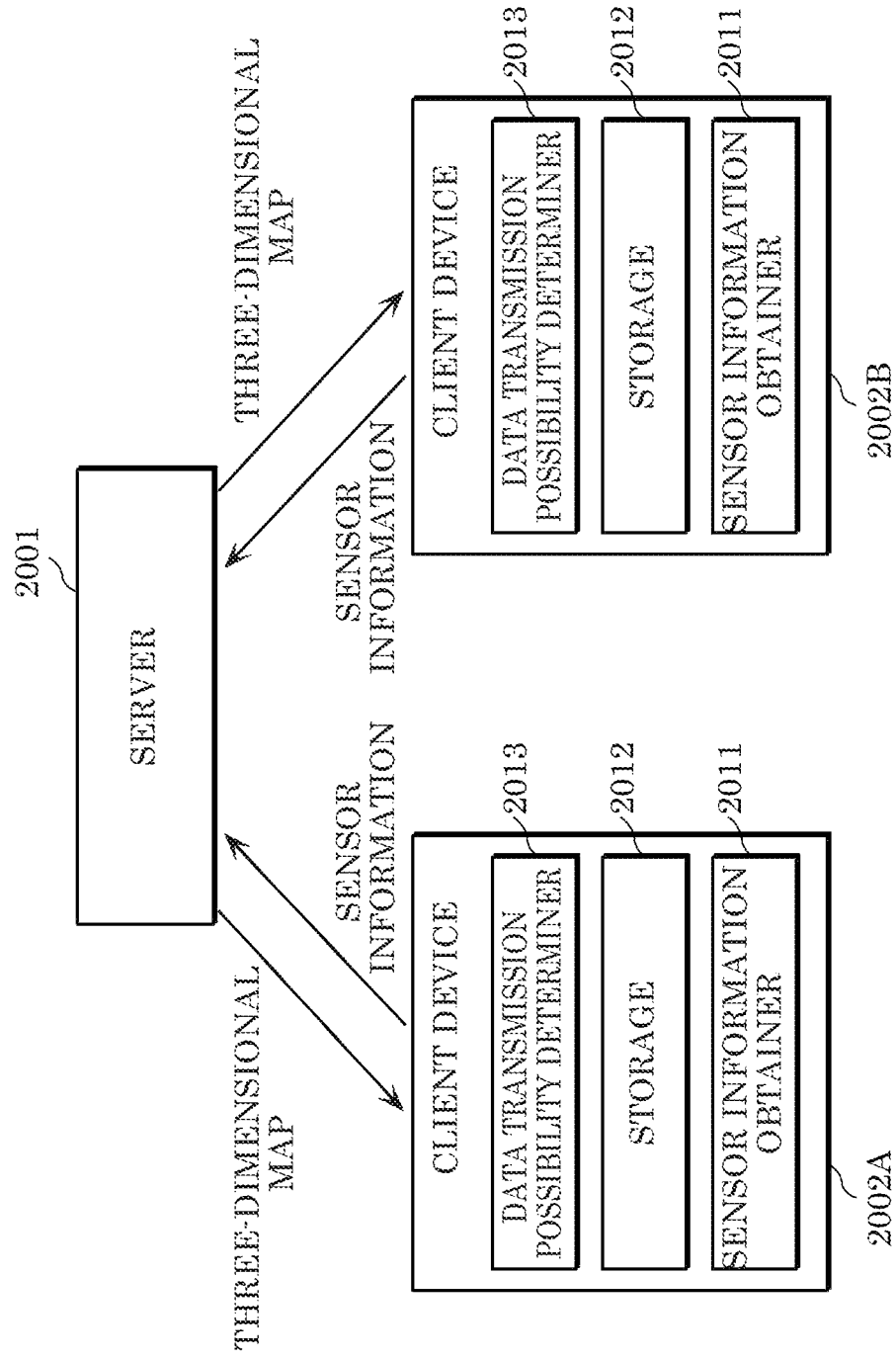

The following will describe a variation of the present embodiment. FIG. 122 is a diagram illustrating a configuration of a system according to the present embodiment. The system illustrated in FIG. 122 includes server 2001, client device 2002A, and client device 2002B.

Client device 2002A and client device 2002B are each provided in a mobile object such as a vehicle, and transmit sensor information to server 2001. Server 2001 transmits a three-dimensional map (a point cloud) to client device 2002A and client device 2002B.

Client device 2002A includes sensor information obtainer 2011, storage 2012, and data transmission possibility determiner 2013. It should be noted that client device 2002B has the same configuration. Additionally, when client device 2002A and client device 2002B are not particularly distinguished below, client device 2002A and client device 2002B are also referred to as client device 2002.

Figure 123:
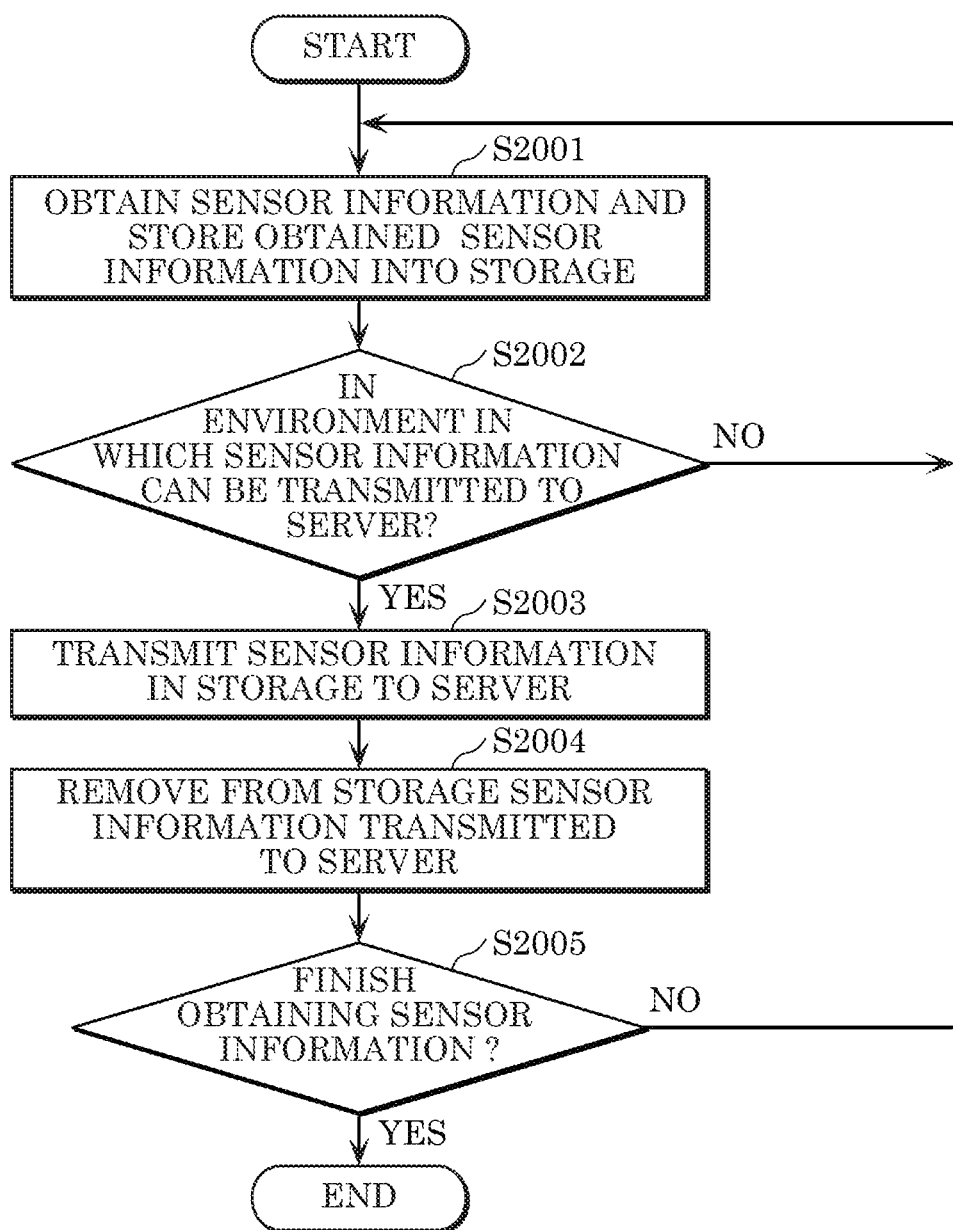

FIG. 123 is a flowchart illustrating operation of client device 2002 according to the present embodiment.

Sensor information obtainer 2011 obtains a variety of sensor information using sensors (a group of sensors) provided in a mobile object. In other words, sensor information obtainer 2011 obtains sensor information obtained by the sensors (the group of sensors) provided in the mobile object and indicating a surrounding state of the mobile object. Sensor information obtainer 2011 also stores the obtained sensor information into storage 2012. This sensor information includes at least one of information obtained by LiDAR, a visible light image, an infrared image, or a depth image. Additionally, the sensor information may include at least one of sensor position information, speed information, obtainment time information, or obtainment location information. Sensor position information indicates a position of a sensor that has obtained sensor information. Speed information indicates a speed of the mobile object when a sensor obtained sensor information. Obtainment time information indicates a time when a sensor obtained sensor information. Obtainment location information indicates a position of the mobile object or a sensor when the sensor obtained sensor information.

Next, data transmission possibility determiner 2013 determines whether the mobile object (client device 2002) is in an environment in which the mobile object can transmit sensor information to server 2001 (S2002). For example, data transmission possibility determiner 2013 may specify a location and a time at which client device 2002 is present using GPS information etc., and may determine whether data can be transmitted. Additionally, data transmission possibility determiner 2013 may determine whether data can be transmitted, depending on whether it is possible to connect to a specific access point.

When client device 2002 determines that the mobile object is in the environment in which the mobile object can transmit the sensor information to server 2001 (YES in S2002), client device 2002 transmits the sensor information to server 2001 (S2003). In other words, when client device 2002 becomes capable of transmitting sensor information to server 2001, client device 2002 transmits the sensor information held by client device 2002 to server 2001. For example, an access point that enables high-speed communication using millimeter waves is provided in an intersection or the like. When client device 2002 enters the intersection, client device 2002 transmits the sensor information held by client device 2002 to server 2001 at high speed using the millimeter-wave communication.

Next, client device 2002 deletes from storage 2012 the sensor information that has been transmitted to server 2001 (S2004). It should be noted that when sensor information that has not been transmitted to server 2001 meets predetermined conditions, client device 2002 may delete the sensor information. For example, when an obtainment time of sensor information held by client device 2002 precedes a current time by a certain time, client device 2002 may delete the sensor information from storage 2012. In other words, when a difference between the current time and a time when a sensor obtained sensor information exceeds a predetermined time, client device 2002 may delete the sensor information from storage 2012. Besides, when an obtainment location of sensor information held by client device 2002 is separated from a current location by a certain distance, client device 2002 may delete the sensor information from storage 2012. In other words, when a difference between a current position of the mobile object or a sensor and a position of the mobile object or the sensor when the sensor obtained sensor information exceeds a predetermined distance, client device 2002 may delete the sensor information from storage 2012. Accordingly, it is possible to reduce the capacity of storage 2012 of client device 2002.

When client device 2002 does not finish obtaining sensor information (NO in S2005), client device 2002 performs step S2001 and the subsequent steps again. Further, when client device 2002 finishes obtaining sensor information (YES in S2005), client device 2002 completes the process.

Client device 2002 may select sensor information to be transmitted to server 2001, in accordance with communication conditions. For example, when high-speed communication is available, client device 2002 preferentially transmits sensor information (e.g., information obtained by LiDAR) of which the data size held in storage 2012 is large. Additionally, when high-speed communication is not readily available, client device 2002 transmits sensor information (e.g., a visible light image) which has high priority and of which the data size held in storage 2012 is small. Accordingly, client device 2002 can efficiently transmit sensor information held in storage 2012, in accordance with network conditions Client device 2002 may obtain, from server 2001, time information indicating a current time and location information indicating a current location. Moreover, client device 2002 may determine an obtainment time and an obtainment location of sensor information based on the obtained time information and location information. In other words, client device 2002 may obtain time information from server 2001 and generate obtainment time information using the obtained time information. Client device 2002 may also obtain location information from server 2001 and generate obtainment location information using the obtained location information.

For example, regarding time information, server 2001 and client device 2002 perform clock synchronization using a means such as the Network Time Protocol (NTP) or the Precision Time Protocol (PTP). This enables client device 2002 to obtain accurate time information. What's more, since it is possible to synchronize clocks between server 2001 and client devices 2002, it is possible to synchronize times included in pieces of sensor information obtained by separate client devices 2002. As a result, server 2001 can handle sensor information indicating a synchronized time. It should be noted that a means of synchronizing clocks may be any means other than the NTP or PTP. In addition, GPS information may be used as the time information and the location information.

Server 2001 may specify a time or a location and obtain pieces of sensor information from client devices 2002. For example, when an accident occurs, in order to search for a client device in the vicinity of the accident, server 2001 specifies an accident occurrence time and an accident occurrence location and broadcasts sensor information transmission requests to client devices 2002. Then, client device 2002 having sensor information obtained at the corresponding time and location transmits the sensor information to server 2001. In other words, client device 2002 receives, from server 2001, a sensor information transmission request including specification information specifying a location and a time. When sensor information obtained at a location and a time indicated by the specification information is stored in storage 2012, and client device 2002 determines that the mobile object is present in the environment in which the mobile object can transmit the sensor information to server 2001, client device 2002 transmits, to server 2001, the sensor information obtained at the location and the time indicated by the specification information. Consequently, server 2001 can obtain the pieces of sensor information pertaining to the occurrence of the accident from client devices 2002, and use the pieces of sensor information for accident analysis etc.

It should be noted that when client device 2002 receives a sensor information transmission request from server 2001, client device 2002 may refuse to transmit sensor information. Additionally, client device 2002 may set in advance which pieces of sensor information can be transmitted. Alternatively, server 2001 may inquire of client device 2002 each time whether sensor information can be transmitted.

A point may be given to client device 2002 that has transmitted sensor information to server 2001. This point can be used in payment for, for example, gasoline expenses, electric vehicle (EV) charging expenses, a highway toll, or rental car expenses. After obtaining sensor information, server 2001 may delete information for specifying client device 2002 that has transmitted the sensor information. For example, this information is a network address of client device 2002. Since this enables the anonymization of sensor information, a user of client device 2002 can securely transmit sensor information from client device 2002 to server 2001. Server 2001 may include servers. For example, by servers sharing sensor information, even when one of the servers breaks down, the other servers can communicate with client device 2002. Accordingly, it is possible to avoid service outage due to a server breakdown.

A specified location specified by a sensor information transmission request indicates an accident occurrence location etc., and may be different from a position of client device 2002 at a specified time specified by the sensor information transmission request. For this reason, for example, by specifying, as a specified location, a range such as within XX meters of a surrounding area, server 2001 can request information from client device 2002 within the range. Similarly, server 2001 may also specify, as a specified time, a range such as within N seconds before and after a certain time. As a result, server 2001 can obtain sensor information from client device 2002 present for a time from t-N to t+N and in a location within XX meters from absolute position S. When client device 2002 transmits three-dimensional data such as LiDAR, client device 2002 may transmit data created immediately after time t.

Server 2001 may separately specify information indicating, as a specified location, a location of client device 2002 from which sensor information is to be obtained, and a location at which sensor information is desirably obtained. For example, server 2001 specifies that sensor information including at least a range within YY meters from absolute position S is to be obtained from client device 2002 present within XX meters from absolute position S. When client device 2002 selects three-dimensional data to be transmitted, client device 2002 selects one or more pieces of three-dimensional data so that the one or more pieces of three-dimensional data include at least the sensor information including the specified range. Each of the one or more pieces of three-dimensional data is a random-accessible unit of data. In addition, when client device 2002 transmits a visible light image, client device 2002 may transmit pieces of temporally continuous image data including at least a frame immediately before or immediately after time t.

When client device 2002 can use physical networks such as 5G, Wi-Fi, or modes in 5G for transmitting sensor information, client device 2002 may select a network to be used according to the order of priority notified by server 2001. Alternatively, client device 2002 may select a network that enables client device 2002 to ensure an appropriate bandwidth based on the size of transmit data. Alternatively, client device 2002 may select a network to be used, based on data transmission expenses etc. A transmission request from server 2001 may include information indicating a transmission deadline, for example, performing transmission when client device 2002 can start transmission by time t. When server 2001 cannot obtain sufficient sensor information within a time limit, server 2001 may issue a transmission request again.

Sensor information may include header information indicating characteristics of sensor data along with compressed or uncompressed sensor data. Client device 2002 may transmit header information to server 2001 via a physical network or a communication protocol that is different from a physical network or a communication protocol used for sensor data. For example, client device 2002 transmits header information to server 2001 prior to transmitting sensor data. Server 2001 determines whether to obtain the sensor data of client device 2002, based on a result of analysis of the header information. For example, header information may include information indicating a point cloud obtainment density, an elevation angle, or a frame rate of LiDAR, or information indicating, for example, a resolution, an SN ratio, or a frame rate of a visible light image. Accordingly, server 2001 can obtain the sensor information from client device 2002 having the sensor data of determined quality.

As stated above, client device 2002 is provided in the mobile object, obtains sensor information that has been obtained by a sensor provided in the mobile object and indicates a surrounding state of the mobile object, and stores the sensor information into storage 2012. Client device 2002 determines whether the mobile object is present in an environment in which the mobile object is capable of transmitting the sensor information to server 2001, and transmits the sensor information to server 2001 when the mobile object is determined to be present in the environment in which the mobile object is capable of transmitting the sensor information to server 2001.

Additionally, client device 2002 further creates, from the sensor information, three-dimensional data of a surrounding area of the mobile object, and estimates a self-location of the mobile object using the three-dimensional data created.

Besides, client device 2002 further transmits a transmission request for a three-dimensional map to server 2001, and receives the three-dimensional map from server 2001. In the estimating, client device 2002 estimates the self-location using the three-dimensional data and the three-dimensional map.

It should be noted that the above process performed by client device 2002 may be realized as an information transmission method for use in client device 2002.

In addition, client device 2002 may include a processor and memory. Using the memory, the processor may perform the above process.

Figure 124:
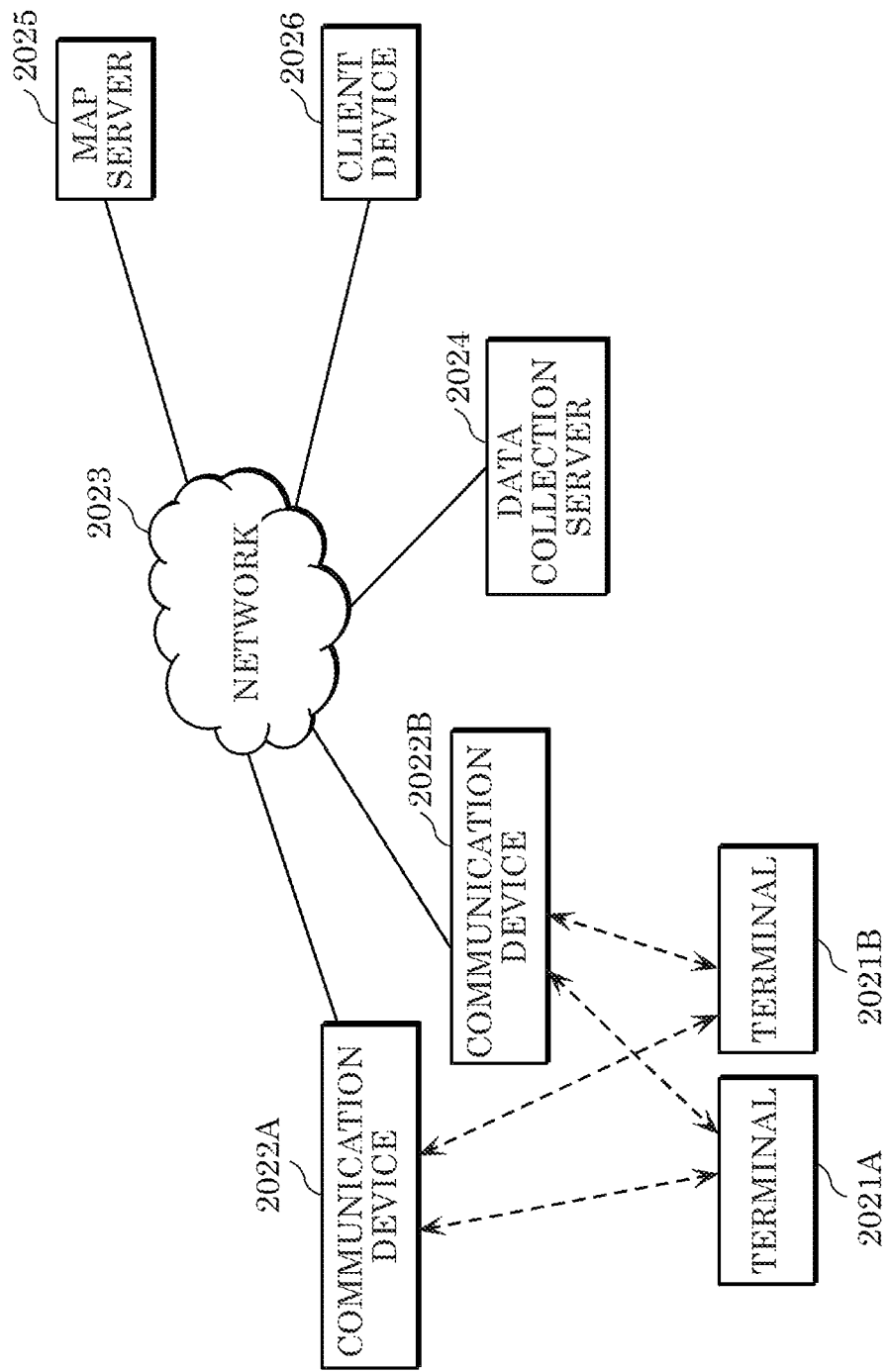

Next, a sensor information collection system according to the present embodiment will be described. FIG. 124 is a diagram illustrating a configuration of the sensor information collection system according to the present embodiment. As illustrated in FIG. 124, the sensor information collection system according to the present embodiment includes terminal 2021A, terminal 2021B, communication device 2022A, communication device 2022B, network 2023, data collection server 2024, map server 2025, and client device 2026. It should be noted that when terminal 2021A and terminal 2021B are not particularly distinguished, terminal 2021A and terminal 2021B are also referred to as terminal 2021. Additionally, when communication device 2022A and communication device 2022B are not particularly distinguished, communication device 2022A and communication device 2022B are also referred to as communication device 2022.

Data collection server 2024 collects data such as sensor data obtained by a sensor included in terminal 2021 as position-related data in which the data is associated with a position in a three-dimensional space.

Sensor data is data obtained by, for example, detecting a surrounding state of terminal 2021 or an internal state of terminal 2021 using a sensor included in terminal 2021. Terminal 2021 transmits, to data collection server 2024, one or more pieces of sensor data collected from one or more sensor devices in locations at which direct communication with terminal 2021 is possible or at which communication with terminal 2021 is possible by the same communication system or via one or more relay devices.

Data included in position-related data may include, for example, information indicating an operating state, an operating log, a service use state, etc. of a terminal or a device included in the terminal. In addition, the data include in the position-related data may include, for example, information in which an identifier of terminal 2021 is associated with a position or a movement path etc. of terminal 2021.

Information indicating a position included in position-related data is associated with, for example, information indicating a position in three-dimensional data such as three-dimensional map data. The details of information indicating a position will be described later.

Position-related data may include at least one of the above-described time information or information indicating an attribute of data included in the position-related data or a type (e.g., a model number) of a sensor that has created the data, in addition to position information that is information indicating a position. The position information and the time information may be stored in a header area of the position-related data or a header area of a frame that stores the position-related data. Further, the position information and the time information may be transmitted and/or stored as metadata associated with the position-related data, separately from the position-related data.

Map server 2025 is connected to, for example, network 2023, and transmits three-dimensional data such as three-dimensional map data in response to a request from another device such as terminal 2021. Besides, as described in the aforementioned embodiments, map server 2025 may have, for example, a function of updating three-dimensional data using sensor information transmitted from terminal 2021.

Data collection server 2024 is connected to, for example, network 2023, collects position-related data from another device such as terminal 2021, and stores the collected position-related data into a storage of data collection server 2024 or a storage of another server. In addition, data collection server 2024 transmits, for example, metadata of collected position-related data or three-dimensional data generated based on the position-related data, to terminal 2021 in response to a request from terminal 2021.

Network 2023 is, for example, a communication network such as the Internet. Terminal 2021 is connected to network 2023 via communication device 2022. Communication device 2022 communicates with terminal 2021 using one communication system or switching between communication systems. Communication device 2022 is a communication satellite that performs communication using, for example, (1) a base station compliant with Long-Term Evolution (LTE) etc., (2) an access point (AP) for Wi-Fi or millimeter-wave communication etc., (3) a low-power wide-area (LPWA) network gateway such as SIGFOX, LoRaWAN, or Wi-SUN, or (4) a satellite communication system such as DVB-S2.

It should be noted that a base station may communicate with terminal 2021 using a system classified as an LPWA network such as Narrowband Internet of Things (NB IoT) or LTE-M, or switching between these systems.

Here, although, in the example given, terminal 2021 has a function of communicating with communication device 2022 that uses two types of communication systems, and communicates with map server 2025 or data collection server 2024 using one of the communication systems or switching between the communication systems and between communication devices 2022 to be a direct communication partner; a configuration of the sensor information collection system and terminal 2021 is not limited to this. For example, terminal 2021 need not have a function of performing communication using communication systems, and may have a function of performing communication using one of the communication systems. Terminal 2021 may also support three or more communication systems. Additionally, each terminal 2021 may support a different communication system.

Terminal 2021 includes, for example, the configuration of client device 902 illustrated in FIG. 114. Terminal 2021 estimates a self-location etc. using received three-dimensional data. Besides, terminal 2021 associates sensor data obtained from a sensor and position information obtained by self-location estimation to generate position-related data.

Position information appended to position-related data indicates, for example, a position in a coordinate system used for three-dimensional data. For example, the position information is coordinate values represented using a value of a latitude and a value of a longitude. Here, terminal 2021 may include, in the position information, a coordinate system serving as a reference for the coordinate values and information indicating three-dimensional data used for location estimation, along with the coordinate values. Coordinate values may also include altitude information.

The position information may be associated with a data unit or a space unit usable for encoding the above three-dimensional data. Such a unit is, for example, WLD, GOS, SPC, VLM, or VXL. Here, the position information is represented by, for example, an identifier for identifying a data unit such as the SPC corresponding to position-related data. It should be noted that the position information may include, for example, information indicating three-dimensional data obtained by encoding a three-dimensional space including a data unit such as the SPC or information indicating a detailed position within the SPC, in addition to the identifier for identifying the data unit such as the SPC. The information indicating the three-dimensional data is, for example, a file name of the three-dimensional data.

As stated above, by generating position-related data associated with position information based on location estimation using three-dimensional data, the system can give more accurate position information to sensor information than when the system appends position information based on a self-location of a client device (terminal 2021) obtained using a GPS to sensor information. As a result, even when another device uses the position-related data in another service, there is a possibility of more accurately determining a position corresponding to the position-related data in an actual space, by performing location estimation based on the same three-dimensional data.

It should be noted that although the data transmitted from terminal 2021 is the position-related data in the example given in the present embodiment, the data transmitted from terminal 2021 may be data unassociated with position information. In other words, the transmission and reception of three-dimensional data or sensor data described in the other embodiments may be performed via network 2023 described in the present embodiment.

Next, a different example of position information indicating a position in a three-dimensional or two-dimensional actual space or in a map space will be described. The position information appended to position-related data may be information indicating a relative position relative to a keypoint in three-dimensional data. Here, the keypoint serving as a reference for the position information is encoded as, for example, SWLD, and notified to terminal 2021 as three-dimensional data.

The information indicating the relative position relative to the keypoint may be, for example, information that is represented by a vector from the keypoint to the point indicated by the position information, and indicates a direction and a distance from the keypoint to the point indicated by the position information. Alternatively, the information indicating the relative position relative to the keypoint may be information indicating an amount of displacement from the keypoint to the point indicated by the position information along each of the x axis, the y axis, and the z axis. Additionally, the information indicating the relative position relative to the keypoint may be information indicating a distance from each of three or more keypoints to the point indicated by the position information. It should be noted that the relative position need not be a relative position of the point indicated by the position information represented using each keypoint as a reference, and may be a relative position of each keypoint represented with respect to the point indicated by the position information. Examples of position information based on a relative position relative to a keypoint include information for identifying a keypoint to be a reference, and information indicating the relative position of the point indicated by the position information and relative to the keypoint. When the information indicating the relative position relative to the keypoint is provided separately from three-dimensional data, the information indicating the relative position relative to the keypoint may include, for example, coordinate axes used in deriving the relative position, information indicating a type of the three-dimensional data, and/or information indicating a magnitude per unit amount (e.g., a scale) of a value of the information indicating the relative position.

The position information may include, for each keypoint, information indicating a relative position relative to the keypoint. When the position information is represented by relative positions relative to keypoints, terminal 2021 that intends to identify a position in an actual space indicated by the position information may calculate candidate points of the position indicated by the position information from positions of the keypoints each estimated from sensor data, and may determine that a point obtained by averaging the calculated candidate points is the point indicated by the position information. Since this configuration reduces the effects of errors when the positions of the keypoints are estimated from the sensor data, it is possible to improve the estimation accuracy for the point in the actual space indicated by the position information. Besides, when the position information includes information indicating relative positions relative to keypoints, if it is possible to detect any one of the keypoints regardless of the presence of keypoints undetectable due to a limitation such as a type or performance of a sensor included in terminal 2021, it is possible to estimate a value of the point indicated by the position information.

A point identifiable from sensor data can be used as a keypoint. Examples of the point identifiable from the sensor data include a point or a point within a region that satisfies a predetermined keypoint detection condition, such as the above-described three-dimensional feature or feature of visible light data is greater than or equal to a threshold value.

Moreover, a marker etc. placed in an actual space may be used as a keypoint. In this case, the maker may be detected and located from data obtained using a sensor such as LiDAR or a camera. For example, the marker may be represented by a change in color or luminance value (degree of reflection), or a three-dimensional shape (e.g., unevenness). Coordinate values indicating a position of the marker, or a two-dimensional bar code or a bar code etc. generated from an identifier of the marker may be also used.

Furthermore, a light source that transmits an optical signal may be used as a marker. When a light source of an optical signal is used as a marker, not only information for obtaining a position such as coordinate values or an identifier but also other data may be transmitted using an optical signal. For example, an optical signal may include contents of service corresponding to the position of the marker, an address for obtaining contents such as a URL, or an identifier of a wireless communication device for receiving service, and information indicating a wireless communication system etc. for connecting to the wireless communication device. The use of an optical communication device (a light source) as a marker not only facilitates the transmission of data other than information indicating a position but also makes it possible to dynamically change the data.

Terminal 2021 finds out a correspondence relationship of keypoints between mutually different data using, for example, a common identifier used for the data, or information or a table indicating the correspondence relationship of the keypoints between the data. When there is no information indicating a correspondence relationship between keypoints, terminal 2021 may also determine that when coordinates of a keypoint in three-dimensional data are converted into a position in a space of another three-dimensional data, a keypoint closest to the position is a corresponding keypoint.

When the position information based on the relative position described above is used, terminal 2021 that uses mutually different three-dimensional data or services can identify or estimate a position indicated by the position information with respect to a common keypoint included in or associated with each three-dimensional data. As a result, terminal 2021 that uses the mutually different three-dimensional data or the services can identify or estimate the same position with higher accuracy.

Even when map data or three-dimensional data represented using mutually different coordinate systems are used, since it is possible to reduce the effects of errors caused by the conversion of a coordinate system, it is possible to coordinate services based on more accurate position information.

Hereinafter, an example of functions provided by data collection server 2024 will be described. Data collection server 2024 may transfer received position-related data to another data server. When there are data servers, data collection server 2024 determines to which data server received position-related data is to be transferred, and transfers the position-related data to a data server determined as a transfer destination.

Data collection server 2024 determines a transfer destination based on, for example, transfer destination server determination rules preset to data collection server 2024. The transfer destination server determination rules are set by, for example, a transfer destination table in which identifiers respectively associated with terminals 2021 are associated with transfer destination data servers.

Terminal 2021 appends an identifier associated with terminal 2021 to position-related data to be transmitted, and transmits the position-related data to data collection server 2024. Data collection server 2024 determines a transfer destination data server corresponding to the identifier appended to the position-related data, based on the transfer destination server determination rules set out using the transfer destination table etc.; and transmits the position-related data to the determined data server. The transfer destination server determination rules may be specified based on a determination condition set using a time, a place, etc. at which position-related data is obtained. Here, examples of the identifier associated with transmission source terminal 2021 include an identifier unique to each terminal 2021 or an identifier indicating a group to which terminal 2021 belongs.

The transfer destination table need not be a table in which identifiers associated with transmission source terminals are directly associated with transfer destination data servers. For example, data collection server 2024 holds a management table that stores tag information assigned to each identifier unique to terminal 2021, and a transfer destination table in which the pieces of tag information are associated with transfer destination data servers. Data collection server 2024 may determine a transfer destination data server based on tag information, using the management table and the transfer destination table. Here, the tag information is, for example, control information for management or control information for providing service assigned to a type, a model number, an owner of terminal 2021 corresponding to the identifier, a group to which terminal 2021 belongs, or another identifier. Moreover, in the transfer destination able, identifiers unique to respective sensors may be used instead of the identifiers associated with transmission source terminals 2021. Furthermore, the transfer destination server determination rules may be set by client device 2026.

Data collection server 2024 may determine data servers as transfer destinations, and transfer received position-related data to the data servers. According to this configuration, for example, when position-related data is automatically backed up or when, in order that position-related data is commonly used by different services, there is a need to transmit the position-related data to a data server for providing each service, it is possible to achieve data transfer as intended by changing a setting of data collection server 2024. As a result, it is possible to reduce the number of steps necessary for building and changing a system, compared to when a transmission destination of position-related data is set for each terminal 2021.

Data collection server 2024 may register, as a new transfer destination, a data server specified by a transfer request signal received from a data server; and transmit position-related data subsequently received to the data server, in response to the transfer request signal.

Data collection server 2024 may store position-related data received from terminal 2021 into a recording device, and transmit position-related data specified by a transmission request signal received from terminal 2021 or a data server to request source terminal 2021 or the data server in response to the transmission request signal.

Data collection server 2024 may determine whether position-related data is suppliable to a request source data server or terminal 2021, and transfer or transmit the position-related data to the request source data server or terminal 2021 when determining that the position-related data is suppliable.

When data collection server 2024 receives a request for current position-related data from client device 2026, even if it is not a timing for transmitting position-related data by terminal 2021, data collection server 2024 may send a transmission request for the current position-related data to terminal 2021, and terminal 2021 may transmit the current position-related data in response to the transmission request.

Although terminal 2021 transmits position information data to data collection server 2024 in the above description, data collection server 2024 may have a function of managing terminal 2021 such as a function necessary for collecting position-related data from terminal 2021 or a function used when collecting position-related data from terminal 2021.

Data collection server 2024 may have a function of transmitting, to terminal 2021, a data request signal for requesting transmission of position information data, and collecting position-related data.

Management information such as an address for communicating with terminal 2021 from which data is to be collected or an identifier unique to terminal 2021 is registered in advance in data collection server 2024. Data collection server 2024 collects position-related data from terminal 2021 based on the registered management information. Management information may include information such as types of sensors included in terminal 2021, the number of sensors included in terminal 2021, and communication systems supported by terminal 2021.

Data collection server 2024 may collect information such as an operating state or a current position of terminal 2021 from terminal 2021.

Registration of management information may be instructed by client device 2026, or a process for the registration may be started by terminal 2021 transmitting a registration request to data collection server 2024. Data collection server 2024 may have a function of controlling communication between data collection server 2024 and terminal 2021.

Communication between data collection server 2024 and terminal 2021 may be established using a dedicated line provided by a service provider such as a mobile network operator (MNO) or a mobile virtual network operator (MVNO), or a virtual dedicated line based on a virtual private network (VPN). According to this configuration, it is possible to perform secure communication between terminal 2021 and data collection server 2024.

Data collection server 2024 may have a function of authenticating terminal 2021 or a function of encrypting data to be transmitted and received between data collection server 2024 and terminal 2021. Here, the authentication of terminal 2021 or the encryption of data is performed using, for example, an identifier unique to terminal 2021 or an identifier unique to a terminal group including terminals 2021, which is shared in advance between data collection server 2024 and terminal 2021. Examples of the identifier include an international mobile subscriber identity (IMSI) that is a unique number stored in a subscriber identity module (SIM) card. An identifier for use in authentication and an identifier for use in encryption of data may be identical or different.

The authentication or the encryption of data between data collection server 2024 and terminal 2021 is feasible when both data collection server 2024 and terminal 2021 have a function of performing the process. The process does not depend on a communication system used by communication device 2022 that performs relay. Accordingly, since it is possible to perform the common authentication or encryption without considering whether terminal 2021 uses a communication system, the user's convenience of system architecture is increased. However, the expression "does not depend on a communication system used by communication device 2022 that performs relay" means a change according to a communication system is not essential. In other words, in order to improve the transfer efficiency or ensure security, the authentication or the encryption of data between data collection server 2024 and terminal 2021 may be changed according to a communication system used by a relay device.

Data collection server 2024 may provide client device 2026 with a User Interface (UI) that manages data collection rules such as types of position-related data collected from terminal 2021 and data collection schedules. Accordingly, a user can specify, for example, terminal 2021 from which data is to be collected using client device 2026, a data collection time, and a data collection frequency. Additionally, data collection server 2024 may specify, for example, a region on a map from which data is to be desirably collected, and collect position-related data from terminal 2021 included in the region.

When the data collection rules are managed on a per terminal 2021 basis, client device 2026 presents, on a screen, a list of terminals 2021 or sensors to be managed. The user sets, for example, a necessity for data collection or a collection schedule for each item in the list.

When a region on a map from which data is to be desirably collected is specified, client device 2026 presents, on a screen, a two-dimensional or three-dimensional map of a region to be managed. The user selects the region from which data is to be collected on the displayed map. Examples of the region selected on the map include a circular or rectangular region having a point specified on the map as the center, or a circular or rectangular region specifiable by a drag operation. Client device 2026 may also select a region in a preset unit such as a city, an area or a block in a city, or a main road, etc. Instead of specifying a region using a map, a region may be set by inputting values of a latitude and a longitude, or a region may be selected from a list of candidate regions derived based on inputted text information. Text information is, for example, a name of a region, a city, or a landmark.

Moreover, data may be collected while the user dynamically changes a specified region by specifying one or more terminals 2021 and setting a condition such as within 100 meters of one or more terminals 2021.

When client device 2026 includes a sensor such as a camera, a region on a map may be specified based on a position of client device 2026 in an actual space obtained from sensor data. For example, client device 2026 may estimate a self-location using sensor data, and specify, as a region from which data is to be collected, a region within a predetermined distance from a point on a map corresponding to the estimated location or a region within a distance specified by the user. Client device 2026 may also specify, as the region from which the data is to be collected, a sensing region of the sensor, that is, a region corresponding to obtained sensor data. Alternatively, client device 2026 may specify, as the region from which the data is to be collected, a region based on a location corresponding to sensor data specified by the user. Either client device 2026 or data collection server 2024 may estimate a region on a map or a location corresponding to sensor data.

When a region on a map is specified, data collection server 2024 may specify terminal 2021 within the specified region by collecting current position information of each terminal 2021, and may send a transmission request for position-related data to specified terminal 2021. When data collection server 2024 transmits information indicating a specified region to terminal 2021, determines whether terminal 2021 is present within the specified region, and determines that terminal 2021 is present within the specified region, rather than specifying terminal 2021 within the region, terminal 2021 may transmit position-related data.

Data collection server 2024 transmits, to client device 2026, data such as a list or a map for providing the above-described User Interface (UI) in an application executed by client device 2026. Data collection server 2024 may transmit, to client device 2026, not only the data such as the list or the map but also an application program. Additionally, the above UI may be provided as contents created using HTML displayable by a browser. It should be noted that part of data such as map data may be supplied from a server, such as map server 2025, other than data collection server 2024.

When client device 2026 receives an input for notifying the completion of an input such as pressing of a setup key by the user, client device 2026 transmits the inputted information as configuration information to data collection server 2024. Data collection server 2024 transmits, to each terminal 2021, a signal for requesting position-related data or notifying position-related data collection rules, based on the configuration information received from client device 2026, and collects the position-related data.

Next, an example of controlling operation of terminal 2021 based on additional information added to three-dimensional or two-dimensional map data will be described.

In the present configuration, object information that indicates a position of a power feeding part such as a feeder antenna or a feeder coil for wireless power feeding buried under a road or a parking lot is included in or associated with three-dimensional data, and such object information is provided to terminal 2021 that is a vehicle or a drone.

A vehicle or a drone that has obtained the object information to get charged automatically moves so that a position of a charging part such as a charging antenna or a charging coil included in the vehicle or the drone becomes opposite to a region indicated by the object information, and such vehicle or a drone starts to charge itself. It should be noted that when a vehicle or a drone has no automatic driving function, a direction to move in or an operation to perform is presented to a driver or an operator by using an image displayed on a screen, audio, etc. When a position of a charging part calculated based on an estimated self-location is determined to fall within the region indicated by the object information or a predetermined distance from the region, an image or audio to be presented is changed to a content that puts a stop to driving or operating, and the charging is started.

Object information need not be information indicating a position of a power feeding part, and may be information indicating a region within which placement of a charging part results in a charging efficiency greater than or equal to a predetermined threshold value. A position indicated by object information may be represented by, for example, the central point of a region indicated by the object information, a region or a line within a two-dimensional plane, or a region, a line, or a plane within a three-dimensional space.

According to this configuration, since it is possible to identify the position of the power feeding antenna unidentifiable by sensing data of LiDAR or an image captured by the camera, it is possible to highly accurately align a wireless charging antenna included in terminal 2021 such as a vehicle with a wireless power feeding antenna buried under a road. As a result, it is possible to increase a charging speed at the time of wireless charging and improve the charging efficiency.

Object information may be an object other than a power feeding antenna. For example, three-dimensional data includes, for example, a position of an AP for millimeter-wave wireless communication as object information. Accordingly, since terminal 2021 can identify the position of the AP in advance, terminal 2021 can steer a directivity of beam to a direction of the object information and start communication. As a result, it is possible to improve communication quality such as increasing transmission rates, reducing the duration of time before starting communication, and extending a communicable period.

Object information may include information indicating a type of an object corresponding to the object information. In addition, when terminal 2021 is present within a region in an actual space corresponding to a position in three-dimensional data of the object information or within a predetermined distance from the region, the object information may include information indicating a process to be performed by terminal 2021.

Object information may be provided by a server different from a server that provides three-dimensional data. When object information is provided separately from three-dimensional data, object groups in which object information used by the same service is stored may be each provided as separate data according to a type of a target service or a target device.

Three-dimensional data used in combination with object information may be point cloud data of WLD or keypoint data of SWLD.

In the three-dimensional data encoding device, when attribute information of a current three-dimensional point to be encoded is layer-encoded using Levels of Detail (LoDs), the three-dimensional data decoding device may decode the attribute information in layers down to LoD required by the three-dimensional data decoding device and need not decode the attribute information in layers not required. For example, when the total number of LoDs for the attribute information in a bitstream generated by the three-dimensional data encoding device is N, the three-dimensional data decoding device may decode M LoDs (M<N), i.e., layers from the uppermost layer LoD0 to LoD(M−1), and need not decode the remaining LoDs, i.e., layers down to LoD(N−1). With this, while reducing the processing load, the three-dimensional data decoding device can decode the attribute information in layers from LoD0 to LoD(M−1) required by the three-dimensional data decoding device.

Figure 125:
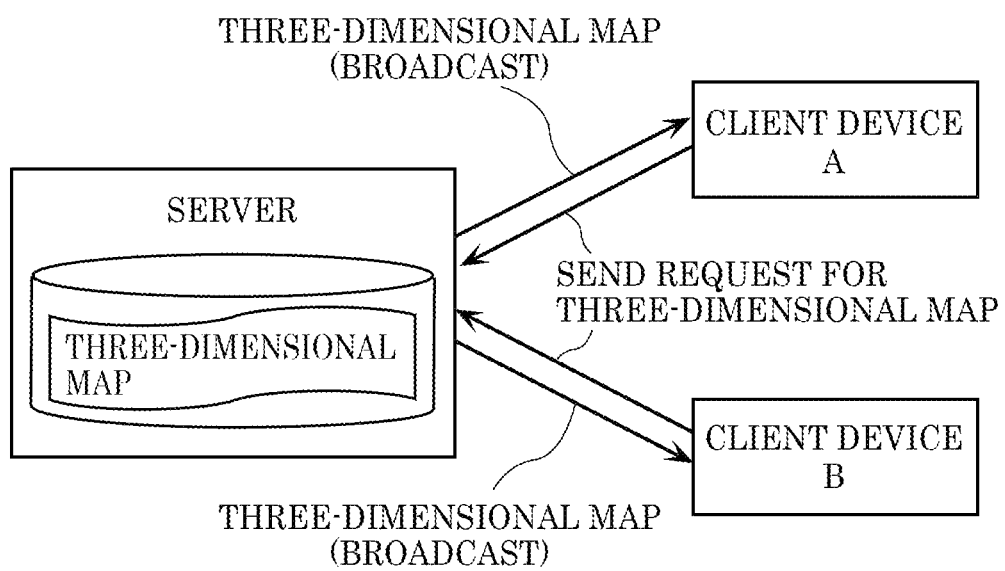

FIG. 125 is a diagram illustrating the foregoing use case. In the example shown in FIG. 125, a server stores a three-dimensional map obtained by encoding three-dimensional geometry information and attribute information. The server (the three-dimensional data encoding device) broadcasts the three-dimensional map to client devices (the three-dimensional data decoding devices: for example, vehicles, drones, etc.) in an area managed by the server, and each client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure or the like. Then, the sever layer-encodes the attribute information of the three-dimensional map using N LoDs established based on the geometry information. The server stores a bitstream of the three-dimensional map obtained by the layer-encoding.

Next, in response to a send request for the map information from the client device in the area managed by the server, the server sends the bitstream of the encoded three-dimensional map to the client device.

The client device receives the bitstream of the three-dimensional map sent from the server, and decodes the geometry information and the attribute information of the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and decodes all the information in the bitstream.

Moreover, when the client device displays the three-dimensional map information to a user or the like, the client device determines that a decoding result to the sparse three-dimensional points is necessary as the attribute information, and decodes the geometry information and the attribute information in M LoDs (M<N) starting from an upper layer LoD0.

In this way, the processing load of the client device can be reduced by changing LoDs for the attribute information to be decoded in accordance with the intended use of the client device.

In the example shown in FIG. 125, for example, the three-dimensional map includes geometry information and attribute information. The geometry information is encoded using the octree. The attribute information is encoded using N LoDs.

Client device A performs highly accurate estimation of the self-position. In this case, client device A determines that all the geometry information and all the attribute information are necessary, and decodes all the geometry information and all the attribute information constructed from N LoDs in the bitstream.

Client device B displays the three-dimensional map to a user. In this case, client device B determines that the geometry information and the attribute information in M LoDs (M<N) are necessary, and decodes the geometry information and the attribute information constructed from M LoDs in the bitstream.

It is to be noted that the server may broadcast the three-dimensional map to the client devices, or multicast or unicast the three-dimensional map to the client devices.

The following describes a variation of the system according to the present embodiment. In the three-dimensional data encoding device, when attribute information of a current three-dimensional point to be encoded is layer-encoded using LoDs, the three-dimensional data encoding device may encode the attribute information in layers down to LoD required by the three-dimensional data decoding device and need not encode the attribute information in layers not required. For example, when the total number of LoDs is N, the three-dimensional data encoding device may generate a bitstream by encoding M LoDs (M<N), i.e., layers from the uppermost layer LoD0 to LoD(M−1), and not encoding the remaining LoDs, i.e., layers down to LoD(N−1). With this, in response to a request from the three-dimensional data decoding device, the three-dimensional data encoding device can provide a bitstream in which the attribute information from LoD0 to LoD(M−1) required by the three-dimensional data decoding device is encoded.

Figure 126:
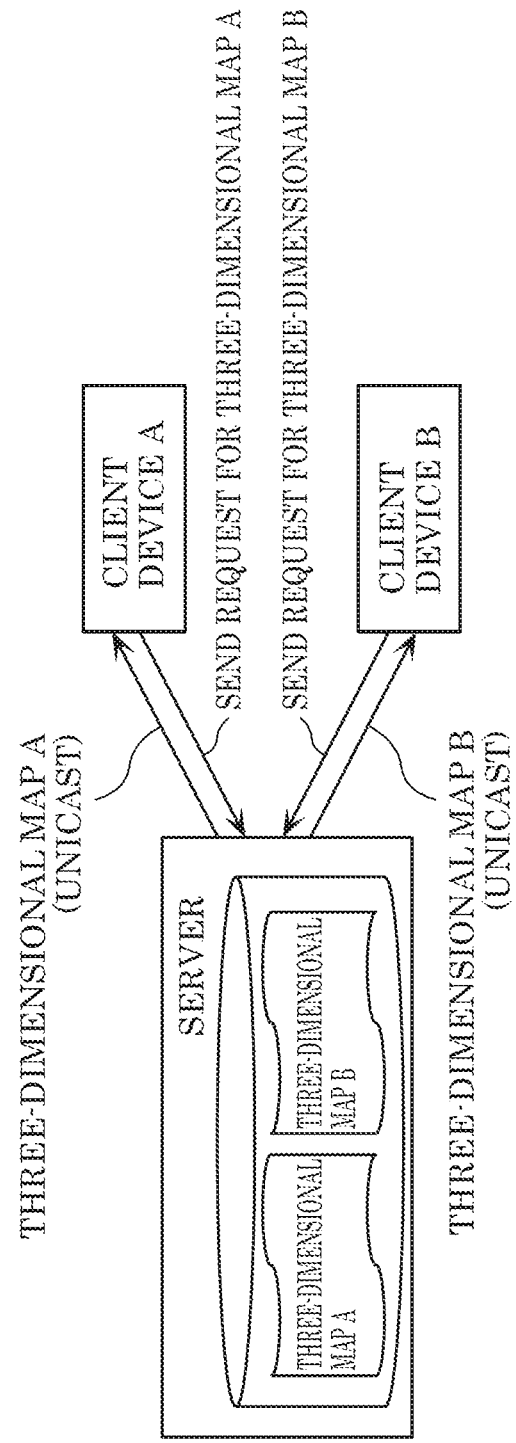

FIG. 126 is a diagram illustrating the foregoing use case. In the example shown in FIG. 126, a server stores a three-dimensional map obtained by encoding three-dimensional geometry information and attribute information. The server (the three-dimensional data encoding device) unicasts, in response to a request from the client device, the three-dimensional map to a client device (the three-dimensional data decoding device: for example, a vehicle, a drone, etc.) in an area managed by the server, and the client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure, or the like. Then, the sever generates a bitstream of three-dimensional map A by layer-encoding the attribute information of the three-dimensional map using N LoDs established based on the geometry information, and stores the generated bitstream in the server. The sever also generates a bitstream of three-dimensional map B by layer-encoding the attribute information of the three-dimensional map using M LoDs (M<N) established based on the geometry information, and stores the generated bitstream in the server.

Next, the client device requests the server to send the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and requests the server to send the bitstream of three-dimensional map A. Moreover, when the client device displays the three-dimensional map information to a user or the like, the client device determines that a decoding result to the sparse three-dimensional points is necessary as the attribute information, and requests the server to send the bitstream of three-dimensional map B including the geometry information and the attribute information in M LoDs (M<N) starting from an upper layer LoD0. Then, in response to the send request for the map information from the client device, the server sends the bitstream of encoded three-dimensional map A or B to the client device.

The client device receives the bitstream of three-dimensional map A or B sent from the server in accordance with the intended use of the client device, and decodes the received bitstream. In this way, the server changes a bitstream to be sent, in accordance with the intended use of the client device. With this, it is possible to reduce the processing load of the client device.

In the example shown in FIG. 126, the server stores three-dimensional map A and three-dimensional map B. The server generates three-dimensional map A by encoding the geometry information of the three-dimensional map using, for example, an octree structure, and encoding the attribute information of the three-dimensional map using N LoDs. In other words, NumLoD included in the bitstream of three-dimensional map A indicates N.

The server also generates three-dimensional map B by encoding the geometry information of the three-dimensional map using, for example, an octree structure, and encoding the attribute information of the three-dimensional map using M LoDs. In other words, NumLoD included in the bitstream of three-dimensional map B indicates M.

Client device A performs highly accurate estimation of the self-position. In this case, client device A determines that all the geometry information and all the attribute information are necessary, and requests the server to send three-dimensional map A including all the geometry information and the attribute information constructed from N LoDs. Client device A receives three-dimensional map A, and decodes all the geometry information and the attribute information constructed from N LoDs.

Client device B displays the three-dimensional map to a user. In this case, client device B determines that all the geometry information and the attribute information in M LoDs (M<N) are necessary, and requests the server to send three-dimensional map B including all the geometry information and the attribute information constructed from M LoDs. Client device B receives three-dimensional map B, and decodes all the geometry information and the attribute information constructed from M LoDs.

It is to be noted that in addition to three-dimensional map B, the server (the three-dimensional data encoding device) may generate three-dimensional map C in which attribute information in the remaining N-M LoDs is encoded, and send three-dimensional map C to client device B in response to the request from client device B. Moreover, client device B may obtain the decoding result of N LoDs using the bitstreams of three-dimensional maps B and C.

Figure 127:
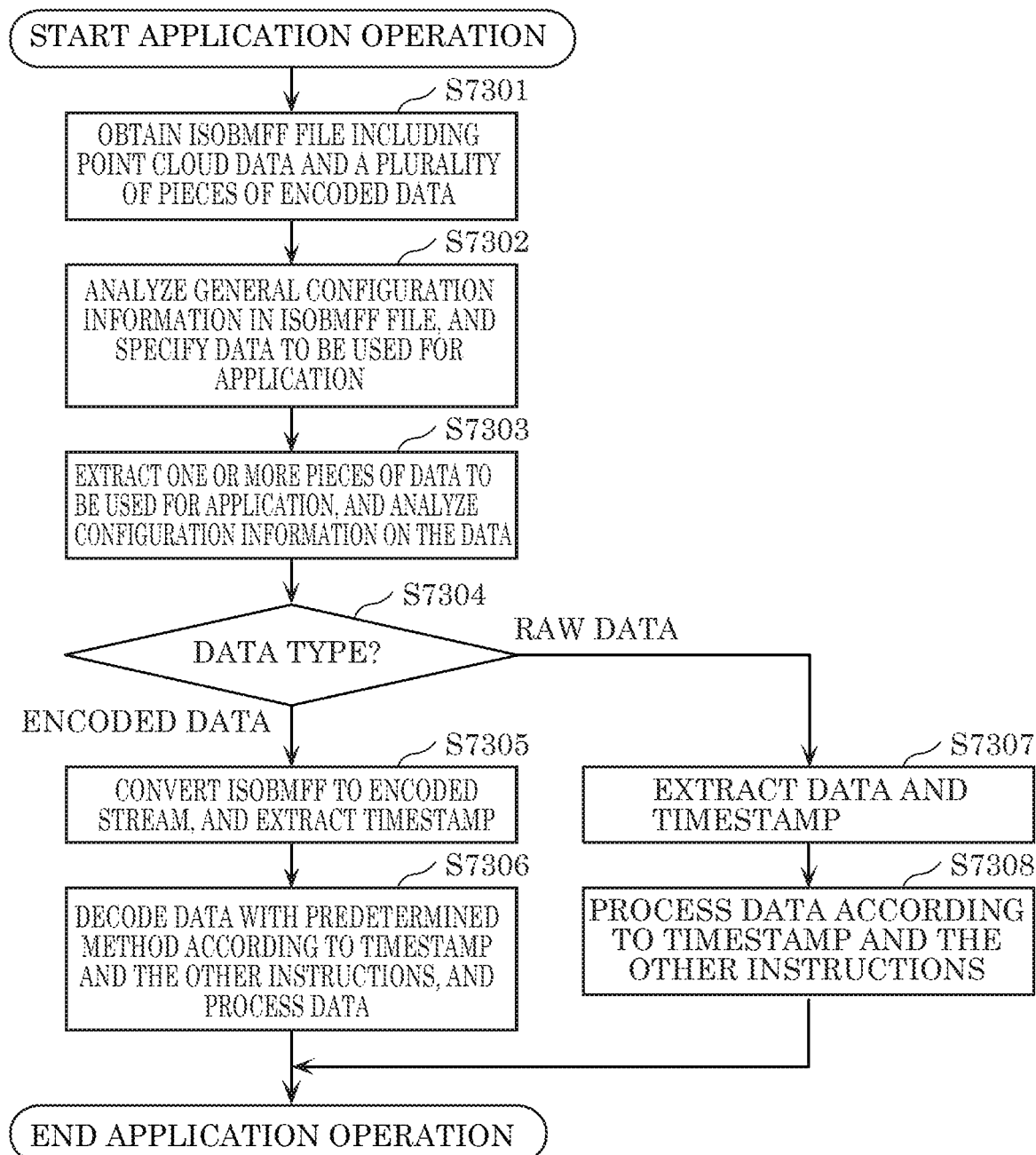

Hereinafter, an example of an application process will be described. FIG. 127 is a flowchart illustrating an example of the application process. When an application operation is started, a three-dimensional data demultiplexing device obtains an ISOBMFF file including point cloud data and a plurality of pieces of encoded data (S7301). For example, the three-dimensional data demultiplexing device may obtain the ISOBMFF file through communication, or may read the ISOBMFF file from the accumulated data.

Next, the three-dimensional data demultiplexing device analyzes the general configuration information in the ISOBMFF file, and specifies the data to be used for the application (S7302). For example, the three-dimensional data demultiplexing device obtains data that is used for processing, and does not obtain data that is not used for processing.

Next, the three-dimensional data demultiplexing device extracts one or more pieces of data to be used for the application, and analyzes the configuration information on the data (S7303).

When the type of the data is encoded data (encoded data in S7304), the three-dimensional data demultiplexing device converts the ISOBMFF to an encoded stream, and extracts a timestamp (S7305). Additionally, the three-dimensional data demultiplexing device refers to, for example, the flag indicating whether or not the synchronization between data is aligned to determine whether or not the synchronization between data is aligned, and may perform a synchronization process when not aligned.

Next, the three-dimensional data demultiplexing device decodes the data with a predetermined method according to the timestamp and the other instructions, and processes the decoded data (S7306).

On the other hand, when the type of the data is RAW data (RAW data in S7304), the three-dimensional data demultiplexing device extracts the data and timestamp (S7307). Additionally, the three-dimensional data demultiplexing device may refer to, for example, the flag indicating whether or not the synchronization between data is aligned to determine whether or not the synchronization between data is aligned, and may perform a synchronization process when not aligned. Next, the three-dimensional data demultiplexing device processes the data according to the timestamp and the other instructions (S7308).

Figure 128:
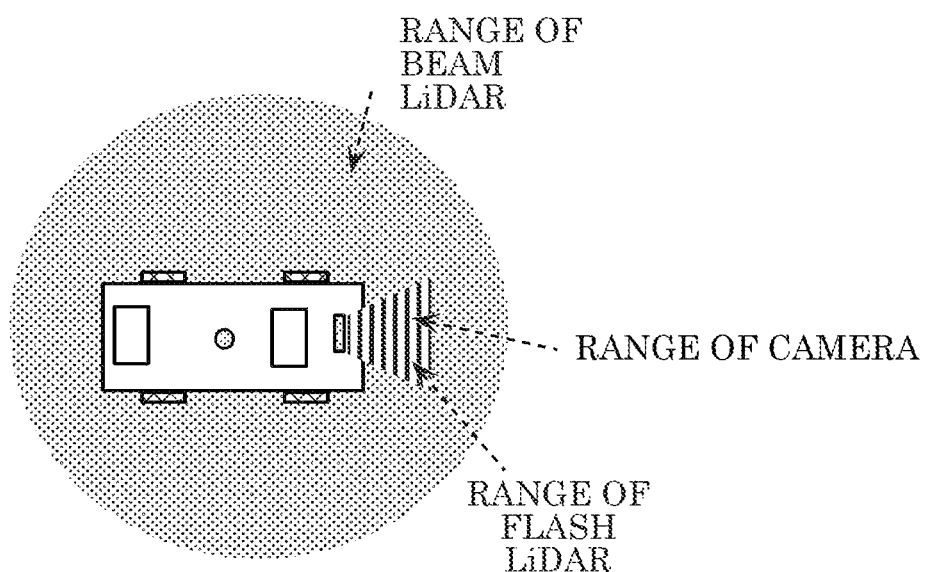

For example, an example will be described in which the sensor signals obtained by a beam LiDAR, a FLASH LiDAR, and a camera are encoded and multiplexed with respective different encoding schemes. FIG. 128 is a diagram illustrating examples of the sensor ranges of a beam LiDAR, a FLASH LiDAR, and a camera. For example, the beam LiDAR detects all directions in the periphery of a vehicle (sensor), and the FLASH LiDAR and the camera detect the range in one direction (for example, the front) of the vehicle.

In the case of an application that integrally handles a LiDAR point cloud, the three-dimensional data demultiplexing device refers to the general configuration information, and extracts and decodes the encoded data of the beam LiDAR and the FLASH LiDAR. Additionally, the three-dimensional data demultiplexing device does not extract camera images.

According to the timestamps of the beam LiDAR and the FLASH LiDAR, the three-dimensional data demultiplexing device simultaneously processes the respective encoded data of the time of the same timestamp.

For example, the three-dimensional data demultiplexing device may present the processed data with a presentation device, may synthesize the point cloud data of the beam LiDAR and the FLASH LiDAR, or may perform a process such as rendering.

Additionally, in the case of an application that performs calibration between data, the three-dimensional data demultiplexing device may extract sensor geometry information, and use the sensor geometry information in the application.

For example, the three-dimensional data demultiplexing device may select whether to use beam LiDAR information or FLASH LiDAR information in the application, and may switch the process according to the selection result.

In this manner, since it is possible to adaptively change the obtaining of data and the encoding process according to the process of the application, the processing amount and the power consumption can be reduced.

Figure 129:
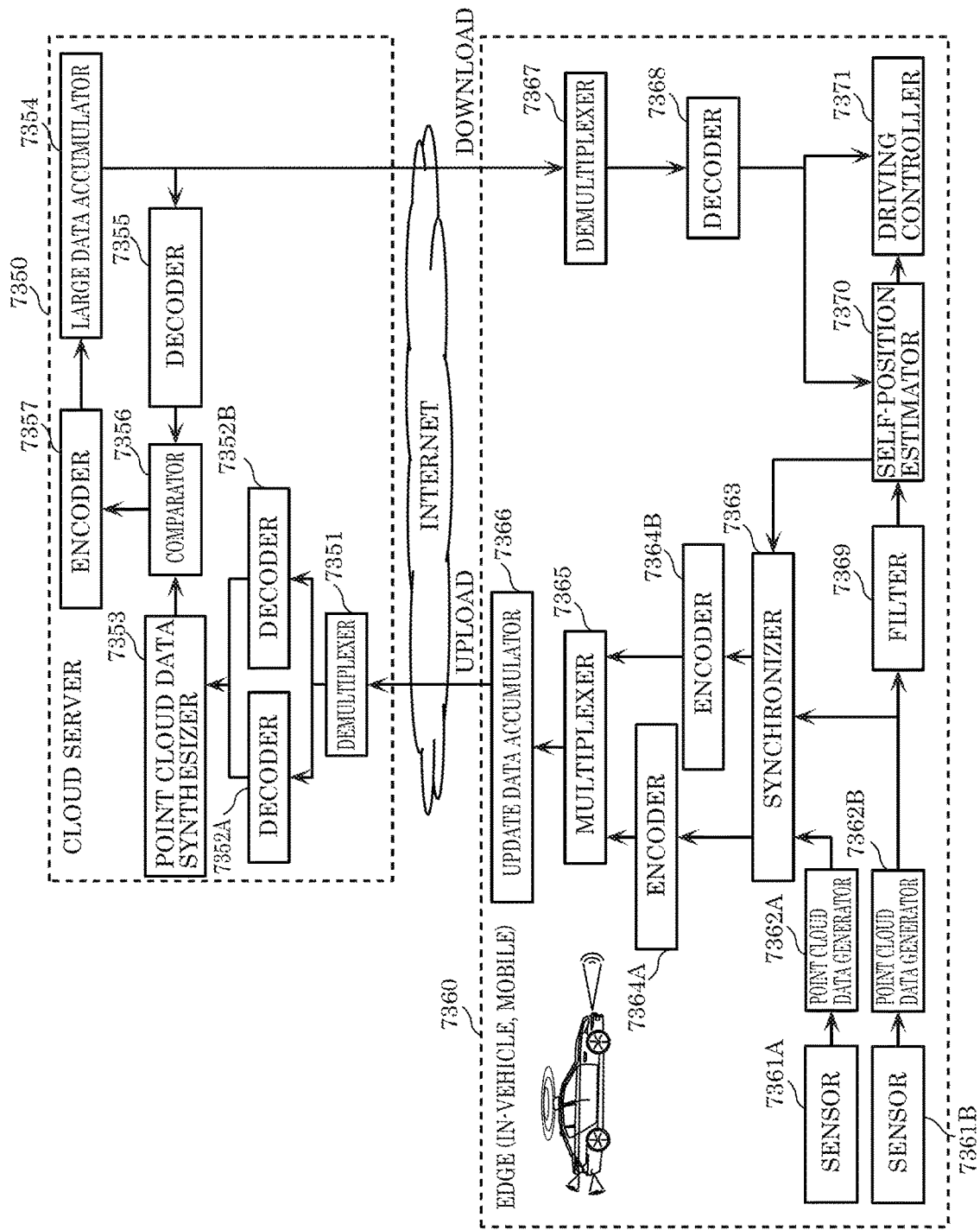

Hereinafter, a use case in automated driving will be described. FIG. 129 is a diagram illustrating a configuration example of an automated driving system. This automated driving system includes cloud server 7350, and edge 7360 such as an in-vehicle device or a mobile device. Cloud server 7350 includes demultiplexer 7351, decoders 7352A, 7352B, and 7355, point cloud data synthesizer 7353, large data accumulator 7354, comparator 7356, and encoder 7357. Edge 7360 includes sensors 7361A and 7361B, point cloud data generators 7362A and 7362B, synchronizer 7363, encoders 7364A and 7364B, multiplexer 7365, update data accumulator 7366, demultiplexer 7367, decoder 7368, filter 7369, self-position estimator 7370, and driving controller 7371.

In this system, edge 7360 downloads large data, which is large point-cloud map data accumulated in cloud server 7350. Edge 7360 performs a self-position estimation process of edge 7360 (a vehicle or a terminal) by matching the large data with the sensor information obtained by edge 7360. Additionally, edge 7360 uploads the obtained sensor information to cloud server 7350, and updates the large data to the latest map data.

Additionally, in various applications that handle point cloud data in the system, point cloud data with different encoding methods are handled.

Cloud server 7350 encodes and multiplexes large data. Specifically, encoder 7357 performs encoding by using a third encoding method suitable for encoding a large point cloud. Additionally, encoder 7357 multiplexes encoded data. Large data accumulator 7354 accumulates the data encoded and multiplexed by encoder 7357.

Edge 7360 performs sensing. Specifically, point cloud data generator 7362A generates first point cloud data (geometry information (geometry) and attribute information) by using the sensing information obtained by sensor 7361A. Point cloud data generator 7362B generates second point cloud data (geometry information and attribute information) by using the sensing information obtained by sensor 7361B. The generated first point cloud data and second point cloud data are used for the self-position estimation or vehicle control of automated driving, or for map updating. In each process, a part of information of the first point cloud data and the second point cloud data may be used.

Edge 7360 performs the self-position estimation. Specifically, edge 7360 downloads large data from cloud server 7350. Demultiplexer 7367 obtains encoded data by demultiplexing the large data in a file format. Decoder 7368 obtains large data, which is large point-cloud map data, by decoding the obtained encoded data.

Self-position estimator 7370 estimates the self-position in the map of a vehicle by matching the obtained large data with the first point cloud data and the second point cloud data generated by point cloud data generators 7362A and 7362B. Additionally, driving controller 7371 uses the matching result or the self-position estimation result for driving control.

Note that self-position estimator 7370 and driving controller 7371 may extract specific information, such as geometry information, of the large data, and may perform processes by using the extracted information. Additionally, filter 7369 performs a process such as correction or decimation on the first point cloud data and the second point cloud data. Self-position estimator 7370 and driving controller 7371 may use the first point cloud data and second point cloud data on which the process has been performed. Additionally, self-position estimator 7370 and driving controller 7371 may use the sensor signals obtained by sensors 7361A and 7361B.

Synchronizer 7363 performs time synchronization and geometry correction between a plurality of sensor signals or the pieces of data of a plurality of pieces of point cloud data. Additionally, synchronizer 7363 may correct the geometry information on the sensor signal or point cloud data to match the large data, based on geometry correction information on the large data and sensor data generated by the self-position estimation process.

Note that synchronization and geometry correction may be performed not by edge 7360, but by cloud server 7350. In this case, edge 7360 may multiplex the synchronization information and the geometry information to transmit the synchronization information and the geometry information to cloud server 7350.

Edge 7360 encodes and multiplexes the sensor signal or point cloud data. Specifically, the sensor signal or point cloud data is encoded by using a first encoding method or a second encoding method suitable for encoding each signal. For example, encoder 7364A generates first encoded data by encoding first point cloud data by using the first encoding method. Encoder 7364B generates second encoded data by encoding second point cloud data by using the second encoding method.

Multiplexer 7365 generates a multiplexed signal by multiplexing the first encoded data, the second encoded data, the synchronization information, and the like. Update data accumulator 7366 accumulates the generated multiplexed signal. Additionally, update data accumulator 7366 uploads the multiplexed signal to cloud server 7350.

Cloud server 7350 synthesizes the point cloud data. Specifically, demultiplexer 7351 obtains the first encoded data and the second encoded data by demultiplexing the multiplexed signal uploaded to cloud server 7350. Decoder 7352A obtains the first point cloud data (or sensor signal) by decoding the first encoded data. Decoder 7352B obtains the second point cloud data (or sensor signal) by decoding the second encoded data.

Point cloud data synthesizer 7353 synthesizes the first point cloud data and the second point cloud data with a predetermined method. When the synchronization information and the geometry correction information are multiplexed in the multiplexed signal, point cloud data synthesizer 7353 may perform synthesis by using these pieces of information.

Decoder 7355 demultiplexes and decodes the large data accumulated in large data accumulator 7354. Comparator 7356 compares the point cloud data generated based on the sensor signal obtained by edge 7360 with the large data held by cloud server 7350, and determines the point cloud data that needs to be updated. Comparator 7356 updates the point cloud data that is determined to need to be updated of the large data to the point cloud data obtained from edge 7360.

Encoder 7357 encodes and multiplexes the updated large data, and accumulates the obtained data in large data accumulator 7354.

As described above, the signals to be handled may be different, and the signals to be multiplexed or encoding methods may be different, according to the usage or applications to be used. Even in such a case, flexible decoding and application processes are enabled by multiplexing data of various encoding schemes by using the present embodiment. Additionally, even in a case where the encoding schemes of signals are different, by conversion to an encoding scheme suitable for demultiplexing, decoding, data conversion, encoding, and multiplexing processing, it becomes possible to build various applications and systems, and to offer of flexible services.

Figure 130:
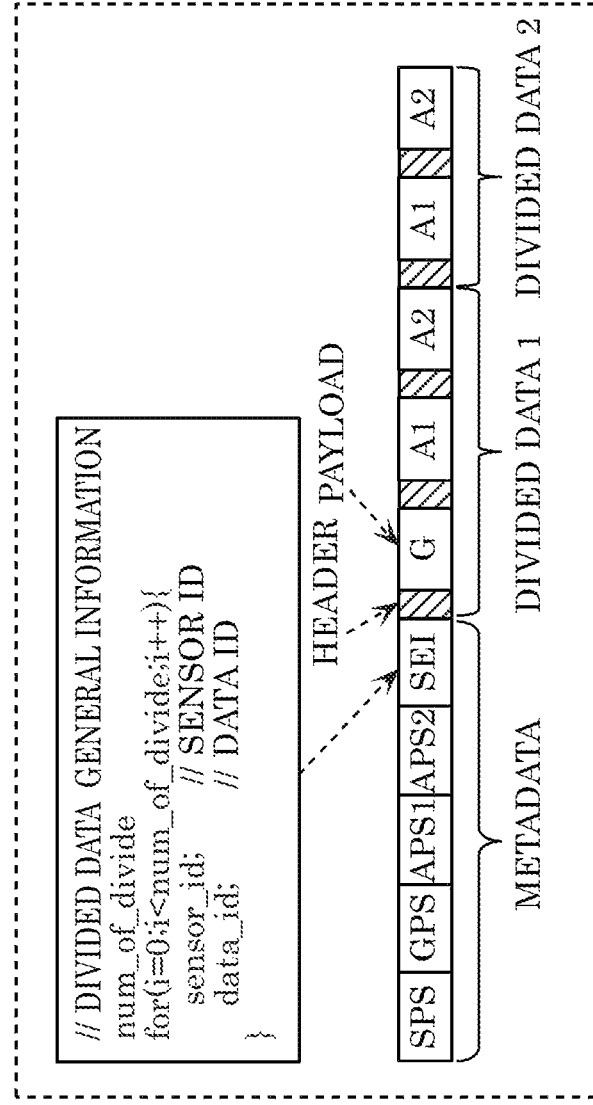

Hereinafter, an example of decoding and application of divided data will be described. First, the information on divided data will be described. FIG. 130 is a diagram illustrating a configuration example of a bitstream. The general information of divided data indicates, for each divided data, the sensor ID (sensor_id) and data ID (data_id) of the divided data. Note that the data ID is also indicated in the header of each encoded data.

Note that the general information of divided data illustrated in FIG. 130 includes, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly, the three-dimensional data decoding device can obtain the information on various sensors from the configuration information.

The general information of divided data may be stored in SPS, GPS, or APS, which is the metadata, or may be stored in SEI, which is the metadata not required for encoding. Additionally, at the time of multiplexing, the three-dimensional data encoding device stores the SEI in a file of ISOBMFF. The three-dimensional data decoding device can obtain desired divided data based on the metadata.

In FIG. 130, SPS is the metadata of the entire encoded data, GPS is the metadata of the geometry information, APS is the metadata for each attribute information, G is encoded data of the geometry information for each divided data, and A1, etc. are encoded data of the attribute information for each divided data.

Next, an application example of divided data will be described. An example of application will be described in which an arbitrary point cloud is selected, and the selected point cloud is presented. FIG. 131 is a flowchart of a point cloud selection process performed by this application. FIG. 132 to FIG. 134 are diagrams illustrating screen examples of the point cloud selection process.

As illustrated in FIG. 132, the three-dimensional data decoding device that performs the application includes, for example, a UI unit that displays an input UI (user interface) 8661 for selecting an arbitrary point cloud. Input UI 8661 includes presenter 8662 that presents the selected point cloud, and an operation unit (buttons 8663 and 8664) that receives operations by a user. After a point cloud is selected in UI 8661, the three-dimensional data decoding device obtains desired data from accumulator 8665.

First, based on an operation by the user on input UI 8661, the point cloud information that the user wants to display is selected (S8631). Specifically, by selecting button 8663, the point cloud based on sensor 1 is selected. By selecting button 8664, the point cloud based on sensor 2 is selected. Alternatively, by selecting both button 8663 and button 8664, the point cloud based on sensor 1 and the point cloud based on sensor 2 are selected. Note that it is an example of the selection method of point cloud, and it is not limited to this.

Next, the three-dimensional data decoding device analyzes the general information of divided data included in the multiplexed signal (bitstream) or encoded data, and specifies the data ID (data_id) of the divided data constituting the selected point cloud from the sensor ID (sensor_id) of the selected sensor (S8632). Next, the three-dimensional data decoding device extracts, from the multiplexed signal, the encoded data including the specified and desired data ID, and decodes the extracted encoded data to decode the point cloud based on the selected sensor (S8633). Note that the three-dimensional data decoding device does not decode the other encoded data.

Lastly, the three-dimensional data decoding device presents (for example, displays) the decoded point cloud (S8634). FIG. 133 illustrates an example in the case where button 8663 for sensor 1 is pressed, and the point cloud of sensor 1 is presented. FIG. 134 illustrates an example in the case where both button 8663 for sensor 1 and button 8664 for sensor 2 are pressed, and the point clouds of sensor 1 and sensor 2 are presented.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a three-dimensional data encoding device and a three-dimensional data decoding device.

What is claimed is:

1. A three-dimensional data encoding method comprising:
obtaining data units each including three-dimensional points;
encoding the three-dimensional points included in each of the data units; and
generating a bitstream including encoded data obtained by encoding the three-dimensional points,
wherein in the encoding:
geometry information of three-dimensional points included in a data unit to be encoded is converted into occupancy maps using an N-ary tree, N being an integer greater than or equal to 2;
each of the occupancy maps is converted into an index using a table indicating a correspondence relation between occupancy maps and indexes, and the encoded data is generated by encoding the index;
the table is updated according to the index resulting from the conversion, and is stored into memory;
whether the table stored in the memory is to be initialized is determined when a lead three-dimensional point included in a next data unit following the data unit to be encoded is encoded; and
when it is determined that the table stored in the memory is not to be initialized, encoding of the next data unit is started using the table stored in the memory, and
the bitstream further includes first identification information indicating a result of the determination.

2. The three-dimensional data encoding method according to claim 1,
wherein the index indicates a total number of occurrences of an occupancy map or an occurrence frequency of an occupancy map.

3. The three-dimensional data encoding method according to claim 1,
wherein when indicating that the table is to be initialized, the first identification information indicates that context of a preceding data unit is to be initialized, and attribute information of the three-dimensional points is to be encoded; and when indicating that the table is not to be initialized, the first identification information indicates that the attribute information is to be encoded continuously using the context of the preceding data unit.

4. The three-dimensional data encoding method according to claim 1,
wherein the bitstream further includes second identification information indicating whether a function of continuing entropy between the data units is to be used, and
when the second identification information indicates that the function of continuing the entropy between the data units is to be used, the first identification information is shown.

5. A three-dimensional data decoding method comprising:
obtaining a bitstream including encoded data and first identification information, the encoded data being obtained by encoding a data unit including three-dimensional points, the first identification information indicating whether a table is to be initialized and used to encode the data unit, the table being used in encoding a preceding data unit preceding the data unit; and
decoding the encoded data using the table according to the first identification information,
wherein the table indicates a correspondence relation between occupancy maps and indexes, the occupancy map representing geometry information of the three-dimensional points using an N-ary tree, N being an integer greater than or equal to 2,
the encoded data includes the index encoded, and
in the decoding, the geometry information of the three-dimensional points is calculated by deriving an occupancy map corresponding to, in the table, the index obtained by decoding the encoded data.

6. The three-dimensional data decoding method according to claim 5,
wherein the index indicates a total number of occurrences of an occupancy map or an occurrence frequency of an occupancy map.

7. The three-dimensional data decoding method according to claim 5,
wherein when indicating that the table is to be initialized, the first identification information indicates that context of the preceding data unit is to be initialized, and attribute information of the three-dimensional points is to be encoded; and when indicating that the table is not to be initialized, the first identification information indicates that the attribute information is to be encoded continuously using the context of the preceding data unit.

8. The three-dimensional data decoding method according to claim 5,
wherein the bitstream further includes second identification information indicating whether a function of continuing entropy between the data units is to be used, and
when the second identification information indicates that the function of continuing the entropy between the data units is to be used, the first identification information is shown.

9. A three-dimensional data encoding device comprising:
a processor; and
memory,
wherein using the memory, the processor:
obtains data units each including three-dimensional points;
encodes the three-dimensional points included in each of the data units; and
generates a bitstream including encoded data obtained by encoding the three-dimensional points,
in the encoding:
geometry information of three-dimensional points included in a data unit to be encoded is converted into occupancy maps using an N-ary tree, N being an integer greater than or equal to 2;
each of the occupancy maps is converted into an index using a table indicating a correspondence relation between occupancy maps and indexes, and the encoded data is generated by encoding the index;
the table is updated according to the index resulting from the conversion, and is stored into the memory;
whether the table stored in the memory is to be initialized is determined when a lead three-dimensional point included in a next data unit following the data unit to be encoded is encoded; and
when it is determined that the table stored in the memory is not to be initialized, encoding of the next data unit is started using the table stored in the memory, and
the bitstream further includes first identification information indicating a result of the determination.

10. A three-dimensional data decoding device comprising:
a processor; and
memory,
wherein using the memory, the processor:
obtains a bitstream including encoded data and first identification information, the encoded data being obtained by encoding a data unit including three-dimensional points, the first identification information indicating whether a table is to be initialized and used to encode the data unit, the table being used in encoding a preceding data unit preceding the data unit; and
decodes the encoded data using the table according to the first identification information,
the table indicates a correspondence relation between occupancy maps and indexes, the occupancy map representing geometry information of the three-dimensional points using an N-ary tree, N being an integer greater than or equal to 2,
the encoded data includes the index encoded, and
in the decoding, the geometry information of the three-dimensional points is calculated by deriving an occupancy map corresponding to, in the table, the index obtained by decoding the encoded data.

* * * * *